US010558963B2

(12) United States Patent
Desai et al.

(10) Patent No.: US 10,558,963 B2
(45) Date of Patent: Feb. 11, 2020

(54) SHAREABLE WIDGET INTERFACE TO MOBILE WALLET FUNCTIONS

(71) Applicant: MASTERCARD MOBILE TRANSACTIONS SOLUTIONS, INC., Purchase, NY (US)

(72) Inventors: Mehul Desai, Oak Brook, IL (US); Satyan G. Pitroda, Oak Brook, IL (US); Nehal Maniar, Oak Brook, IL (US)

(73) Assignee: MASTERCARD MOBILE TRANSACTIONS SOLUTIONS, INC., Purchase, NY (US)

( * ) Notice: Subject to any disclaimer, the term of this patent is extended or adjusted under 35 U.S.C. 154(b) by 416 days.

(21) Appl. No.: 15/293,847

(22) Filed: Oct. 14, 2016

(65) Prior Publication Data
US 2017/0032364 A1 Feb. 2, 2017

Related U.S. Application Data

(63) Continuation of application No. 14/154,635, filed on Jan. 14, 2014, now Pat. No. 9,508,073, which is a
(Continued)

(51) Int. Cl.
*G06Q 20/20* (2012.01)
*G06Q 20/36* (2012.01)
(Continued)

(52) U.S. Cl.
CPC .......... *G06Q 20/202* (2013.01); *G06F 8/60* (2013.01); *G06Q 20/10* (2013.01); *G06Q 20/204* (2013.01);
(Continued)

(58) Field of Classification Search
CPC .................................................. G06Q 20/202
(Continued)

(56) References Cited

U.S. PATENT DOCUMENTS 6,163,772 A  12/2000  Kramer et al.
6,606,708 B1  8/2003  Devine et al.
(Continued)

FOREIGN PATENT DOCUMENTS

EP   1132839 A1   9/2001
WO   0250743 A1   6/2002
(Continued)

OTHER PUBLICATIONS

"Guo Weidong, Design of Architecture for Mobile Payments System, 2008, Chinese Control and Decision Conference" (Year: 2008).*
(Continued)

*Primary Examiner* — Eric T Wong
*Assistant Examiner* — Kevin T Poe
(74) *Attorney, Agent, or Firm* — GTC Law Group PC & Affiliates

(57) ABSTRACT

Configuring a shareable widget interface to mobile wallet functions includes disposing a wallet module in a memory of a client device, and disposing a wallet companion applet in a secure element accessible by the client device, wherein the wallet companion applet facilitates access by at least one other applet and at least one wallet module to content that is stored in the secure element via a mobile wallet function sharable interface.

15 Claims, 59 Drawing Sheets

Related U.S. Application Data continuation of application No. 13/909,262, filed on Jun. 4, 2013, now Pat. No. 10,176,476, which is a continuation of application No. 13/651,028, filed on Oct. 12, 2012, now abandoned.

(60) Provisional application No. 61/546,084, filed on Oct. 12, 2011, provisional application No. 61/619,751, filed on Apr. 3, 2012.

(51) Int. Cl.
| | |
|---|---|
| G06Q 20/32 | (2012.01) |
| G06Q 40/02 | (2012.01) |
| G06Q 20/10 | (2012.01) |
| G06F 8/60 | (2018.01) |
| G06Q 20/40 | (2012.01) |
| G06Q 20/38 | (2012.01) |
| G06Q 30/06 | (2012.01) |

(52) U.S. Cl.
CPC ........... *G06Q 20/32* (2013.01); *G06Q 20/322* (2013.01); *G06Q 20/3223* (2013.01); *G06Q 20/3227* (2013.01); *G06Q 20/3278* (2013.01); *G06Q 20/36* (2013.01); *G06Q 20/363* (2013.01); *G06Q 20/367* (2013.01); *G06Q 20/3674* (2013.01); *G06Q 20/3829* (2013.01); *G06Q 20/40* (2013.01); *G06Q 20/401* (2013.01); *G06Q 20/405* (2013.01); *G06Q 20/4014* (2013.01); *G06Q 30/0641* (2013.01); *G06Q 40/02* (2013.01)

(58) Field of Classification Search
USPC .......................................................... 705/41
See application file for complete search history.

(56) References Cited

U.S. PATENT DOCUMENTS

| | | | |
|---|---|---|---|
| 6,993,747 B1 | 1/2006 | Friedman et al. | |
| 7,155,411 B1 | 12/2006 | Blinn et al. | |
| 7,240,034 B1 | 7/2007 | Remery et al. | |
| 7,802,264 B2 | 9/2010 | Robertson et al. | |
| 7,899,748 B2 | 3/2011 | Peters et al. | |
| 7,925,875 B2 | 4/2011 | McAvoy | |
| 8,069,435 B1 | 11/2011 | Lai et al. | |
| 8,126,806 B1 | 2/2012 | DiMartino et al. | |
| 8,311,513 B1 | 11/2012 | Nasserbakht et al. | |
| 8,432,260 B2 | 4/2013 | Talty et al. | |
| 8,496,168 B1 | 7/2013 | Zaugg et al. | |
| 8,577,804 B1 | 11/2013 | Bacastow et al. | |
| 8,595,186 B1 | 11/2013 | Mandyam et al. | |
| 8,671,055 B2 | 3/2014 | Spodak et al. | |
| 9,037,914 B1 | 5/2015 | Watanabe et al. | |
| 9,208,488 B2 | 12/2015 | Liberty | |
| 9,324,067 B2 | 4/2016 | Van Os et al. | |
| 9,390,413 B2 | 7/2016 | Castell et al. | |
| 9,454,758 B2 | 9/2016 | Desai et al. | |
| 9,483,253 B1 | 11/2016 | Schwermann et al. | |
| 9,501,773 B2 | 11/2016 | Dai | |
| 9,508,073 B2 | 11/2016 | Desai et al. | |
| 9,626,675 B2 | 4/2017 | Desai et al. | |
| 9,886,691 B2 | 2/2018 | Desai et al. | |
| 10,026,079 B2 | 7/2018 | Desai et al. | |
| 10,032,160 B2 | 7/2018 | Desai et al. | |
| 10,096,025 B2 | 10/2018 | Desai et al. | |
| 10,176,476 B2 | 1/2019 | Desai et al. | |
| 2001/0018746 A1 | 8/2001 | Lin | |
| 2002/0112171 A1 | 8/2002 | Ginter et al. | |
| 2002/0147645 A1 | 10/2002 | Alao et al. | |
| 2002/0179704 A1 | 12/2002 | Deaton | |
| 2002/0193102 A1 | 12/2002 | Hyyppa et al. | |
| 2003/0033539 A1 | 2/2003 | Cheng | |
| 2003/0087648 A1 | 5/2003 | Mezhvinsky et al. | |
| 2003/0121967 A1 | 7/2003 | Goldberg et al. | |
| 2004/0242209 A1 | 12/2004 | Kruis et al. | |
| 2004/0267688 A1 | 12/2004 | Vetelainen | |
| 2005/0044393 A1 | 2/2005 | Holdsworth et al. | |
| 2005/0071269 A1 | 3/2005 | Peters et al. | |
| 2005/0177517 A1 | 8/2005 | Leung et al. | |
| 2005/0187873 A1 | 8/2005 | Labrou et al. | |
| 2005/0246193 A1 | 11/2005 | Roever et al. | |
| 2005/0256802 A1 | 11/2005 | Ammermann et al. | |
| 2006/0046712 A1 | 3/2006 | Shamp et al. | |
| 2006/0059429 A1 | 3/2006 | Batthish et al. | |
| 2006/0165060 A1 | 7/2006 | Dua | |
| 2006/0242072 A1 | 10/2006 | Peled et al. | |
| 2006/0248069 A1 | 11/2006 | Qing et al. | |
| 2007/0005613 A1 | 1/2007 | Singh et al. | |
| 2007/0022058 A1 | 1/2007 | Labrou et al. | |
| 2007/0027784 A1 | 2/2007 | Kahn et al. | |
| 2007/0055635 A1 | 3/2007 | Kanapur et al. | |
| 2007/0101433 A1 | 5/2007 | Louch et al. | |
| 2007/0106564 A1* | 5/2007 | Matotek .................. G06Q 20/20 705/26.1 |
| 2007/0130252 A1 | 6/2007 | Boyle | |
| 2007/0156436 A1 | 7/2007 | Fisher et al. | |
| 2007/0198435 A1 | 8/2007 | Siegal et al. | |
| 2007/0220009 A1 | 9/2007 | Morris et al. | |
| 2007/0293155 A1* | 12/2007 | Liao ....................... G06Q 20/32 455/41.2 |
| 2008/0010196 A1 | 1/2008 | Rackley, III et al. | |
| 2008/0048022 A1 | 2/2008 | Vawter | |
| 2008/0059375 A1 | 3/2008 | Abifaker | |
| 2008/0091616 A1 | 4/2008 | Helwin et al. | |
| 2008/0162361 A1* | 7/2008 | Sklovsky ............... G06Q 20/32 705/65 |
| 2008/0189184 A1 | 8/2008 | Kubo et al. | |
| 2008/0208744 A1 | 8/2008 | Arthur et al. | |
| 2008/0209225 A1 | 8/2008 | Lord et al. | |
| 2008/0214149 A1 | 9/2008 | Ramer et al. | |
| 2008/0255947 A1 | 10/2008 | Friedman et al. | |
| 2009/0037983 A1 | 2/2009 | Chiruvolu et al. | |
| 2009/0048953 A1 | 2/2009 | Hazel et al. | |
| 2009/0050686 A1 | 2/2009 | Kon et al. | |
| 2009/0076966 A1* | 3/2009 | Bishop ................. G06Q 20/027 705/67 |
| 2009/0125880 A1 | 5/2009 | Manolescu et al. | |
| 2009/0157716 A1 | 6/2009 | Kim et al. | |
| 2009/0234751 A1 | 9/2009 | Chan et al. | |
| 2009/0235149 A1 | 9/2009 | Frohwein et al. | |
| 2009/0248883 A1 | 10/2009 | Suryanarayana et al. | |
| 2009/0249321 A1 | 10/2009 | Mandyam et al. | |
| 2009/0288004 A1 | 11/2009 | Strandell et al. | |
| 2009/0288012 A1 | 11/2009 | Hertel et al. | |
| 2009/0307300 A1 | 12/2009 | Guedalia et al. | |
| 2010/0269096 A1 | 10/2010 | Araya et al. | |
| 2010/0291899 A1 | 11/2010 | Machani et al. | |
| 2010/0291904 A1* | 11/2010 | Musfeldt ............... G06F 21/604 455/414.1 |
| 2010/0323681 A1 | 12/2010 | Corda et al. | |
| 2011/0113473 A1* | 5/2011 | Corda .................... G06Q 20/32 726/3 |
| 2011/0137980 A1 | 6/2011 | Kim et al. | |
| 2011/0138376 A1 | 6/2011 | Kim et al. | |
| 2011/0145049 A1 | 6/2011 | Hertel et al. | |
| 2011/0191252 A1 | 8/2011 | Dai et al. | |
| 2011/0202465 A1 | 8/2011 | Mashhour | |
| 2011/0208657 A1 | 8/2011 | Rao | |
| 2011/0218911 A1 | 9/2011 | Spodak | |
| 2011/0238532 A1 | 9/2011 | Zargahi | |
| 2011/0289437 A1 | 11/2011 | Yuen et al. | |
| 2011/0294418 A1 | 12/2011 | Chen et al. | |
| 2012/0011063 A1 | 1/2012 | Killian et al. | |
| 2012/0059742 A1 | 3/2012 | Katzin et al. | |
| 2012/0074232 A1 | 3/2012 | Spodak et al. | |
| 2012/0123937 A1 | 5/2012 | Spodak | |
| 2012/0130838 A1 | 5/2012 | Koh et al. | |
| 2012/0172026 A1 | 7/2012 | Kwon et al. | |
| 2012/0173431 A1 | 7/2012 | Ritchie et al. | |
| 2012/0191612 A1 | 7/2012 | Spodak et al. | |
| 2012/0267432 A1 | 10/2012 | Kuttuva | |
| 2012/0290376 A1 | 11/2012 | Dryer et al. | |

(56) References Cited

U.S. PATENT DOCUMENTS

| | | |
|---|---|---|
| 2012/0290940 A1 | 11/2012 | Quine et al. |
| 2013/0041817 A1 | 2/2013 | Greenwald et al. |
| 2013/0054454 A1 | 2/2013 | Purves et al. |
| 2013/0060618 A1 | 3/2013 | Barton et al. |
| 2013/0065555 A1 | 3/2013 | Baker et al. |
| 2013/0124413 A1 | 5/2013 | Itwaru et al. |
| 2013/0151400 A1 | 6/2013 | Makhotin et al. |
| 2013/0151417 A1 | 6/2013 | Gupta et al. |
| 2013/0159186 A1 | 6/2013 | Brudnicki et al. |
| 2013/0191708 A1 | 7/2013 | Song et al. |
| 2013/0246261 A1 | 9/2013 | Purves et al. |
| 2013/0268437 A1 | 10/2013 | Desai et al. |
| 2013/0297464 A1 | 11/2013 | Jaquez et al. |
| 2013/0332343 A1 | 12/2013 | Desai et al. |
| 2013/0339232 A1 | 12/2013 | Desai et al. |
| 2014/0006184 A1 | 1/2014 | Godsey et al. |
| 2014/0019352 A1 | 1/2014 | Shrivastava |
| 2014/0020068 A1 | 1/2014 | Desai et al. |
| 2014/0058938 A1 | 2/2014 | McClung et al. |
| 2014/0089113 A1 | 3/2014 | Desai et al. |
| 2014/0089120 A1 | 3/2014 | Desai et al. |
| 2014/0089185 A1 | 3/2014 | Desai et al. |
| 2014/0095382 A1 | 4/2014 | Desai et al. |
| 2014/0129430 A1 | 5/2014 | Desai et al. |
| 2014/0129437 A1 | 5/2014 | Desai et al. |
| 2014/0129438 A1 | 5/2014 | Desai et al. |
| 2014/0130035 A1 | 5/2014 | Desai et al. |
| 2014/0157392 A1 | 6/2014 | Smith et al. |
| 2014/0188719 A1 | 7/2014 | Poornachandran et al. |
| 2014/0279479 A1 | 9/2014 | Maniar et al. |
| 2015/0019444 A1 | 1/2015 | Purves |
| 2015/0026049 A1 | 1/2015 | Theurer et al. |
| 2015/0154584 A1 | 6/2015 | Prashant et al. |
| 2015/0302398 A1 | 10/2015 | Desai et al. |
| 2015/0310423 A1 | 10/2015 | Desai et al. |
| 2015/0332254 A1 | 11/2015 | Desai et al. |
| 2016/0125386 A1 | 5/2016 | Desai et al. |
| 2016/0125394 A1 | 5/2016 | Desai et al. |
| 2016/0125414 A1 | 5/2016 | Desai et al. |
| 2017/0011396 A1 | 1/2017 | Desai et al. |
| 2017/0140356 A1 | 5/2017 | Desai et al. |
| 2018/0144337 A1 | 5/2018 | Maniar et al. |

FOREIGN PATENT DOCUMENTS

| | | |
|---|---|---|
| WO | 2005086593 A2 | 9/2005 |
| WO | 2006074258 A2 | 7/2006 |
| WO | 2013056104 A1 | 4/2013 |

OTHER PUBLICATIONS

"Carr Mahil, Mobile Payment Systems and Services: An Introduction, 2007" (Year: 2007).*

"Kamouskos Stamatis, Fokus Fraunhofer, Mobile Payment: A Journey Through Existing Procedures and Standardization Initiatives, 2004, IEEE Communications Surveys The Electronic Magazine of Original Peer-Reviewed Survey Articles" (Year: 2004).*

12840812.7, "European Application Serial No. 12840812.7, European Extended Search Report dated Jan. 8, 2015", C-Sam, Inc., 7 Pages.

PCT/US2012/060038, "International Application Serial No. PCT/US2012/060038, International Preliminary Report on Patentability and Written Opinion dated Apr. 24, 2014", C-Sam, Inc. et al, 7 Pages.

PCT/US2012/060038, "International Application Serial No. PCT/US2012/060038, International Search Report and Written Opinion dated Mar. 28, 2013", C-Sam, Inc. et al, 10 pages.

Andes, Scott M. et al., "Opportunities and Innovations in the Mobile Broadband Economy", The Information Technology and Innovation Foundation (Year: 2010), Sep. 14, 2010, pp. 1-15.

Carr, Mahil, "Mobile Payment Systems and Services", 2007 (Year: 2007), 2007, 12 Pages.

Chen, Jiajun J. et al., "User Acceptance of Mobile Payments: A Theoretical Model for Mobile Payments", Jan. 2005, (Year: 2005), Jan 2005, pp. 619-624.

Crease, Murray et al., "A Toolkit of Mechanism and Context Independent Widgets", http://eprints.gla.ac.uk/3214/1/toolkit_of_mechanism1.pdf, 2001, p. 1-15.

Falke, Oliver et al., "Mobile Services for Near Field Communications", Mar. 2007, University of Munich Department of Computer Science Media Informatics Group (Year: 2007), Vodafone Group Research and Development, Munich, oliver.falke@benq.com, ulrich.dietz@vodafone.com, Mar. 2007, 15 Pages.

Inside Secure, , "Inside Secure and SecureKey Technologies Team to Simplify Mobile Authentication and Payments", Apr. 7, 2012, Investment Weekly News (Year: 2012), Apr. 7, 2012, 1 page.

Kabir, Ziaul, "User Centric Design of an NFC Mobile Wallet Framework", http://www.diva-portal.org/smash/get/diva2:432724/FULLTEXT01.pdf, Feb. 2011, p. 1-95.

Nambiar, Seema et al., "Analysis of Payment Transaction Security in Mobile Commerce", Proceedings of the 2004 IEEE International Conference on Information Reuse and Integration, 2004 (Year: 2005), 2005, 7 Pages.

Ondrus, Jan, "Mobile Payments: A Tool Kit for a Better Understanding of the Market", 2009, University of Lausanne (Year: 2009), Ondrus@hec.unil.ch, 2009, pp. 1-38.

Raina, Vibha K. , "Integration of Biometric authentication prodcedure in customer oriented payment system in trusted mobile devices", Dec. 2011, International Journal of Information Technology Convergence and Services, vol. 1 No. 6 (Year: 2011), Department of Computer Sciences Birla Institute of Technology, Extension Centre, NOIDA, kawvibha@yahoo.com, Dec. 2011, pp. 15-25.

Singh, Sumanjeet , "Emergence of Payment Systems in the age of electronic commerce: The State of Art", 2009, Asia Pacific Journal of Fiance and Banking Research, vol. 3 No. 3 2009 (Year: 2009), 2009, pp. 18-40.

Spindler, Martin et al., "Dynamic Tangible User Interface Palettes", https://pdfs.semanticscholar.org/5ac7/12a51758dacfec2bb6ff1585570c1139e99f.pdf, 2013, p. 1-18.

Varshney, Upkar , "Location Management for Mobile Commerce Applications in Wireless Internet Environment", Aug. 2003, ACM Transactions on Internet Technology vol. 3 No. 3 (Year: 2003), Aug. 2003, pp. 236-255.

Vartiainen, Elina et al., "Auto-Update: A Concept for Automatic Downloading of Web Content to a Mobile Device", http://delivery.acm.org/10.1145/1380000/1378179/p683-vartiainen.pdf, Sep. 10-12, 2007, p. 683-689.

Veijalainen, Jan et al., "Transaction management for m-commerce at a mobile terminal", Oct. 2005, Electronic Commerce Research and Applications, vol. 5 Issue 3, (Year: 2005), Oct. 2005, pp. 229-245.

* cited by examiner

SHAREABLE WIDGET INTERFACE TO MOBILE WALLET FUNCTIONS

CROSS-REFERENCE TO RELATED APPLICATIONS

This application is a continuation of U.S. patent application Ser. No. 14/154,635 filed Jan. 14, 2014, entitled "SHAREABLE WIDGET INTERFACE TO MOBILE WALLET FUNCTIONS."

U.S. patent application Ser. No. 14/154,635 is a continuation of U.S. patent application Ser. No. 13/909,262 filed Jun. 4, 2013, entitled "A SECURE ECOSYSTEM INFRASTRUCTURE ENABLING MULTIPLE TYPES OF ELECTRONIC WALLETS IN AN ECOSYSTEM OF ISSUERS, SERVICE PROVIDERS, AND ACQUIRES OF INSTRUMENTS". U.S. patent application Ser. No. 13/909,262 is a continuation of U.S. patent application Ser. No. 13/651,028 filed Oct. 12, 2012, entitled "A MULTI-TIERED SECURE MOBILE TRANSACTIONS ENABLING PLATFORM".

U.S. patent application Ser. No. 13/651,028 also claims the benefit of U.S. provisional patent application 61/546,084 filed Oct. 12, 2011 and U.S. provisional patent application 61/619,751 filed Apr. 3, 2012.

U.S. patent application Ser. No. 14/154,635 is related U.S. patent application Ser. No. 11/931,872, filed Oct. 31, 2007, entitled "System and methods for servicing electronic transactions".

Each of the foregoing applications is incorporated herein by reference in its entirety.

This application is related to the following U.S. patents, each of which is incorporated herein by reference in its entirety: U.S. Pat. No. 8,527,380, filed Oct. 31, 2002, entitled "System and methods for servicing electronic transactions"; U.S. Pat. No. 6,769,607, filed Jun. 6, 2000, entitled "Point of sale and display adapter for electronic transaction device"; U.S. Pat. No. 6,705,520, filed Nov. 15, 1999, entitled "Point of sale adapter for electronic transaction device"; U.S. Pat. No. 5,590,038, filed Jun. 20, 1994, entitled "Universal electronic transaction card including receipt storage and system and methods of conducting electronic transactions"; U.S. Pat. No. 5,884,271, filed Sep. 6, 1996, entitled "Device, system and methods of conducting paperless transactions device", U.S. Pat. No. 6,925,439, filed Mar. 10, 1999, entitled "Device, system and methods of conducting paperless transactions"; U.S. Pat. No. 7,308,426, filed Aug. 11, 1999, entitled "System and methods for servicing electronic transactions"; and U.S. Pat. No. 7,366,990, filed Jan. 19, 2001, entitled "Method and system for managing user activities and information using a customized computer interface".

BACKGROUND

Field

The methods and systems of a multi-tier mobile transaction platform for secure personalized transactions in a multi-domain ecosystem generally relates to mobile transaction processing security.

Description of the Related Art

Mobile transactions are becoming the most prevalent form of point of sale payments. Existing systems for mobile transaction processing do not have the scalability and flexibility of configurability needed to address the ever growing demand for secure personalized transaction services and client contact to meet future business needs.

SUMMARY

A mobile transaction platform (MTP) may comprise a carrier-grade, infrastructure platform that may facilitate the development and delivery of secure transactional services, both mCommerce (e.g. over-the-air) and mPayment (e.g. Near Field Communication (NFC) Proximity), to a broad range of mobile phone environments. A MTP may include an enhanced software development methodology to further simplify development and hide phone environment-specific complexities from the developer by providing a consistent, common development environment. Native phone features may also be exposed during development to allow developers to define native phone experiences and the like while still benefiting from a common and robust development methodology and environment. One benefit of using the MTP is rapid mobile service development for a broad range of mobile handsets to quickly build a profitable mobile transaction ecosystem.

In addition, disclosed herein is an end-to-end secure transaction environment in which a trust model is applied that ensures not only secure electronic transactions but provides secure and safe electronic business operations among users, payment facilities, and merchants through the use of dynamic authentication of each user, each device operated by a user, and each transaction and/or service domain. The disclosed trust model ensures that, for example, users and merchants can conduct transactions without the use of "middle men" to ensure safe and reliable commerce. By authenticating a user through one or more main service facilities and by authenticating merchants and other providers through such main service facilities it is possible for each merchant to have a unique yet secure relationship with each user through any device on which the user has been authenticated to the main service facility. However, through use of a main service facility for authentication and enabling a robust trust model, multiple merchants (e.g. providers of products, financial services, and many other services described herein) may securely and directly transact with a single user. In this way a plurality of authenticated merchants may be available to the user in an aggregated portfolio that may facilitate greatly improved secure electronic commerce.

Aspects of an e-business environment may include a provider domain (e.g. banks, merchants, etc) that may be accessed through a wallet platform and provides the ability to build out wallet and widget capability to enable looking at an electronic transaction environment from a risk management perspective. In an example, cross selling across the ecosystems may take advantage of the methods and systems described herein thereby allowing mapping of risk management into the e-commerce process.

Aspects of a secure multi-domain ecosystem environment may extend the environment to the consumer. Once a consumer is authenticated into such an environment one may have the ability to establish trust models that may enable delivery of a particular instance of services by a single trust model. Other products/services may be delivered by the use of other trust models.

Also, the methods and systems herein may facilitate extending a security tunnel to merchants that may be embodied as a tunnel within a tunnel, which may enable a core security architecture. In this way businesses can avoid getting bogged down with security rather than focusing on applications that will provide a sustainable business model. In an example, the methods and systems herein may enable a business person to look at the frequency of use of applications (e.g., 3x/day vs. 3x/month) to help envision a significantly different trust model for each of a range of different user interaction models.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures.

DETAILED DESCRIPTION

Figure 1:
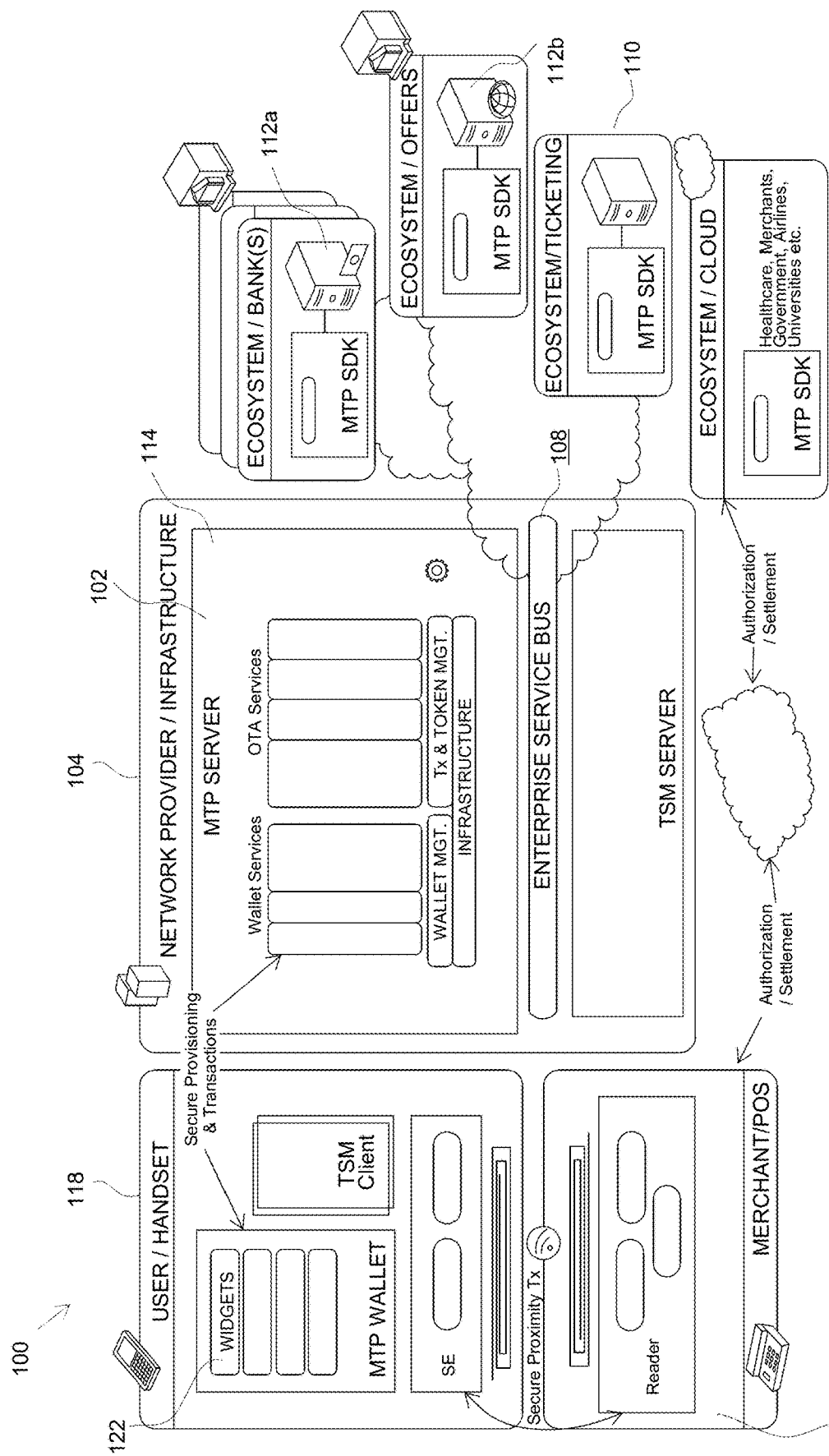
FIG. 1 illustrates a dynamic ecosystem 100 for secure mCommerce and mPayment transactions.

While described herein with reference to various embodiments, it is understood that, in all cases, unless otherwise specified, references to an "embodiment" or "embodiments" refer to one or more exemplary and non-limiting embodiments. Also, it is understood that, in all descriptions herein, unless otherwise specified, even when not explicitly being referenced to an "embodiment" or "embodiments" refer to one or more exemplary and non-limiting embodiments.

A multi-domain ecosystem may be configured for secure personalized transactions via a multi-tiered secure mobile transactions enabling platform that may comprise an enabling tier, a service tier, a personalization tier, an expert tier, and an experience framework tier. A multi-domain ecosystem may include a plurality of service providers, instrument issuers, mobile transaction processors, transaction acquirers, third-party authenticators, and a plurality of users accessing the ecosystem via a diversity of electronic devices. A multi-tiered secure mobile transactions ecosystem-enabling platform as described herein may facilitate any ecosystem participant to configure aspects of the ecosystem to satisfy a set of unique business model needs. The multi-tiered secure mobile transactions ecosystem enabling platform may offer software development and element configuration tools to prepare and personalize electronic wallets, active device widgets, back-end infrastructure runtime code, and the like that target specific business model and/or trust model needs. By facilitating secure, trusted, ecosystem operations (e.g. issuance, maintenance, and use of electronic wallets) the platform may support securely transacting via a single mobile device with a large number of distinct domains. By providing tools to personalize functional elements (e.g. widgets) for deployment in mobile devices, the platform may facilitate, secure, customized transaction-related communication between the plurality of distinct domains (e.g. distinct service providers) and a user, such as a customer, that may increase opportunities for interacting with the customer by a factor of ten or more.

A multi-tiered secure mobile transactions enabling platform, which may alternatively be coined a mobile transaction platform or MTP, may deliver secure transaction functionality for users, enabling an ecosystem of participants which include service providers, issuers/acquirers of instruments and services, related support and value added service providers, and distribution networks, among others. A multi-tiered secure mobile transaction enabling platform may be delivered through well structured software and/or hardware modules focused on delivering capabilities such as direct service provider to user communication, messaging and notification, security and authentication, over-the-air (OTA) provisioning, OTA trusted service manager (TSM) proxy operation, client-based secure ecosystem container operation, wallet and widget management, transaction engine operation, digital instrument management, location and/or geo-fencing support, augmented reality, and the like.

The methods and systems of a multi-tier mobile transaction platform for secure personalized transactions in a multi-domain ecosystem may facilitate establishing and operating a market place or exchange of transaction-related credentials. These credentials may be tokenized or may not be tokenized, subject to the requirement of their respective issuers and acquirers, related to payment and non-payment services, and the like. These credentials may be transacted over-the-air and in proximity environments over host of channels, such as point of sale terminals, and the like. By employing these methods and systems that may enable such a transaction-related credential exchange, a key business problem related to scaling such an ecosystem may be solved. This exchange of transaction-related credentials may completely remove the need for a single service provider to embed themselves as the effective exchange of such transaction credentials, and rather allow for existing issuers, acquirers and service providers (and/or consumers of such credentials) to continue to leverage their existing systems, business, and risk-management practices. Such an exchange will add value by leveraging the aspects of the mobile transaction platform described herein including various deployment models, configurable ecosystem rules, underlying aggregation security architecture and configurable security trust models, necessary tools, utilities, web-services, mobile device and server applications (e.g. wallets, containers, widgets, wallet companion domains), and the like. The result may be high quality service delivery in a highly scalable enterprise environment for ensuring the different ecosystem participants can be integrated and new participants can be added without burdensome overhead.

FIG. 1 illustrates a dynamic ecosystem 100 for secure mCommerce and mPayment transactions. The ecosystem 100 may be described herein. The MTP 114 may be configured to power a dynamic ecosystem for secure mCommerce and mPayment transactions as described below. The MTP may be set up in a network provider's domain 102 and integrated into a system of the network provider 104. In an example, an enterprise service bus (ESB) 108 of the network provider 104 may be used for integration. The MTP 114 may be connected to an ecosystem of service and security providers 110, which may include one or more trusted service managers (TSMs), for example, 112a, 112b. The network provider 104 may use the MTP 114 to create a branded mobile application targeting a specific business vertical. In an example, the mobile application may be a mWallet for the retail/financial domain or a mHealth application for the healthcare vertical. In an example, the mobile application may provide a core set of services to a user, specific to a domain for which it may have been created. For the purpose of this invention, the mobile application may be a wallet assuming a retail domain application. In an example, the wallet may also facilitate, application lifecycle and security, standardized user experience and widget management responsibilities. The widget may provide specific business services and complies with the wallet guidelines. The mobile application may be downloaded onto a user handset 118. The ecosystem of services 110 may be configured to authenticate any transaction done over the handset 118. In an example, the user handset 118 may be used at a merchant terminal 120. The merchant terminal 120 may be configured to receive communication from the ecosystem cloud 110 regarding the widget authentication of the user handset 118 widget 122, when used in vicinity of the merchant terminal 120 for effecting a transaction.

In an example, individual, independent service providers may use the MTP SDK to build widgets that may be loaded into the wallet. These widgets may provide incremental, functionality that may enhance the overall appeal of the mobile application. The wallet and the widgets may provide the users with OTA value added services (VAS) and proximity NFC services. The container (or MTP mClient runtime) may provide the wallet and the widgets a secure runtime environment and the services to communicate OTA with the server (OTA services) and also communicate with the secure element to manage payment and non-payment applets for proximity NFC transactions.

In an example, the widgets may have an associated applet running in the secure element. In an example, the widgets may not have an associated applet running in the secure element. In an example, the service providers may only choose to provide only OTA services. In an example, the MTP and TSMs may collaborate together to provide the entire NFC experience. In an example, the wallet and the widget (including soft card) provisioning, setup and management may be handled by the MTP, while applet issuance and personalization may be done by the TSM. In an example, the network provider may ensure that the NFC readers at merchant locations may be equipped to handle the proximity protocols that may be used by the various applets that may have been loaded into the phone's SE. These readers may then process the transaction through an acquiring network that may switch the transaction to the appropriate ecosystem service provider in the cloud. The wallet and/or the widget may communicate with the ecosystem cloud to determine service status and various other VAS requirements like balance, transaction history, stored value top-up, and the like.

In exemplary and non-limiting embodiments, the MTP may be configured for providing the wallet, the widget, and manage the transaction along with all the relevant business services that may be associated with delivering wallets to a universe of diverse mobile environments. In exemplary and non-limiting embodiments, the MTP may be configured for providing an improved SDK that may to help build a wallet and ecosystem of service providers that may create widgets with elaborate feature sets without having to worry about handset fragmentation. In exemplary and non-limiting embodiments, the MTP may be configured for establishing connectors with various ecosystems to deliver a dynamic user experience and diverse set of services to the end user that may be accessed irrespective of time and geographical location.

The MTP may be deployed for customers from various countries and may be tailored to specific country requirements. For example, the MTP may be used in The United States of America (USA), Japan, China, India, Singapore, Mexico, and Bolivia, for a variety of mCommerce and mPayments services. In exemplary and non-limiting embodiments, the MTP may be configured for providing banking services, ticketing services, and payment services.

In exemplary and non-limiting embodiments, the MTP may be deployed in a cloud and may be configured to aggregate various disparate service providers, to effectively provide end users with a suite of personalized secure transactional services. In an example, the network providers may deploy the enabling layer of the MTP (for example, the wallet and the transaction management along with infrastructure components), which may be agnostic to the services and channels. The enabling layer of the MTP may be configured to support an ecosystem of service providers for example, banks, merchants, healthcare providers, and the like. The enabling layer of the MTP may be configured to support all third party developers that may use the SDK to build their individual personalized applications for example, secure transaction applications.

Figure 2:
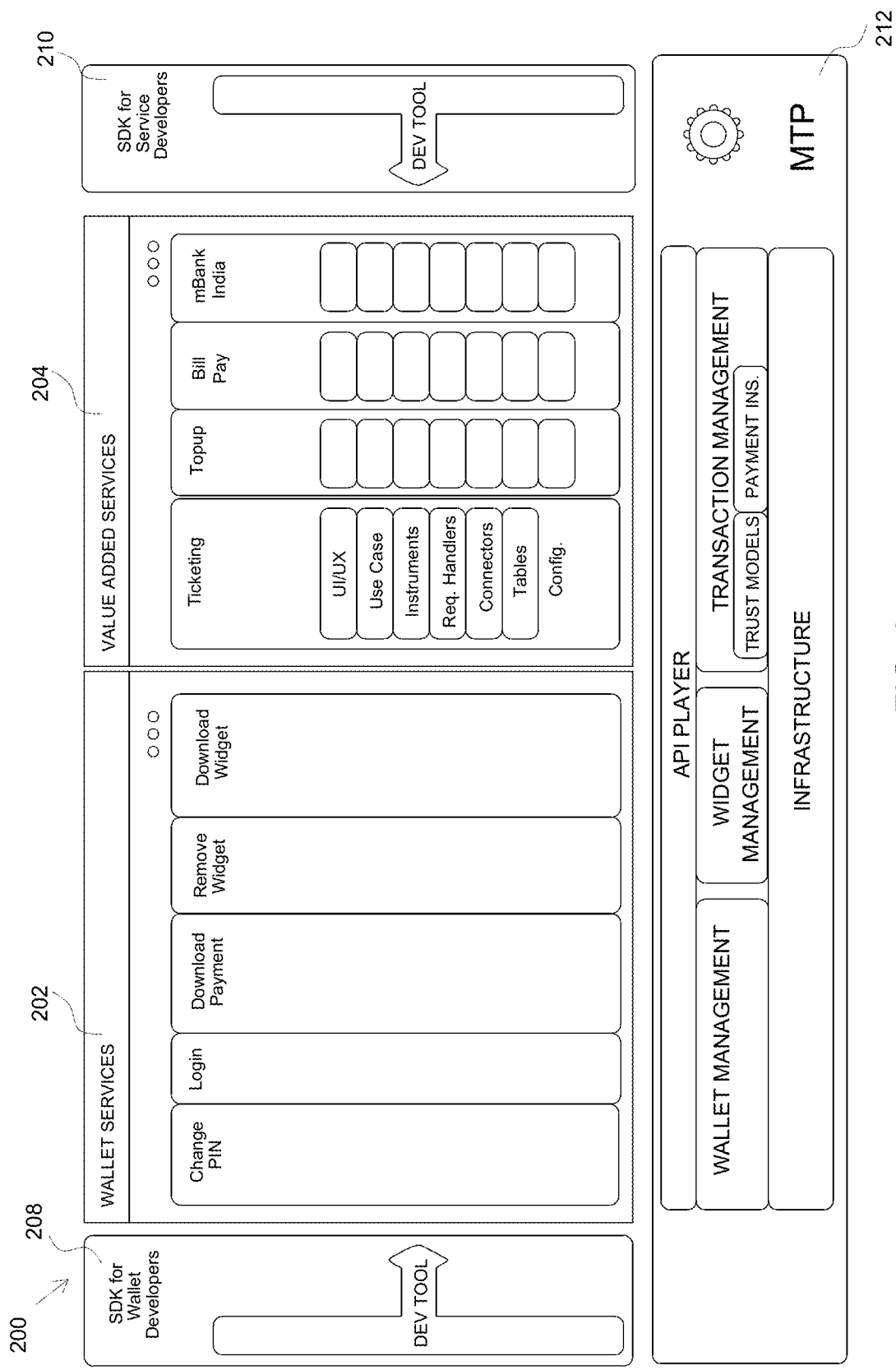
FIG. 2 illustrates a mobile transaction platform (MTP) high level structure.

FIG. 2 illustrates a MTP high level structure 200. A MTP 212 may be a client server platform. The client may operate on various mobile handsets and the server may operate in the service provider's "cloud". The client and the server may follow the high level architecture as shown in FIG. 1. The high level architecture may have three distinct components that may be required to build out an ecosystem. The distinct components may include a mobile enabling tier, a service tier and a software development kit (SDK). Each of the distinct components may interact with the client and the server. In exemplary and non-limiting embodiments, the mobile enabling tier may include infrastructure or business independent components that may be necessary to develop mobile applications. In exemplary and non-limiting embodiments, the service tier may include a collection of reference service implementations for wallet ecosystems and value added services. In exemplary and non-limiting embodiments, the SDK may include a set of tools and APIs that may be necessary to develop the wallet and the widget services (described in this document) and build a comprehensive ecosystem.

In exemplary and non-limiting embodiments, the mobile enabling tier may include different components for the client and for the server. For example, the mobile enabling tier for the client may include infrastructure runtime container software (SW) built using the mobile phone's specific development environment. In an example, the mobile enabling tier may provide the client a common abstraction to underlying phone capabilities with common Developer APIs, UI Interpretation and rendering engine, business execution environment, widget and wallet lifecycle management, Patterns for OTA/proximity transactions, etc. In an example, the mobile enabling tier may provide the server infrastructure software deployed in network provider's domain that may be configured for establishing and managing a secure mobile transactional ecosystem. In an example, the mobile enabling tier may provide the server with software equipped for wallet management, stateful transaction engine, object lifecycle management, channel specific communication, multi-domain security policy and risk management, OTA provisioning, and the like.

In exemplary and non-limiting embodiments, the service tier may include different components for the client and for the server. In an example, the service tier for the client may include a library of common platform services that may be used to implement a plurality of business use cases. The common platform services may run within the business execution environment provided by the enabling tier. In an example, the service tier may include three basic units. A first unit may be a use case, for example, a client side workflows and templates built for the various transaction services. A second unit may be an instrument, for example, a corresponding single wallet instrument that may facilitate mapping to real world instruments. In an example, the instrument may provide data for a visual or a display. In an example, the instrument may provide data for an over-the-air (OTA) transaction. In an example, the instrument may provide data for a proximity transaction. In an example, the instrument may provide data for an administration. A third unit may include at least one trust model. The trust model may facilitate implementation for authentication schemes, which may include a two factor authentication (2FA). The 2FA may be required by different widget providers and may be relevant for the ecosystem.

In an example, the service tier for the server may include a library of business specific components and associated service templates that may be partially or entirely reused to develop a customer centric offering. In an example, the services may include wallet services 202 and value added services 204. The wallet services 202 may include managing the lifecycle of the wallet and payment tokens. The value added services may include providing business services. The service tier may include three units. A first unit may be a use case, for example, the server side template may be built using the mobile enabling tier's transactional framework for implementing a specific use case. In an example, there may be one or more varying templates for a business service (example, bill payment, movie ticketing, and the like). A second unit may include at least one instrument or token. The instruments may include business specific data objects (for example, credit card, bank account, bill, coupons, etc.) that may be reused across various services and may provide a commonly understood definition for the object and implementation for the rules governing the object's lifecycle and transaction. A third component may include at least one trust model. The trust model may facilitate implementation for different authentication schemes for the services, including support to operate within individual trust clusters with their independent TSMs.

In exemplary and non-limiting embodiments, the SDK may include different components for the client and for the server. In an example, the SDK for the client may be divided into 2 parts. A first part may be a wallet SDK 208 and a second part may be a widget SDK 210. In an example, the wallet SDK 208 may provide access to the wallet services 202, privileged APIs, and the necessary components to build the wallet container application or user experience. In an example, the widget SDK 210 may facilitate the ecosystem partners to build their widgets that may operate within the wallet container. In exemplary and non-limiting embodiments, the SDK may essentially facilitate client side configuration and user experience. In an example, the SDK may facilitate configuration by facilitating customizability for parameters exposed by the client container. This may include device specific parameters, variables (like PIN size, exit confirmation, selecting inclusion of modules, etc.). In an example, the SDK may provide user experience by facilitating the development of differentiating user experiences across handsets.

In an example, the SDK for the server may include at least one library that may allow any ecosystem server to communicate with the wallet, format content for the widgets, and expose services to the wallet application. The library may include a configuration module and an interface module. The configuration module may allow customizability for parameters exposed by the server's mobile enabling and service tier. The parameters may be configured in property files and resource bundles. The interface module may provide connectors developed to facilitate communication with various backend systems that may collaborate to fulfill the complete end to end service. The interface module may also include web services exposed by the platform to integrate peripheral systems like customer care, user portals, and the like.

SDK vision—In an example, the SDK may refer to a collective set of tools and the underlying platform's APIs, utilities, patterns, interfaces, XML definitions, abstractions, and the like that may be used and/or followed to facilitate creation of a mobile client application or widget that runs within the MTP 212. The SDK's may facilitate development of the application without requiring in depth knowledge of the MTP or underlying phone environments. In an example, the complexities of secure, reliable mobile transactions may be designed so as to be "hidden under the hood" of the mobile enabling tier.

The SDK may support an open tool driven development for third party partners and sound illusion (SI) teams. The SDK may empower developers to independently build and distribute their own personalized secure transaction widgets based on the guidelines issued by the wallet management/enabling layer provider (typically a network provider). The SDK may open up various layers (essentially top to bottom). The SDK may provide access to the platform's lateral capabilities with respect to supporting multiple handset OS, robust messaging and communications, security and authentication, and NFC based secure proximity transactions for payment as well as non-payment services. The SDK may simplify development of the wallet and the widget. In an example, the MTP may also have a provision for building native wallets directly to leverage underlying functionality that may not yet be exposed through the SDK. This may give a developer the best of both the SDK and the MTP with enough flexibility to build an improved user experience.

Figure 3:
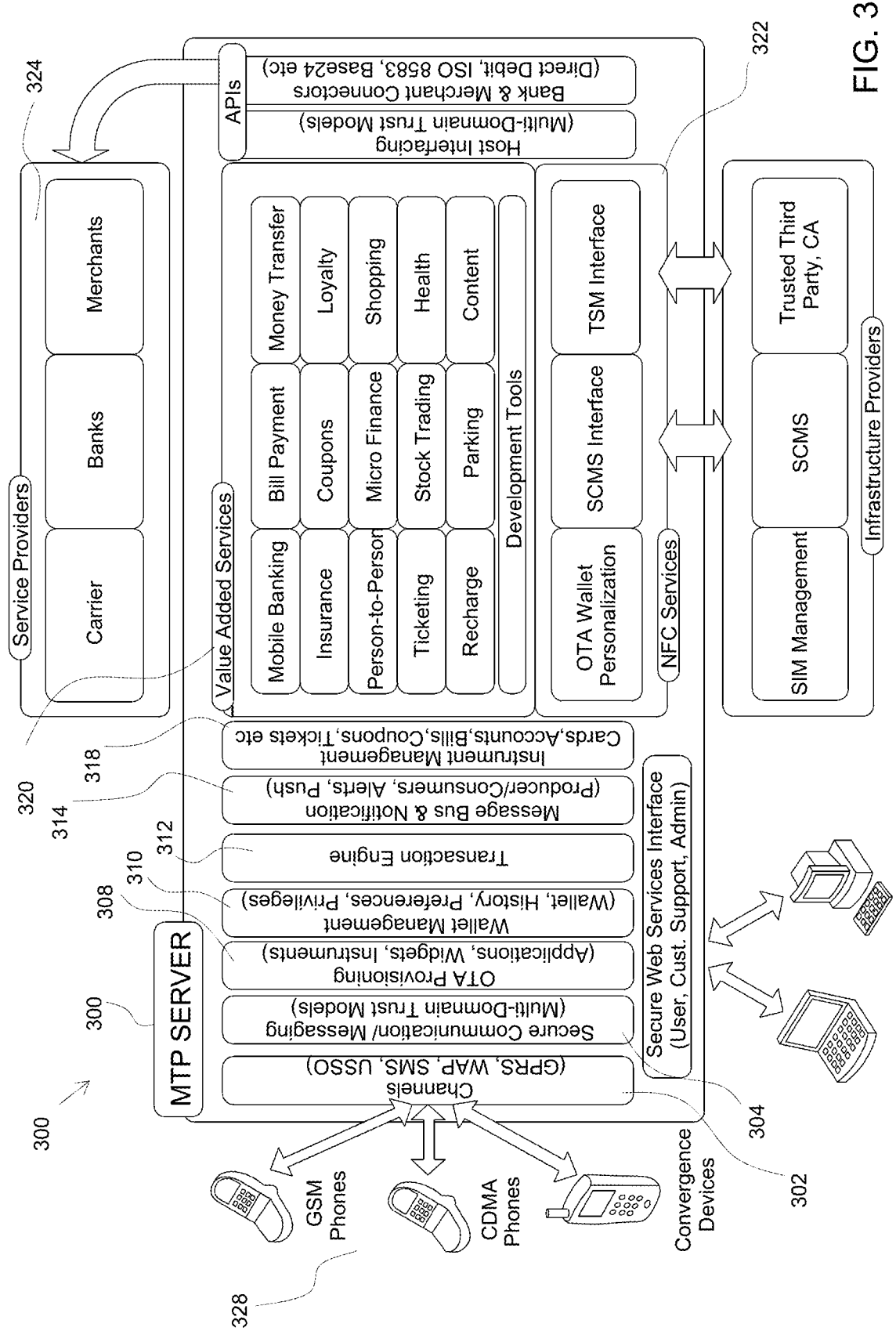
FIG. 3 illustrates mobile transaction platform (MTP) architecture.

FIG. 3 illustrates a detailed architecture of an MTP server 300. The MTP server may be an enabling infrastructure for building a wallet ecosystem that may support mCommerce (for example by OTA) and mPayment (for example by NFC Proximity) transactional services. The server may provide a front end gateway thereby extending the services offered by the ecosystem partners or service providers 324 (for example, the merchants, the banks, and the carriers) to a plurality of mobile handsets 328 through the mobile wallet application. In an exemplary and non-limiting embodiment, the server may include a set of components that may collaborate to provide wallet management, transaction management, and ecosystem integration. The server may be developed in Java and may support various application servers and databases. In an example, the server may be a container for the services being offered by the MTP. In an example, the server may be hosted in a secure DMZ (demilitarized zone) in a clustered setup for mission critical applications with connectivity to the ecosystem cloud.

As illustrated in FIG. 3, the MTP architecture may include server infrastructure components, service templates and reference implementations, NFC infrastructure components, and host integration framework.

In an example, the MTP server may include a plurality of channels 302, a communication module 304, an OTA component 308, a wallet management module 310, a transaction engine 312, a notification and service bus 314, an instruction management module 318, at least one value added services (VAS) module 320, NFC infrastructure 322, and a host integration framework. In an example, the channels 302 may provide a channel specific adaptation for requests to be received through multiple channels such as Mobile Data, SMS, USSD, and the like. In an example, the communication module 304 may provide the framework for supporting secure mobile client server interactions. The communication module 304 may facilitate the communication, authentication, authorization, and the like from the individual business components. The flexible architecture may facilitate a service developer to extend the security or introduce new requirements by adding additional layers. In an example, the OTA component 308 may provide a support that may be required for facilitating OTA delivery of applications, widgets, and personalized tokens that may be used during transactions. In an example, the OTA provisioning may include devices discovery and ensuring the appropriate version may be delivered to the device. In an example, the wallet management 310 module may provide the implementation for the wallet state management, lifecycle services, version management, wallet history, etc. The payment services, for example, provisioning of soft cards and personalizing applets, may also be included as a part of wallet management. In an example, the transaction engine 312 may provide the framework for developing OTA transactional services. The transactional service implementation may be developed by following the templates provided by the transaction framework. The requirements of reliability, security, logging, etc. may be transparently managed by the transaction framework. The transaction framework may provide a centralized access to interfaces with internal virtual accounts and external payment gateways. In an example, the notification and message bus 314 may provide an object exchange bus with the client application. In an example, the notification and message bus 314 may include support for pushing alerts and message to the wallet. In an example, an instrument management module 318, there may be several components which may provide various wallet instruments (for example, credit cards, bills, tickets, etc.) and manage various lifecycle services and configurations associated with these instruments within the platform. In an example, at least one of the VAS modules 320 may include a library of service templates and implementations for common business services that may have been built and deployed using the MTP platform. In an example, the NFC infrastructure 322 components a set of components that may integrate with the NFC ecosystem hosts for orchestrating the issuance and personalization of soft card and applets. The integration may support be required for enabling global platform compliant NFC transactional services from the ecosystem. In an example, the host integration framework may a layer including various connectors that may be plugged into the server to communicate with the back-end systems for facilitating the transactional services. The host integration framework may include a series of interface definitions which may have to be implemented by the service developer in the form of connectors to communicate with external host systems.

In various exemplary and non-limiting embodiments of the present invention, the primary responsibilities of the MTP server may include providing wallet management for the community of wallet users. In an example, the wallet management may include wallet lifecycle services, payment, widget management, and the like. In various exemplary and non-limiting embodiments of the present invention, the primary responsibilities of the MTP server may include establishing a service ecosystem and orchestrate transactions from the wallet application with the ecosystem service providers in a secure and reliable manner. In various exemplary and non-limiting embodiments of the present invention, the primary responsibilities of the MTP server may include supporting a third party developer community in building and distributing transactional widgets and manage the widget discovery and delivery. In various exemplary and non-limiting embodiments of the present invention, the primary responsibilities of the MTP server may include providing defined patterns and templates for implementing mobile financial transactions that hide the complexity of security, reliability, etc. from the service developer.

Figure 4:
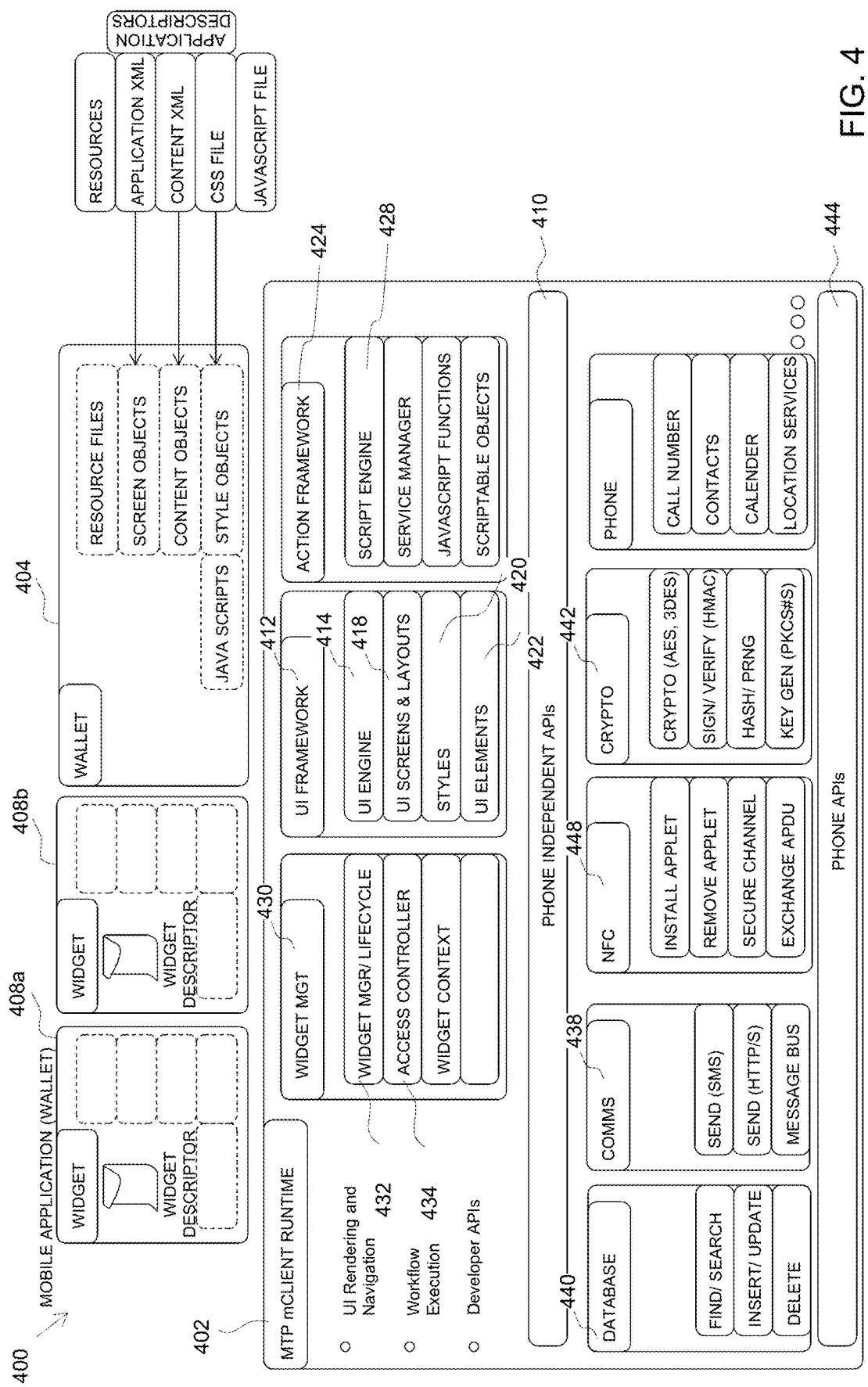
FIG. 4 illustrates a high level architectural view of a wallet application with a MTP mClient runtime.

FIG. 4 illustrates a high level architectural view of the Wallet application with a MTP mClient runtime 400. For the purpose of this figure a wallet 404 and widget 408a and 408b may be similar as modules described above but differ in functionality and responsibilities. In various exemplary and non-limiting embodiments of the present invention the MTP mClient 402 may be an enabling infrastructure for rapid mobile application development. The mClient may provide a container based approach to supporting multi-tenant application architecture. In an example, the mClient container may be a phone specific runtime environment for the wallet 404 and the widgets 408a and 408b that may be developed using the MTP SDK. The mClient container may facilitate application execution, transactional security, reliability, device specific implementations, and the like thereby allowing the developer to focus more on a service's unique functions. The mClient container may be built on top of the device specific APIs and available for popular device environments for example, phone APIs 444. The mClient runtime may generate a native application screen from the widget descriptors. The screen may ensure that a button on the screen may appear like a native Android®, Blackberry®, or iPhone® button on the respective devices. The mClient server may include at least one phone independent API 410. The phone independent API 410 may ensure that widgets 408a and 408b developed using the SDK run across all supported handsets. The phone independent APIs 410 may be specifically designed to provide all the support that a developer may need to create an improved user experience. The mClient server 402 may be configured so as to facilitate the native implementation within the underlying phone O/S as it may be abstracted away through the runtime and API. In an example, the wallet application may be like a widget as the wallet application may be interpreted and executed by the mClient runtime 402. In an example, the wallet 404 may have a privileged control over the mobile application. The wallet 404 may also define additional APIs for the widget developers that may be specific to the application's context (for example, related to financial sector, retail sector, healthcare sector, government).

In various exemplary and non-limiting embodiments of the present invention, the mClient runtime may have components that may wrap all the major phone platform developer APIs. In an example, the UI framework and the workflow engine may render the user interface and handle the event based execution of local business functions.

In various exemplary and non-limiting embodiments of the present invention, the mClient runtime may include following components. The mClient runtime may include an UI framework 412. In an example, the UI framework 412 may provide the necessary infrastructure to render the user interface. In an example, the UI framework 412 may include a UI engine 414, a UI screen & layouts 418, a set of styles 420, and a plurality of UI elements 422. The UI framework 412 may be configured to manage the diversity of handsets and screen capabilities. In an example, the UI engine 414 may manage the generation and display of screens 418 based on the screen configuration provided in the application XML. The mClient runtime 402 may include an action framework 424. The action framework 424 may provide the necessary support to execute business specific logic (actions). The action framework 424 may be in the form of custom JavaScripts or pre-existing platform services. The action framework may include a script engine 428. The script engine 428 may control the execution of the action and interaction with the user interface. The mClient runtime 402 may include a widget management component 430. The widget management component 430 may facilitate managing the widget lifecycle services 432 such as installation, loading, unloading, removal, update, etc. The widget management component may include an access controller 434 to manage access control to only permit widgets to access resources for which they have permissions in their widget descriptor. The mClient runtime 402 may include a communication component 438. The communication component 438 may be configured for providing the basic communication services between the client and server applications. The communication component 438 may provide communications support for HTTP (& HTTPS) and SMS channels. In an example, the communication component 438 may include packet construction, encoding/decoding and basic HTTP error handling. In an example, the communication component 438 may support attachments to the communication packet for non-essential business objects like alerts and advertisements. The mClient runtime 402 may include a database component 440. The database 440 may provide services to store, update, remove and find data from a local database. In an example, the database 440 may provide APIs which, may not available from the native phone platform. The mClient runtime 402 may include a security component 442. The security components 442 may provide crypto APIs for encryption, decryption, hash based message authentication code (HMAC), secure random hashing, and the like. The mClient runtime may include a NFC component. The NFC 448 may implement the global platform compliant NFC services and provides APIs for interact with the applets on the phone's secure element. The NFC 448 may contain APIs for NFC tags and peer-to-peer (P2P) mode. The mClient runtime may include a phone component. The phone may provide platform services to interact with the phone components like calling, SMS, LED, vibrate command, calendar function, contact management, and the like. The mClient runtime may include the widgets 408a and 408b. The widget may be a service bundle that may encapsulate the screens, content, resources, JavaScript, and styles for a collection of business services. The widgets may be built using the MTP SDK which may include a set of tools that operate on a pre-defined set of XML files In various exemplary and non-limiting embodiments of the present invention, the mClient may be a container within which widgets may be installed and run. In various exemplary and non-limiting embodiments of the present invention, mClient may simplify development of end to end visual workflows for the entire mobile application. In various exemplary and non-limiting embodiments of the present invention, the mClient may provide a set of well tested, standardized APIs and platform services for application developers to quickly use to build their applications across mobile handset platforms without a risk of device fragmentation issues. In various exemplary and non-limiting embodiments of the present invention, the mClient may generate an improved user interface that may utilize the native smart phone capabilities, but may still be responsive on limited capability devices. In various exemplary and non-limiting embodiments of the present invention, the mClient may provide defined patterns for implementing mobile financial transactions that may be configured so that to have complexity of security, reliability, and the like as a backend operation.

Figure 5:
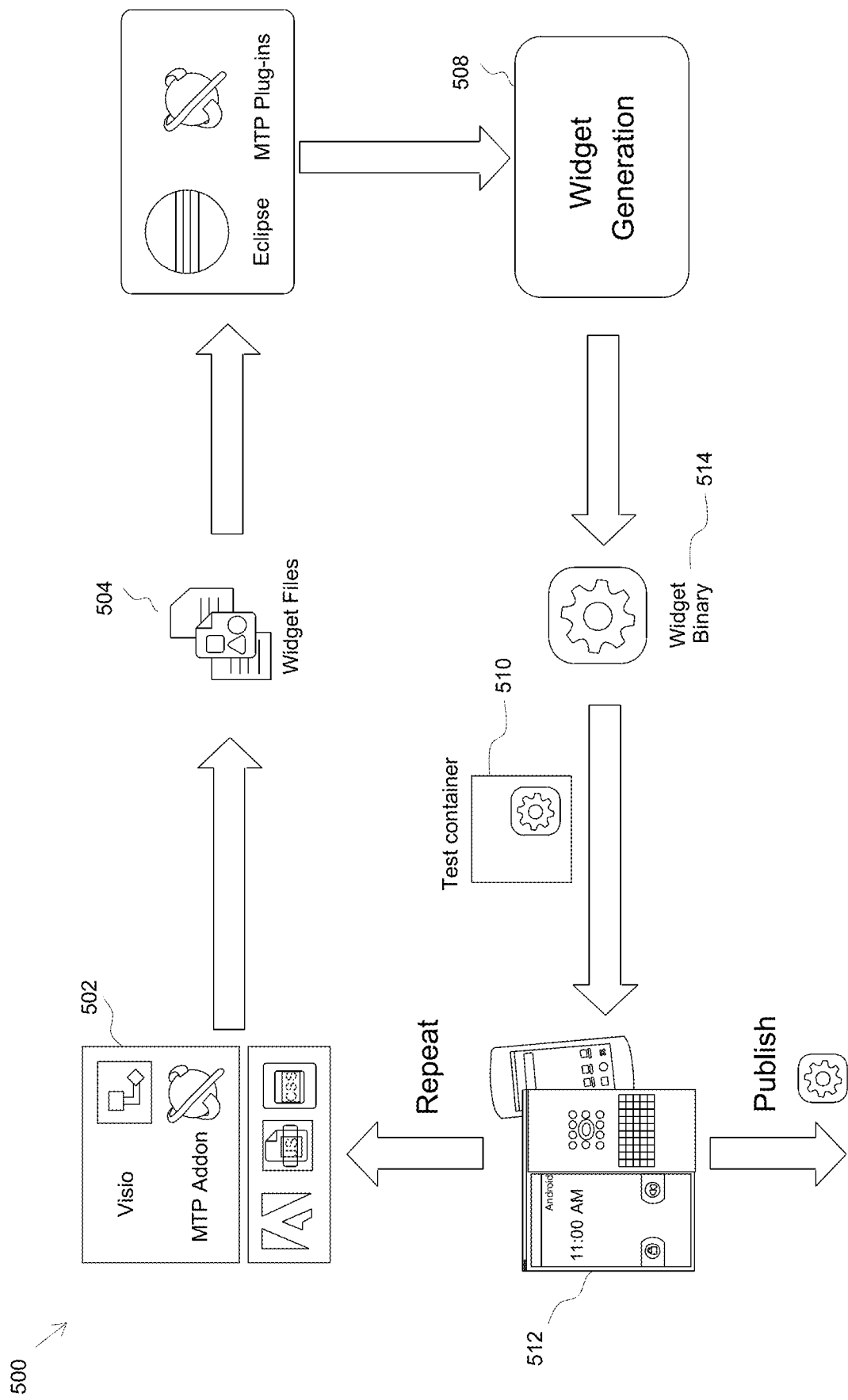
FIG. 5 illustrates an overview of a widget development process with reference to a development cycle.

FIG. 5 illustrates an overview of a widget development process with reference to a development cycle.

In exemplary and non-limiting embodiments, the MTP SDK may be configured for facilitating the overall widget development 500 and provide a greater degree of flexibility and independence to the widget developers. A first stage in widget development may be a design stage 502. In an example, a developer may create the mobile application using a Microsoft office Visio® or a similar tool & any XML and JavaScript editor. Further to development, a widget or widget file 504 may be packaged. In an example, the developer may use an eclipse plug-in to package the widget workspace and create a widget package. The widget package may be sent to an automated build server for widget generation 508. The widget files 504 may not be in a form of a widget binary 514. In an example, the automated build server may generate an application binary consisting of the mClient runtime as well as the widget package. Further to packaging, a widget may be tested using a test container 510. In an example, the developer may utilize any off-the-shelf device simulator to verify widget flows and script execution. Further to testing, the widget may be published to a MTP server 512. In an example, the wallet users may be able to discover widgets and download them from the MTP server 512.

In exemplary and non-limiting embodiments, a plurality of tools may be used for widget development, for example, the MTP-SDK, the MTP Microsoft Visio add-on, and the MTP eclipse plug-in.

In an example, the MTP SDKs for the server side and the client side development. The client side SDK (also referred to as mClient SDK) may be essential for developing any mClient Widget. The server SDK may provide a set of useful protocols and contracts that may facilitate the developers to build on MTP's proven enabling frameworks. In an example, independent web services for the widgets may also be developed, without using the MTP Server.

In exemplary and non-limiting embodiments, the MTP mClient SDK may consists of a set of APIs to access various native phone platform services like database, contactless, communication, and the like. The APIs may be provided as JavaScript functions and may be utilized by the widget developers. In exemplary and non-limiting embodiments the MTP server SDK may consists of useful libraries and contracts which may enable rapid integration with mClient widget's utilizing MTP's underlying implementation for communication, security, reliability, failover, and the like.

In an example, Development of elements of an MTP, such as with a SDK, may be supported by a visualization development capability (e.g. Microsoft Visio®) that facilitates developers defining user interface workflows by performing drag-n-drop actions with MTP templates, stencils, and the like. The MTP add-on may facilitate export of the workflow into an MTP, phone independent, XML format (for example, MTP application descriptors).

In exemplary and non-limiting embodiments, the MTP eclipse plug-in, the MTP SDK may be supported by an Eclipse plug-in that may be used to generate the wallet application or widgets from the application descriptors. The MTP eclipse plug-in may provide a single click build option for all the supported device platforms.

A mobile transaction platform may include reference implementations for elements such as containers, wallets, widgets, and for applications such as finance, retail, health, government, and the like. The features and functions of a mobile transaction platform may be delivered through multiple deployment models, which may include the use of a native client application (e.g. a container or mClient) that may be supported by MTP tools that providers can use to develop client functions such as wallets, widgets, companion applets, couponing applets, and the like. Similarly, the MTP may facilitate deployment of web-services (that may be provided and/or customized for each provider) that may facilitate exposing different features of the MTP, and the like. An MTP, such as a multi-tiered secure mobile transactions enabling platform described herein, may include tools that can be used to develop wallets, widgets, companion applets, etc. These tools and methods for configuring and delivering wallets, widgets, and the like may also be configured with a wizard-like utility to expedite ecosystem development. Additional MTP tools can be configured to monitor usage and transactional information, and further offer up intelligent options and solutions for optimization based on various capability and performance criteria, etc.

A multi-tiered secure mobile transactions enabling platform may satisfy enterprise service delivery environment expectations and demands with the necessary support for scalability, redundancy, inter-operability, service delivery, message definitions, and the like. The platform may be delivered either through a hosted model for service/issue/acquisition providers and/or through a managed service model. The MTP facilitates implementing rules (e.g. business, transaction, trust, and the like) across an ecosystem as described herein, which can govern various ecosystem operations including on-boarding of participants into the ecosystem, how the participants access and consume the various services through the ecosystem, how a participant may be removed from the ecosystem, how different participants within the ecosystem may cooperate with each other, how different participants may cooperate with entities outside of the ecosystem, how participants acquire customers, how participants will support customers, how participants may capture data related to users and transactions (static and dynamic), how participants will use such data, share such data, and monetize such data—within the ecosystem as well as outside, among other things.

A MTP may be associated with an expert engine for providing customer support to consumers as well as providers/participants in the ecosystem. The expert engine may be leveraged to deliver a simplified user experience to consumers as well as providers/participants through the methods and systems described herein. An MTP may be architected with several tiers or facets as described herein and labeled for the sake of description as enabling, service, personalization and the like, with each tier potentially further divided into other tiers, such as logical and physical tiers or aspects. Such a multi-tiered architecture or platform may uniquely help deliver the services and functionality in a multi-domain (and optionally multi-tenant) ecosystem as described herein while ensuring independent ownership among service providers and supporting evolution of differentiated capabilities, especially in a multi-domain ecosystem environment.

An MTP may be delivered through containers that may facilitate ecosystem-wide capabilities, wallets that may facilitate differentiated instrument implementation related capabilities and features, (e.g. NFC, NFC with Secure Element (SE), tokenization, tokenization exposed through QR Code/BarCode and the like), and widgets that may facilitate differentiated capabilities and features that providers can directly expose out to the end-user without disintermediation within the ecosystem.

A MTP, such as the multi-tiered secure mobile transactions enabling platform described herein, may ensure aggregation of different front-end protocols across an ecosystem, such as a multi-domain ecosystem described herein, based on back-end requirements of the ecosystem participants, rules and the like. Aggregation of different front-end protocols may be optimized further by providing an abstraction or wrapper capability, and/or a tokenization of the wrapper capability.

A MTP may enable an ecosystem to progressively deliver protocol level functionality into the front-end, through the methods and systems described herein over an enterprise service delivery environment. Protocol level functionality delivery may further be enhanced by providing tokenization of the wrapper or aggregation capability described herein, or by use of ecosystem rules.

A MTP may be set up in a network provider's domain and portions thereof integrated into their systems. The MTP may additionally be connected to an ecosystem of service and security providers, including one or more Trusted Service Managers (TSMs). A network provider may use the MTP to create a branded mobile application targeting a specific business vertical. Such a branded mobile application may be a wallet for, for example, a retail/financial domain or, for example, a wallet for the healthcare vertical. Such a wallet application may provide a core set of services to a user specific to the domain for which it is created. In addition to providing core domain services, wallets may also handle application lifecycle and security, standardized user experience and widget management responsibilities. Widgets may provide specific business services and comply with the wallet guidelines.

Figure 6:
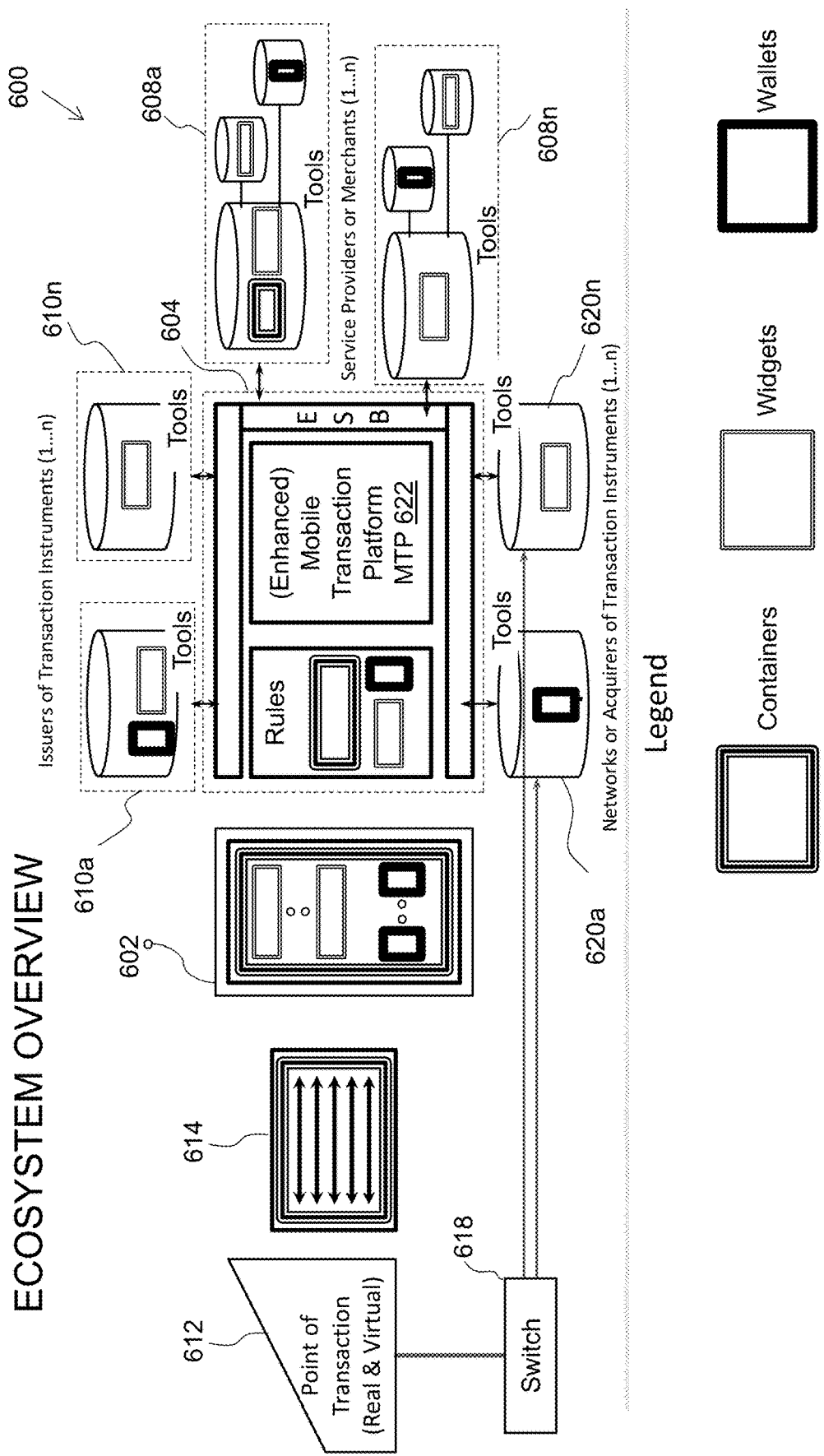
FIG. 6 illustrates an overview of an ecosystem for a secure personalized transaction.

FIG. 6 depicts an overview of an ecosystem for secure personalized transactions as described herein. The ecosystem 600 may include a plurality of participants such as a user of a client device 602, issuers of instruments 610, acquirers of transaction instruments 620, service providers or merchants 608, and a variety of an infrastructure elements including transaction and processing resources 604 that may include a mobile transaction platform (MTP) 622, rules, interfaces to tools and participants that maybe embodied as one or more enterprise service busses (ESB), point of sale facilities 612, secure point of sale switching functionality 618, functionality for abstracting transaction protocols 614, and the like. The client device 602 may include a plurality of containers that may include a plurality of wallets, wallet companion applets, and a plurality of widgets for performing a transaction (e.g., payment transaction) for the one or more services/products that may be offered by a service provider, such as service provider 608.

The MTP 622 depicted in FIG. 6 may be set up in a network provider's domain and integrated into the network provider's systems (optionally through their ESB). As shown, the MTP may be configured to be connected within the ecosystem 600 of service providers. Individual, independent service providers or merchants 608 may use the MTP software development kit and environment to build widgets that can be loaded into a wallet or a wallet container accessible on the client device 602. These widgets may provide incremental functionality that may enhance the overall appeal of the wallet application. Further, the MTP infrastructure 604 may include rules such as to provide wallet, widget, and transaction management along with all the relevant business services that are associated with delivering wallets to a universe of diverse mobile environments. Further, the MTP may establish connections with various ecosystems to deliver a dynamic user experience and diverse set of services to an end user that can be accessed anytime, anywhere.

The ecosystem 600 may further include a plurality of issuers of transaction instruments 610. The issuer 610 may provide various transaction instruments such as a virtual credit card, a gift card, a loyalty card, tickets and the like. The user of the client 602 may select these instruments using one or more wallets and widgets to perform a transaction. In an example, the plurality of issuers 610 may use tools provided in association with the MTP 622 to develop customized widgets to enhance the user experience, provide security, comply with issuer workflows, and the like. Further, the ecosystem 600 may include digital wallets (e.g. that may be installed on a mobile client 602) that may include functionality for storing these instruments, performing a transaction for these instruments, and the like.

The ecosystem 600 may further be characterized by capabilities and features such as three-dimensional security for personalized transactions (e.g. device, domain, and user), multiple functionality tiers (e.g., an architecture with personalization, service, enabling tier, expert, and experience framework tiers or layers), support for multiple independent containers on a client device 602, multiple distinct widgets within a container, multiple distinct and independent wallets within a container, single widget access to multiple wallets, single wallet access by multiple widgets, support for a plurality of trust models, and the like. The ecosystem 600 may further include a point of sale facility or functionality 612 that may be configured to perform real (e.g. proximity-based) and/or virtual (e.g. on-line) transactions. The ecosystem 600 may include a protocol abstraction component 614 that may include a wrapper such as to perform transactions across the multiple types of protocols between the client 602 and the point of sale facility 612, and the like. For example, the protocol abstraction component 614 may enable a client device 602 perform a transaction independent of the protocol by which the point of sale device 612 or the aggregator switch 618 operates.

The ecosystem 600 may further include a plurality of acquirers 620. Each of the acquirers 620 may be use tools provided in association with the MTP 622 for developing customized widgets, wallets, and the like. In an example, the ecosystem 600 may include a switch 618 for selecting the acquirer 608 from the plurality of acquirers for performing a transaction.

As depicted in FIG. 6, issuers 610, service providers 608, acquirers 620, and the like may have access to or may configure their portions of the ecosystem for secure personalized transaction with only portions of the ecosystem 600 functionality. In an example, acquirer 620A includes wallet functionality, whereas acquirer 620n includes widget functionality. Likewise, issuer 610a includes wallet and widget functionality, whereas issuer 610n only includes widgets. Similarly, service provider 608a includes widgets, wallets, and containers, whereas service provider 608n includes only widgets and wallets.

Figure 7:
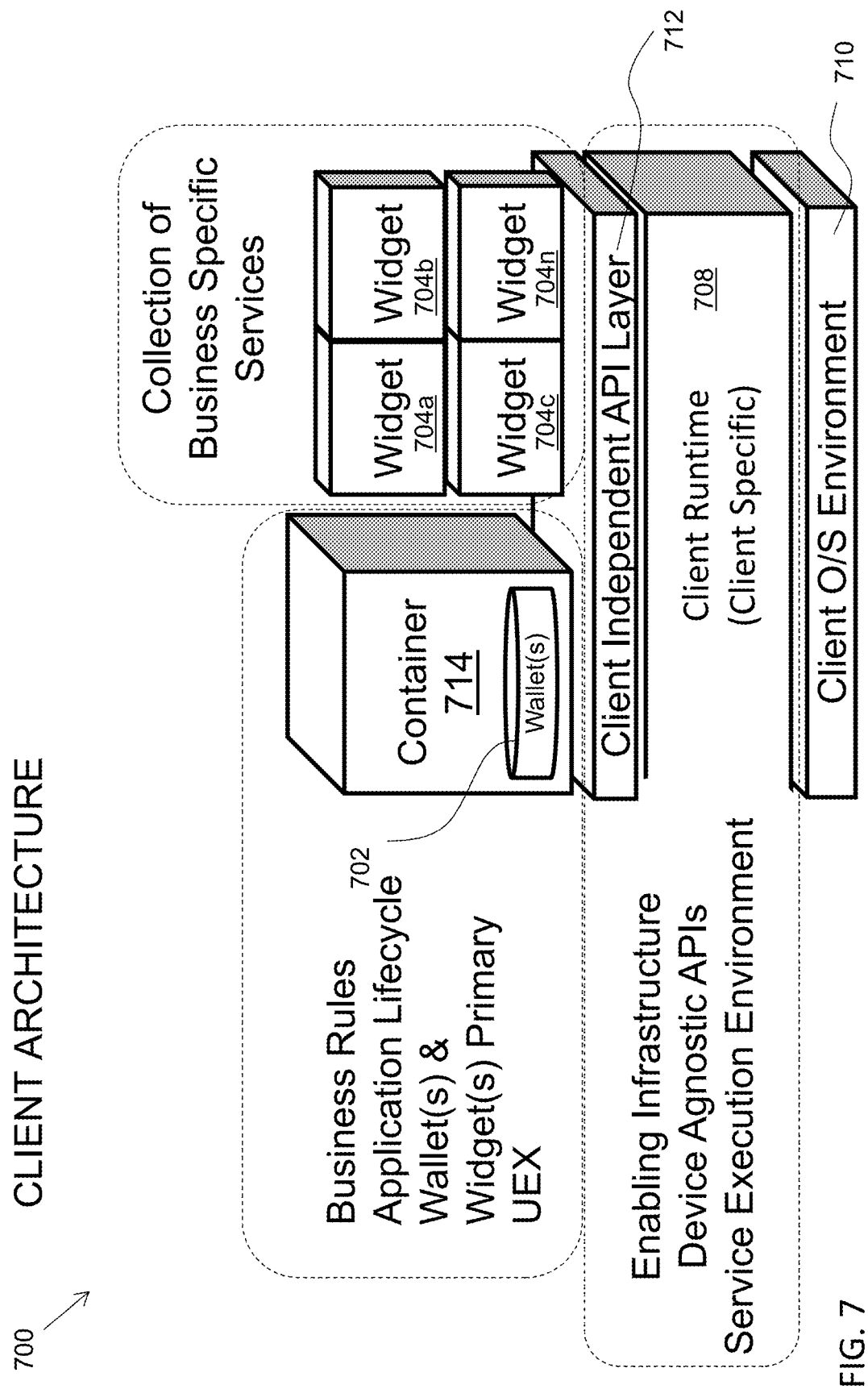
FIG. 7 illustrates an exemplary client architecture for use in an ecosystem for secure personalized transactions.

FIG. 7 depicts an exemplary client architecture 700 for use in an ecosystem for secure personalized transactions. The client architecture 700 may include a container based approach such as to support a multi-tenant application architecture. The client architecture 700 may be configured into business specific services, wallet functionality, enabling infrastructure, and the like that may be supported by device independent APIs, device-specific operating system environment(s), and the like. Wallet functionality may be container-based to provide functionality including business rules adherence, wallet and widget application lifecycle management, user experience management, and may further include one or more containers 714 that may include one or more wallets 702. Business specific services may be provided by one or more widgets such as a widget 704a, a widget 704b, a widget 704c . . . , and a widget 704n (collectively referred to herein as a widget 704). Enabling infrastructure may be facilitated by device agnostic APIs and a service execution environment in a client runtime environment 708.

Further, the client architecture 700 may include a mClient runtime container 708 that may a phone specific run-time environment for the wallet 702 and the widget 704 that are developed using the MTP Software Development Kit (SDK). This container may handle complexity related to application execution, transactional security, reliability, etc. thereby, this may allow the developer to focus more on an service's unique functions and not worry about most of the complexity, including device specific implementations. The mClient container 708 may be built on top of the device specific APIs and available for popular device operating system environments 710. The runtime container 708 may generate a native application screen from descriptors associated with widgets 704. This ensures that a button looks like a native ANDROID, BLACKBERRYOS, or IPHONEOS button on the respective devices.

The client architecture 700 may further include a device independent API layer 710 that may ensure that widgets developed using the SDK may run across all supported handsets. These APIs are specifically designed to provide all the support that a developer needs to create rich user experiences. However, the developer may not need to worry about the native implementation within the underlying phone O/S since this is abstracted away through the client runtime container 708 and the API layer 712. The wallet 702 may be executed like a widget in that it may be interpreted and executed by the client runtime 708. However, the wallet 702 may have privileged control over the application. The wallet 702 may also define additional APIs for the widget developers that may be specific to the application's context (financial, retail, healthcare, government, etc.).

Figure 8:
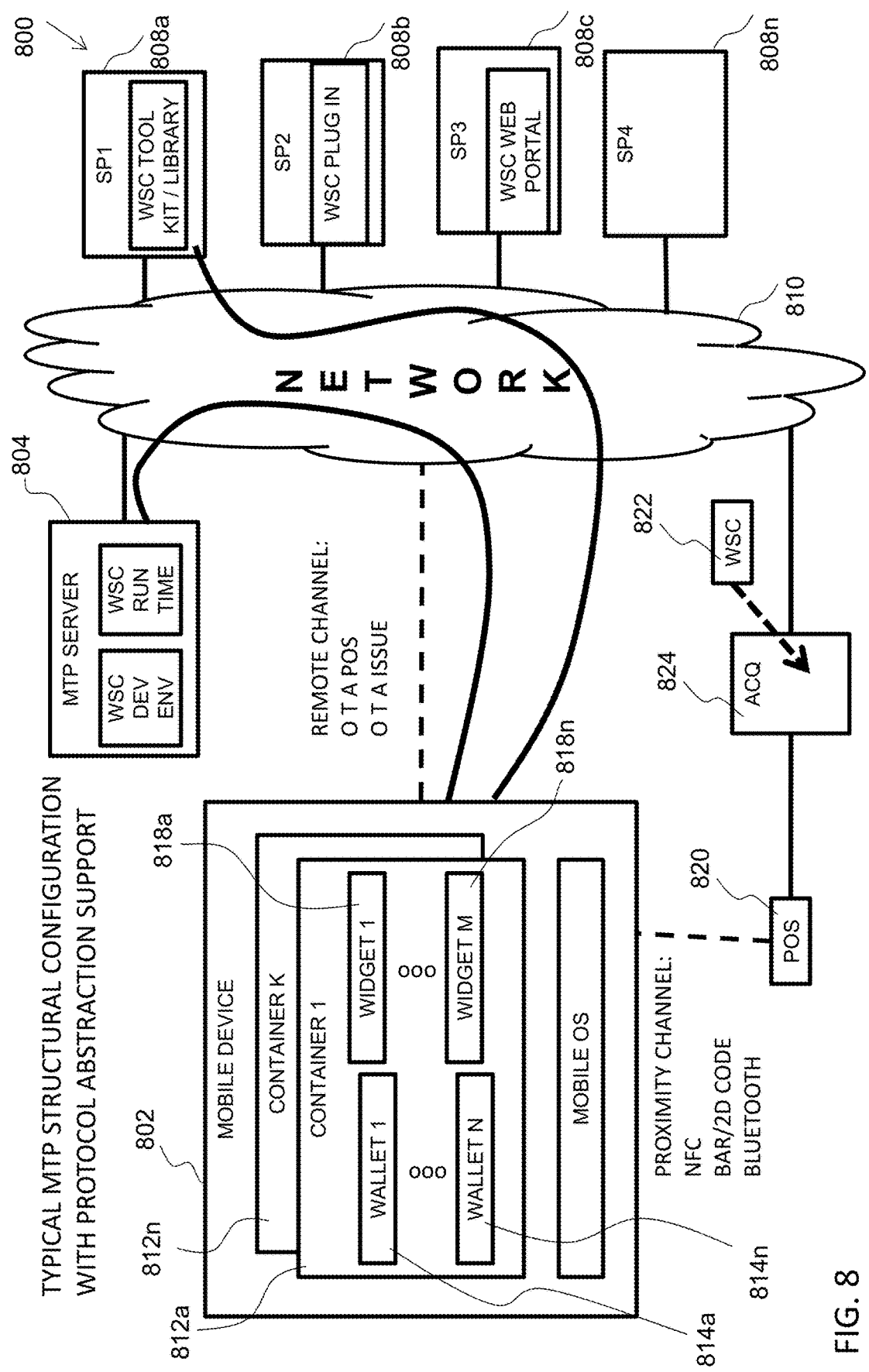
FIG. 8 illustrates an ecosystem for secure personalized transactions including an MTP structural configuration with a protocol abstraction support capability.

FIG. 8 depicts an ecosystem for secure personalized transactions including an MTP structural configuration with a protocol abstraction support capability. The system 800 may include a mobile device 802, a MTP server 804 and a plurality of service providers such as a service provider 808a, a service provider 808b, a service provider 808c . . . , and a service provider 808n communicatively coupled to a network 810. The mobile device 802 may include a plurality of containers such as a container 812a and a container 812n. Each of the containers may include a plurality of wallets such as a wallet 814a and a wallet 814n (collectively referred herein to as a wallet 814). Each of the containers may include a plurality of widgets such as a widget 818a and a widget 818n (collectively referred herein to as a widget 818).

Different service providers may leverage different features of a mobile transaction platform and/or wallet service center (WSC) as described herein. For example, the service provider 808a may access a wallet service center toolkit capability of the MTP, the service provider 808b may access a wallet service center plug-in capability, the service provider 808c may access a wallet service center web portal service, and the service provider 808n may provide a package of services that do not require any dedicated WSC or MTP resident software. The various service providers or merchants may access the WSC development environment and WSC run time through the network 810. For example, the service provider 808n may not be required to run the toolkit and may directly access the WSC toolkit as available on the MTP server 804. Similarly, the MTP server 804 may provide access to a library to the various service providers, wherein the library may include codecs for encoding/decoding, authentication/security schemes and the like. Not every service provider is required to run a WSC library.

In an example, the MTP server 804 may be configured to provide a development environment as well as a runtime environment to the plurality of the service providers. At any instant, a service provider may either have the plug-ins, libraries or may access these components directly from the MTP server 804. As a result, this system allows the service providers or merchants to customize the configuration as per the desired requirements. Alternatively, the MTP server 804 may connect directly with a client device, such as the mobile device 802 to perform transactions, such as on behalf of a service provider (e.g. PL808n).

The ecosystem may include acquisition functionality, such as through various point-of-sale (PoS) terminals and over the air transactions. Protocol abstraction associated with transaction acquisition may optionally be facilitated by an acquisition module 824 that may incorporate MTP and/or WSC acquisition functionality 822 that may add more functionality to the system such as to make the transaction more reliable, robust and secure. A PoS terminal 820 may communicate with the mobile device 802 through one or more proximity communication channels including but not limited to NFC, Bluetooth, barcode reader and the like via any of a variety of acquisition protocols. Protocol abstraction may be handled via wrapping such communication between the mobile device 802 and the PoS terminal 820. In an example, the wrapper may be implemented for abstracting a protocol that embodies a transaction between a wallet 824 and the PoS terminal 820. For over the air transactions (e.g. that do not directly use a PoS terminal 820), protocol abstraction can be similarly generated via wrappers, tokens, tokenized wrappers, and the like that may be used to exchange information over a public network 810 (e.g. the Internet) to effect a transaction.

Figure 9:
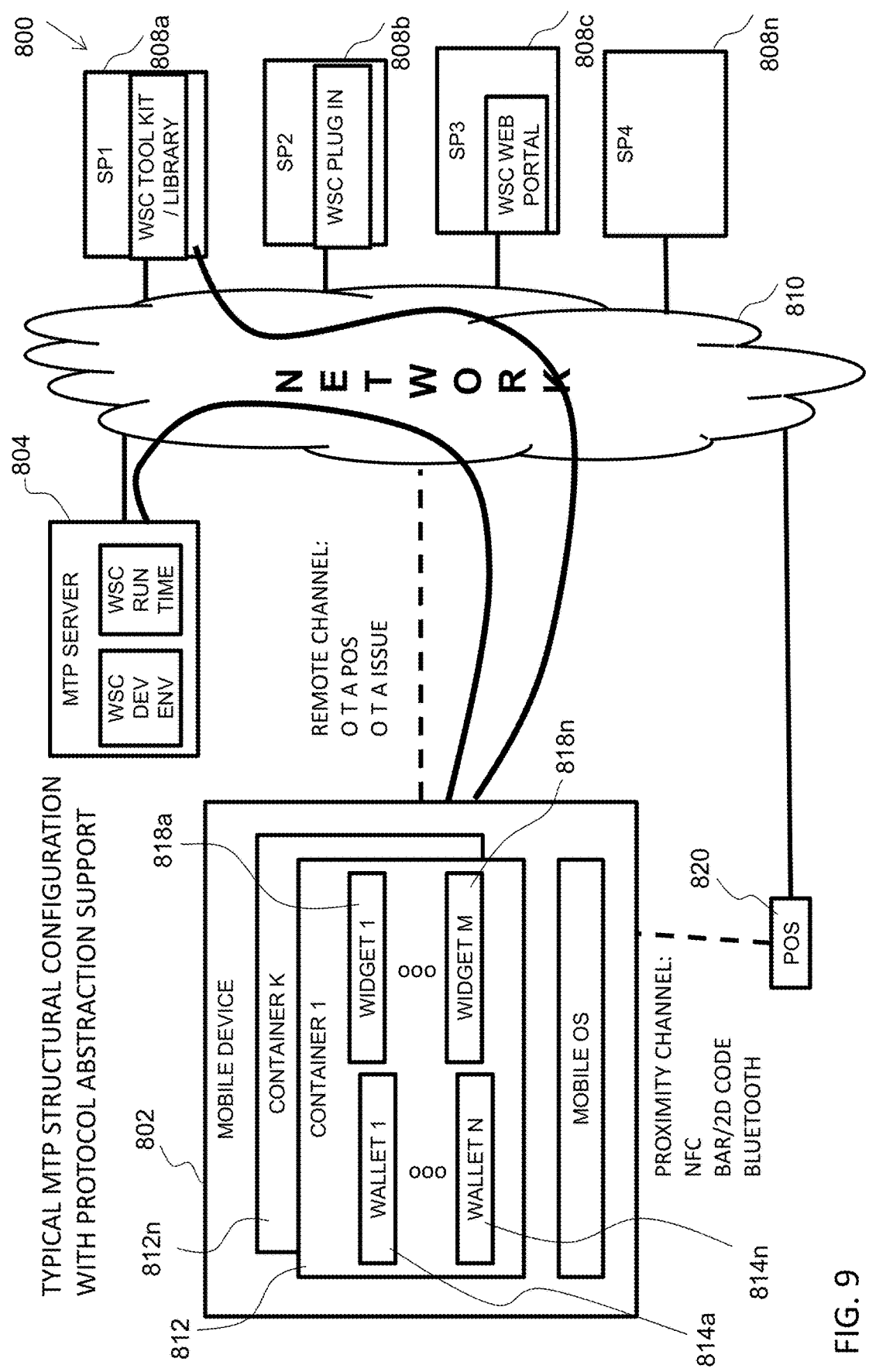
FIG. 9 illustrates an alternate configuration of an ecosystem for secure personalized transactions as illustrated in the FIG. 8.

FIG. 9 depicts an alternate configuration of an ecosystem for secure personalized transactions as depicted in FIG. 8 without the use of an acquisition facility (e.g. 824 in FIG. 8).

The methods and systems described herein of multi-domain ecosystem secure personalized transactions include a system such as a platform for secure personalized transactions in a multi-domain ecosystem. The platform may include a personalization tier for enabling service provider personalization of one or more ecosystem elements stored on a mobile device. The one or more ecosystem elements may be selected from the group consisting of widgets, wallets, and applets. The platform may further include an enabling tier for facilitating interoperation between the personalization tier and a client device. The platform may further include a service tier operating independently of the enabling tier to enable service delivery for a plurality of services. In an example, the plurality of services may be selected from a group consisting of banking, ticketing and bill payment. The platform may be operable in a distributed network of ecosystem participants. The ecosystem participants may include such as service providers, instrument issuers, instrument acquirers, and mobile device users. The platform may further include a plurality of functional modules. The functional modules may include one or more module for such as communication, notification, security, authentication, over the air operation, and device runtime container to manage wallets and widgets. The platform may further include a software development environment that may include such as reference implementations of containers, wallets, and widgets. The software development environment may further include such as reference implementations of finance, retail, health, and government domains. In an example, the platform may be deployed through the use of a native client application. In an example, the platform may be deployed through the use of a native client application and a set of software development tools. The set of software development tools may be used to develop client functions. The set of client functions may be selected from the group of wallets, widgets, companion applets, and couponing applets. In an example, the platform may be deployed through the use of a native client application and a set of web services that may be exposed by the platform to integrate peripheral systems. The peripheral systems may include such as customer care and user portals. In an example, the platform may be deployed with tools that may be used to such as develop wallets, widgets, and companion applications. The tools may include a wizard-like utility. In an example, the tools may be used to monitor usage and transaction information. In an example, the tools may be used to provide intelligent optimization options and solutions. The optimizations solutions may be based on monitored capability and performance criteria. In an example, the platform may be deployed with the necessary support in an enterprise service delivery environment. The necessary support may include such as support for scalability, redundancy, inter-operability, service delivery, and message definitions. In an example, the platform may be deployed through a hosted model for a plurality of providers. The plurality of providers may be selected from the group including such as service, issue, and acquisition providers. In an example, the platform may be delivered by implementing rules which may govern the use of services by the ecosystem participants. In an example, the rules may govern the access of the services by the participants. In an example, the rules may govern the consumption of the services by the participants. In an example, the rules may govern how a participant may be removed from the ecosystem. In an example, the rules may govern how participants may cooperate with each other within the ecosystem. In an example, the rules may govern how participants may cooperate with entities outside of the ecosystem. In an example, the rules may govern how participants may acquire customers. In an example, the rules may govern how participants may support customers. In an example, the rules may govern how participants may capture data related to users and transactions. In an example, the users and transactions may be static. In an example, the users and transactions may be dynamic. In an example, the rules may govern how participants may use the captured data within the ecosystem. In an example, the rules may govern how participants may use the captured data outside of the ecosystem. In an example, the rules may govern how participants may share the captured data within the ecosystem. In an example, the rules may govern how participants may share the captured data outside of the ecosystem. In an example, the rules may govern how participants may monetize the captured data within the ecosystem. In an example, the rules may govern how participants may monetize the captured data outside of the ecosystem. In an example, the platform may be delivered by leveraging an expert engine to provide customer support to participants such that the participants may be selected from a group of consumers and providers. In an example, the platform may be delivered by leveraging an expert engine to provide a simplified user experience to participants such that the participants may be selected from a group of consumers and providers. In an example, the platform may be architected using multiple tiers. The multiple tiers may be selected from the group including such as an enabling tier, a service tier, and a personalization tier. Each tier may further be divided into additional tiers. The additional tiers may be selected from the group including such as logical tiers and physical tiers A multi-domain ecosystem platform for secure personalized transactions may comprise a personalization tier for service provider personalization of ecosystem elements, an enabling tier for facilitating interoperation with client device software and hardware that operates independently of a service tier that facilitates service delivery for a variety of services such as banking, ticketing, bill payment, and the like. Such a multi-domain ecosystem platform may facilitate generic and specialized transactions, including secure personalized transactions, may be logically and/or physically segmented into multiple functionally independent blocks, segments, units, layers or tiers such that they operate separately, in conjunction through interfaces using exchange of data or information, or seamlessly with each other in a predefined or configurable order to fulfill a larger function or unit of transaction or a complete transaction. As an example, the multi-tiered ecosystem-enabling platform as described herein may be comprised of three tiers, namely, the personalization tier, service tier and the enabling tier.

Further, as an example, the personalization tier may be used to effect specific branding elements (such as trademarks, logos, themes, colors or the like), user interaction elements, workflows (e.g., stored account and transaction data to enable efficient completion of repeated transactions, shopping carts, single-click transactions and many others), user interface effects (e.g., transitions, content formats, dynamics or any other action), cause and/or effect that may be required by a service provider for a specific requirement. A personalization layer may facilitate the deployment of a service provider's corporate design or interaction philosophy as well as giving room to consumers to adjust to their personal needs and preferences, including for the visually impaired, and the like.

The enabling tier may facilitate interaction with the underlying layers, platform or substrate which may be in the form of software or hardware or a combination of both to communicate and interact therewith. The enabling tier may or may not serve as an abstraction effectively isolating the layers or tiers above it from those that are below the enabling layer.

The service tier may cater to the specific requirements such as work flows, business logic, rules, intelligence, and needs of a service vertical which includes service vertical such as, but not limited to, banking, ticketing, bill payment, couponing, loyalty and point card programs, parking, and other ecosystem services.

Figure 10:
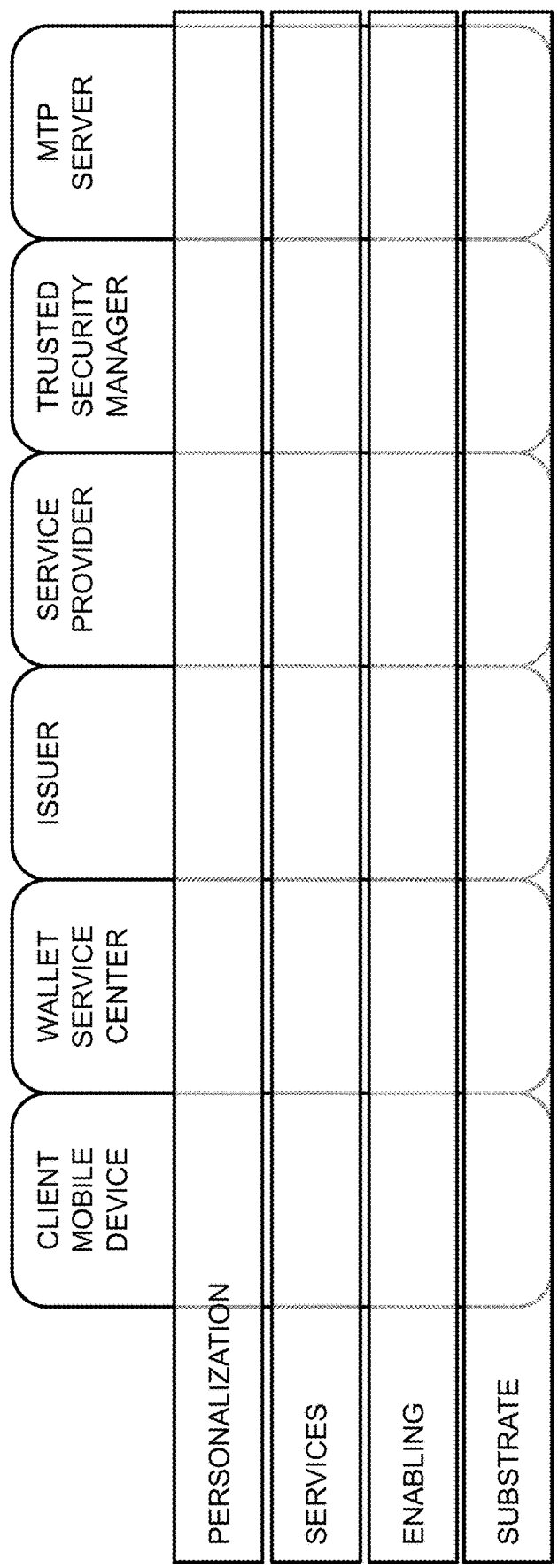
FIG. 10 illustrates a notion of a tiered platform that may span a range of ecosystem elements.

Services enabled by such a service tier may include mobile banking, money transfer, bill payments, ticketing, couponing, loyalty programs, marketing and advertising related services, education related services, city services, mobile health services, mobile insurance, transit services such as parking coupons, travel services, emergency or 911 services, retail payments, logistics support services, business intelligence solutions, branding, shopping, product authentication services, regulatory services, records management, interactive television services, text-to-voice services, location based services and the like While the examples used herein illustrate the concept of multi-tiered ecosystem enabling platforms, the methods and systems described herein actually cover more generalized platform architectural and/or structural concepts including multiple functionally independent blocks, segments, units, layers or tiers. FIG. 10 depicts a notion of a tiered platform that may span a range of ecosystem elements including client devices (e.g. mobile devices), wallet service center functionality, trusted security managers, mobile transaction platform servers, issuers of wallets, merchants (aka service providers), and the like. Each such ecosystem element may comprise at least enabling, service, and personalization tiers. As noted herein, additional tiers, such as expert engine and experience framework tiers may also be incorporated in deployments of a multi-tiered secure mobile transactions ecosystem-enabling platform.

The methods and systems described herein of multi-domain ecosystem secure personalized transactions includes a method that includes analyzing one or more of a set consisting of ecosystem participants, service requirements, customer requirements, regulatory requirements, transaction security requirements, trust models, and electronic transaction communication channels. The method may further include determining, based in the analysis, one or more ecosystem features to configure in a platform comprising at least one of a service tier, an enabling tier, and a personalization tier. The method may further include configuring the one or more ecosystem features in accordance with the determination. In an embodiment, the one or more ecosystem features may be configured to ensure satisfaction of each analyzed requirement within a context of a service provider business model. The platform may additionally include an expert engine tier and an experience framework tier.

Methods for selecting ecosystem features for inclusion in each of an enabling tier, a service tier, and a personalization tier may include analyzing ecosystem participants, service requirements, customer requirements, regulatory requirements, transaction security requirements, trust models, and electronic transaction communication channels to determine ecosystem features to configure in a service tier, an enabling tier, and a personalization tier to ensure satisfaction of each analyzed requirement within the context of a service provider business model. Features may be similarly determined for additional tiers, such as expert engine and experience framework tiers.

A method or process of breaking down parts of the overall transaction, service or process into the multi-tiered ecosystem platform may be based on a combination of analytics, heuristics and requirements, optionally aided by tools including expert engines based on artificial intelligence concepts. Such a method or process may take into account the perspectives and requirements of all participating—present and anticipated in future—entities in the ecosystems including, but not limited to, service providers; service requirements; customer requirements; end-user requirements; regulatory mandates & guidelines; security mandates, guidelines and requirements; trust models; economic models; business logic and workflow; commonality with other services; operational factors; design & technology factors; target devices & platforms; projected technology evolution; other related & unrelated services; and operating constraints.

In most cases, the aspects and parameters mentioned above can result in the service requirement to be logically segmented or partitioned into three tiers, namely the personalization, service and enabling tiers.

Figure 11:
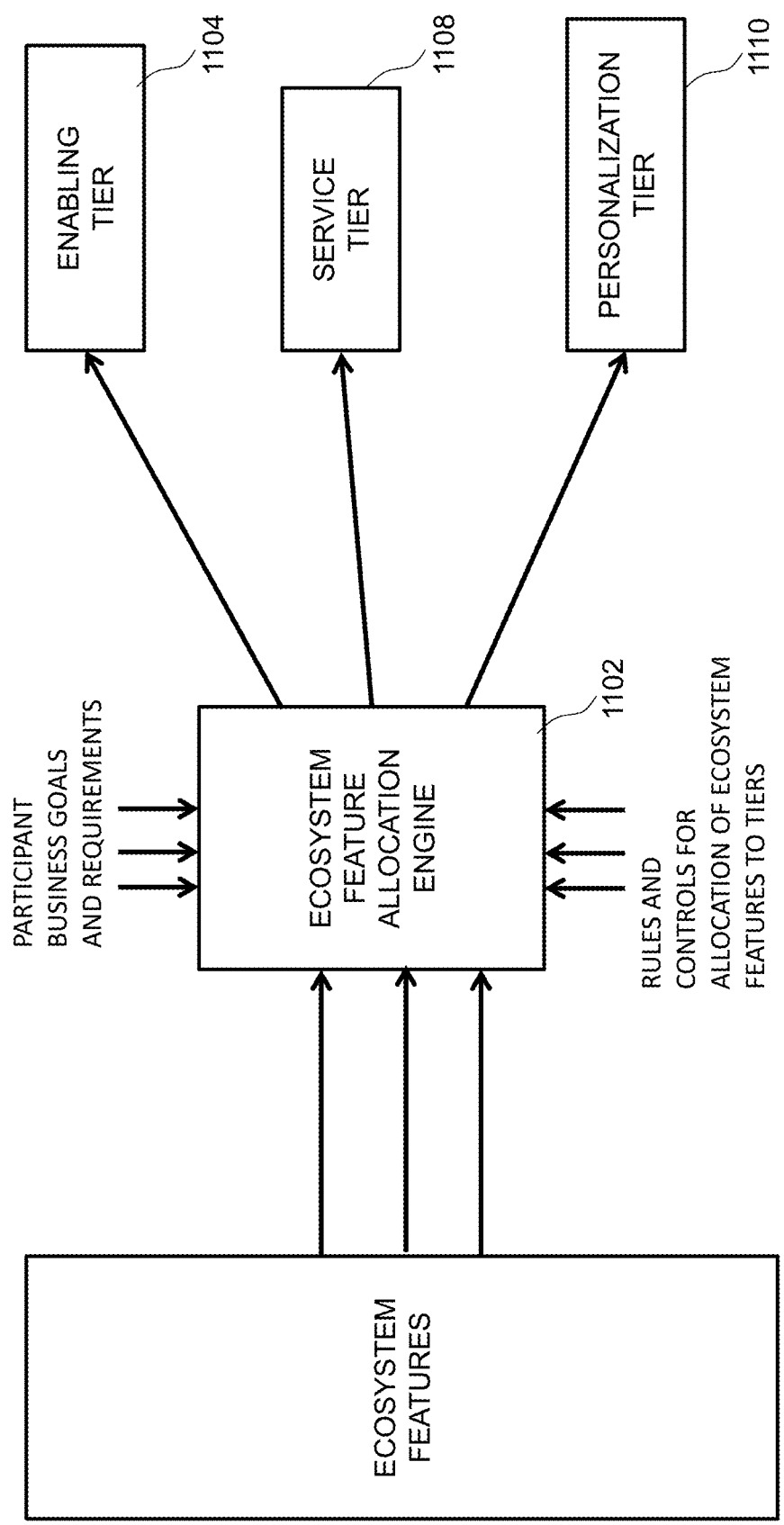
FIG. 11 illustrates an embodiment of selecting ecosystem features for inclusion in each of an enabling tier, a service tier, and a personalization tier of a multi-domain ecosystem platform for secure personalized transactions.

Referring to FIG. 11, an embodiment of selecting ecosystem features for inclusion in each of an enabling tier, a service tier, and a personalization tier of a multi-domain ecosystem platform for secure personalized transactions. Based on participant business goals and requirements, an ecosystem feature allocation engine 1102 may process rules and controls such as to allocate features of the ecosystem to the enabling tier 1104, a service tier 1108, and a personalization tier 1110.

In an example, the enabling tier 1104 may include infrastructure or business independent components that may be necessary to develop mobile applications. The service tier 1108 may include a collection of reference service implementations for wallet ecosystems and value added services. The personalization tier 1110 may include a set of tools and APIs that may be necessary to develop the wallet and the widget services (described in this document) and build a comprehensive ecosystem.

In an example, the enabling tier 1104 may include features different for the client and the server. In the enabling tier 1104, the client may be configured to include infrastructure runtime container software (SW) that may be built using a specific development environment associated with the mobile device. In an example, the enabling tier 1104 may provide the client a common abstraction to underlying device capabilities with common Developer APIs, UI Interpretation and rendering engine, business execution environment, widget and wallet lifecycle management, patterns for OTA/proximity transactions, and the like. On the server side, the enabling tier 1104 may provide to the server an infrastructure software that may be deployed in network provider's domain that may be configured for establishing and managing a secure mobile transactional ecosystem. In an example, the enabling tier 1104 may configure the server features such as wallet management, stateful transaction engine, object lifecycle management, channel specific communication, multi-domain security policy and risk management, OTA provisioning, and the like.

In an example, the service tier 1108 may include multiple features for the client. For example, the client may be configured to include a library of common platform services that may be used to implement a plurality of business use cases. The common platform services may run within the business execution environment provided by the enabling tier 1104. In an example, the service tier 1108 may include three basic units. A first unit may be a use case, for example, a set of client side workflows and templates built for the various transaction services. A second unit may be an instrument, for example, a corresponding single wallet instrument that may facilitate mapping to real world instruments. In an example, the instrument may provide data for a visual or a display. In an example, the instrument may provide data for an over-the-air (OTA) transaction. In an example, the instrument may provide data for a proximity transaction. In an example, the instrument may provide data for an administration. A third unit may include at least one trust model. The trust model may facilitate implementation for authentication schemes, which may include a two factor authentication (2FA). The 2FA may be required by different widget providers and may be relevant for the ecosystem.

In an example, the service tier 1108 may include multiple features for the server. The server may be configured to include a library of business specific components and associated service templates that may be partially or entirely reused to develop a customer centric offering. In an example, the services may include wallet services and value added services. The wallet services may include managing the lifecycle of the wallet and payment tokens. The value added services may include providing business services. The service tier 1108 may include three units. A first unit may be a use case, for example, the server side template may be built using the mobile enabling tier 1104's transactional framework for implementing a specific use case. In an example, there may be one or more varying templates for a business service (e.g., bill payment, movie ticketing, and the like). A second unit may include at least one instrument or token. The instruments may include business specific data objects (for example, credit card, bank account, bill, coupons, etc.) that may be reused across various services and may provide a commonly understood definition for the object and implementation for the rules governing the object's lifecycle and transaction. A third component may include at least one trust model. The trust model may facilitate implementation for different authentication schemes for the services, including support to operate within individual trust clusters with their independent TSMs.

In exemplary and non-limiting embodiments, the personalization tier 1110 (may also be referred to as a SDK tier) may include different features for the client and for the server. In an example, features associated with the client in the SDK tier may be divided into 2 parts. A first part may be a wallet SDK and a second part may be a widget SDK. In an example, the wallet SDK may provide access to the wallet services, privileged APIs, and the necessary components to build the wallet container application or user experience. In an example, the widget SDK may facilitate the ecosystem partners to build their widgets that may operate within the wallet container. In exemplary and non-limiting embodiments, the SDK may essentially facilitate client side configuration and user experience. In an example, the SDK may facilitate configuration by facilitating customizability for parameters exposed by the client container. This may include device specific parameters, variables (like PIN size, exit confirmation, selecting inclusion of modules, etc.). In an example, the SDK may provide user experience by facilitating the development of differentiating user experiences across handsets.

In an example, the SDK for the server may include at least one library that may allow any ecosystem server to communicate with the wallet, format content for the widgets, and expose services to the wallet application. The library may include a configuration module and an interface module. The configuration module may allow customizability for parameters exposed by the server's mobile enabling tier 1104 and service tier 1108. The parameters may be configured in property files and resource bundles. The interface module may provide connectors developed to facilitate communication with various backend systems that may collaborate to fulfill the complete end to end service. The interface module may also include web services exposed by the platform to integrate peripheral systems like customer care, user portals, and the like.

The methods and systems described herein of multi-domain ecosystem secure personalized transactions includes a method in a platform including such as at least one of a service tier, an enabling tier, and a personalization tier. The method includes applying an expert engine to analyze one or more mobile device user and transaction environment requirements. In an example, the expert engine may include an expert engine tier. The expert engine tier may interact with an experience framework to adapt the one or more user requirements. In an example, applying the expert engine may include applying the expert engine to analyze a user's habits. The method may further include configuring one or more platform features in accordance with the analysis. In an embodiment, configuring the one or more ecosystem features may include configuring a user interface based on one or more transaction requirements. In an example, configuring the one or more ecosystem features may include configuring one or more display features of a mobile device. In an example, the one or more display features may be configured based on a regional preference associated with a location of the mobile device. In an example, the one or more display features may be configured based on an identified client base.

A multi-tiered secure mobile transaction enabling platform may facilitate scaling a multi-domain ecosystem for secure personalized transactions to tens of millions of users, comprising applying an expert engine for analyzing user and transaction environment requirements and configuring ecosystem features to simplify transactions, such as configuring a user interface based on transaction requirements. The expert engine may interact with an experience framework to facilitate adapting to user requirements.

It is anticipated that users will have varying preferences, habits, perceptions, perspectives, requirements and styles when it comes to using devices and applications. In addition to the parameters mentioned above, users have individual preferences, tastes, and requirements for the presentation of results of their operations. Many or most applications currently available constrain users to follow a specific regimen to carry out transactions and obtain and view results from the system.

The expert engine tier described in this document may learn user habits, preferences and other parameters mentioned above, and may adjust the system and/or the application to present itself in the manner most suitable to individual users including regional preferences ("most French like it this way while the Americans like it that way"), mobile device capabilities (screen size, keyboard available or only on-screen, and the like), and differences in client base (low-end versus luxury customers).

An expert engine tier may also manage the vagaries in the ecosystem such as breaks in communication, delays in the server's response, abnormal operating conditions such as a rundown battery or signal drops, etc. to ensure an uninterrupted or interruption managed experience for the user. The expert engine may ensure that operation breakdowns are managed and the user is able to seamlessly resume operations as and when normalcy has been restored.

The issues mentioned above are further compounded when we add to them the dimension of having a large number of disparate users. The numbers are estimated to run into tens of millions with thousands transacting simultaneously.

An expert engine may essentially manage all users as outlined earlier, and also carry out analytics on the transactions, usage patterns, and other parameters that will help the 'learning' process of an inference engine.

Figure 12:
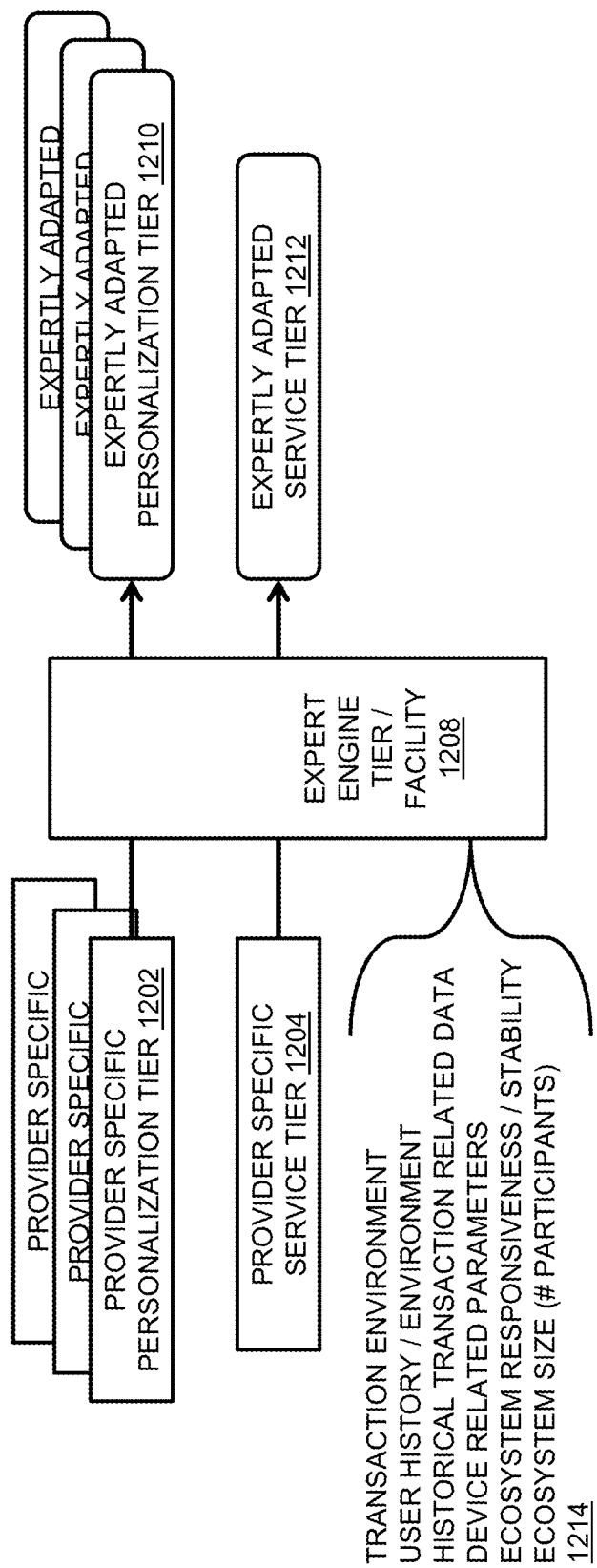
FIG. 12 illustrates an expert engine for facilitating modifying each of a personalization and a service tier for each of a plurality of service providers in a multi-domain ecosystem for secure personalized transactions.

Referring to FIG. 12, an expert engine as described herein is exemplary depicted for facilitating modifying each of a personalization and a service tier for each of a plurality of service providers in a multi-domain ecosystem for secure personalized transactions.

An expert engine tier/facility 1208 may take provider specific personalization tiers 1202 and adapt them to provide adapted personalization tiers 1210 by analyzing a variety of aspects 1214 of the ecosystem, including transaction environment aspects, user history aspects, user environment aspects, historical transaction related data aspects, device related aspects, ecosystem status (e.g. responsiveness and/or stability and the like), ecosystem size as may be determined from a number of enrolled participants and/or ecosystem transaction activity, provider specific aspects, and the like. Similarly, provider specific service tier data 1204 may be expertly adapted by the expert engine tier/facility 1208 to produce one or more expertly adapted service tiers 1212.

The methods and systems described herein of multi-domain ecosystem secure personalized transactions includes a platform for enabling multiple types of electronic wallets in an ecosystem. The platform may include a software development kit for developing a provider specific wallet. The software development kit may be executable at least in part by a networked server. The platform may further include a plurality of reference wallets accessible through the software development kit. The plurality of reference wallets may include such as a reference wallet for each of a plurality of providers including an instrument issuer, a service provider, and an instrument acquirer. The platform may further include a runtime container operable on a client device for receiving different types of provider specific wallets. The container may facilitate distinct operation of each type of provider specific wallet for performing secure transactions between a provider specific wallet and a provider that developed the provider specific wallet.

The methods and systems described herein of multi-domain ecosystem secure personalized transactions include a computer readable medium containing program instructions. The execution of the program instructions by one or more processors of a computer system may cause the one or more processors to carry out the steps that include configuring one or more widget modules in a wallet container on a mobile device. The steps may further include accessing one or more wallet modules in the wallet container through the one or more widget modules. In an example, accessing the one or more wallet modules may include receiving a communication from a service provider module to a first widget module in the wallet container and enabling authenticated access by the first widget module to the wallet module. In an example, each of the one or more wallet modules may be configured and installed in the wallet container over a network by a service provider. In an example, each of the one or more wallet modules may be configured and installed in the wallet container over a network by a user. The steps carried out by computer readable medium may further include authenticating each of the one or more widget modules prior to accessing the one or more wallet modules.

A secure ecosystem infrastructure that may enable multiple types of electronic wallets in a multi-domain ecosystem of issuers, service providers, and acquirers of instruments may include client-side functionality including a wallet container operable on a mobile device that facilitates isolation of a plurality of distinct wallets and further facilitates accessing each distinct wallet through widget modules configured into the wallet container and securely maintained as separate modules, wherein each widget must be authenticated to access any wallet. Such an ecosystem infrastructure may also include personalized service provider modules operating remotely from the mobile device and distinctly from each other wherein a service provider module communicates to a widget in the wallet container and the wallet container facilitates authenticated access by the widget to a wallet. In addition, ecosystem infrastructure elements may include capabilities for configuring and installing each of the distinct wallets in the wallet container over a network by a service provider, issuer, proxy, and the like. These and other features of a secure ecosystem infrastructure for enabling multiple types of electronic wallets is further depicted and described in FIGS. 8 and 9.

The methods and systems described herein of multi-domain ecosystem secure personalized transactions include a method that includes analyzing at least one requirement. In an example, the at least one requirement may be selected from the set consisting of business strategies, go-to-market strategies, exit strategies, competitive strategies, product roadmaps, hardware release schedules and feature lists, software release schedules, feature lists, and application programming interfaces. In an example, the at least one requirement may be analyzed within the context of a service provider business model. The method may further include configuring a service tier, an enabling tier and a personalization tier based, at least in part, upon the analysis. In an example, the enabling tier may be configured to include infrastructure runtime container software built using a specific development environment associated with a mobile device. In an example, the service tier may be configured to include a library of common platform services that may be used to implement a plurality of business use cases.

Methods for selecting new business needs and device functionality for inclusion in each of an enabling tier, a service tier, and a personalization tier may include analyzing requirements related to business strategies, go-to-market strategies, exit strategies, competitive strategies, product roadmaps, hardware release schedules and feature lists, and software release schedules, feature lists, and application programming interfaces to configure in a service tier, an enabling tier, and a personalization tier to ensure satisfaction of each analyzed requirement within the context of a service provider business model. Features may be similarly determined for additional tiers, such as expert engine and experience framework tiers.

A method or process of breaking down parts of the overall transaction, service or process into the multi-tiered ecosystem platform may be based on a combination of analytics, heuristics and requirements, optionally aided by tools including expert engines based on artificial intelligence concepts. Such a method or process may take into account the perspectives and requirements, both present and anticipated in future, related to—business strategies, go-to-market strategies, exit strategies, competitive strategies, product roadmaps, hardware release schedules and feature lists, and software release schedules, feature lists, and application programming interfaces.

In most cases, the aspects and parameters mentioned above can result in the service requirement to be logically segmented or partitioned into three tiers, namely the personalization, service and enabling tiers.

Figure 13:
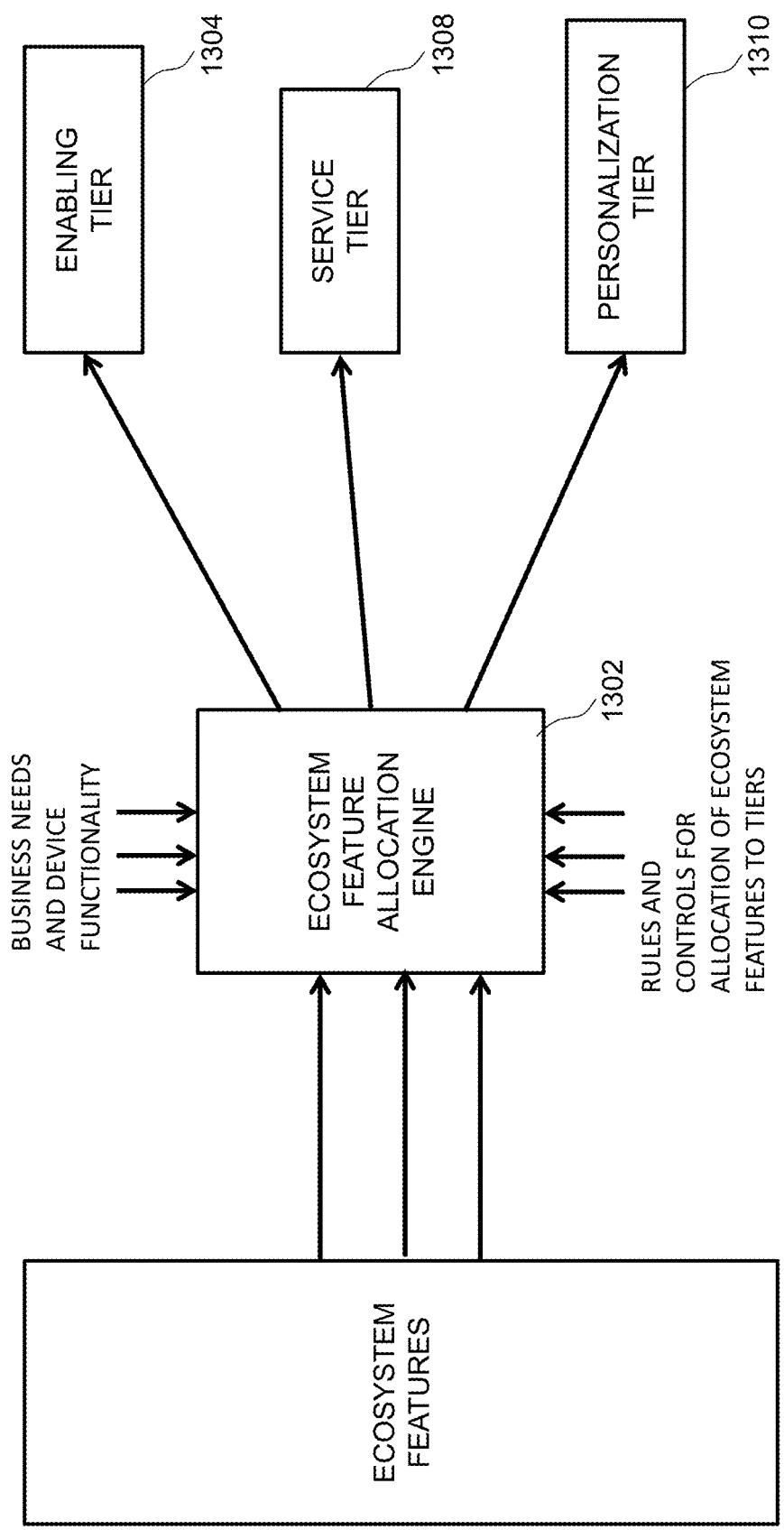
FIG. 13 illustrates an embodiment of selecting business needs and device functionality for inclusion in each of an enabling tier, a service tier, and a personalization tier of a multi-domain ecosystem platform for secure personalized transactions.

Referring to FIG. 13, an embodiment of selecting business needs and device functionality for inclusion in each of an enabling tier, a service tier, and a personalization tier of a multi-domain ecosystem platform for secure personalized transactions. Based on participant business needs and device functionality, an ecosystem feature allocation engine 1302 may process rules and controls such as to allocate features of the ecosystem to the enabling tier 1304, a service tier 1308, and a personalization tier 1310.

In an example, the enabling tier 1304 may include infrastructure or business independent components that may be necessary to develop mobile applications. The service tier 1308 may include a collection of reference service implementations for wallet ecosystems and value added services. The personalization tier 1310 may include a set of tools and APIs that may be necessary to develop the wallet and the widget services (described in this document) and build a comprehensive ecosystem.

In an example, the enabling tier 1304 may include features different for the client and the server. In the enabling tier 1304, the client may be configured to include infrastructure runtime container software (SW) that may be built using a specific development environment associated with the mobile device. In an example, the enabling tier 1304 may provide the client a common abstraction to underlying device capabilities with common Developer APIs, UI Interpretation and rendering engine, business execution environment, widget and wallet lifecycle management, patterns for OTA/proximity transactions, and the like. On the server side, the enabling tier 1304 may provide to a server infrastructure software that may be deployed in a network provider's domain that may be configured for establishing and managing a secure mobile transactional ecosystem. In an example, the enabling tier 1304 may configure the server features such as wallet management, stateful transaction engine, object lifecycle management, channel specific communication, multi-domain security policy and risk management, OTA provisioning, and the like.

In an example, the service tier 1308 may include multiple features for the client. For example, the client may be configured to include a library of common platform services that may be used to implement a plurality of business use cases. The common platform services may run within the business execution environment provided by the enabling tier 1304. In an example, the service tier 1308 may include three basic units. A first unit may be a use case, for example, a set of client side workflows and templates built for the various transaction services. A second unit may be an instrument, for example, a corresponding single wallet instrument that may facilitate mapping to real world instruments. In an example, the instrument may provide data for a visual or a display. In an example, the instrument may provide data for an over-the-air (OTA) transaction. In an example, the instrument may provide data for a proximity transaction. In an example, the instrument may provide data for an administration. A third unit may include at least one trust model. The trust model may facilitate implementation for authentication schemes, which may include two factor authentication (2FA). The 2FA may be required by different widget providers and may be relevant for the ecosystem.

In an example, the service tier 1308 may include multiple features for the server. The server may be configured to include a library of business specific components and associated service templates that may be partially or entirely reused to develop a customer centric offering. In an example, the services may include wallet services and value added services. The wallet services may include managing the lifecycle of the wallet and payment tokens. The value added services may include providing business services. The service tier 1308 may include three units. A first unit may be a use case, for example, the server side template may be built using the mobile enabling tier 1304's transactional framework for implementing a specific use case. In an example, there may be one or more varying templates for a business service (e.g., bill payment, movie ticketing, and the like). A second unit may include at least one instrument or token. The instruments may include business specific data objects (for example, credit card, bank account, bill, coupons, etc.) that may be reused across various services and may provide a commonly understood definition for the object and implementation for the rules governing the object's lifecycle and transaction. A third component may include at least one trust model. The trust model may facilitate implementation for different authentication schemes for the services, including support to operate within individual trust clusters with their independent TSMs.

In exemplary and non-limiting embodiments, the personalization tier 1310 (may also be referred to as a SDK tier)

may include different features for the client and for the server. In an example, features associated with the client in the SDK tier may be divided into 2 parts. A first part may be a wallet SDK and a second part may be a widget SDK. In an example, the wallet SDK may provide access to the wallet services, privileged APIs, and the necessary components to build the wallet container application or user experience. In an example, the widget SDK may facilitate the ecosystem partners to build their widgets that may operate within the wallet container. In exemplary and non-limiting embodiments, the SDK may essentially facilitate client side configuration and user experience. In an example, the SDK may facilitate configuration by facilitating customizability for parameters exposed by the client container. This may include device specific parameters, variables (like PIN size, exit confirmation, selecting inclusion of modules, etc.). In an example, the SDK may provide user experience by facilitating the development of differentiating user experiences across handsets.

In an example, the SDK for the server may include at least one library that may allow any ecosystem server to communicate with the wallet, format content for the widgets, and expose services to the wallet application. The library may include a configuration module and an interface module. The configuration module may allow customizability for parameters exposed by the server's mobile enabling tier 1304 and service tier 1308. The parameters may be configured in property files and resource bundles. The interface module may provide connectors developed to facilitate communication with various backend systems that may collaborate to fulfill the complete end to end service. The interface module may also include web services exposed by the platform to integrate peripheral systems like customer care, user portals, and the like.

In an example, a device manufacturer may determine that NFC functionality will be offered as a new communication option on a new device, in order to support the business objectives of the company. Upon detection of the availability of the new NFC functionality, the business needs and device functionality allocation engine 1302 may review the requirements of the device manufacturer and allocate the device functionality to the enabling tier 1304. The enabling tier 1304 may then make the NFC device functionality available to the service providers who offer that device to its customers. The service provider may then enable NFC functionality on a device through the service tier 1308 and enable an end user to activate NFC functionality as a payment method by adding an NFC icon to a mobile widget using the SDK provided by the personalization tier 1310.

In accordance with exemplary and non-limiting embodiments, the present disclosure provides a mobile transaction platform (MTP) that may build a secure and a robust ecosystem for mPayment and mCommerce. In an example, the MTP may incorporate a widget architecture that may allow service providers to build their own independent widgets that can be downloaded and installed within a mobile wallet application. In an example, the MTP may offer a comprehensive Software Development Kit (SDK) to the service providers. The SDK may allow the service providers to quickly build their widgets for all MTP handsets without having to write phone-specific code. While the mobile wallet application may be distributed and promoted by an ecosystem operator, the service providers may build and offer their own unique services through the widgets and leverage the distribution channels created by the ecosystem operator. The mobile wallet application may offer the widgets a secure and isolated runtime environment.

In an example, the MTP may manage the one or more widgets using a widget management component that may manage use cases, design, architecture, data structures, lifecycle, versions and the like of the widgets within the MTP.

The MTP may include an mClient such as to enable infrastructure for rapid mobile application development. The mClient may provide a container-based approach such as to support multi-tenant application architecture. In an example, an mClient runtime may be a container for running the mobile wallet applications. The wallet application may be an overarching and a primary application that may provide an overall user experience and server as an entry point to widgets. In an example, the widgets may include service groups developed by third parties and run within the mClient container, independent and isolated from the wallet application. The mClient may handle complexity related to application execution, security, reliability, and the like and thereby, may allow the developers to focus more on service's unique functions. The mClient may enable the developer not to worry about most of the complexity, including device specific implementations. In an example, the mClient container may be built on top of the device specific application programming interfaces (APIs) and available for popular device environments. The device independent API may ensure that applications that may be developed using the SDK may run across all supported MTP handsets. These APIs may be designed to provide all the support that developers may need to create dynamic user experiences. In an example, wallet application and widgets may be built using the MTP SDK. In an example, the wallet application and the widgets may be identical in structure (screens, JavaScript, & CSS Styles), except that the wallet application may access a relatively wider set of privileged APIs. When the wallet application may be first invoked, the wallet application may take control until the user may select an entry point into a particular widget (a card image, menu option, etc.). The wallet developer, as a part of the overall UI design, may determine the one or more entry points for the widget. On selection of the entry point of the widget, the widget may be launched (within the same runtime application) and the wallet may be suspended. In an example, the wallet may stop executing. Once the widget execution is completed, the wallet may be resumed and the screen from where the user left the wallet may be returned to the display.

In accordance with the exemplary and non-limiting embodiments, the widget developer may develop the widgets and test depending on the requirement that may be provided by the service provider. The service provider may submit the developed widget to an MTP server. Further, the ecosystem provider may certify and publish the widget so that the widget may be accessible to the wallet users. In an example, the wallet user may discover and download the widget to access the mobile services provided by the service provider. In an example, the widget may already be installed in the mobile phone of the wallet user. The wallet user may discover the higher version of the widget and accordingly, may update the existing version of the widget with the updated version. In an example, the wallet user may not be interested in using the installed widget and accordingly, the wallet user may terminate and remove (i.e., uninstall) the widget from the mobile device.

In an example, the widget developer may be trained to use the SDK and understand the services to build the widgets. Additionally, the widget developer may have guidelines that may be specified by the ecosystem provider such as to ensure that the widget may comply with the guidelines.

In an example, the service provider may be an entity that may issue or own a service product. The service may include a Credit Card for mPayment, a Movie Ticketing service, an mBanking service, and the like. In an example, the service provider may commission the widget development and enter into a business agreement with the ecosystem provider.

In an example, the ecosystem operator may be an entity that may set up an mPayment and mCommerce ecosystem within the region/geography or business domain. The ecosystem may not necessarily be a payment or commerce ecosystem. In an example, the ecosystem can be a healthcare or other complex business domain.

In an example, the wallet user may be a consumer that may have downloaded and activated the mobile application (or wallet if related to a payment domain) on their phone.

In accordance with the exemplary and non-limiting embodiments, the present disclosure provides a plurality of use cases for the widget. In an example, one or more use cases for the widget may include a Develop Widget use case, wherein the developer may build the widgets as per the specifications provided by the service provider. In an example, one or more use cases for the widget may include a Test Widget use case, wherein the developer may test the widgets using both a dummy container and possible a sandbox wallet application. In an example, one or more use cases for the widget may include an Approve Widget use case, wherein the business sponsor within the service provider may review and approve the widget. Such use cases may not be on the MTP server or client.

In an example, one or more use cases for the widget may include a Submit Widget use case, wherein the service provider may send the widget to the ecosystem operator along with a set of test cases. The widget may be installed on the ecosystem provider's test/UAT environment. In an example, one or more use cases for the widget may include a Validate Widget use case, wherein the ecosystem operator may review the widget test cases, test the widget, validate all functionality of the widget, and check the widget against all defined guidelines. In an example, one or more use cases for the widget may include an Approve Widget use case, wherein the ecosystem operator may approve the widget and permit the widget to be included within the wallet application.

In an example, one or more use cases for the widget may include a Reject Widget use case, wherein the ecosystem operator may reject or deny the widget for some reason. The entire process so far may be repeated once the issues are fixed and a new widget may be submitted. In an example, one or more use cases for the widget may include a Publish Widget use case, wherein the ecosystem operator may publish the widget and load the widget to the MTP Server so that the wallet users may download the published widget. In an example, one or more use cases for the widget may include a Suspend Widget use case, wherein the ecosystem operator may suspend the widget that has been published due to some problem until this problem may be rectified. In an example, one or more use cases for the widget may include a Discover Widget use case, wherein the wallet users may be alerted to the availability of the widget through an alert or through a proactive search for available widgets. In an example, one or more use cases for the widget may include a Download Widget use case, wherein the widget may be provisioned to the user's MTP mobile client application and may be installed and ready for use. In an example, one or more use cases for the widget may include an Upgrade Widget use case, wherein the wallet users may upgrade their widget to a newer version from within the mobile wallet application. In an example, one or more use cases for the widget may include a Remove Widget use case, wherein the user may decide that the widget may be no longer desired. The wallet user may remove the widget and all associated data stores from the wallet application.

In an example, the widget may include a plurality of services that may provide the wallet user with meaningful, domain specific functionality that may augment the capabilities of the mobile application that may be used by the wallet user. The widget may be referred to as a widget bundle or a service capsule. In an example, the widget bundle may include a widget profile data, a widget user interface, widget business logic, and widget permissions.

In an example, the widget profile data may include information regarding the widget, service provider, version, and the like. In an example, the widget user interface may include screens, content, and styles that may be used by the wallet container to render the widget's user interface. In an example, the widget business logic may contain scripts that may encapsulate the widget's business logic that may get executed when the widget may be loaded on the mobile device. In an example, the widget permissions may include an access control list that may include permissions that the ecosystem operator may have offered to the widget while running within the mobile application.

In accordance with the exemplary and non-limiting embodiments, the present disclosure provides management of a widget that may be grouped into two large phases. The first phase may include the widget developments and the second phase may include widget usage. The widget development phase may include all steps leading up to the widget being ready for use and the widget usage may include all steps relating to the utilization of the widget and its lifecycle.

Figure 14:
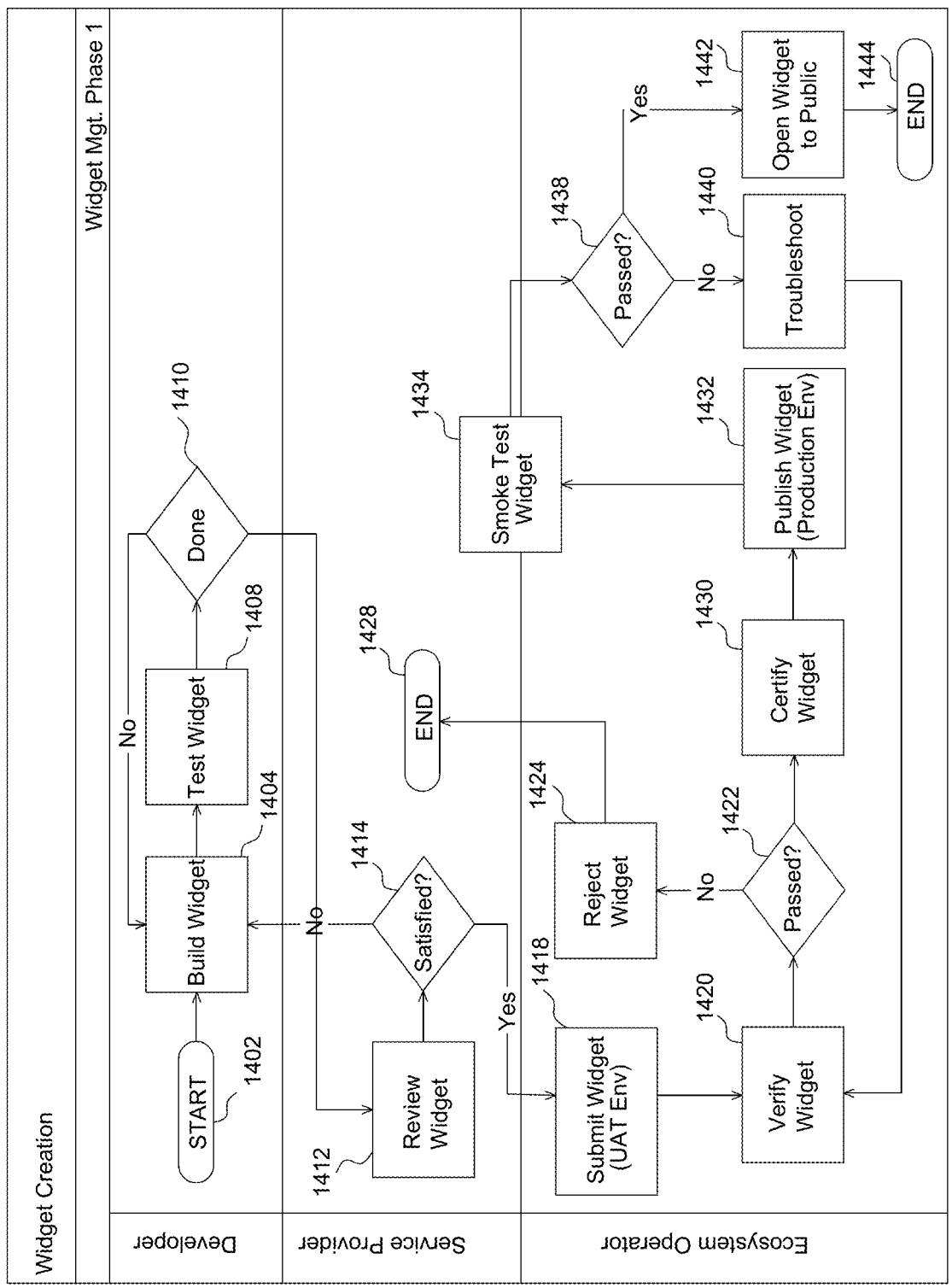
FIG. 14 illustrates a method of developing a widget.

In accordance with the exemplary and non-limiting embodiments, the present disclosure provides a method 1400 as illustrated in FIG. 14 of developing a widget in accordance with an example. At 1402, the method 1400 may start and at 1404, the method 1400 may allow to build the widget. In an example, the developer may use the SDK offered by the MTP to build the widget in accordance with the requirements specified by the service provider. At 1408, the method 1400 may test the widget. In an example, the system may perform static code verification on the widget's Java-scripts. At 1410, a decision may be made such as to complete the widget development. If the widget development is not completed, the method 1400 may move to 1404, where the developer may work further on the widget. If the widget development is completed, the method 1400 may move to 1412 where the service provider may review the widget. If it is determined at 1414 that the service provider is not satisfied with the widget, the method 1400 may move to 1404 where the developer may incorporate the feedback of the service provider to build the widget.

On satisfaction of the service provider, at 1418, the widget may be submitted to the ecosystem operator. In an example, an employee of the service provider may submit the widget through an online mode of submission to the ecosystem operator. At 1420, the ecosystem operator may verify the widget such as to identify any errors in the widget. At 1422, the ecosystem operator may determine passing or failing of the widget. If the widget has not passed the requirements of the ecosystem operator, at 1424, the ecosystem operator may reject the widget and the method 1400 may end at 1428.

If the widget has met the requirements of the ecosystem operator, at 1430, the widget may be certified and at 1432, the widget may be published. Further, at 1434, a smoke test may be performed on the widget. At 1438, it may be determined as whether the widget has passed the smoke test. If the widget may not pass the smoke test, at 1440, troubleshoot may be initiated and the method 1400 may move to 1420 to re-verify the widget. Otherwise, at 1442, the ecosystem operator may open the widget to the public so that the public may download and use the widget. At 1444, the method 1400 may end.

Figure 15:
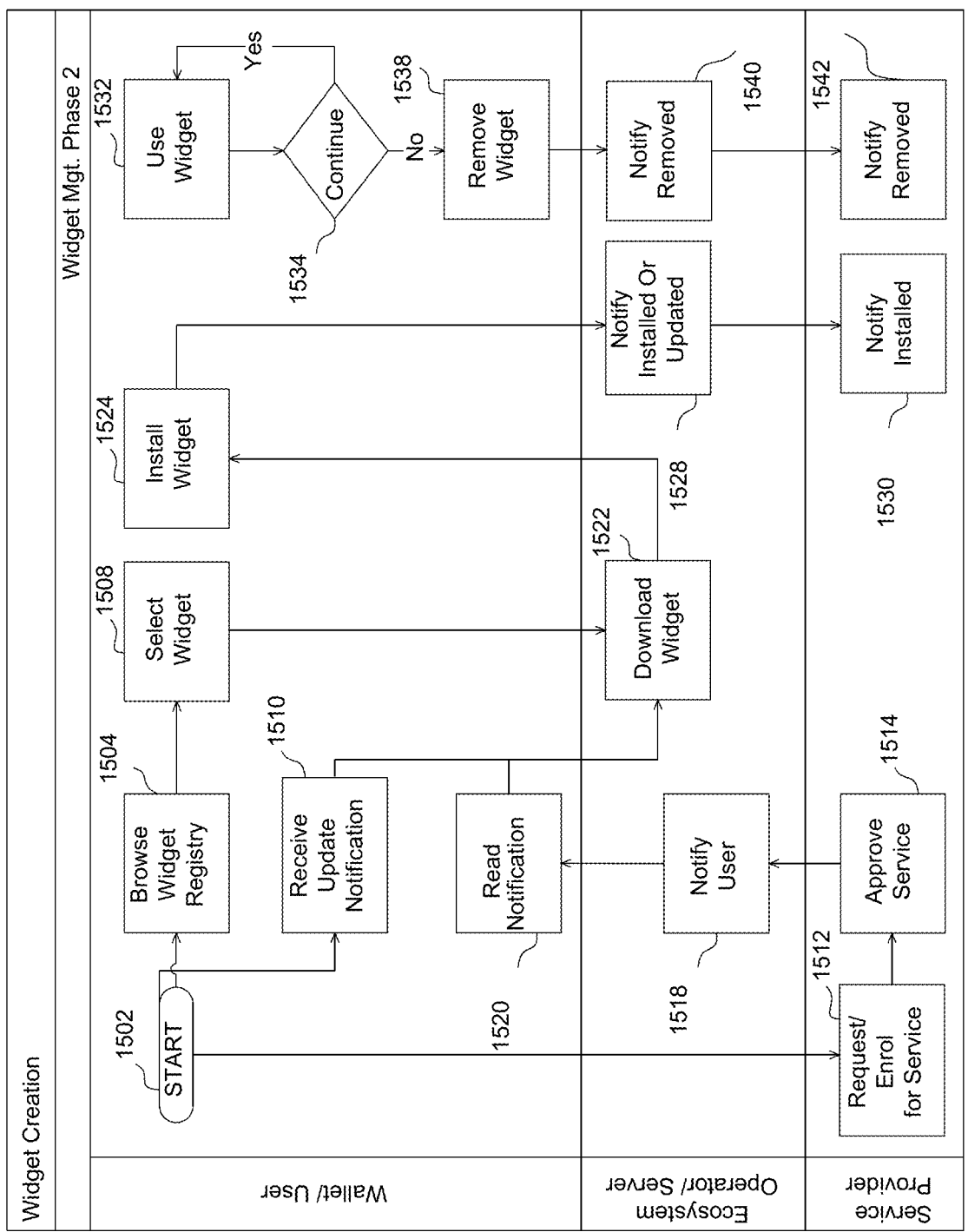
FIG. 15 illustrates a method of widget usage.

In accordance with the exemplary and non-limiting embodiments, the present disclosure provides a method 1500 of widget usage in accordance with an example as illustrated in FIG. 15. At 1502, the method 1500 may start and branch into three different steps. At 1504, the wallet user may browse the widget registry such as to identify one or more widgets. At 1508, the wallet user may select the required widget and at 1522, the method 1500 may allow the wallet user to download the widget.

In an example, at 1510, the wallet user may receive an update notification for the widget that may be installed in the device of the wallet user. The wallet user may desire to download the update for the widget and accordingly, at 1522, the method 1500 may allow the widget user to download the latest version of the widget that may be available at the MTP server. In an example, at 1512, the service provider may enroll with the MTP server for providing one or more services to the end users. At 1514, one or more service may be approved and at 1518, the ecosystem operator may notify the wallet user regarding the approved service of the service provider. AT 1520, the wallet user may read the notification and at 1522, the method 1500 may allow the wallet user to download the widget associated with the notified service of the service provider.

At 1524, the wallet user may install the widget and accordingly, at 1528, the ecosystem operator may be notified regarding installation or updation of the widget by the wallet user. At 1530, service provider may be notified regarding the installation of the widget.

In accordance with the exemplary and non-limiting embodiments, the present disclosure provides a method 1500 for notifying the service provider regarding removal of the installed widget. At 1532, the wallet user may use the widget that may be installed in the device of the wallet user. At 1534, a determination may be made as to whether the wallet user is interested in the continuous use of the installed widget. If the user may want to use the widget in the future, the method 1500 may move to 1532 where the user may continue to use the widget. Otherwise, the method 1500 may move to 1538, where the widget may be removed from the device. At 1540, the server may be notified regarding the removal of the widget and at 1542, the service provider may be notified regarding the removal of the widget.

In accordance with the exemplary and non-limiting embodiments, the present disclosure describes a use case wherein the service provider may be created. The service provider may also be referred to as a widget provider. As discussed above, widget providers may have entered into business relationships with the ecosystem operators such as to create and promote their widgets. In an example, before a widget can be created in the system, the service provider entity may be required to be updated in the system. For example, an employee of the ecosystem operator may log into a system management console and may select an option of widget management. Further, the employees may select a link to add the service provider, fill the corresponding details associated with the service provider and create the service provider record. In an example, the system may e-mail the service provider details of their enrolment along with their unique identifier.

In accordance with the exemplary and non-limiting embodiments, the present disclosure describes a use case Submit Widget, wherein the widget may be stored on the MTP test bed/UAT system within the ecosystem operator's domain. In an example, the widget may have been developed and created using a correct version of the MTP SDK tools. Further, the widget may be internally tested and approved for submission by the service provider. In an example, the MTP system may allow submission of the widget in two modes: on-line and offline.

In an example of offline submission of the widget, an employee of the service provider may send the widget bundle associated with the widget to an authorized employee of the ecosystem that may select the widget management from the MTP system management console. Further, the ecosystem's employee may select a link to submit the widget and upload the widget bundle. The MTP system may validate the widget bundle and the system may create widget records and set the state of the widget as SUBMITTED. Accordingly, the system may confirm the employee of the service provider that the widget has been successfully submitted.

In an example of online submission of the widget, the employee of the service provider may configure an Eclipse plug-in tool to point to the correct MTP server. Further, the service provider's employee may configure their unique widget provider ID and select the option of "submit widget". The Eclipse tool may create a widget submission request to upload the widget to the MTP server that may validate the widget bundle, create widget records and set state of the widget as SUBMITTED. The MTP system may return confirmation that the widget has been successfully submitted and may send a notification to the employee of the ecosystem that a new widget has been submitted.

In accordance with the exemplary and non-limiting embodiments, the present disclosure describes a use case Validate Widget, wherein the widget may be successfully tested. In an example, the widget has been submitted to the MTP and may be ready for testing. The employee of the ecosystem (EOE) may select the widget management from the MTP system console. Further, the EOE may select a link for a widget listing that may show all widgets in the SUBMITTED state. The EOE may select the widget to be tested and the MTP may prompt a confirmation with a checklist of all required verifications that may be performed. The EOE may select the Test option and the system may change the state of widget from SUBMITTED to TESTING. In an example, the system may perform static code verification on the widget's Java scripts and may confirm that static code verification has passed. The system may display the verification result and prompt the EOE to review and confirm it. The EOE may confirm the verification result approval and may perform all other tests as per the ecosystem guidelines.

In accordance with the exemplary and non-limiting embodiments, the present disclosure describes a use case Approve Widget, wherein the widget may be approved and published. The EOE may log into the MTP System Console and select a link for approving the widget in the widget management section. The system may show all widgets in the TESTING state and thereby, the EOE may select the widget to approve. Accordingly, the system may prompt confirmation with a checklist of all required verifications to be performed and the EOE may confirm and check all tests that have been performed. Further, the EOE may enter any comments/remarks and select an Approve option. Thereafter, the system may change the state of widget to APPROVED and may confirm that the widget has been approved.

In accordance with the exemplary and non-limiting embodiments, the present disclosure describes a use case Publish widget, wherein the widget may be published and ready to be downloaded to the user's wallet application. The EOE may log into the MTP system console and select a link for publishing the widget in the widget management section. The system may show all widgets in the APPROVED state and the EOE may select the widget to be published. The EOE may enter any comments/remarks and select a publish option. The system may prompt for confirmation and the EOE may confirm that widget may be published. Accordingly, the system may change the state of widget to PUBLISHED and generate a signature for the widget. In an example, the system may create a HASH of the widget bundle to be securely stored on the wallet in the SE and sign the widget bundle with an HMAC and have a shared key with the wallet. In an example, the system may sign the widget bundle with an RSA key and include certificate within wallet. Thereafter, the system may confirm that the widget has been published.

In accordance with the exemplary and non-limiting embodiments, the present disclosure describes a use case Suspend Widget, wherein the widget state may be transitioned to SUSPENDED and it may no longer be actively downloaded. In an example, the EOE may log into the MTP system management console and select a link for suspending widgets in the widget management section. The system may show all widgets in the PUBLISHED state and the EOE may select a widget to suspend the widget. The EOE may enter any comments/remarks and select a SUSPEND publish. Further, the system may prompt for confirmation and the EOE may confirm the suspension of the widget. Accordingly, the system may change the state of widget to SUSPENDED and may confirm that the widget has been suspended. In an example, the system may generate an email notification to the service provider that the widget has been suspended.

Figure 16:
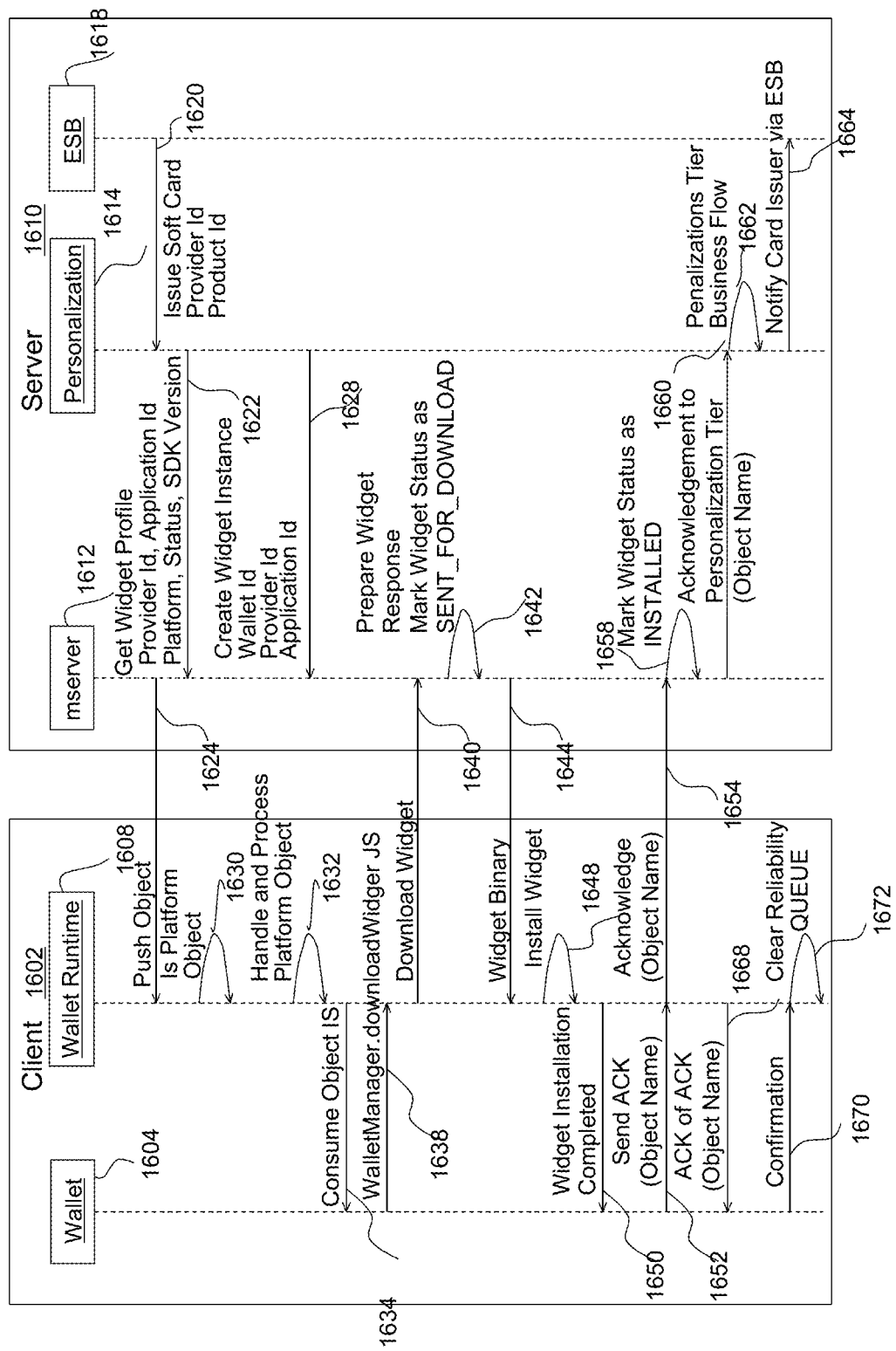
FIG. 16 illustrates a transaction flow diagram for installing a widget.

FIG. 16 illustrates a transaction flow diagram 1600 for installing a widget, according to an example. As shown in FIG. 16, the client 1602 may include a wallet 1604 and a wallet runtime 1608. The one or more components of the server 1610 may include mserver 1612, personalization module 1614, and an enterprise service bus (ESB) 1618.

In an example, at 1620, the server 1608 may use the ESB 1618 to issue soft card, service provider ID, and the product ID to the personalization module 1614. At 1622, a request such as get widget profile, identities such as provider ID, product ID, platform, status, and SDK version may be sent to the mserver 1612. At 1624, an object is pushed towards the wallet runtime 1608. At 1628, the personalization module 1614 may communicate a request to the mserver 1612 to create widget instance that may include a wallet ID, provider ID, and an applet ID. At 1630, it may be determined that the object is a platform object. At 1632, the platform object may be handled and processed. At 1634, the wallet runtime 1608 may communicate a request to consume object JS. At 1638, the wallet 1604 may respond with an object for downloading object JS.

At 1640, the wallet runtime 1608 may communicate a request to download the widget to the mserver 1612. At 1642, the mserver 1612 may prepare the widget response and mark widget status as SENT FOR DOWNLOAD. At 1644, the mserver 1612 may send widget binary to the wallet runtime 1608. At 1648, the wallet runtime 1608 may install the widget and accordingly, at 1650, the wallet runtime 1608 may communicate to the wallet 1604 that widget installation is completed. At 1652, the wallet 1604 may send an acknowledgment to the wallet runtime 1608, which in turn at 1654, may acknowledge to the mserver 1612. At 1658, the mserver 1612 may mark the widget status as INSTALLED. At 1660, the mserver 1612 may further communicate the acknowledgement to the personalization module 1614 which in turn, at 1662, may execute the business flow. At 1664, the personalization module 1614 may notify the card issuer via ESB 1618. In addition, at 1668, the wallet runtime 1608 may acknowledge back to the acknowledgement of the wallet 1604. At 1670, the wallet 1604 may send a confirmation and at 1672, the wallet runtime 1608 may clear the reliability queue.

In accordance with the exemplary and non-limiting embodiments, the present disclosure describes association of an instrument and wallet. In an example, the platform (i.e., MTP) may get an instruction such as to push an instrument (e.g., soft card) in the platform. Various APIs may be used and/or published such as to integrate the issuer system with the MTP. The MTP may get the service product from the master records based on the identification parameters. In an example, the identification parameter may include provider ID, type of the service product, a network provider type, and a correlation identity (e.g., a mobile number), and the like. The platform may fetch wallet account information using the correlation identity. The platform may create the instrument (i.e., service account reference) record that may be associated with the wallet account. The platform may mark the instrument record status as REGISTERED, which may be updated by the issuer system. Further, lifecycle of the can be controlled using the status such as WAITING_FOR_ACTIVATION, ACTIVE, CLOSED and the like. The platform may deliver the instrument by triggering the wallet using a PUSH notification or a piggyback channel.

Figure 17:
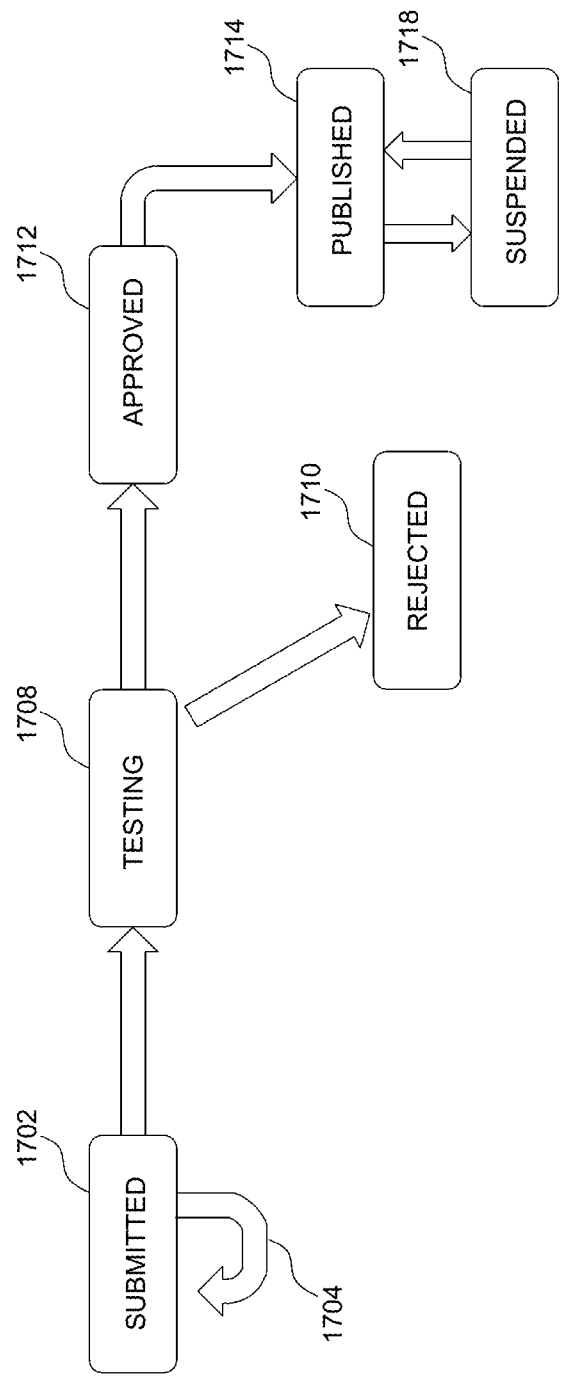
FIG. 17 illustrates a state diagram depicting a lifecycle of a widget in a MTP system.

FIG. 17 illustrates an example state diagram depicting a lifecycle of the widget in the MTP system. At 1702, the widget may be submitted with the MTP. In an example, the EOE may submit the widget with the MTP. In another example, the employee of the service provider may use online submission feature to submit the widget with the MTP. As shown in the FIG. 17, at 1704, the widget may be submitted any number of times while the state is SUBMITTED. This may allow the developer to update the widget before testing may begin. In an example, the widget may not be re-submitted when the widget is in a state other than the SUBMITTED state.

At 1708, the widget state may be updated to TESTING. During this state, the system may perform a plurality of tests (for example, static code verification) on the widget. At this state, the system may change the state of the widget either to APPROVED or REJECTED, depending on the results of the tests. At 1710, the REJECTED state of the widget may not allow the developer to update the rejected widget. In other words, once the system may reject the widget, a new widget bundle (with the same widget ID & version number) may be submitted and the process may be repeated. As a result, a new record in the widget table may be created. Further, the widget may not enter the SUBMITTED state if a widget with the same widget ID and version number already exists in any state except SUBMITTED or REJECTED. At 1712, the widget state may be updated to APPROVED, depicting that the widget may have cleared the testing stage. At 1714, the approved widget may be published and may be available for downloading. Further, it may be possible that the published widget may need to be updated or the system may need to suspend the published widget. Accordingly, at 1718, the widget may be suspended depicting that the widget may not be available for downloading. In an example, a widget with a mathematically greater version number can be SUBMITTED only if all previous version numbers are in the APPROVED, PUBLISHED, REJECTED, or SUSPENDED state. In an example, the system may log the state transition of the widget along with timestamp, unique identification of the actor, and audit trail of comments that have been entered by the actor.

The system may be configured to include various APIs for service account management. For example, the system may be configured to include creation related APIs wherein the APIs may create the service product record, service provider record, service account reference record and the like. In an example, the system may be configured to include updation related APIs wherein the APIs may update the service account reference record, service account reference status (such as to control the service account reference lifecycle), and the like. In an example, the system may be configured to include listing related APIs wherein the APIs may list of all registered service products available in the system, all registered service providers available in the system, and the like. In an example, the system may be configured to include retrieval related APIs wherein the APIs may retrieve service account reference records based on wallet id filter criteria, service account reference records based on widget ID filter criteria, service account reference records based on product ID filter criteria, service account reference records based on status filter criteria, service account reference records based on service account reference number, service account reference records based on service product provider id filter criteria, service account reference records based on widget instance id filter criteria, service product based on service product id filter criteria, service product provider records by provider id filter criteria, and the like. In an example, the status values can be REGISTERED, WAITING_FOR_ACTIVATION and ACTIVE. The status values can be extended for customization or to introduce more granular level of Service Account Reference status. In an example, the service account reference number can be a unique identifier shared by issuer system which may act as the correlation id within wallet platform and issuer system. In an example, the system may be configured to include updation related APIs wherein the APIs may update service product record, service product provider record, and the like.

In accordance with the exemplary and non-limiting embodiments, the present disclosure describes details of various data mappings. In an example, the system may include various data fields for data associated with the service provider. An ID may be a unique system identifier of the service product provider and may be auto generated. The name field may be used for displaying the name of the service provider and data associated with the service provider may be inputted while creating the entry of the service provider. Type filed may identify the service type of the service provider and category field may define the category of the service product that may be offered by the service provider. Email filed may include an email address of the service provider. Further, the system may include one or more attributes that may be stored in the form of a key value pair (e.g., contact number) and may be used to introduce any custom attributes to the service provider.

In an example, the system may include various data fields for data associated with the service product. An ID may be a unique system identifier of the service product and the ID may be auto-generated by the system. A provider ID may be the unique system identifier of the service product provider as discussed above. A product ID may be a unique name (e.g., Gold bank card, Premium credit card, and the like) of the product and the system may include an application ID of an application (e.g., banking) associated with the service product. Type filed may identify the type (e.g., credit card) of the service product and category filed may identify category (e.g., payment) of the service product. Name filed may identify display name of the service product and description may identify description of the service product. Further, the system may include attributes stored in the form of key value pair and attributes can be used to introduce any custom attributes to the service product entity.

In an example, the system may include various data fields for data associated with the instrument (service account reference). An ID may identify a unique system identifier of the instrument and the system may auto generate the ID. A wallet ID may identify a unique identifier of the wallet. An issuer ID may identify a unique identifier of the issuer and a product ID may identify a unique identifier of the service product. A widget instance ID may identify a unique identifier of the widget instance and an account reference number may identify a unique identifier of the instrument at the issuer end. Status may identify status (e.g., created, activated, suspended, and the like) of the instrument. Similarly, the system may include wallet platform status. Provisioning time stamp may identify provisioning date (time stamp) of the instrument and download time stamp may identify download date (time stamp) of the instrument. Activation time stamp may identify an activation date (time stamp) of the instrument and discontinue time stamp may identify discontinue date (time stamp) of the instrument. Last activity time stamp may identify last activity date (time stamp) of the instrument and last state change time stamp may identify time stamp of the last status change. Further, the system may include nickname filed such as to identify user provided name of the instrument, other fields such as OTA TX data, PROXIMITY TX data and the like.

An expiry date may identify an expiry date of the instrument and due date may identify due date of the instrument. The system may include extra attributes which can be used to accommodate any additional information. These attributes may not be used by platform and may be used mainly for the widgets. Further, Logo Image may identify an image which can be used to display Soft Card on the Wallet application. This image can be cobranded as per the issuer's branding definition. Card Image may identify an image which can be used to display Soft Card on the Wallet application. This image can be cobranded as per the issuer's branding definition. A product type may identify a unique identifier of the service product configured at the wallet platform during setup. An AID (e.g. HEXSTRING) may identify an applet ID that may be a unique identifier of the applet installed on secure element during personalization. OTA Permission may identify Over the Air service permissions flag that can be managed by the issuer to control OTA service permissions and Proximity Permission filed may identify proximity service permissions flag that can managed by the issuer to control proximity transaction or services. Soft card brand ID may include branding information ID and a network operator ID may identify a mobile network operator.

In an example, the system may include various data fields for data associated with the widget provider. An ID may identify a unique system identifier of the widget provider and the system may auto generate the ID. Name file may identify display name of the widget provider and description may identify description of the widget provider. An email may identify an email address of the widget provider and status may indicate status of the widget provider. A creation date time stamp may identify creation date (time stamp) of the widget provider and an approval date time stamp may identify approval date (time stamp) when the widget provider has been approved.

In an example, the system may include various data fields for data associated with the widget provider. An ID may identify a unique system identifier of the widget profile and the system may automatically generate the ID. An application ID may identify a widget application ID and an application name filed may identify an application name with which the widget may be associated. A provider ID may identify a unique identifier of the widget provider and a provider name may identify the name of the widget provider. A minimum runtime version may identify minimal required wallet platform version and a version may identify version of the widget. Status filed may identify the status (e.g., created, published, and the like) of the widget profile.

In an example, the system may include various data fields for data associated with the widget instance. An ID may identify a unique system identifier of the widget instance and the system may auto generate the ID. A widget bundle ID may identify a foreign key to wsc_widget_bundle. A widget profile ID may identify a unique identifier of the widget and the system may define foreign key: ID of widget profile. A wallet ID may identify a unique identifier of the wallet. A provision time stamp may identify a widget provisioning date (in time stamp) and an installation time stamp may identify widget installation date (in time stamp). An activation time stamp is an optional field and a removal time stamp may identify widget instance removal date. A status filed may identify the status of the widget instance.

In an example, the system may include various data fields for data associated with the widget permissions. An ID may identify a unique system identifier of the widget instance and the system may automatically generate the ID. A widget profile ID may identify a reference to the widget profile ID and a widget provider ID may identify a reference to the widget provider ID.

In an example, the system may include various data fields for data associated with the widget bundle. An ID may identify a unique system identifier of the widget instance and the system may automatically generate this ID. A widget bundle may identify binary data of the widget file (.wgt) and a device software class may identify device software class associated with widget bundle. A widget profile ID may identify a reference to the widget profile ID and a bund hash may identify hash of the widget bundle file.

In some exemplary and non limiting embodiments, The methods and systems described herein of multi-domain ecosystem secure personalized transactions includes a mobile wallet (also referred to as a wallet) container that may support installing and managing multiple widgets. Each of these widgets may be developed and owned by different issuers and service providers. The wallet may be configured to fulfill various security requirements. Some of the exemplary key security environments described here include widget integrity, widget access control, and widget isolation. These are described as follows:

In an example, the widgets may be provisioned to a wallet runtime securely using a protected provisioning server like a wallet server. The widgets may be installed on handset. Any tampering to the widgets may be automatically detected while on the handset, and necessary actions may be taken.

In an example, access to an issuer security domain applet may be exclusive to the issuer widget. The system may prevent any issuer widget to access another issuer's security domain. The system may prevent the widget from accessing System Actions which may not be granted explicitly to the given widget. The system may prevent any issuer widget from accessing URLs/domains other than what are explicitly granted to the given widget.

In an example, any issuer widget may have exclusive access to the issuer's workflow code. The system may be configured so that any issuer widget may not access any other issuer's workflow code. The system can be configured so that any issuer widget may have exclusive access to the issuer's user interface (UI) Code. The system may be configured so that any issuer widget may not access any other issuer's UI code. The system may be configured so that any issuer widget cannot access any other widget's persistent data. The system may be configured so that any issuer widget may not access any other widget's static resources (Images, Files, etc).

In some exemplary and non limiting embodiments, The methods and systems described herein of multi-domain ecosystem secure personalized transactions includes an access control mechanism (ACM) may be configured to manage "resources" against a given "policy". In some exemplary and non limiting embodiments, The methods and systems described herein of multi-domain ecosystem secure personalized transactions includes, few exemplary resources being managed may include Widget Workflow Code, Widget Data, Widget UI Code (Screens), Secure Element, Server Communication. In an example, to determine the "policy", the present disclosure may have an Access Controller that may use the given widget's "Widget Descriptor" as the policy file. The Widget Descriptor may be a simple Key-Value pair structure which is created by a widget developer (to describe the necessary resources) and signed by a mobile transaction platforms (MTP) server based on the wallet operator's processes. The access control mechanism may involve a widget descriptor life cycle and a mClient access control in the overall process of managing resources against a given policy. These two aspects of the process may be described below.

Figure 18:
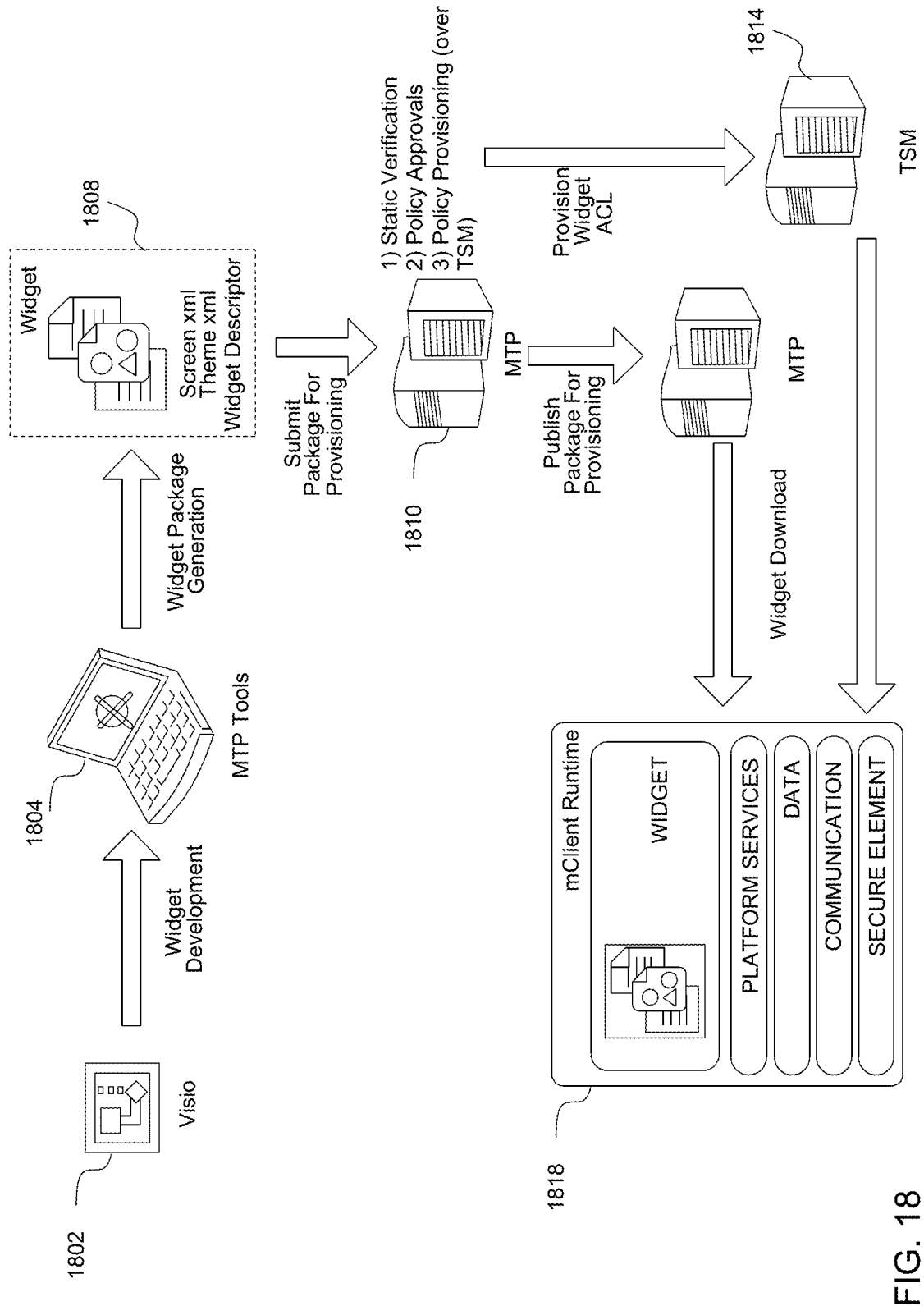
FIG. 18 illustrates a widget lifecycle from development to execution.

FIG. 18 illustrates the widget lifecycle from development to execution. In some exemplary and non limiting embodiments, the widget life cycle (represented by 1800) may have phases with responsibility demarcation between issuer and JVL's sub systems. The phases may include widget development, widget verification and approval, widget delivery, widget installation and widget execution. The widget development phase of the widget life cycle may include a toolkit 1802. In an example, the toolkit 1802 may be based on Microsoft Visio®. A mobile transaction platform tool (MTP) 1804 may support the toolkit 1802 to facilitate widget development. The widget development may be followed by a widget package generation stage. During, the widget package generation a widget bundle 1808 may be formed by the MTP tool 1804. The widget bundle 1808 may comprise a widget descriptor, a screen support file and a theme support file (these may be explained below in greater detail). The widget bundle 1808 may be sent for a static verification, policy approval or policy provisioning by the MTP tool 1804 to a mobile transaction platform (MTP) 1810. In an example, the policy provisioning and the widget provisioning profile may be provided using a trusted service manager (TSM) 1814. In an example, the widget provisioning may be providing using an access control list (ACL), as explained by way of later sections. The MTP 1810 may be configured for publishing the widget bundle 1808 after verification. In an example, widget provisioning and publishing may be synchronized and take place simultaneously over the MTP 1810 and the TSM 1816. The MTP 1810 and the TSM 1816 may send the widget bundle 1808 after verification and publishing to an mClient 1818. The mClient 1818 may be configured to include the widget bundle 1808, a block for platform services, a block for data services, a block for communication services and a block for a secure element. The mClient 1818 may define a runtime footprint for the widget bundle 1808. The mClient may be explained later by way of FIG. 21.

In some exemplary and non limiting embodiments a first phase in widget lifecycle may be widget development. In an example, the mobile transaction platform (MTP) may support a Microsoft Visio based widget development toolkit to automate Widget development. The widget development may take place in an issuer domain. The widget may be made up of a plurality of widget artifacts. In an example, the widget may be made up of a screen.xml file, a content.xml file, a theme.xml file, a plurality of script files, a plurality of images, and a widget descriptor. In an example, the widget development toolkit may generate widget's artifacts like screen, content etc. along with the widget descriptor. The widget descriptor may capture widget access requirements (or requests) for different resources like Actions/URLs/Applets etc by the developer.

In some exemplary and non limiting embodiments, a next phase in widget lifecycle may be widget verification and approval. In an example, the widget approval step may involve validation of the Widget. In an example, the widget verification may take place at a wallet platform (for example, a JVL wallet platform—certification tooling). The widget approval step may further involve approval or provisioning of the Widget. The present invention provides a set of tools for a static analysis of the widget, which may help the overall approval process. In an example, the technical process of widget approval may include various steps. A first step may be creating a static analysis report for the given widget, indicating any warnings/duplications/conflict. In an example, these indications may relate to an application protocol data unit conflict (APDU), an uniform resource locator (URL) Conflict, a presence of too many external resources, use of restricted/controlled application programming interfaces (API). A next step may be capturing a manual approval of the widget recording the approval conditions and accepted/ignored warnings. A next step may be creating a widget provisioning profile. The widget provisioning profile may include the hash of the widget binaries and the ACL. A next step may be creating a widget package to be downloaded using a wallet channel.

In some exemplary and non limiting embodiments, a next phase in the widget life cycle may be the widget delivery and installation. In an example, the widget may be ready for delivery once it is certified and may be available for download from the wallet platform. In some exemplary embodiments, the widget download and installation may be triggered due to various events. The events may include a new card provisioning event by the issuer.

In some exemplary and non limiting embodiments, the mClient's widget manager may execute various steps at the time of installing the widget. A first step may be to verify the integrity of the widget bundle after the widget bundle has been downloaded. In an example, the verification may be done using secure element services. In case, the integrity of the widget bundle is verified, the widget bundle may be added to the mClient. In case, the integrity of the widget bundle is not verified, an error message will be shown and the widget bundle will not be added to the mClient.

In some exemplary and non limiting embodiments, a next phase in the widget life cycle may be the widget execution. The Widget's integrity and access profile may be determined by the wallet manager for each run of the widget. The widget execution and integrity check may include a load time integrity check, and a runtime access control. The load time integrity check may check if the widget may be ready for execution post successful installation. The Hash may be verified every time a widget is loaded for execution. This validation may be required to ensure that the widget or its data has not been tempered with during the idle time of the wallet or the widget. The runtime access control may check if the Widget may start its function once it passes through the hash verification step at its load time. The widget access controller may ensure that the widget trying to access a particular resource may be as per proper authorization i.e. isolation rules.

The mClient Access Control (also referred to as the access control)—While the Widget Descriptor Lifecycle describes the process of "Establishing the policy", the mClient Access Control mechanism ensures the "Enforcement of the policy". This section describes a high level overview of the Access Control Mechanism.

Figure 19:
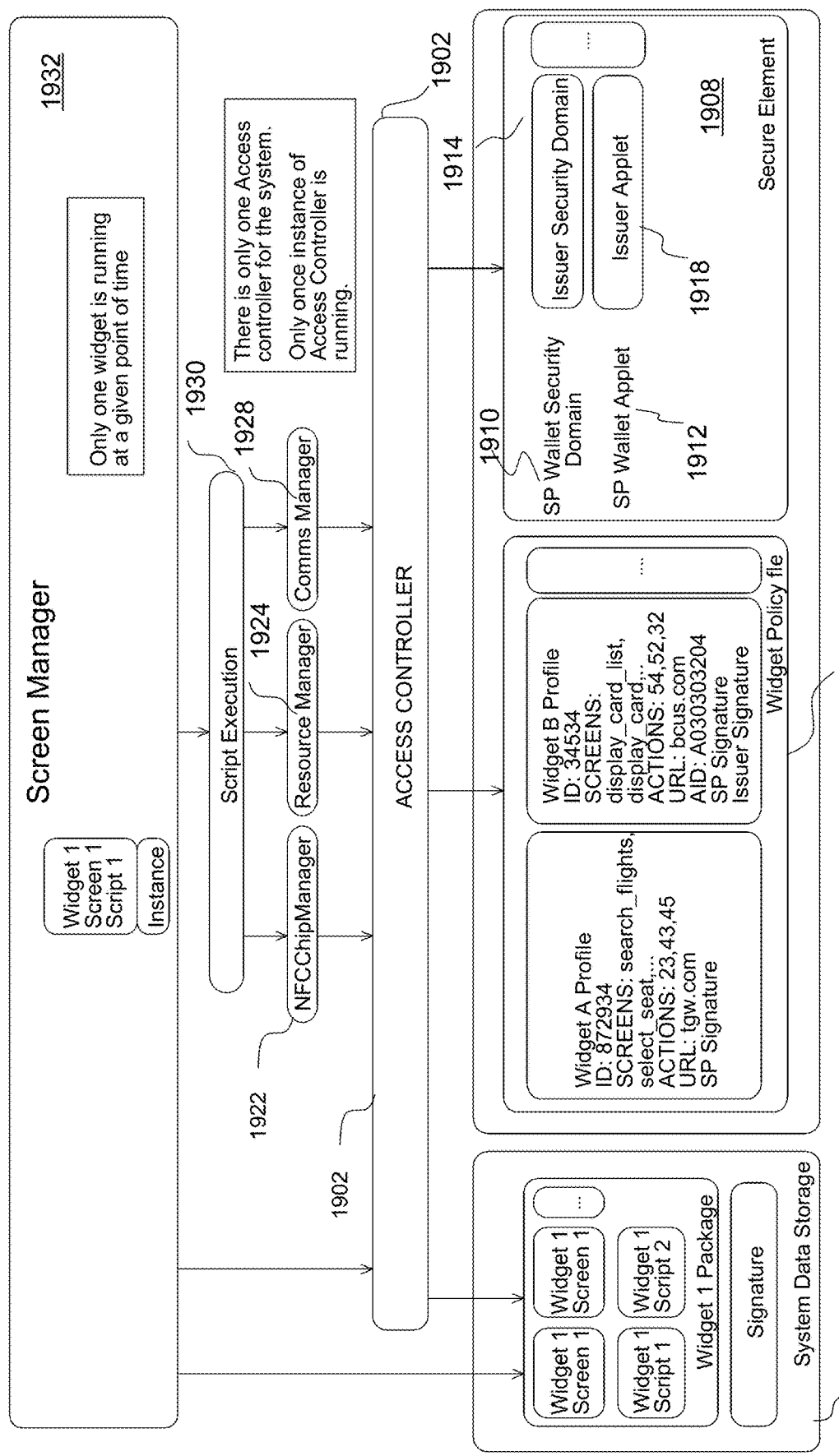
FIG. 19 illustrates a high level view of an access control mechanism.

FIG. 19 illustrates a high level view of the access control mechanism. As illustrated in FIG. 19, the resource access may be controlled by via an access controller 1902. The access controller 1902 may determine the access rights based on the widget descriptor. The access controller 1902 may avail a particular resource for example, a screen or an action or an applet and the like to the widget. In exemplary and non-limiting embodiments, the access controller 1902 may include a set of design considerations. In an example, the access controller 1902 may require a system for data storage 1904. The data storage may be configured to store widget binaries. In an example, the widget profile provisioning and ACL information may be securely stored in a secure element 1908. The secure element 1908 may be in communication with the access controller 1902. The widget profile provisioning and ACL information may include a wallet security domain 1910, a wallet applet 1912, an issuer security domain 1914, and an issuer applet 1918. The access controller 1902 may be in communication with a widget policy file 1920.

The access controller 1902 may be in communication with a near field communication (NFC) chip manager 1922, a resource manager 1924, and a communication manager 1928. The NFC chip manager 1922, the resource manager 1924, and the communication manager 1928 may be in communication with a script execution platform 1930 that can be in communication with a screen manager 1932. As illustrated in FIG. 19, the widgets may not have API level access to any native resources and all resource usage may have to be facilitated by the access controller 1902. For example, the system for data storage 1904 may have to communicate with the access controller 1902, which may facilitate access of the NFC chip manager 1922, the resource manager 1924, and the communication manager 1928 for the system for data storage 1904. In an example, the screen manager 1922 may be allowed to execute only one widget at a particular point of time. In exemplary and non-limiting embodiments, there may be only one access controller 1902 for entire system.

In an example, a widget may be required to get its hash verified every time it may be loaded or reloaded. In an example, only one widget may be allowed to be executed at.

Figure 20:
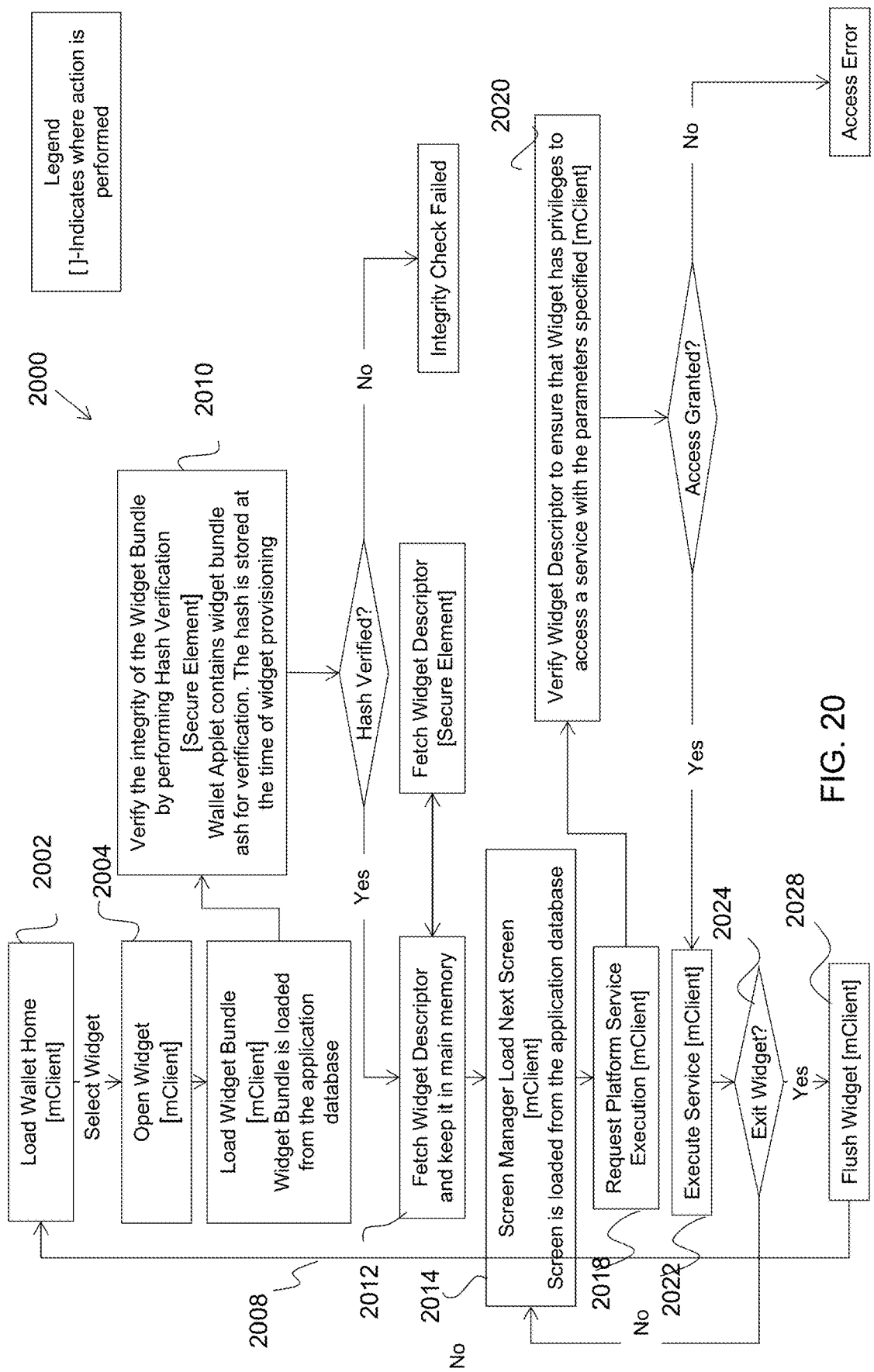
FIG. 20 illustrates a method for loading and execution of a widget with respect to the access controller.

FIG. 20 illustrates a method 2000 for loading and execution of a widget with respect to the access controller.

The method 2000 may require the mClient to load a wallet home at step 2002. The mClient may be in interfacing with the user. The user may select a widget from the wallet home after the wallet home may be loaded onto the mClient. The mClient may be configured to open the widget selected by the user at step 2004 of the method 2000. The mClient may be in communication with an application database. The mClient may be configured for loading the widget bundle of the selected widget from the application database at step 2008. The mClient may be in communication with the secure element. The secure element may verify the integrity of the widget bundle by performing hash verification at step 2010. As mentioned above, the hash may be verified every time a widget may be loaded. In an example, the widget bundle may be contained in a wallet applet for has verification. The hash may be stored at the time of widget provisioning. The hash verification may be vital for the method 2000 and in cases of hash verification failure; the widget execution may be stopped. In cases where hash verification is successful, the mClient may retrieve the widget descriptor for the selected widget from the secure element. The widget descriptor may be stored in the main memory of the MTP at step 2012 of the method 2000. The screen manager may load a next screen onto the mClient after the widget descriptor may be retrieved at step 2014. The mClient may request a platform service execution at step 2018. In an example, the service may be requested by specifying various parameters. The platform service may be exclusive the selected widget (platform services explained by way of FIG. 21). The mClient may verify the widget descriptor so as to ensure that the widget may have privileges to access the platform service requested at step 2020. The mClient may execute the platform service requested in case the selected widget may have privileges to access the selected platform service at step 2022 of the method 2000. The method 2000 may require the widget descriptor verification of the step 2020 for further execution of the widget. For example, if the widget descriptor may be found to not have access to the selected platform service, then the mClient may terminate the method. The mClient may communicate widget execution to the user and the mClient may prompt the user to exit the widget after execution at step 2024 of the method 2000. The mClient may destroy the widget after execution at step 2028. The mClient may be configured to load another wallet home if the user may want to execute another widget.

Figure 21:
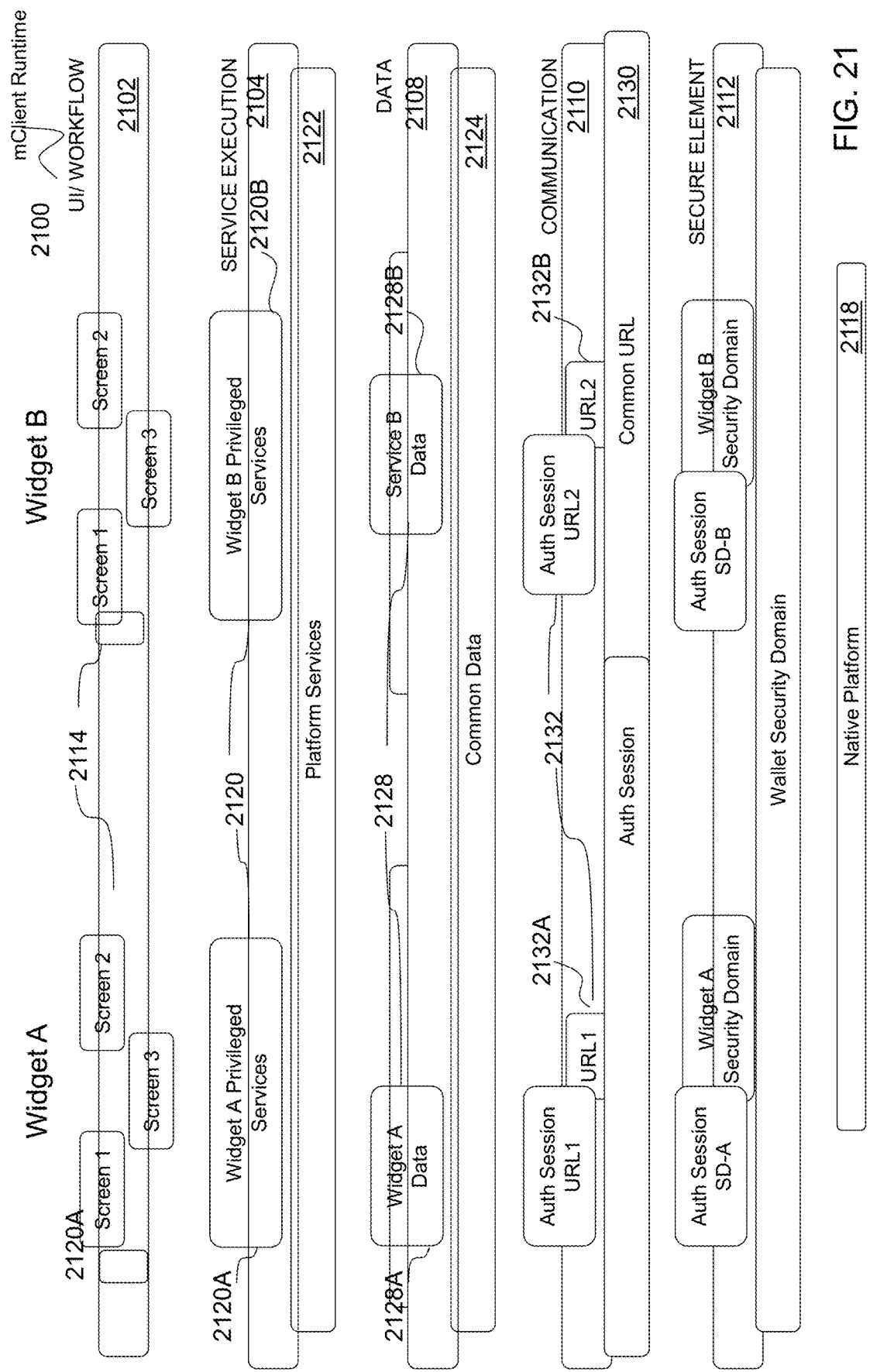
FIG. 21 illustrates a widget runtime footprint based on a widget access control policy.

FIG. 21 illustrates a widget runtime footprint 2100 based on widget access control policy. Each widget may create a logical footprint at runtime based on its access control policy. The access control policy may be defined in the widget provisioning profile. Each logical footprint may contain UI workflow resources 2102, actions/services resources 2104, data resources 2108, online resources or communication resources 2110, and secure element resources 2112. As illustrated by FIG. 21, a boundary of the widget runtime footprint 2100 may described herein.

Each widget may have its own screen 2114 and content files. A widget A may not use content files from a widget B and vice versa. The widget runtime footprint 2100 would use a native platform 2118 that may be common for all widgets. Every widget may have a set of privileged services 2120 that may be used by a particular widget only. For example, the widget A may use only a widget A privileged service 2120A from the privilege services 2120 and the widget B may only use widget B privileged service 2120B from the privilege services 2120. The widget runtime footprint 2100 has a platform services block 2122 that may be a part of the mClient and therefore, may be used by any of the widget A or widget B or any other widget. Any widget may access a common data 2124. The common data is stored by default in the widget runtime footprint 2100. In an example, the widget may define, its own data store if authorized to do so. For example, the widget A may define a data source 2128A and the widget B may define a data store 2128B.

The mClient may have a common URL platform 2130. Any widget for example, widget A or widget B may access data from the common URL platform 2130 by default. In an example, each of the widget A and widget B may define their own communication end points 2132A and 2132B. The communication end points may be domain names. In this example, widget A may use the communication end point 2132A and widget B may use the communication end point 2132B.

Any of the widget may not have default access to any SE applets. Each applet access that may be allowed for the given widget may be defined explicitly in the widget descriptor. One or more Widgets may have access to the same SE applet, based on the permission granted by the server's signature.

Detailed design of the widget isolation requirement. In some exemplary and non limiting embodiments, The methods and systems described herein of multi-domain ecosystem secure personalized transactions includes an overall lifecycle of the policy file used for the access control. Various stages describe important files/data-structure and their transformation/processing, which ultimately results in access control implementation at the mClient container. The stages may include a development stage, a provisioning stage, a widget launch stage, and a widget execution stage. These stages may be described herein.

The development stage may include the widget descriptor file. The widget descriptor file may be provided by a developer (for example, the issuer). The widget descriptor file may describe a set of resource requirements from the developer's perspective. In an example, during the development stage the widget along with the widget descriptor file may be submitted for the widget approval process. In exemplary embodiments, the resource requirements may be justified during the widget approval process. The widget may be signed by a provisioning authority (for example, JVL) after, the widget has been approved.

The provisioning stage may include a widget provisioning profile. The widget provisioning profile may be created by the provisioning authority as a part of approval process. The widget provisioning profile may be a derivation of the widget descriptor file with some additional information. In an example, the additional information may include a user-ID, a widget hash and the like. The widget provisioning profile may be provided using a trusted service manager (TSM). The widget provisioning profile may be stored inside the secure element (SE), using the wallet authentication/companion applet. The SE may provide a service to the wallet to accept the user ID and the widget hash and return the verification status as well as the ACL.

The widget launch stage may include at least one widget access record. In an example, the widget launch stage may include more than one widget access record. The widget access record may be created and maintained by the widget manager inside the wallet's main memory. The widget access record may be a simple record structure where the resource permissions may be stored. When a widget is launched, the widget manager may contact the SE to read the ACL and the widget manager loads up the widget access records in the main memory.

The widget execution stage may include a widget access context object. The widget access context object may be a runtime object which may provide a simple method to check permissions for the widget execution. The widget access records may be used to populate the widget access context object. The widget access context object may internally maintain a simple Map (key-value pair) of permissions. The widget access context object may be used by all access aware resource managers to check the given widget's permissions. The resource managers may internally decide whether the given resource needs to be checked against policy or not.

In some exemplary and non limiting embodiments the widget descriptor may be a central place where all the access rights for a plurality of resources may be defined. In an example, the plurality of resources may include the action, the screen, at least one URL and SE/Applets. In an exemplary embodiment, construction of a widget may require availing different resources like actions, applets, screens and the like. In exemplary but non limiting embodiments, action may include that the mClient platform may provide 4 different types of actions i.e. system actions, core/infrastructure actions, wallet actions and any other issuer specific custom actions. In an example, actions may be a part of mClient platform and hence are shared across widgets. In an example, any widget may access core and wallet actions. In an example, the widget by default may not be allowed to access any system actions. The widget may need to specify all the system actions required by it in the descriptor. In an example, the widget may specify any widget specific action that may be an action meant for only that widget in particular. In exemplary but non limiting embodiments, every widget may be required to have an individual set of screens and content files that may not reuse the screens and content resources from any other widget. In exemplary but non limiting embodiments, a widget may be permitted to make a connection to a plurality of URL's. In exemplary but non limiting embodiments, the widget may interface with a plurality of applets.

Figure 22:
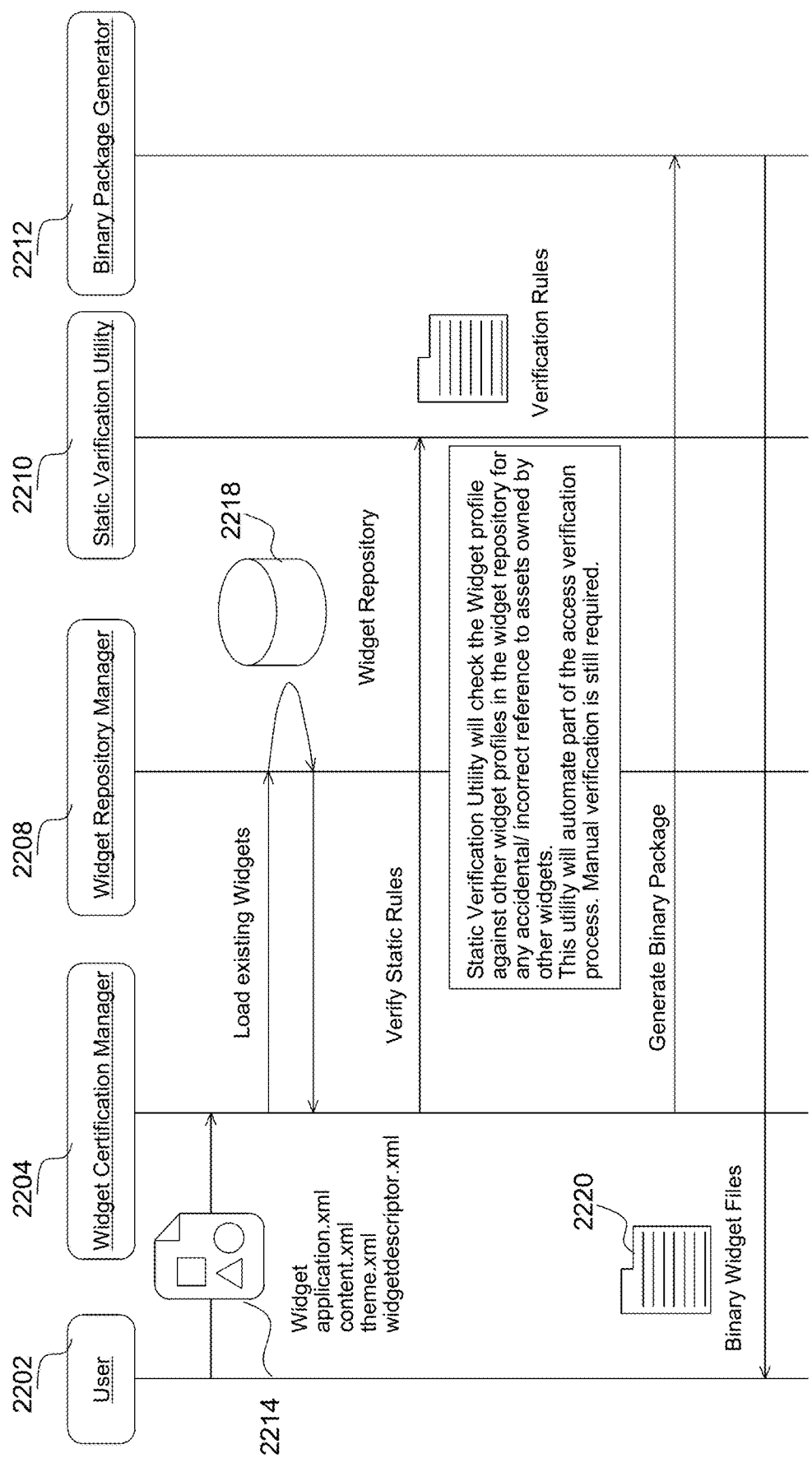
FIG. 22 illustrates a widget approval process.

Widget Approval Process—FIG. 22 illustrates a widget approval process.

The widget approval process as illustrated in FIG. 22 may involve a user 2202, a widget certification manager 2204, a widget repository manager 2208, a static verification utility 2210 and a binary package generator 2212. The user 2202 may select a widget bundle 2214 from various widget bundles available to the user. In an example, the widget bundle 2214 may contain an applicaition.xml file, a content.xml file, a theme.xml file and a widget descriptor (these files may be same as described above). The widget bundle 2214 may be sent to the widget certification manager 2204 by the user 2202. The widget certification manager 2204 may also be the widget approval manager. The widget certification manager 2204 may be the main controller class driving approval process. The widget certification manager 2204 may send the widget bundle 2214 to the widget repository manager 2208, the widget repository manager 2208 may manage details about all the certified and uncertified widgets with proper timestamp details. The widget repository manager 2208 may have access to a widget repository 2218. The widget repository 2218 may contain all the certified and uncertified widgets with proper timestamp details. This information may help for audit trailing and for static verification. The widget certification manager 2204 may send the widget bundle 2214 to the static verification utility 2210. The static verification utility 2210 may validate the widget bundle 2214 against static rules. For example, if a client may have already declared client Check CardStatus as one of its custom actions, then any other issuer then the client itself may not be allowed to use this particular action. The static verification utility 2210 may check the widget bundle 2214 in the widget repository 2218 for any accidental/incorrect reference to assets that may be owned by other widgets. The static verification utility 2210 may automate a part of the access verification process, but manual verifications may still be required. The widget certification manager 2204 may receive the widget bundle 2214 verified against static rules from the static verification utility 2210. The widget certification manager 2204 may send the widget bundle 2214 to the binary package generator 2212. The binary package generator 2212 may generates the final binary package corresponding to the widget bundle 2214. The binary package may be ready for over-the-air download and delivery. The binary package generator 2212 may send a binary widget file 2220 to the user 2202.

Widget Environment Aspects—Few exemplary nut non-limiting environmental assumptions and dependencies for the wallet software are described here. The environmental assumptions and dependencies may include a secure communication, a secure main memory, a secure application environment, a reliable API, a SE access management, a protected database, and a reliable rush registry. In an example, the wallet software may assume that the underlying platform and the APIs offer reliable and secure HTTP and HTTPS connections for Secure Communication. The native platform may manage a root certificate store for the secure sockets layer (SSL) verification. In an example, the wallet software may assume that the main memory allocated to the wallet software by the native OS may be protected from other applications (apps) and may be secure to hold sensitive data elements for transitional scope. The wallet software may assume that the wallet binaries may be stored and maintained securely by the application environment on the phone to provide a secure application environment. The app signature is verified by the environment using trusted content certificates. The Environment may also impose strict signing and access control rules on all apps downloaded on the phone. The wallet software may assume that all Java or similar APIs may be secured by the underlying environment and may be trusted for processing sensitive data for a reliable API. Also, the APIs may be access controlled by the environment. The wallet software may assume that the access to secure element may be managed by the environment infrastructure (for example, JSR 177) and the accesses to various secure element services may be privileged. The privilege management may be implemented by the environment based on the app signatures. The wallet software may assume that the environment may restrict access to persistent data to the owner application only and the applications may not access or modify each other's data. The wallet software may assume that the environment may provide a reliable application push registry, where the events for the wallet app are passed on to the wallet reliably (without corruption or intrusion).

The methods and systems described herein of multi-domain ecosystem secure personalized transactions includes a computer readable medium containing program instructions. The execution of the program instructions by one or more processors of a computer system may cause the one or more processors to carry out the steps that include configuring one or more widget modules for execution via a wallet container on a mobile device. The one or more widget modules may comprise a service group of a service provider. In an example, the wallet container may operate in cooperation with an enabling tier of a multi-tier platform for providing secure personalized transactions to provide the one or more widget modules exclusive access to a workflow of the service provider. In an example, the wallet container may interpret the widget module in a runtime environment operating on the mobile device to provide the exclusive access. In an example, service provider may be a widget issuer. In an example, one or more of the widget modules issued by the widget issuer may be provided exclusive access to a workflow of the widget issuer. In an example, the wallet container may operate in cooperation with an enabling tier of a multi-tier platform for providing secure personalized transactions to provide the exclusive access. In an example, the one or more of the widget modules issued by the widget issuer may be provided exclusive access to a user interface of the widget issuer. In an example, the wallet container may operate in cooperation with an enabling tier of a multi-tier platform for providing secure personalized transactions to provide the exclusive access. In an example, the one or more of the widget modules issued by the widget issuer may be prevented from accessing a workflow of another widget issuer. In an example, the wallet container may operate in cooperation with an enabling tier of a multi-tier platform for providing secure personalized transactions to prevent accessing a workflow of another widget issuer. In an example, the one or more of the widget modules issued by the widget issuer may be prevented from accessing a user interface of another widget issuer. In an example, the wallet container may operate in cooperation with an enabling tier of a multi-tier platform for providing secure personalized transactions to prevent accessing a workflow of another widget issuer.

A multi-domain ecosystem for secure personalized transactions may include various components including server, client, and other types of components. Client components may include various software programs, applications, applets, data sets, interfaces, menus, and the like that may be described herein or elsewhere. In general client functionality may be derived from various wallets, widgets, applets, containers, and the like that reside and/or are executable on a client device, such as a mobile phone, smart phone, tablet, universal electronic transaction facility, laptop, notebook, netbook, kiosk, appliance, utility device, automobile, plane, and any other electronic or electro-mechanical device.

In general the methods and systems described herein includes client software referred to herein and elsewhere as mClient, container, and the like which acts as an enabling infrastructure for rapid mobile application development. It provides a container-based approach to supporting a multi-tenant application architecture. The mClient container provides a phone specific run-time environment for the wallet and widgets. The container handles complexity related to application execution, transactional security, reliability, and the like including device specific implementations. An mClient container may be based on APIs, such as device specific APIs. The container runtime environment facilitates generating a native application screen from widget descriptors. This facilitates ensuring that a touch screen button looks like a native ANDROID, BLACKBERRY, IPHONE, or other device button on the respective devices. The wallet application may be similar to a widget in that it may also be interpreted and executed by the mClient runtime functionality. However, as described herein a wallet will have privileged control over the application to maintain a highly secure and separated environment for use and access to wallet information that may include user account, personal, and transaction-related content, among other things. A wall may also be defined to provide functionality that is domain specific (e.g. financial, retail, healthcare, government, and the like).

Figure 23:
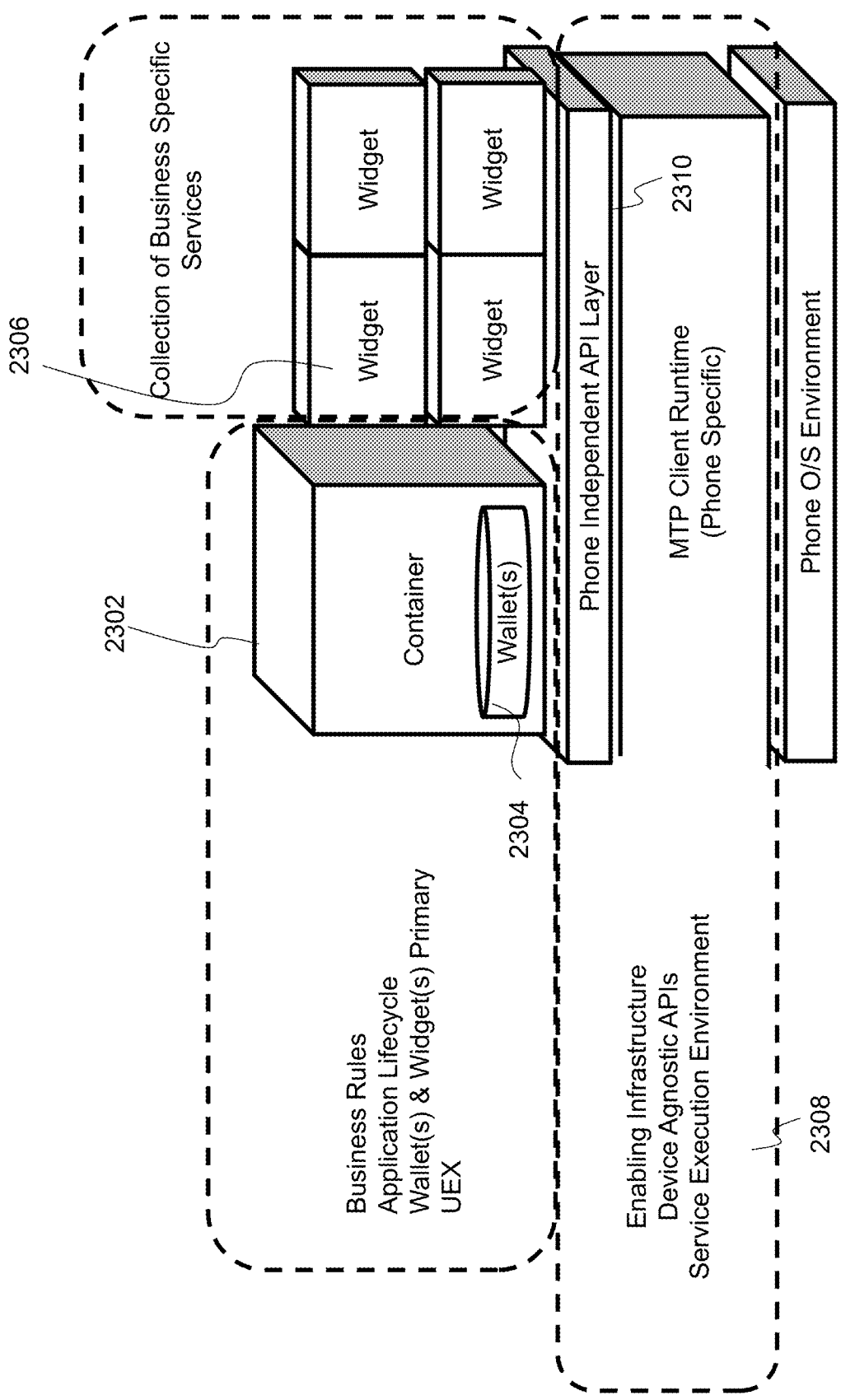
FIG. 23 illustrates an exemplary and non-limiting embodiment of widget architecture.

With reference to FIG. 23, there is illustrated an exemplary and non-limiting embodiment of a widget architecture that may facilitate isolating distinct service provider widgets within a wallet container on a client device in a multi-domain ecosystem for secure personalized transactions. A client container 2302 may operate as a client runtime component for facilitating execution of mobile applications on a client device, such as a mobile telephone, computer, PDA, laptop and the like in a multidomain ecosystem for secure personalized transactions. As illustrated, one or more wallets 2304 may comprise applications and data that may provide an overall user digital wallet experience and may be accessed through one or more secure entry points managed by the container 2302 for one or more widgets 2306. One or more widgets 2306 may comprise service groups developed and/or issued by third party service providers. In accordance with exemplary embodiments, the widgets 2306 may run within the secure environment of the client container 2302 in an independent manner isolated from the one or more wallets 2304. When implemented in accordance with exemplary embodiments as discrete units of executable code, widgets may execute and operate in a manner separate and distinct from the operation of other widgets, wallets and applets or, conversely, may operate in a cooperative manner with one or more other wallets, widgets and/or applets to perform secure transactions.

As illustrated, the client container 2302 may interface with an API layer 2308 comprising one or more device specific APIs. The API layer 2308 may support various and/or popular device environments. A phone independent API layer 2310 may ensure that applications, including, but not limited to wallets, widgets and applets, such as those developed using a Mobile Transaction Platform (MTP) software development kit (SDK), run across all supported MTP handsets. In accordance with exemplary embodiments, both the wallets 2304 and the widgets 2306 may be nearly identical in structure (e.g., screens, JavaScript, & CSS Styles), except that the wallets 2304 may have access to a wider set of privileged APIs within the API layer 2308 than do the widgets 2306. In some instances, wallets 2304 may be capable of robust user configuration and personalization particularly as compared to widgets in general and service provider derived widgets in particular. As a result, in some instances, wallets may be provided with increased access to APIs exerting control over the functionality of a client device.

In accordance with exemplary and non-limiting embodiments, when invoked, a wallet 2304 may take application control until a widget 2306 entry point is selected (e.g. by a user, wallet 2304, container 2302, external service, and the like). User selection of a widget 2306 may be via a card image, a menu option, and the like that may be available to the user through the wallet 2304 interface. In response to such selection, the selected widget may be launched within a runtime secure environment (e.g. an environment provided by the container 2302) comprising the wallet 2304 and the execution of the wallet 2304 may be suspended.

Once launched, the widget 2306 may operate to facilitate secure transactions between, for example, a wallet 2304 of a mobile client device upon which the widget 2306 is executing and a service provider, such as the service provider who issued the widget 2306. In such an instance, a widget 2306 issued by a service provider may be granted exclusive access to the workflow of the issuing service provider, resources on the mobile device, such as wallet resources, secure element resources, as well as to user interfaces of the client device. Likewise, a widget 2306 issued by a service provider may be denied access to the workflows, wallet elements, and the like of other service providers as well as to certain mobile device resources, such as user interfaces of the client device.

As separately executable units of code, widgets 2306 may be effectively isolated one from the other via the execution separation functions available from a mobile operating system and/or by aspects of the mClient including the runtime environment provided by a container. In addition, widgets 2306 may be developed by a service provider (e.g. an issuer of instruments, and the like) who may configure the widget to incorporate provider-specific security elements that may make it hard for other service-provider developed widgets from accessing its resources, workflows, and the like. A mobile transaction platform that may include such widgets, containers, wallets, service provider software (including without limitation various aspects of a wallet service center described later herein), and the like may enforce strong and diverse security in all such aspects so that, for example, widgets developed by service provider A may not access resources (e.g. server-based) of service provider B. Such strong security may be important for a variety of reasons including keeping domain-specific information separate and confidential from other domains that the user may interact with through the user's mobile device (e.g. financial domains, health domain, legal domains, business domains, personal domains, identity domains, and the like).

The methods and systems described herein of multi-domain ecosystem secure personalized transactions include a computer readable medium containing program instructions. The execution of the program instructions by one or more processors of a computer system may cause the one or more processors to carry out the steps that may include configuring one or more widget modules in a wallet container on a mobile device. The wallet container may comprise one or more wallet modules. The steps carried out by computer readable medium may further include, limiting access by the one or more widget modules to the set of elements consisting of the one or more wallet modules, the mobile device, one or more client applications. The steps may further include, providing access to the one or more widget modules of at least one of an issuer-specific security domain and widget-specific issuer security domain.

The methods and systems described herein of multi-domain ecosystem secure personalized transactions includes a method that includes providing a container runtime environment on a mobile device. The method may further include accessing a mobile-device resident widget module to determine access constraints associated with the widget, In an example, the access constraints may pertain to electronic wallet access, device resource access, device resident ecosystem applications, network resources accessible by the mobile device, issuer-specific security domains, and widget-specific security domains. The method may further include, operating at least one of the widget modules through a container to enforce access constraints associated with the widget module. The method may further include facilitating access by the widget module to at least one of issuer-specific security domains and widget-specific security domains associated with the widget module. In an example, enforcing widget module access constraints may include preventing access to electronic wallet resources on the mobile device. In an example, enforcing widget module access constraints may include preventing access by a first widget to a wallet associated with a second widget. In an example, enforcing widget module access constraints may include preventing access by a widget to a wallet on the mobile device based on a state of the wallet. The state of the wallet may include an active state during which access by the widget may be allowed and an inactive state during which access by the widget may be prevented. In an example, facilitating access to a security domain may comprise allowing access to a digital wallet on the mobile device that may share a security domain with the widget module. In an example, facilitating access to a security domain may comprise allowing access to network resources of an issuer that may share a security domain with the widget module.

Various aspects of a mobile transaction platform, including client-specific aspects, for isolating and limiting access among domain-specific resources are described herein above. In addition to these important security and resource access limiting functions, application-related limits on access to wallets, device resources, applications, network resources and the like may also be facilitated by the methods and systems described herein including development, deployment, execution, and transaction methods and systems.

In accordance with exemplary embodiments, a container may implement one or more triggers to control or otherwise limit access to one or more wallets, devices, client applications and network resources. Limits on access may be based on location (e.g. venue, location, network type, provider accessibility, wallet state, spending limit, credit balance, credit score, and the like). Examples of these and other limits on widget access to resources are described here. A wallet may be managed in a personalized way by a merchant so that, for example, when one enters a venue one may not be given the option of using a widget that enables a form of payment that is not accepted at the venue. In another non-limiting example, access to various widgets may be enhanced by a trigger or triggers when a user travels outside the U.S. In accordance with yet other examples, a trigger based on credit card balance/limit may further enhance the operation of one or more widgets including, but not limited to, access by one or more widgets to client applications and network resources. In an exemplary embodiment, if a wallet is not active, such as might occur when the client device on which the container and wallet or wallets are resident is shut off or when a user has deactivated a wallet (e.g. for enhanced security of the wallet resources), an associated widget may be limited from accessing client device and network resources, wallet content, and the like normally controlled by or accessed through the wallet.

The methods and systems described herein of multi-domain ecosystem secure personalized transactions includes a method that includes configuring a widget at least partially by a networked server to provide access to an issuer-specific service group. The method may further include receiving in a secure wallet container operating on a client device, a request from the networked server to deploy the configured widget. The method may further include determining widget isolation requirements for operating the widget on the client device. The method may further include installing the configured widget based on the isolation requirements on the mobile device through the secure wallet container.

The methods and systems described herein of multi-domain ecosystem secure personalized transactions include a computer readable medium containing program instructions. The execution of the program instructions by one or more processors of a computer system may cause the one or more processors to carry out the steps that may include deploying on a client device a first issuer-specific widget to facilitate a first trust model-based secure personalized transaction. The steps may further include deploying on the client device a second issuer-specific widget to facilitate a second trust model-based secure personalized transaction. In an example, the first issuer-specific widget and the second issuer-specific widget may be deployed in a wallet container. In an example, at least one of the first trust model and the second trust model may be one of a delegated trust model, direct trust model, and brokered trust model. In an example, at least one of the first trust model-based secure personalized transaction and the second trust model-based secure personalized transaction maybe facilitated based upon a trigger. In an example, the trigger may correspond to a monetary value of at least one of the first trust model-based secure personalized transaction and the second trust model-based secure personalized transaction.

In accordance with exemplary and non-limiting embodiments, after a widget 2306 has been developed, such as by an issuer who may be a service provider, the operation of the widget 2306 may be verified and approved and may be stored on a server for subsequent downloading to a client device or to more than one client devices in the case of a non-user-specific widget 2306. As noted, widgets 2306 can vary in nature depending upon the functional task to which they are directed. As a result various types of widgets 2306 include, but are not limited to, wallet-specific widgets, user-wallet-specific widgets, offering-specific widgets, marketing-specific widgets, audit-specific widgets, multi-purpose widgets and the like. After a successful installation on the client device, the widget 2306 is ready for execution.

In an exemplary embodiment, once a widget 2306 is installed, confirmation in the form of an acknowledgement may be sent to the server from whence the widget 2306 was downloaded. Receipt by the server of the acknowledgement may result in the server storing information regarding the successful download of a widget 2306. For example, the server may store information indicating a version number of the downloaded and installed widget 2306. Such information may be used, for example, to ascertain the existence of a more recent version of a widget 2306 for download than has been previously downloaded. In some exemplary embodiments, the successful download of a widget 2306 at a client device may result in a confirmatory visual indicia, such as a displayed text message, being displayed to a user of the client device. Also, a user may be provided with a means for accepting the downloaded widget including, for example, performing a non-binding trial of the widget. A result of such a widget installation may include placing a new icon in a mobile transaction platform user interface of the client device. The new icon may be differentiated from other icons temporarily to facilitate indicating that it is newer that the others. Alternatively, a new widget may have no visually detectable difference to the user.

Deployed or installed widget integrity may be provided by a container (e.g. mClient container), which is described herein. One technique for ensuring widget integrity is to ensure that the widget and/or its data are unaltered. In accordance with an exemplary embodiment, in order to make sure that neither the widget 2306 nor its data has not been tampered with during the time between downloading of the widget 2306 and its execution, a hash may be employed. A hash may be computed of the application code comprising the widget 2306 and the hash verified when a widget is installed, accessed for execution, accessed during an audit of client mobile transaction platform resources, loaded for execution (e.g. in an cClient container runtime environment), and the like. In an example of verifying a hash when a widget is loaded for execution, the widget 2306 may start its function once it passes through a hash verification at its load time.

An mClient container runtime environment may also facilitate strong isolation of widgets so that distinct widgets cannot impact other widget resources, alter such resources or widget application code, and the like that may impact widget integrity.

As noted above, widgets 2306 may provide one or more secure entry points via which wallet applications may interact with the issuer of the widget 2306. In exemplary embodiments, the issuer of a widget 2306 may also be a service provider whose services are enabled, either in whole or in part, by use of the issued widget 2306 by a user. In an exemplary and non-limiting embodiment, one or more widgets 2306 may act in concert to perform secure personalized transactions with varying degrees of trust. Specifically, different widgets 2306 may be deployed to facilitate secure personalized transactions in accordance with varying trust models, including among others direct, indirect, brokered, and third-party secured trust models for transaction execution.

In accordance with exemplary and non-limiting embodiments, the use of more than one trust model may reflect differences in the environment in which the client device and associated widgets 2306 are deployed. As noted elsewhere herein, wallet and widget issuers may select one or more trust models when configuring elements of an ecosystem. For example, an issuer, perhaps comprising a service provider, may deploy a first widget 2306 to perform secure banking transactions over the air wherein the transactions have a first level of trust. The issuer may further, for example, deploy a second widget to perform secure banking transactions at a point of sale (POS) kiosk wherein the transactions have a second higher level of trust owing to the client devices proximity to the kiosk and/or access to independent verification of the user of the device. Either or both of these widgets may be deployed to a single client device and the selection of a widget for execution may be performed by the wallet 2304, such as based on the nature of the transaction as described, the security of the available OTA network, and the like.

In accordance with other exemplary and non-limiting embodiments, widget deployment may be dependent on a variable. For example, an issuer may configure a plurality of widgets 2306 each operating with a trust model that is financial transaction amount dependent. For example, a widget requiring a relatively low level of trust may be deployed for financial transactions involving less than fifty dollars while a widget requiring a relatively high level of trust may be deployed for financial transactions involving more than fifty dollars.

The methods and systems described herein of multi-domain ecosystem secure personalized transactions includes a method that includes receiving an alert with a multi-domain secure wallet container at a mobile device that an updated version of an existing widget that is deployed on the mobile device is available. The method may further include confirming that the update is an update of a existing widget that is deployed on the mobile device. The method may further include configuring the wallet container to receive the updated widget. The method may further include receiving the updated widget with the wallet container. The method may further include dispositioning the existing widget to prevent further use of the widget. The method may further include storing the updated widget on the mobile device.

The methods and systems described herein of multi-domain ecosystem secure personalized transactions includes a method that includes querying a server with a multi-domain wallet container operating on a mobile device for the existence of an updated widget. The method may further include receiving information from the server indicative of the availability of the updated widget. The method may further include requesting the updated widget. The method may further include receiving the updated widget at the mobile device. The method may further include dispositioning an existing widget that the updated widget supersedes to prevent further use of the existing widget. The method may additionally include storing the updated widget on the mobile device. In an example, querying the server may be performed at predefined time intervals. In an example, querying the server may be performed in response to the execution of a widget on the client device. The method may further include sending a confirmation of storing the updated widget to the server.

The methods and systems described herein of multi-domain ecosystem secure personalized transactions include a method that includes receiving a query from a mobile device for the existence of an updated widget. The method may further include transmitting information indicative of the availability of the updated widget to the mobile device. The method may further include receiving a request for the updated widget from the mobile device. The method may further include transmitting the updated widget to the mobile device. In an example, the query may be received at predefined time intervals. In an embodiment, the query may be received in response to the execution of a widget on the client device. The method may further include receiving a confirmation of storing the updated widget.

In accordance with exemplary and non-limiting embodiments, widgets 2306 stored and capable of running within the secure environment of the client container 2302 may be updated for any of a variety of purposes (e.g. periodically, such as weekly, to provide current pricing or offers, increase a spending limit, in response to a user request, to improve security, to add access to a different trust model, and the like). In one exemplary embodiment, after reviewing and publishing the widget 2306, a widget provider may create and issue an alert indicating the availability of a new or newer version of one or more widgets 2306.

In one exemplary embodiment, the alert may be issued to only those client devices that have previously successfully downloaded (or otherwise have installed) a version of the widget 2306 to be updated. In such an instance, a message may be sent to the client device to inform the user that an updated widget 2306 is available for download and provide the user with the choice to download the updated widget 2306.

In another exemplary embodiment, a configuration file, such as might be stored on a wallet server, may contain user customizable information defining the manner in which the user desires for widget updates to occur. For example, a user may customize an associated configuration file to indicate that each time a new version of a previously downloaded widget 2306 becomes available the newer version of the widget is to be downloaded. Conversely, a client device may periodically, such as at start-up or prior to engaging in a commercial transaction, query the wallet server to downloaded newer versions of previously installed widgets 2306.

In other embodiments, the configuration file may be customized by or for the widget issuer, a related wallet issuer, and the like.

In accordance with other exemplary embodiments, a widget 2306 itself may be informed through a workflow of the widget issuer that an update is available and based on aspects of the updated widget (e.g. a security update), the installed widget might take an action (e.g. disable itself, notify the user that it is no longer current, update portions of itself rather than replacing it with a new widget, etc). Another update mechanism may be realized through operation of the wallet. For example, a wallet may be updated and, as a result, may indicate that a widget is out of date, triggering various widget actions (e.g., notify the user, automatically update, request an update, and the like)

Methods and systems of providing a multi-tier mobile transaction platform for secure personalized transactions in a multi-domain ecosystem may include a method of configuring at least one mobile transaction platform-specific application programming interface on a mobile device for facilitating access to mobile device secure resources by a wallet container executing on the mobile device. The method may further include disposing a plurality of distinct wallet containers in a memory of the mobile device, wherein each wallet container interfaces with mobile device secure resources via the at least one application programming interface. The method may further include the at least one programming application interface enforcing wallet container isolation via security criteria of a three layer mobile transaction platform. The three layers may include a personalization layer, a service layer, and an enabling layer.

The methods and systems described herein of multi-domain ecosystem secure personalized transactions include a wallet container operable on a client device. The wallet container may include a runtime component for facilitating management of widgets, wallets, security, and access to a secure element. The wallet container may further include an API-based interface for accessing business specific services provided by the widgets and for accessing client device specific resources. The wallet container may facilitate operation of a plurality of distinct wallets and distinct widgets for accessing at least one of the plurality of distinct wallets.

The methods and systems described herein of multi-domain ecosystem secure personalized transactions include a computer readable medium containing program instructions. The execution of the program instructions by one or more processors of a computer system causes the one or more processors to carry out the steps that may include configuring one or more widget modules in a wallet container on a mobile device. The wallet container may comprise one or more wallet modules. The steps may further include facilitating access to at least one of the wallet modules by an issuer of at least one of the widgets.

A wallet container 2302 may form a client-resident portion of a mobile transaction platform (MTP) enabling infrastructure. As such, a container may provide a cross platform service execution environment for client devices, such as mobile handsets, and the like.

As noted above, the methods and systems described herein generally include client software referred to herein and elsewhere as mClient, container, runtime environment, and the like, which acts as an enabling infrastructure for rapid mobile application development. It provides a container-based approach to supporting a multi-tenant application architecture. The mClient container provides a phone specific run-time environment for the wallet and widgets. The container handles complexity related to application execution, transactional security, reliability, and the like including device specific implementations. An mClient container may be based on APIs, such as device specific APIs.

As illustrated, one or more wallets 2304 may comprise applications and data that may provide an overall user digital wallet experience and may be accessed through one or more secure entry points managed by the container 2302 for one or more widgets 2306. One or more widgets 2306 may comprise service groups developed and/or issued by third party service providers. In accordance with exemplary embodiments, the widgets 2306 may run within the secure environment of the client container 2302 in an independent manner isolated from the one or more wallets 2304. When implemented in accordance with exemplary embodiments as discrete units of executable code, widgets may execute and operate in a manner separate and distinct from the operation of other widgets, wallets and applets or, conversely, may operate in a cooperative manner with one or more other wallets, widgets and/or applets to perform secure transactions.

Figure 24:
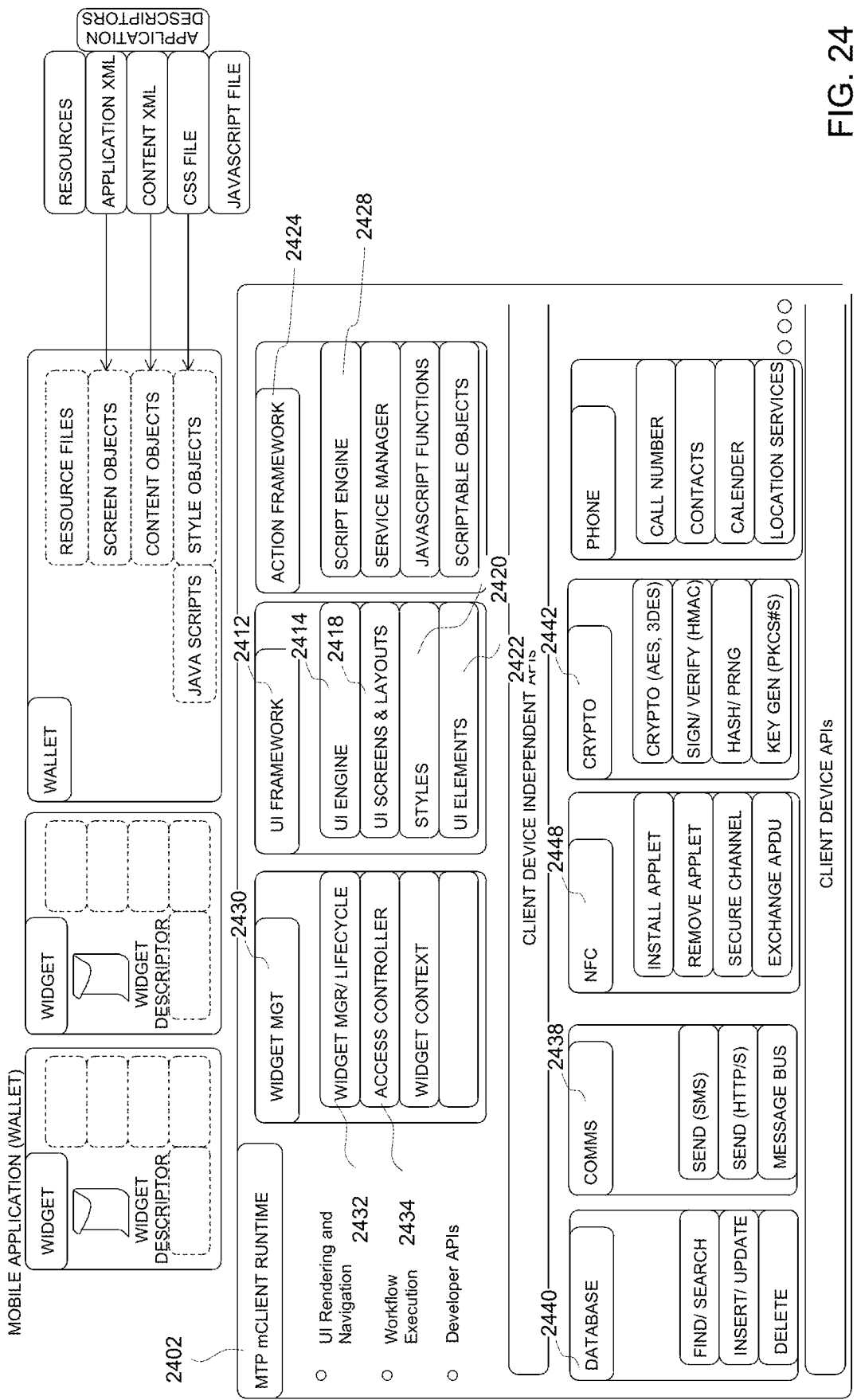
FIG. 24 illustrates a high level architecture view of a client-device container.

Referring to FIG. 24, which depicts a high level architecture view of a client-device container (e.g. mClient), detailed exemplary aspects of a container are presented. A container 2402 may facilitate user interface rendering and navigation; workflow execution; access to developer APIs; and may further include application container infrastructure. A container 2402 may facilitate widget management 2430 with a widget lifecycle manager capability 2432, an access controller 2434, and the like while integrating widget and wallet context. A container may further include a user interface framework 2412 that may include a UI engine 2414, screens and layout 2418, styles 2420, UI elements 2422, and the like. A container as depicted in FIG. 24 may further include a workflow framework 2424 that may leverage a script engine 2428, service manager, and may include javascript functions, scriptable objects, and the like. Other container capabilities may include database functionality 2440, such as find/search, insert/update, delete, and the like. Communications 2438 may be facilitated by a container for sending (e.g. sms, HTTP/S), encoding, decoding, attaching, detaching, and the like. Near Field Communication functionality 2448 may also be supported by the container. A container may further facilitate security through interaction with a secure element or other secure framework as may be provided by the client, including applet installation, removal, secure channel setup, APDU exchange, and the like. Further security features provided in association with a container may include cryptography 2442 (e.g. AES, 3DES, RSA, and the like), signing, verification (e.g. HMAC), hash computation and verification (e.g. SHA/1), key generation (e.g. PKCS#5), random number functions (e.g. PRNG), and the like. A container may also interact with client resources, such as a phone function to facilitate making calls, reaching and/or managing contacts, interaction with calendars to facilitate event-based functions, location-based services, and the like.

The methods and systems described herein of multi-domain ecosystem secure personalized transactions include a method of managing a plurality of transaction protocols that includes disposing a wallet module in a memory of a client device. The method may further include disposing a wallet companion applet in the memory. The method may further include executing the wallet companion applet in association with a secure personalized transaction being conducted over an ecosystem in which the client device is deployed to manage access to selected content of a secure element associated with the client device. In an example, the wallet companion applet may use the accessed secure element content to facilitate authenticating access to the wallet module to perform the transaction.

The methods and systems described herein of multi-domain ecosystem secure personalized transactions include a computer readable medium containing program instructions. The execution of the program instructions by one or more processors of a computer system causes the one or more processors to carry out the steps that may include configuring one or more widget modules in a wallet container on a mobile device. The wallet container may include one or more wallet modules. The steps may further include configuring at least one applet to execute in conjunction with at least one wallet module to facilitate management of s plurality of transaction protocols.

In accordance with an exemplary and non-limiting embodiment, a Secure Element (SE) may be utilized as a secure data storage device at the client-end, such as for mobile devices including standard smart phones. In exemplary and non-limiting embodiments, an SE may be mounted in one or more options including an UICC, a removable MicroSD, embedded in the phone hardware, or mounted as an add-on back plate or in accordance with some other exemplary interface method.

In accordance with exemplary and non-limiting embodiments, a device application, such as the wallet, if permitted by the controlling and/or issuing entity and rest of the ecosystem, may communicate with the SE. The mode and method of communication may vary depending on the type of the SE from among the options mentioned above.

In some exemplary embodiments depending on the security model used for controlling the SE, the wallet may be permitted to install, load and manage applets in the SE. It may also be, or only be, allowed to communicate with pre-installed applets through standard methods of applet communication including sending and receiving application protocol data units (APDUs).

The wallet companion applet, as the name suggests, may have a primary function of working work with a digital wallet (e.g. a wallet application on a client device), and may be used by the client device to carry out a number of tasks including, but not limited to, storing of important and/or critical data required by one or more wallets, or for any operation that is transacted using the wallet, or controlling the functioning of other applets designed to facilitate such a control through a sharable interface and/or through the communication of APDUs designed and implemented for the purpose.

In accordance with various exemplary and non-limiting embodiments, the wallet application, in coordination with the wallet companion applet, may manage, influence and/or control the other applets so enabled, for managing their transaction protocol.

Figure 24A:
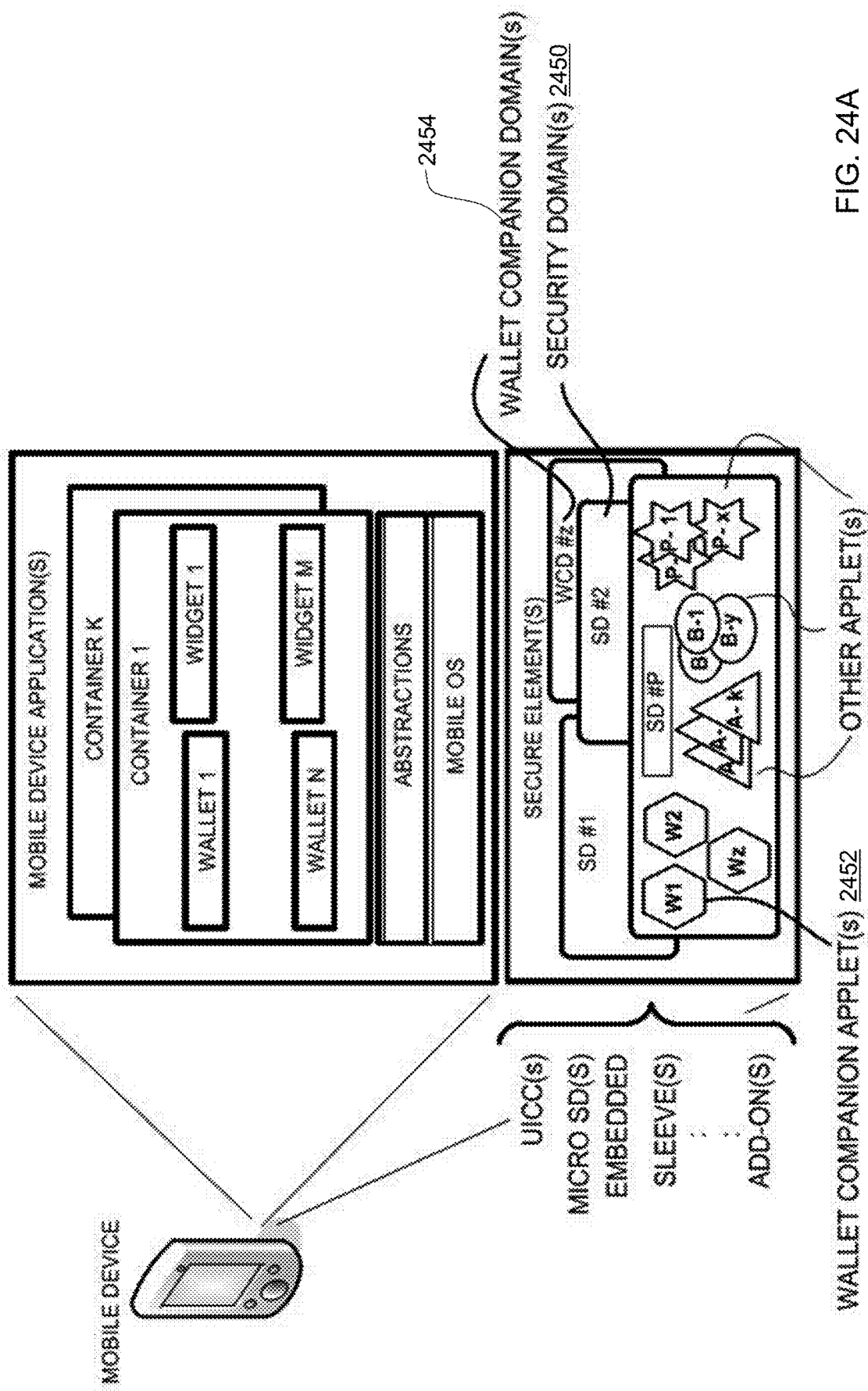
FIG. 24A illustrates a detailed view of mobile transaction platform related elements of a mobile device.

Referring to FIG. 24A, which depicts a detailed view of mobile device contents, mobile device applications and secure element features are presented. Mobile device applications may include MTP applications as described herein (e.g. containers, wallets, widgets, and the like). Secure element content may include security domains 2450, wallet companion applets 2452, and wallet companion domains 2454. As depicted in FIG. 24A, secure elements may be configured in a variety of physical devices including UICCs, microSDs, sleeves, add-ons, embedded elements, and the like.

A wallet companion domain 2454 may expand on a companion applet described herein to encompass an entire security domain for companion applets and features. A wallet companion domain 2454 or security domain may facilitate loading, installing, managing and deleting multiple applets in the secure element as a group associated with the security domain. Each security domain may have unique security keys that may be used by the mobile transaction platform to perform operations on the group of applets in the secure element. A wallet companion domain 2454 may be managed by adapting current technology secure element key security features to enable separate security keys for the mobile transaction platform to manage the contents of the wallet companion domain 2454 in the secure element.

Figure 24B:
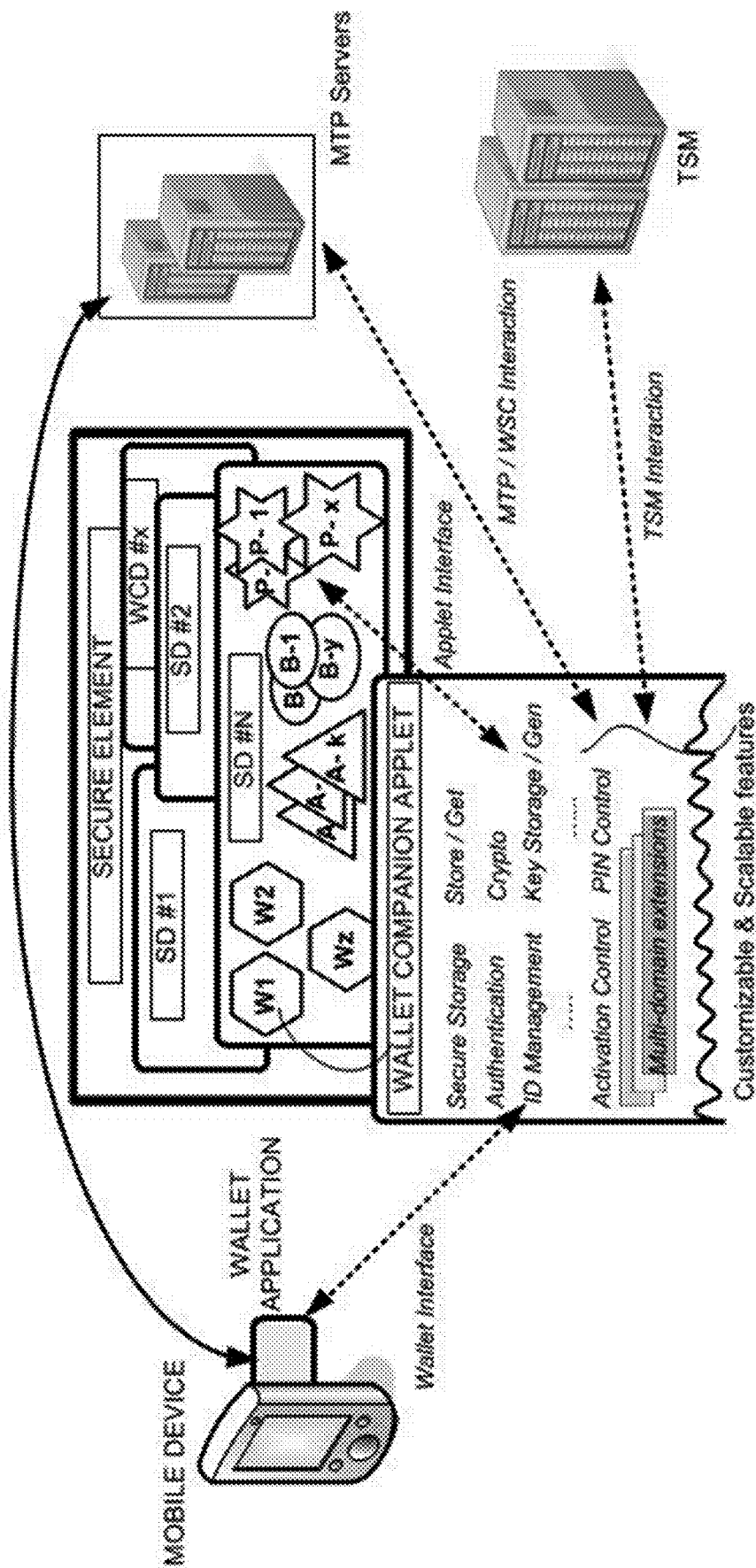
FIG. 24B illustrates wallet companion domain features, and control and data flow.

FIG. 24B depicts various features, and control and data flows associated with a wallet companion applet. The wallet companion applet in the secure element may provide features such as secure storage, authentication, ID management, activation control, store/get functions, crypto functions, key storage and generation functions, PIN control, and the like. The wallet companion applet may provide a wallet interface function that may facilitate managing access to the wallet by other applets, external mobile transaction platform participants, and the like. The wallet companion applet may include an applet interface for accessing the applet in the secure element. The wallet companion applet may facilitate secure interaction with trusted security manager (TSM) servers, mobile transaction platform (MTP) servers, and other participants in a multi-domain ecosystem for secure personalized transactions.

The methods and systems described herein of multi-domain ecosystem secure personalized transactions include a method that includes disposing a wallet module in a memory of a client device. The method may further include disposing a wallet companion applet in a secure element of the memory. The method may further include executing the wallet companion applet to facilitate access to one or more additional wallet applets. In an example, the access may be facilitated through a shareable interface to mobile wallet functions. In an example, the wallet companion applet may enable at least two of couponing, security and payment.

The methods and systems described herein of multi-domain ecosystem secure personalized transactions include a method that includes disposing a container in a memory of a client device. The method may further include disposing a container companion applet in a secure element of the memory. The method may further include executing the container companion applet to facilitate access to one or more additional container companion applets. In an example, the access may be facilitated through a shareable interface to mobile wallet functions and mobile widget functions accessible through the container.

The methods and systems described herein of multi-domain ecosystem secure personalized transactions include a platform operable on a client device that includes a runtime component that may configure at least one tokenized widget. In an example, the at least one tokenized widget may facilitate at least one transaction in a multi-domain ecosystem for secure personalized transactions.

The methods and systems described herein of multi-domain ecosystem secure personalized transactions includes a platform operable on a client device that includes a runtime component that may configure at least one service provider widget in a multi-domain ecosystem for secure personalized transactions.

The methods and systems described herein of multi-domain ecosystem secure personalized transactions includes a platform operable on a client device that includes a runtime component that may configure at least one client container in a multi-domain ecosystem for secure personalized transactions The methods and systems described herein of multi-domain ecosystem secure personalized transactions includes a platform operable on a client device that includes a runtime component that may secure account information for a plurality of accounts in a wallet.

The methods and systems described herein of multi-domain ecosystem secure personalized transactions includes a platform operable on a client device that includes a runtime component that may provide secure access to a mobile wallet by a plurality of service providers A mobile wallet for integrating offers with transactions between an external service provide and the mobile wallet in a multi-domain ecosystem for secure personalized transactions may include a multi-domain digital wallet operable on a mobile device, wherein the digital wallet comprises accounts from at least two distinct service providers. A runtime container for executing widgets that attempt to access the digital wallet may also be included. In addition, a plurality of mobile offer management widgets, operable in the runtime container that interface with distinct mobile offer domains by communicating with external service providers may be included. Lastly a mobile transaction capability provided by cooperative operation of the runtime container, the multi-domain digital wallet, and at least a portion of the plurality of mobile offer management widgets may also be included.

In accordance with exemplary and non-limiting embodiments, the present disclosure provides coupon applets that may be a part of a suite of applets developed to facilitate a richer, and a more convenient retail shopping experience that may be aimed to enable offer-related flows between a mobile wallet application and service provider, such as in association with a point-of-sale (PoS) terminal.

The coupon applets may support near-field communication (NFC) transactions in the form of a single tap as well as a multi-tap user experience. The one or more versions of the coupon applets may support features for attaching multiple coupons to a single transaction, presenting the attached coupons in the transaction (e.g. to a PoS terminal), communicating redemption status, managing offers, matching offers to wallets, seeking offers from service providers (e.g. through a service-provider widget), and the like. To facilitate ease of development and integration, the coupon applets may include at least two interface APIs. One API may be used for interfacing one or more offers (e.g. coupons) with a digital wallet application (e.g., a mobile wallet client as described herein), and another API may be used for interfacing the coupon with the service provider, such as through a PoS terminal. The service provider API may be facilitate access by a PoS terminal to the coupon applet for querying coupons, updating the coupon redemption status, and the like.

The one or more versions of the coupon applet may enable a straight forward flow by which a user can present coupons downloaded from one or more sources in a transaction with a service provider, such as through a PoS terminal, usually through a mobile phone with a Secure Element (SE).

Figure 25:
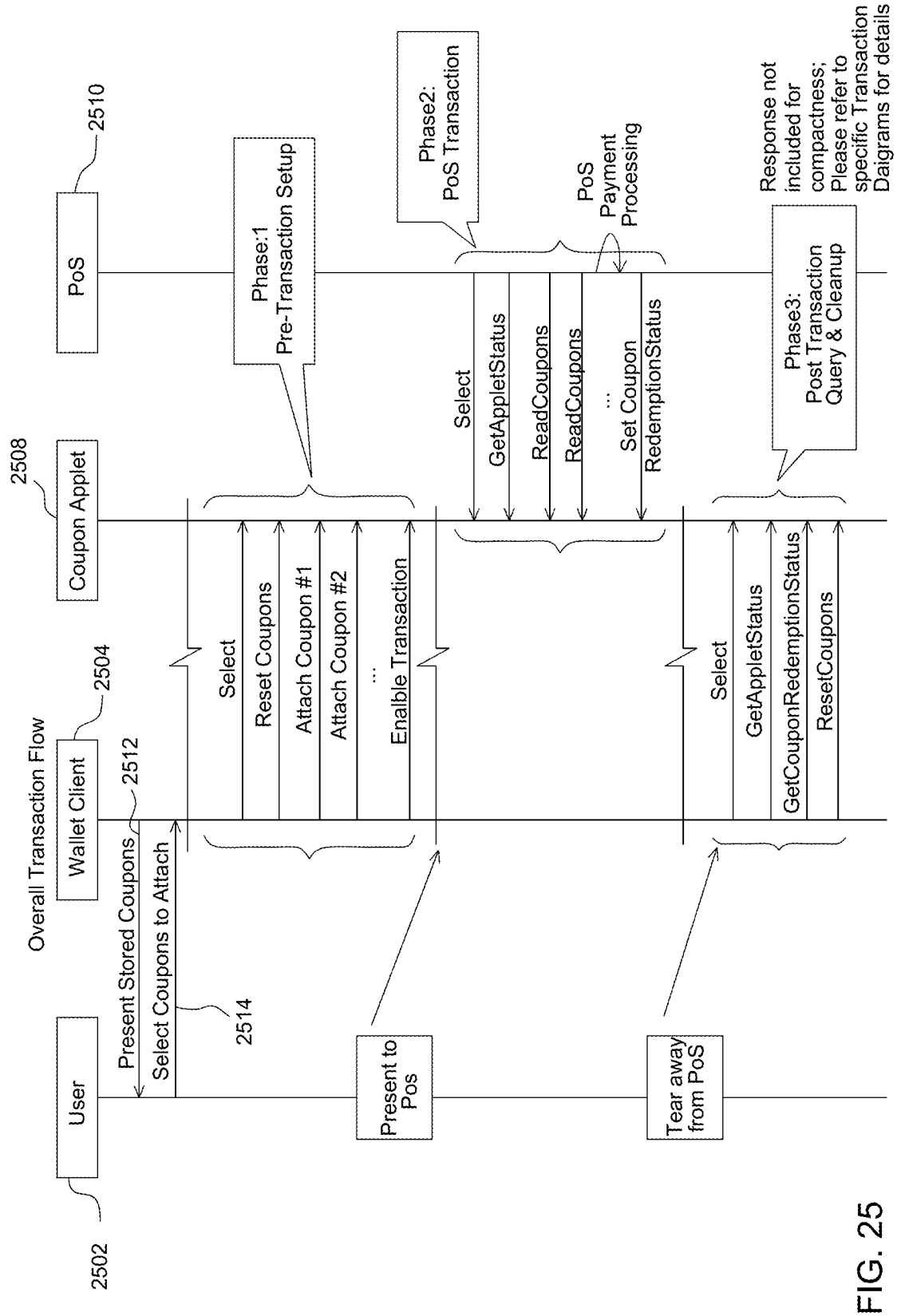
FIG. 25 illustrates an offer or coupon-related transaction flow diagram.

FIG. 25 illustrates an offer or coupon-related transaction flow diagram. Entities participating in the transaction may include a user 2502, a wallet client 2504, a coupon applet 2508, and a PoS terminal 2510. In an example, the user may contact various coupon services, browse coupons, and decide which coupons to use for a particular purchase. The user may perform these operations via a mobile wallet application that may be associated with the wallet client 2504. At 2512, the wallet client 2504 may present the stored coupons to the user 2502 and at 2514, the user 2502 may select the coupons that may be attached.

Further, a phase 1 (also referred to herein as a pre-transaction setup phase) may be initiated. As shown in FIG. 25, during the phase 25, the wallet client 2504 may attach the selected coupons to the applet and thereby, the wallet client 2504 may indicate that the transaction can begin.

After phase 1, phase 2 (also referred to herein as a PoS transaction phase) may be initiated. During phase 2, the authentication identification (e.g. user identity and/or account data from a Secure Element) may be presented to the PoS terminal 2510 to initiate the PoS Transaction Phase. The PoS terminal 2510 then may query the coupon applet 2508 for the attached coupons and the coupon applet 2508 may send back the data pertaining to the attached coupons in response. This could take several queries based on the number of coupons. Once the PoS terminal receives all the coupons, it may process these coupons. Such processing may include validation of coupons, checking applicability, compliance to other business rules to determine applicability of the coupons, etc. At the end of the processing of this phase, redeemed coupons may be identified. The status of these coupons may be communicated to the coupon applet 2508.

After phase 2, phase 3 (also referred to herein as post-transaction query & clean up) may be initiated. During this phase, the wallet client 2504 may query the redemption status if required and reset all the coupons. The resetting of the coupons may mark the end of phase 3, and reposition the state to the beginning of phase 1.

Figure 26:
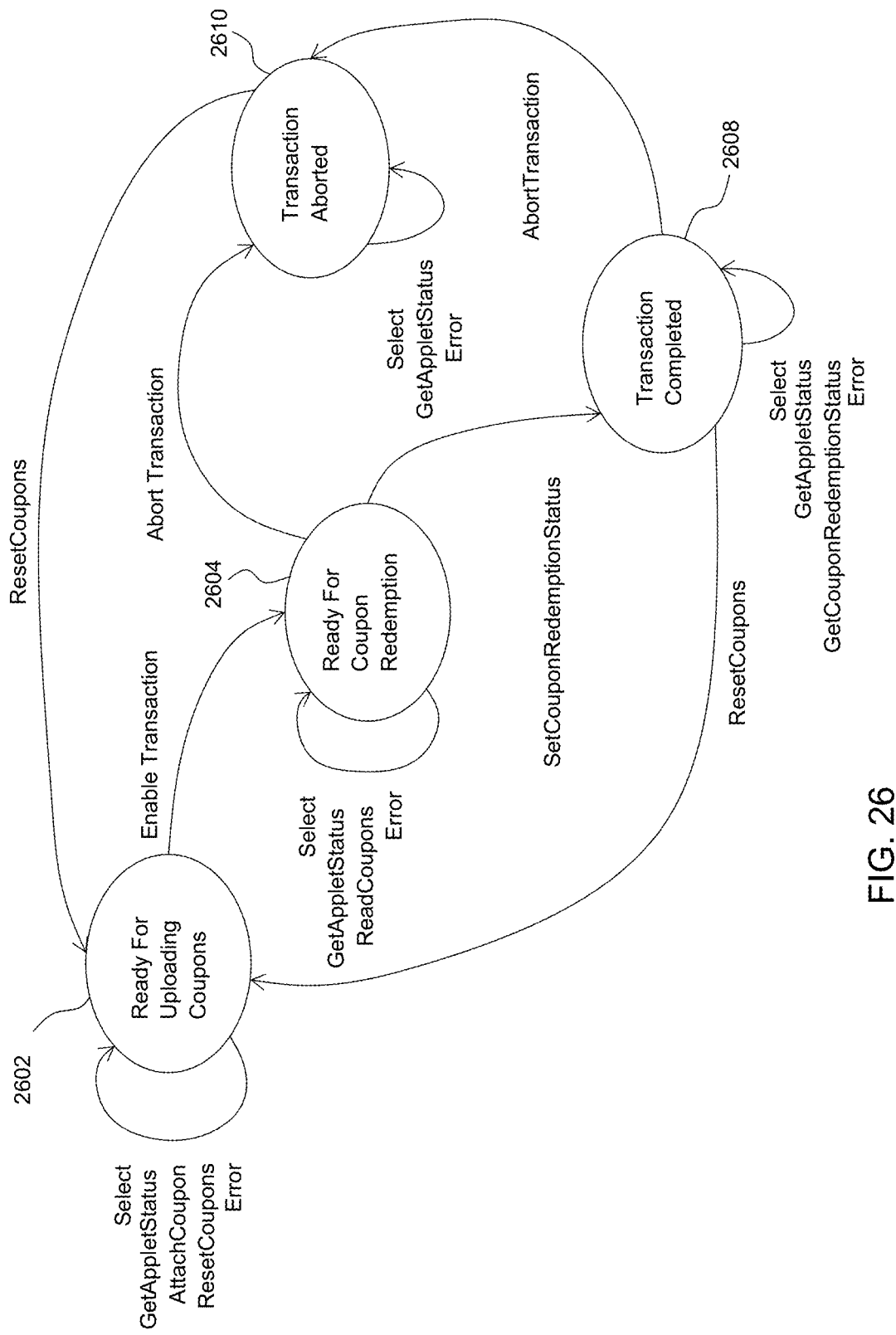
FIG. 26 illustrates a state machine diagram of the coupon applet during the transaction flow according to an example.

FIG. 26 illustrates a state machine diagram of the coupon applet during the transaction flow according to an example. A state 2602 may indicate a READY FOR UPLOADING COUPONS state, indicating that all coupons from the coupon applet may have been reset, and the wallet client can now upload the coupons selected for this transaction. In an example, as shown in FIG. 26, the applet may remain in the state 2602 if a command GET APPLET STATUS results in an error. The coupon applet may transit to a next state 2604 on receiving a valid ENABLE TRANSACTION command.

The 2604 state may include a READY FOR COUPON REDEMPTION state, indicating that the wallet client may have attached all the coupons to the coupon applet's memory, and that the PoS terminal can proceed with the phase 2 of the transaction. In an example, as shown in FIG. 26, the coupon applet may remain in the state 2604, if a command READ COUPONS results in an error. The applet may transit to a next state 2608 on receiving a valid SET COUPON REDEMPTION STATUS command. As shown in FIG. 26, the coupon applet may transit to a next state 2610 on receiving a valid ABORT TRANSACTION command.

The state 2608 may include a TRANSACTION COMPLETED state, indicating that the PoS terminal may have completed phase 2 of the transaction and COUPON REDEMPTION STATUS may have been set. Further, this state 2608 may indicate that the wallet client may now proceed with phase 3 of the transaction. The coupon applet may remain in this state till the applet receives a valid RESET COUPONS command or a valid ABORT TRANSACTION command.

The state 2610 may include a TRANSACTION ABORTED state indicating that the PoS terminal transaction (relating to the coupon presentation & redemption) may have been aborted either by the wallet client or the PoS terminal. The coupon applet may remain in this state 2610 till the applet receives a valid RESET COUPONS command.

In accordance with exemplary and non-limiting embodiments, the present disclosure provides commands to support coupon-related functionality that may be relevant for the interaction with the PoS terminal. In an example, these commands may be based on the standard smart card command and response protocol as defined by ISO/IEC 7816 for all communications with the SE. In an example, a table CAT1 may summarize coding of class bytes (CLA) and instruction (INS) bytes.

| CAT1: Command Summary CLA and INS Command | | |
|---|---|---|
| CLA | INS | Command |
| '00' | 'A4' | SELECT |
| 'C0' | '01' | GET APPLET STATUS |
| 'C0' | '03' | ABORT TRANSACTION |
| 'C0' | '11' | READ COUPONS |
| 'C0' | '41' | SET COUPON REDEMPTION STATUS |

In an example, the coupon applet may return status bytes that may be coded as per ISO/IEC 7816-4. The applet may return a set of generic status bytes shown in table CAT2. The table may list status word SW1, status word SW2 and the meaning associated thereof.

| CAT2: Generic Status Bytes | | |
|---|---|---|
| SW1 | SW2 | Meaning |
| '90' | '00' | Normal processing |
| '67' | '00' | Wrong length |
| '69' | '85' | Conditions of use not satisfied |
| '6A' | '80' | Incorrect values in command data |
| '6A' | '82' | Applet not found |
| '6A' | '84' | Not enough memory |
| '6A' | '86' | Incorrect parameters P1-P2 |
| '6D' | '00' | Instruction not supported |
| '6E' | '00' | Class not supported |

In an example, the present disclosure may include an ABORT TRANSACTION command that may move the applet from its existing state to the transaction aborted state. In an example, the ABORT TRANSACTION command may be coded according to a table CAT3. The table may list one or more codes, such as class byte (CLA), instruction byte (INS), parameter P1, parameter P2, and the like. In an example, there may be no data returned from this command.

| CAT3: ABORT TRANSACTION Command Message | |
|---|---|
| Code | Value |
| CLA | 'C0' |
| INS | '03' |
| P1 | '00' |
| P2 | '00' |
| Lc | '00' |
| data | Absent |
| Le | '00' |

Further, a successful execution of the command may be indicated by status bytes '9000'. The ABORT TRANSACTION command may either return a general error condition, such as listed in the table CAT1. In addition, the ABORT TRANSACTION may return one of the following specific error and warning conditions as listed in the table CAT3.

| CAT4: Status Bytes for ABORT TRANSACTION | | |
|---|---|---|
| SW1 | SW2 | Meaning |
| '67' | '00' | Wrong length |
| '69' | '85' | Conditions of use not satisfied |
| '6A' | '86' | Incorrect parameters P1-P2 |

In an example, a GET APPLET STATUS command may be used to retrieve the current status of the applet. This command may return the current status of the applet. A table CAT5 may list codes and corresponding values associated with this command.

| CAT5: GET APPLET STATUS command Message | |
|---|---|
| Code | Value |
| CLA | 'C0' |
| INS | '01' |
| P1 | '00' |
| P2 | '00' |
| Lc | '00' |
| data | Absent |
| Le | '00' |

In response to this command, a data field may be returned. In an example, the applet status may be returned and coded as 1 byte and details of this data field can be found in table CAT17 as described below in the description. Further, a successful execution of the command may be indicated by status bytes '9000'. The GET APPLET STATUS command may either return a general error condition, such as listed in the table CAT1. In addition, the GET APPLET STATUS command may return one of the following specific error and warning conditions as listed in table CAT6.

| CAT6: Status Bytes for GET APPLET STATUS | | |
|---|---|---|
| SW1 | SW2 | Meaning |
| '67' | '00' | Wrong length |
| '6A' | '86' | Incorrect parameters P1-P2 |

In an example, a READ COUPONS command may be used to retrieve coupon data. Further, the READ COUPONS command may be coded in accordance with a table CAT7.

| CAT7: READ COUPONS Command Message | |
|---|---|
| Code | Value |
| CLA | 'C0' |
| INS | '11' |
| P1 | '00' |
| P2 | See table CAT8 |
| Lc | '00' |
| data | Absent |
| Le | '00' |

The table CAT7 includes a reference control parameter P2 that may control the number of consecutive READ COUPONS command. Further, the reference control parameter P2 may be coded according to the following table CAT8.

| CAT8: READ COUPONS Reference Control Parameter P2 | |
|---|---|
| P2 | Meaning |
| '00' | Get All Occurrences |
| '01' | Get Next Occurrences |

In an example, a Read Coupons [Get Next Occurrences] command may be rejected if no prior Read Coupons [Get All Occurrences] is received within the current application session. Further, in response to the READ COUPONS command, multiple occurrences of a coupon data as may be defined in a customer specific coupon specification may be returned.

| CAT9: READ COUPONS data Field | | |
|---|---|---|
| Tag | Len | Value |
| 'E1' | Var | Customer-specific coupon data |

Further, a successful execution of this command may be indicated by status bytes '9000'. The read coupons command may either return a general error condition, such as listed in the table CAT10.

| CAT10: Status bytes for READ COUPONS | | |
|---|---|---|
| SW1 | SW2 | Meaning |
| '63' | '10' | More data available |
| '67' | '00' | Wrong length |
| '69' | '85' | Conditions of use not satisfied |
| '6A' | '86' | Incorrect parameters P1-P2 |

In an example, a SELECT Command may be used for selecting the coupon applet. The SELECT Command may be coded according to a table CAT11.

| CAT11: SELECT Command Message | |
|---|---|
| Code | Value |
| CLA | '00' |
| INS | 'A4' |
| P1 | '04' |
| P2 | '00' |
| Lc | Length of AID |
| data | AID value |
| Le | '00' |

The "data" field of the command may contain an application identifier (AID) of the coupon applet that may be selected, which may be a customized per customer requirements.

In response to this command, a returned message may be obtained. The returned message may include a data field that may include a file control interface (FCI) and may be coded according to a table CAT12.

| CAT12: SELECT Message Response data Field ||||||
|---|---|---|---|---|---|
| Tag | Len | Value | | | Presence |
| '6F' | Var | FCI Template | | | M |
| | Tag | Len | Value | | Presence |
| | '84' | Var | DF Name (Applet AID) | | M |
| | 'A5' | Var | Proprietary Data | | M |
| | | Tag | Len | Value | Presence |
| | | '9F07' | 2B | C-SAM Coupon Applet - Version Lx API ID | M |
| | | '9F09' | 2B | C-SAM Coupon Applet - Version Lx API Version | M |
| | | '9F11' | 2B | Coupon Format ID | M |
| | | '9F13' | 2B | Coupon Format Version | M |

The AID (Tag '84') of the service provider applet may be AID as described herein. The coupon applet API ID (Tag '9F07') may indicate the support for the coupon applet API. Further, the coupon applet API version (Tag '9F09') may be '0101' for this version. The coupon format ID may be a customer customizable coupon format ID and the coupon format version may be a customer customizable coupon format version. Further, additional two bytes tags may be listed in the table CAT12.

Further, a successful execution of the SELECT command may be indicated by status bytes '9000'. On occurrence of an error, the SELECT command may return a general error condition, such as listed in the table CAT1. In addition, the SELECT command may return one of the following specific errors and warning conditions as listed in the table CAT13.

| CAT13: Status Bytes for SELECT |||
|---|---|---|
| SW1 | SW2 | Meaning |
| '67' | '00' | Wrong length |
| '6A' | '80' | Incorrect values in command data |
| '6A' | '82' | Applet not found |
| '6A' | '86' | Incorrect parameters P1-P2 |

In an example, the SET COUPON REDEMPTION STATUS Command may be used for setting the coupon redemption status. On successful execution of this command, the applet status may change to "Transaction Completed". The SET COUPON REDEMPTION STATUS Command may be coded according to a table CAT14.

| CAT14: SET COUPON REDEMPTION STATUS Command Message ||
|---|---|
| Code | Value |
| CLA | 'C0' |
| INS | '41' |
| P1 | '00' |
| P2 | '00' |
| Lc | '0A' |
| data | Coupon Redemption Status |
| Le | '00' |

The execution of this command may not return any data. Further, a successful execution of the SET COUPON REDEMPTION STATUS command may be indicated by status bytes '9000'. On occurrence of an error, the SET COUPON REDEMPTION STATUS command may return a general error condition, such as listed in the table CAT1. In addition, the SET COUPON REDEMPTION STATUS command may return one of the following specific errors and warning conditions as listed in the table CAT15.

| CAT15: Status bytes for SET COUPON REDEMPTION STATUS |||
|---|---|---|
| SW1 | SW2 | Meaning |
| '67' | '00' | Wrong length |
| '69' | '85' | Conditions of use not satisfied |
| '6A' | '86' | Incorrect parameters P1-P2 |

Figure 27:
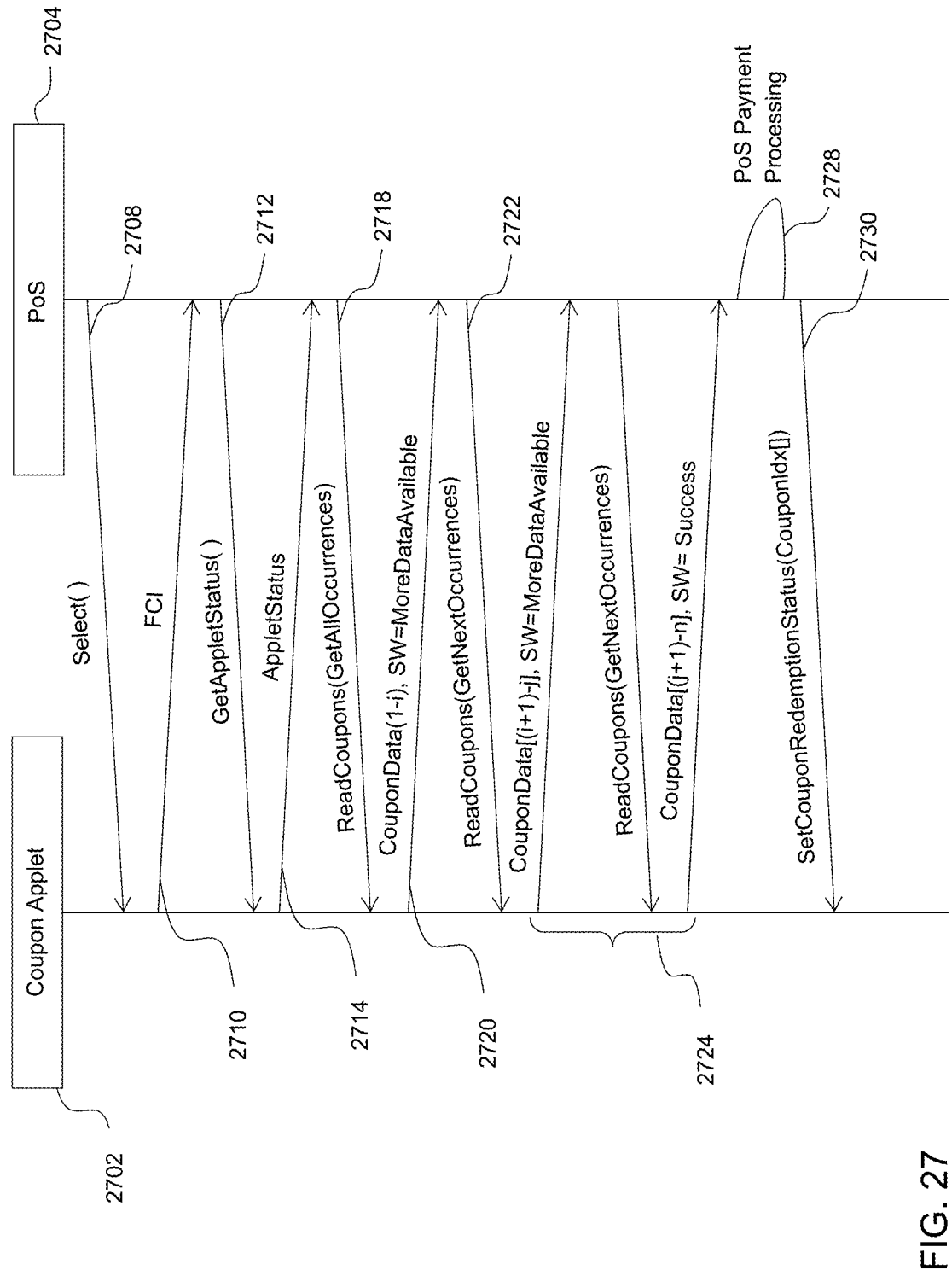
FIG. 27 illustrates an interaction between an applet and a Point of sale terminal.

In accordance with the exemplary and non-limiting embodiments, the present disclosure provides details of the interaction between the applet and the PoS terminal. FIG. 27 illustrates the interaction between the applet 2702 and the PoS terminal 2704.

At 2708, the PoS terminal 2704 may issue the SELECT command to select the coupon applet 2702. At 2710, the coupon applet 2702 may respond with the File Control Information (FCI). At 2712, the PoS terminal 2704 may issue the GET APPLET STATUS command. At 2714, the coupon applet 2702 may return the application status. At 2718, the PoS terminal 2704 may issue the READ COUPONS command with P2=Get All Occurrences on determining that the application status is "READY FOR COUPON REDEMPTION". At 2720, the coupon applet 2702 may return the coupon data for the available Coupons. If there are multiple coupons, it may include coupon data for multiple coupons in the Response data. If the applet may include all the coupon data, the applet may send an SW='9000'. If the applet may not include the coupon data for all the coupons, the applet may send a warning SW='6310', indicating that more data may exist. At 2722, the PoS terminal 2704 may parse the data and the SW. If the SW may include '6310', the PoS terminal may issue another READ COUPONS command with P2=Get Next Occurrences.

On receiving the READ COUPONS command with P2=Get Next Occurrences, at 2724, the coupon applet 2702 may attempt to send the coupon data for the remaining coupons. As with the READ COUPONS command with P2=Get All Occurrences, if there are multiple coupons pending to be sent, the coupon applet 2702 may include coupon data for multiple pending coupons in the response data as shown at 2724 in FIG. 27. Once the applet includes all the pending coupon data, the applet may send an SW='9000'. If the applet does not include the coupon data for all the pending coupons, the applet may send a warning SW='6310', indicating that more data may exist.

On receiving the SW=' 9000' in response to the READ COUPONS, at 2728, the PoS terminal 2704 may proceed to process the coupons. After processing the coupon data, at 2730, the PoS terminal 2704 may set the coupon Redemption Status by issuing a SET COUPON REDEMPTION STATUS command. The byte Array is always of a length equal to the maximum number of coupons. The coupon Redemption Status may need to be set to valid coupon states for all the bytes—even if fewer coupons are present. If fewer coupons were received than the Maximum, the coupon Redemption Status Bytes corresponding to the ones that were not received may be set to indicate "No coupon Present". The coupon Redemption Status may be set in the order of receipt of coupon data in the responses to various calls to the READ COUPONS command. Even in the case when there are no coupons redeemed, the PoS terminal 2704 may be required to issue one of the following two commands: SET COUPON REDEMPTION STATUS or ABORT TRANSACTION.

Figure 28:
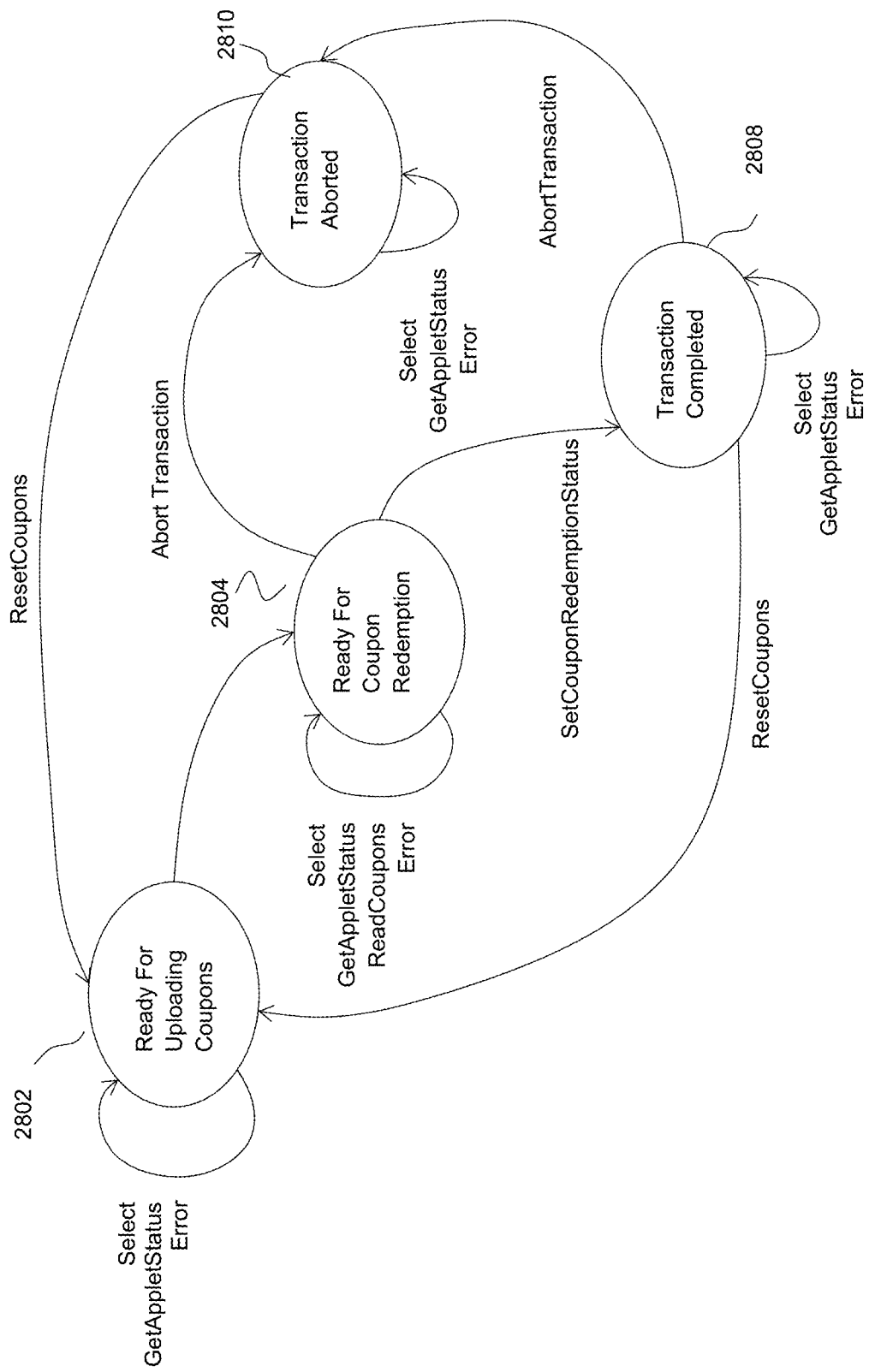
FIG. 28 illustrates a state machine diagram of the coupon applet during the transaction flow according to an example.

FIG. 28 illustrates a state machine diagram of the coupon applet during the transaction flow according to an example. A state 2802 may indicate a READY FOR UPLOADING COUPONS state indicating that all coupons from the coupon applet may have been reset, and the wallet client can now upload the coupons selected for this transaction. In an example, as shown in FIG. 28, the applet may remain in the state 2802, if a command GET APPLET STATUS results in an error. The coupon applet may transit to a next state 2804 on receiving a valid ENABLE TRANSACTION command.

The 2804 state may include a READY FOR COUPON REDEMPTION state indicating that the wallet client may have attached all the coupons to the coupon applet's memory, and that the PoS terminal can proceed with the phase 2 of the transaction. In an example, as shown in FIG. 28, the coupon applet may remain in the state 2804, if a command READ COUPONS results in an error. The applet may transit to a next state 2808 on receiving a valid SET COUPON REDEMPTION STATUS command. As shown in FIG. 28, the coupon applet may transit to a next state 2810 on receiving a valid ABORT TRANSACTION command.

The state 2808 may include a TRANSACTION COMPLETED state indicating that the PoS terminal may have completed the phase 2 of the transaction and COUPON REDEMPTION STATUS may have been set. Further, this state 2808 may indicate that the wallet client may now proceed with phase 3 of the transaction. The coupon applet may remain in this state till the applet may receive a valid RESET COUPONS command or a valid ABORT TRANSACTION command.

The state 2810 may include a TRANSACTION ABORTED state indicating that the PoS terminal transaction (relating to the coupon presentation & redemption) may have been aborted either by the wallet client or the PoS terminal. The coupon applet may remain in this state 2810 till the applet may receive a valid RESET COUPONS command.

In an example, a table CAT16 may list the various applicable conditions to accept a command application data unit. In case of rejections, as shown in the table below, the coupon applet may return a status word SW='6985'.

| CAT16: Command Acceptance Matrix | | | | |
|---|---|---|---|---|
| Command | Ready for Uploading Coupons | Ready for Coupon Redemption | Transaction Completed | Transaction Aborted |
| SELECT | Accepted | Accepted | Accepted | Accepted |
| GET APPLET STATUS | Accepted | Accepted | Accepted | Accepted |
| ABORT TRANSACTION | Rejected | Accepted | Rejected | Rejected |
| READ COUPONS | Rejected | Accepted | Rejected | Rejected |
| SET COUPON REDEMPTION STATUS | Rejected | Accepted | Rejected | Rejected |

In accordance with exemplary and non-limiting embodiments, the present disclosure provides various data objects associated with the coupon applet. In an example, a data object including a coupon applet API ID may be disclosed. The coupon applet API ID may be encoded as a 2 byte structure. In order to determine whether the coupon applet API may be supported, the PoS terminal may perform a logical AND operation on the value with a mask '0102'. The result of the AND operation when equal to '0102', may indicate that coupon applet may be supported.

In an example, a data object including an applet API version may be disclosed. The coupon applet version may be encoded as a 2 byte structure. In an example, the most significant byte may represent a major release version and the least significant byte may represent the minor release version. In an example, a data object including an applet status may be disclosed. The applet status may identify the current state of the applet and may be coded as 1 byte. In an example, a table CAT17 may list status values associated with the different statuses of the applet.

| CAT17: Applet Status | |
|---|---|
| Status | Description |
| '01' | Ready For Uploading Coupons |
| '02' | Ready For Coupon Redemption |
| '40' | Transaction Completed |
| '80' | Transaction Aborted |
| 'FF' | Unknown State |

In an example, a data object including a coupon redemption status may be disclosed. The coupon redemption status may be stored in one byte for every attached coupon. The coupon redemption status for the supported maximum number of coupons may be stored in a byte array of the length maximum number coupons. In an example, the redemption status for coupon 1 may be stored in the B1 of the byte array and the redemption status for coupon 2 is stored in the B2 of the byte array. A Table CAT 18 may list the various supported values of the coupon redemption status.

| CAT18: Coupon Redemption Status | |
|---|---|
| Coupon Status | Description |
| '00' | Unused |
| '01' | Redeemed |
| '05' | Rejected |
| 'FF' | No coupon Present |

In an example, the data object may include one or more coupons and the coupon format may depend on the type of implementation.

In accordance with the exemplary and non-limiting embodiments, the present disclosure provides various processing features of the PoS terminal. In an example, the PoS terminal may be compliant with ISO/IEC 14443-4. While executing a transaction, the PoS terminal may analyze the data objects that may be returned by the applet. For example, the PoS terminal may check for a mandatory data object that may be returned by the applet. If the PoS terminal may not found the mandatory data object, the PoS terminal may abort the transaction. Similarly, if the PoS terminal may recombine incorrect formatting in the data, the PoS terminal may abort the transaction. The PoS terminal may take due care to ensure that the processing exceptions (e.g., incorrect formatting and the like) may be handled in a robust manner.

In an example, the PoS terminal may perform various processing operations while performing a transaction. The PoS terminal may format the SELECT command as discussed above and may verify the formatting of the FCI that may be included in the response message of the SELECT command. In an example, the PoS terminal may verify the formatting of the FCI in accordance with the table CAT12. If it may be detected that the FCI is not formatted in accordance with the table CAT 12, the PoS terminal may terminate processing and ensure de-selection of the applet.

Further, the PoS terminal may analyze the DF Name (tag '84') that may be returned in the FCI. If the DF Name is not same as the AID provided in the data field of the SELECT command, then the PoS terminal may terminate processing and ensure de-selection of the applet. In addition, the PoS terminal may verify that it may support the API by checking the API ID (tag '9F07') that may be returned in the FCI. As discussed above, the PoS terminal may perform a logical AND operation on the value with the mask '0102' to determine an availability of the support for the API. If the result of the AND operation is not equal to '0102', then the PoS terminal may terminate processing and ensure de-selection of the applet.

In an example, the PoS terminal may verify that it may support the API version (tag '9F09') that may be returned in the FCI. If it may not be determined, then the PoS terminal may terminate processing and ensure de-selection of the applet. In an example, the PoS terminal may verify that it may support the handling of the coupon format ID (tag '9F11') that may be returned in the FCI. If this may not be verified, then the PoS terminal may terminate processing and ensure de-selection of the applet. In an example, the PoS terminal may verify that it may support the handling of the coupon format version (tag '9F13') that may be returned in the FCI. If it may not be verified, then the PoS terminal may terminate processing and ensure de-selection of the applet.

In an example, the PoS terminal may process the GET APPLET STATUS command. After successfully selecting the coupon applet, the PoS terminal may query the current applet status using GET APPLET STATUS. In an example, the PoS terminal may recognize that the applet Status may not be "READY FOR COUPON REDEMPTION". In such conditions, the PoS terminal may terminate processing and ensure de-selection of the applet. In an example, the PoS terminal may recognize that the applet status may be "READY FOR COUPON REDEMPTION". In such conditions, the PoS terminal may proceed with the normal processing of coupons.

In an example, the PoS terminal may process the READ COUPONS command. The PoS terminal may issue a READ COUPONS [Get All Occurrences] command to read the coupon data. A successful execution of the command may be indicated by status bytes '9000'. This may indicate that all coupon data may have been sent. Further, the READ COUPONS command may return a warning with SW='6310' to indicate "More data available". On receipt of response with SW='6310', the PoS terminal may issue a subsequent READ COUPONS [Get Next Occurrences] to retrieve the additional data. In an example, in a current application session, if the READ COUPONS [Get Next Occurrences] command may be issued before and without issuing the READ COUPONS [Get All Occurrences], the command may be rejected. Further, the PoS terminal may check to ensure that all mandatory data objects are present. In an example, the PoS terminal may encounter more than one occurrence of a Tag in a coupon object. In such conditions, the PoS terminal may reject the coupon.

In an example, the PoS terminal may process a SET COUPON REDEMPTION STATUS command. On validating the applied coupons, the PoS terminal may issue the SET COUPON REDEMPTION STATUS command to update the coupon redemption status on the applet. The coupon redemption status may be considered only for the coupons that may have been read since the last READ COUPONS [Get All Occurrences]. Further, if the READ COUPONS [Get All Occurrences] was not issued, all the coupon redemption status may be ignored. If all the coupons are not read since the last call to READ COUPONS [Get All Occurrences], the coupon redemption status for the unread coupons may be ignored.

In an example, the PoS terminal may process an ABORT TRANSACTION command. The PoS terminal may encounter errors or states where the PoS may not be able to proceed with the processing. In such conditions, the PoS terminal may issue the ABORT TRANSACTION command to discontinue the transaction. On successful processing of the ABORT TRANSACTION command, the coupon redemption status may be lost. Further, on receiving the response to the ABORT TRANSACTION command, the PoS terminal may terminate processing and ensure de-selection of the applet.

High Level Architecture for a Typical Deployment—

Figure 29:
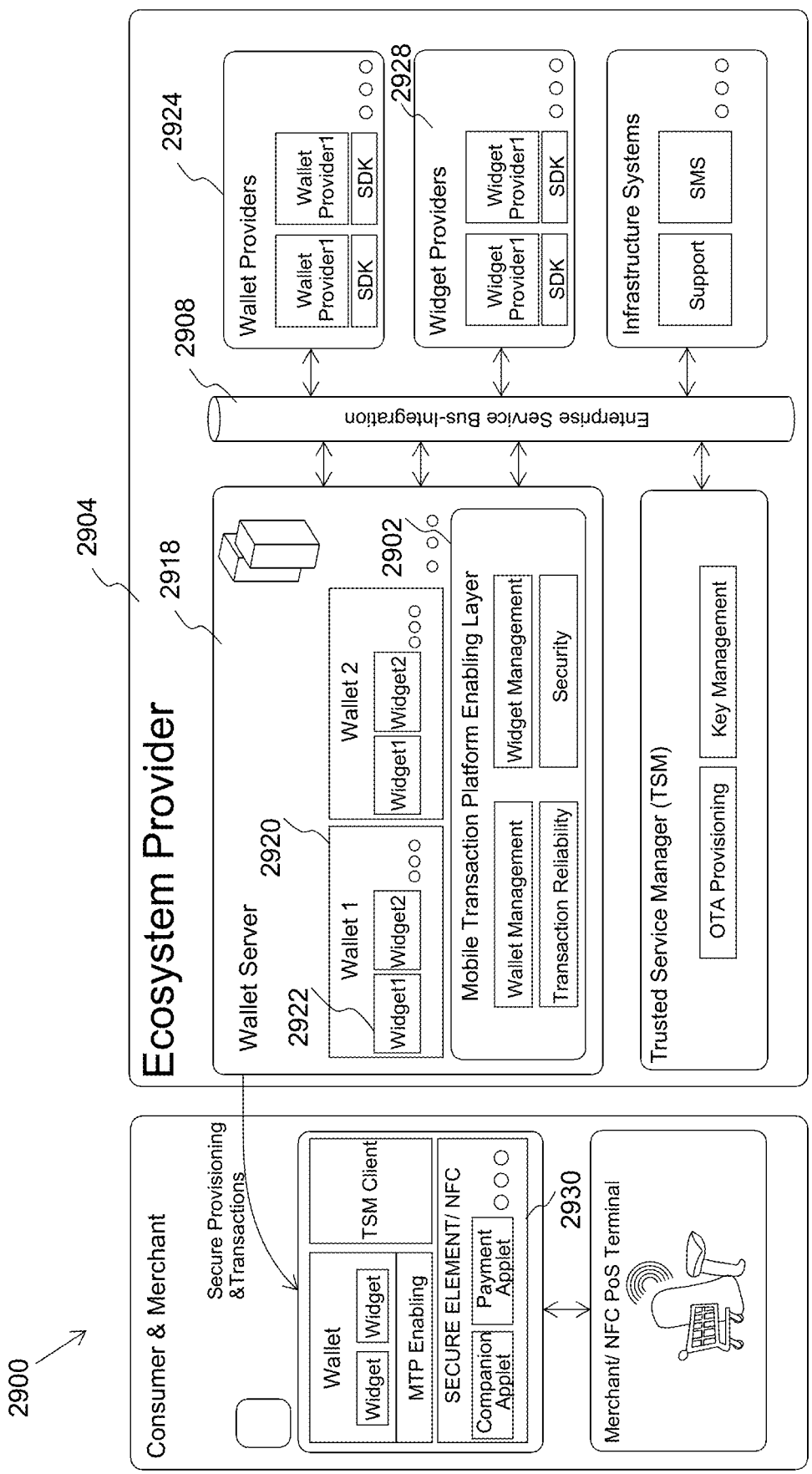
FIG. 29 illustrates a high level architecture of a system for a deployment of the present invention in an exemplary embodiment.

FIG. 29 illustrates a high level architecture of a system 2900 for a deployment of the present invention in an exemplary embodiment.

A MTP 2902 may be set up in an ecosystem provider's domain 2904 and may be integrated into an enterprise service bus (ESB) 2908 of the domain 2904. The domain 2904 may include a wallet server 2918. The wallet server 2918 may include at least one wallet 2920 and the MTP 2902. The wallet 2920 may include at least one widget 2922. In an example, the ESB 2908 may connect the MTP 2902 an ecosystem of service providers 2910. The ESB 2908 may be used for designing and implementing the interaction and communication between mutually interacting software applications in service oriented architecture as illustrated in FIG. 29. The ESB 2908 may be required for implementing an ecosystem with multiple wallet applications as illustrated in FIG. 29. The ESB 2908 may monitor and control the routing of a message exchange between various services for example, between the wallet server 2918 and a wallet provider 2924.

The MTP 2902 may have a plurality of roles. For example, the MTP may perform a wallet and transaction management along with all the relevant business services that may be associated with delivering wallets to a plurality of diverse mobile environments 2912. In an example, the MTP 2902 may provide an establishment of the ecosystem of the service providers 2910 and the third-party developers that build widgets for the wallet without having to worry about handset fragmentation. In an example, the MTP 2902 may establish a plurality of connectors with various ecosystems (for example, the ecosystem of service providers 2910, plurality of mobile environments). The connectors along with the MTP 2902 may provide an improved user experience and a diverse set of services, which may be accessible to the end user irrespective of time or location.

The ecosystem provider's domain 2904 may include a trusted service manager (TSM) 2912. The TSM 2912 may be configured for an over the air provisioning and key management of widgets. The TSM 1812 may collaborate with the MTP 2902 to facilitate a near field communication experience. In an example, the wallet 2920 and the provisioning of the widget 2922 may be facilitated by the MTP 2902 (described by way of FIGS. 30-36). In an example, the setup and management of the wallet 2920 may be facilitated by the MTP 102 (described by way of FIGS. 30-36). In an example, the applet issuance and personalization may be done by the TSM 2912 (described by way of FIGS. 30-36).

In an example, the service providers may use an MTP software development kit to build widgets that may run within a MTP wallet container. The widgets may provide both OTA value added services and proximity NFC services. The wallet container may provide the widgets 2922 a secure runtime environment and services to communicate OTA with the server (OTA services) and also communicate with the secure element to manage payment and non-payment applets for proximity NFC transactions. In an example, the widget 2922 may have an associated applet running in the secure element. In an example, the widget 2922 may not have an associated applet running in the secure element. In an exemplary embodiment, the service provider may provide only OTA services.

The ecosystem provider 2904 may ensure that all NFC readers 2930 at a merchant location 2914 may be equipped to handle the proximity protocols being used by the various applets that may be loaded into the secure element. The NFC readers 2930 may process the transaction through an acquiring network that may switch the transaction to the appropriate ecosystem service provider in the cloud. In an example, the wallet 2920 or the widget 2922 may communicate with an ecosystem cloud to determine service status and various other hygiene requirements like balance, transaction history, stored value top-up, etc.

Figure 31A:
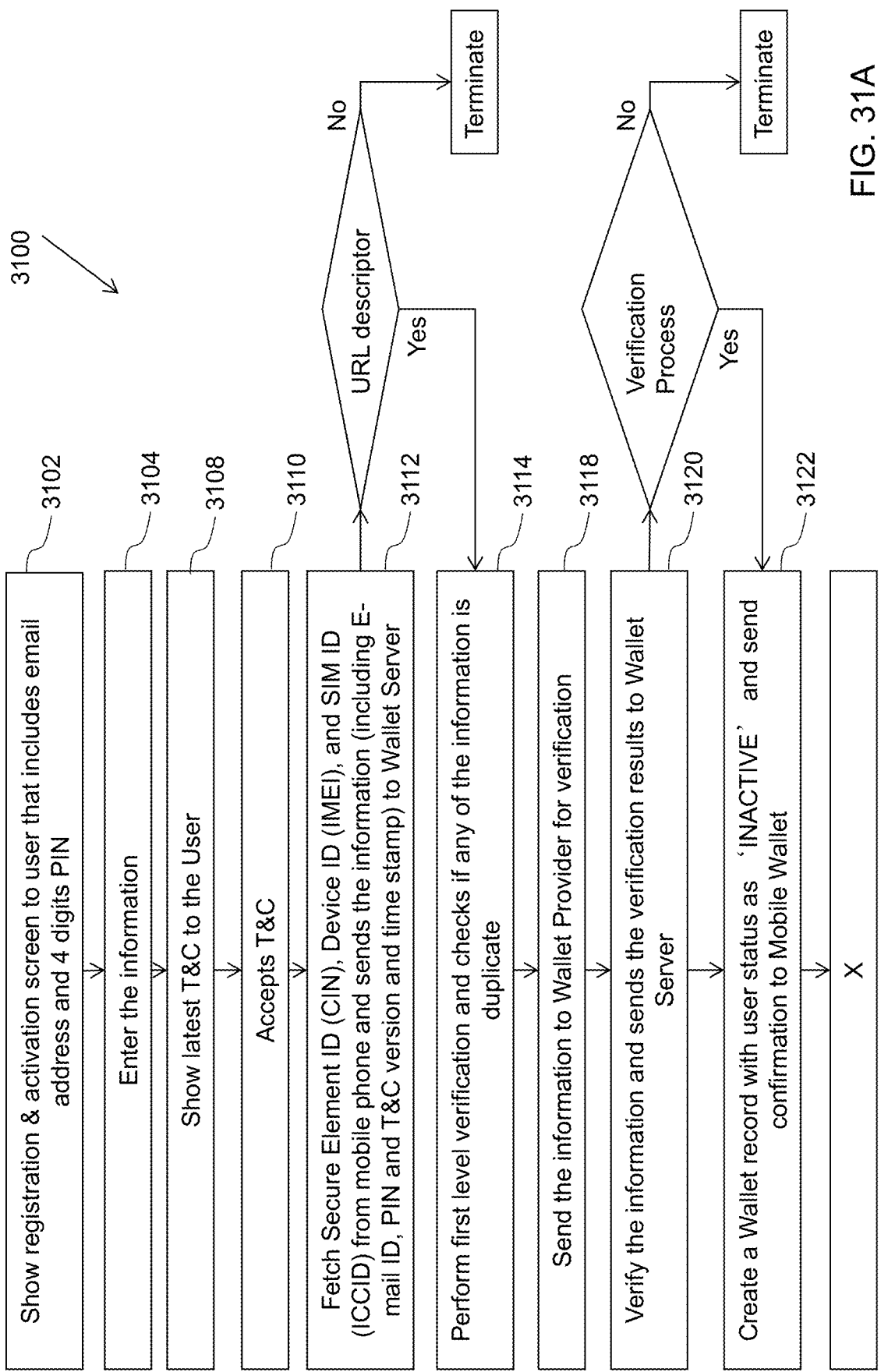
FIGS. 31A and 31B illustrates a method for wallet activation by the user.
Figure 31B:
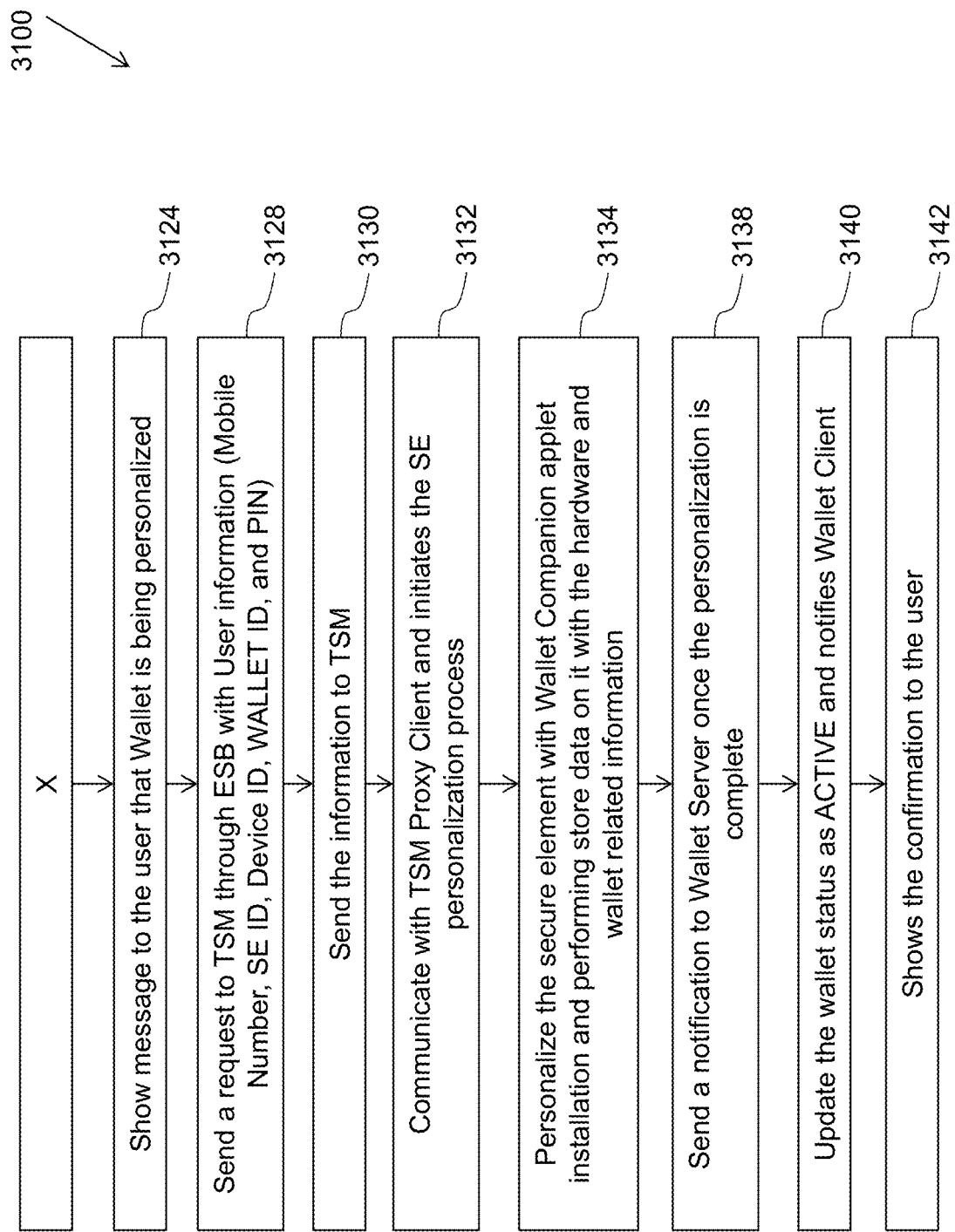

The NFC readers 2930 may facilitate finalization of the secure element form factor, a micro SD, an embedded or UICC (as described in detail by way of FIG. 31). The NFC readers 2930 and allied infrastructure may facilitate finalization of devices. The NFC readers 2930 may facilitate payment protocol finalization. The NFC readers 2930 may facilitate reader distribution and support.

As illustrated in FIG. 29, the mwallet 2920 may interact with various elements from the system 2900. The mwallet 2920 may interact with the wallet providers 2924 and a plurality of widget providers 2928. In an example, the mwallet 2920 may interact with various infrastructure systems like support, message server and other service providers.

Each Ecosystem may include a plurality of ecosystem actors. In exemplary embodiments, the ecosystem actors may include near field communication (NFC) applets, an application store, a barcode reader, an ecosystem provider, an issuer, a message source, a mobile phone, a mobile wallet, a NFC point of sale terminal, an original equipment manufacturer (OEM) provider, a secure element (SE), a service providers (or widget provider), a telecom operator (telco), a trusted service manager (TSM), a TSM proxy client, an user, wallet administrator, a wallet companion applet (WCAp), a wallet provider, a wallet server, and a widget. In an example, the NFC applets on the secure element may perform transactions with the NFC point of sale readers. In an example, the application stores may refer to the application distribution mechanism that may be set up by device manufacturers such as Apple®, Blackberry®/Rim® and Android®/Google®. In an example, the barcode reader may be used to scan the barcode. In an example, the ecosystem aggregator entity that owns and sets up the mobile wallet ecosystem may ties up with the ecosystem operators or partners. The ecosystem aggregator entity may set up infrastructure and aggregate service providers to enable an mPayment and an mCommerce ecosystem. In an example, the issuer may be an entity that may issue cards, coupons, loyalty, gift and other tokens. In an example, the message source may be an entity that may create messages using wallet APIs for wallet users. In an example, the mobile phone may be the one on which the wallet runs. In an example, the mobile wallet may be downloadable client application for mobile handsets to provide users with a seamless payment experience along with a suite of value added services for both proximity (NFC) and over the air transactions. In an example, the NFC point of sale terminal may interact with the NFC phone and performs a transaction. In an example, the OEM provider may provide devices, micro SDs, SE etc. In an example, the SE may represent the combination of the NFC with smart card technology for secure and trusted transactions, wherein the NFC may provide the RF front end for connectivity and smart card may provide security/crypto engine. In an example, the service providers may be the entity that creates wallet and offers payment and non-payment services to the wallet users. In an example, the telecom operator (Telco) may provide SMS and data services. In an example, the TSM may manage the OTA Issuance of Applet and the Card Data on the Secure Element and may provide Key Management Services. In an example, the TSM Proxy Client may sit on the mobile phone and interacts with the TSM server and the secure element. In an example, the user may be an end user of the mobile wallet. In an example, the Wallet Administrator may manage the backend operation of the wallet including the wallet lifecycle. In an example, the wallet companion applet may enable secure wallet & widget life cycle management that may include wallet & widget authentication, wallet state management and settings, and provides a ticket-based verification for secure authentication with the wallet server. In an example, the wallet provider may be an entity that launches branded wallet application and offers it to the user. In an example, the wallet server may be a robust, scalable, server platform that may manage the wallet ecosystem, the wallet lifecycle, the widget provisioning & integration with other ecosystem partners. In an example, the widget may be a set of business features bundled together and availed as a single unit. The widget may contain screen/UI, event handling, and corresponding business logic.

Use Cases—Overview

In various exemplary and non-limiting embodiments, the wallet use-cases may be categorized into various categories. These categories may include wallet download, wallet activation & set up, transaction & widget, life cycle activities, and administration & support. In an example, the wallet download may include use cases and methods for wallet distribution and installation of the wallet software on consumer's mobile phone. These services may be required for introducing the user to the platform and provisioning the mobile software to the mobile phone. In an example, the wallet activation & set up category may include use cases for authenticating user credentials and establishing user profile and enabling user to use mobile wallet application. In an example, the transaction & widget category may include use cases to enable user to download widgets and get payment & non-payment tokens and transact using an activated mobile wallet application. The transaction use cases may include NFC transactions, barcode based transactions and over-the-air transactions. In an example, the life cycle activities may include use cases and features that may be required to enable users to continuing to use the services of the wallet application. In an example, the administration & support use cases may be related to managing day to day operational and support activities of the mWallet platform and includes use cases such as change device, lock and unlock device etc.

In various exemplary and non-limiting embodiments, the widget download may be the first use case scenario followed by the wallet activation & set up. The wallet activation & set up may further be followed by the transaction & widget use cases. The transaction & widget use cases may be followed by the life cycle activities and the administration & support use case category may support and assist the wallet download, wallet activation & set up, transaction & widget, life cycle activities categories. Few exemplary use cases may be described herein.

In an exemplary and non-limiting embodiment, the widget download may be in form of a SMS with Download URL (Push or Pull) use case. In an example, the SMS with Download URL (Push or Pull) use case may allow wallet provider to distribute application over the air using SMS push/pull without publishing the application on the application store. In this example, the mobile wallet may be successfully installed on the mobile phone and the user may see the mobile wallet icon on the main screen. The SMS with Download URL (Push or Pull) use case may use ecosystem actors like the user, the ecosystem provider, the mobile phone, and the telco. A precondition required for this use case may be the mobile phone to be data enabled.

Figure 30:
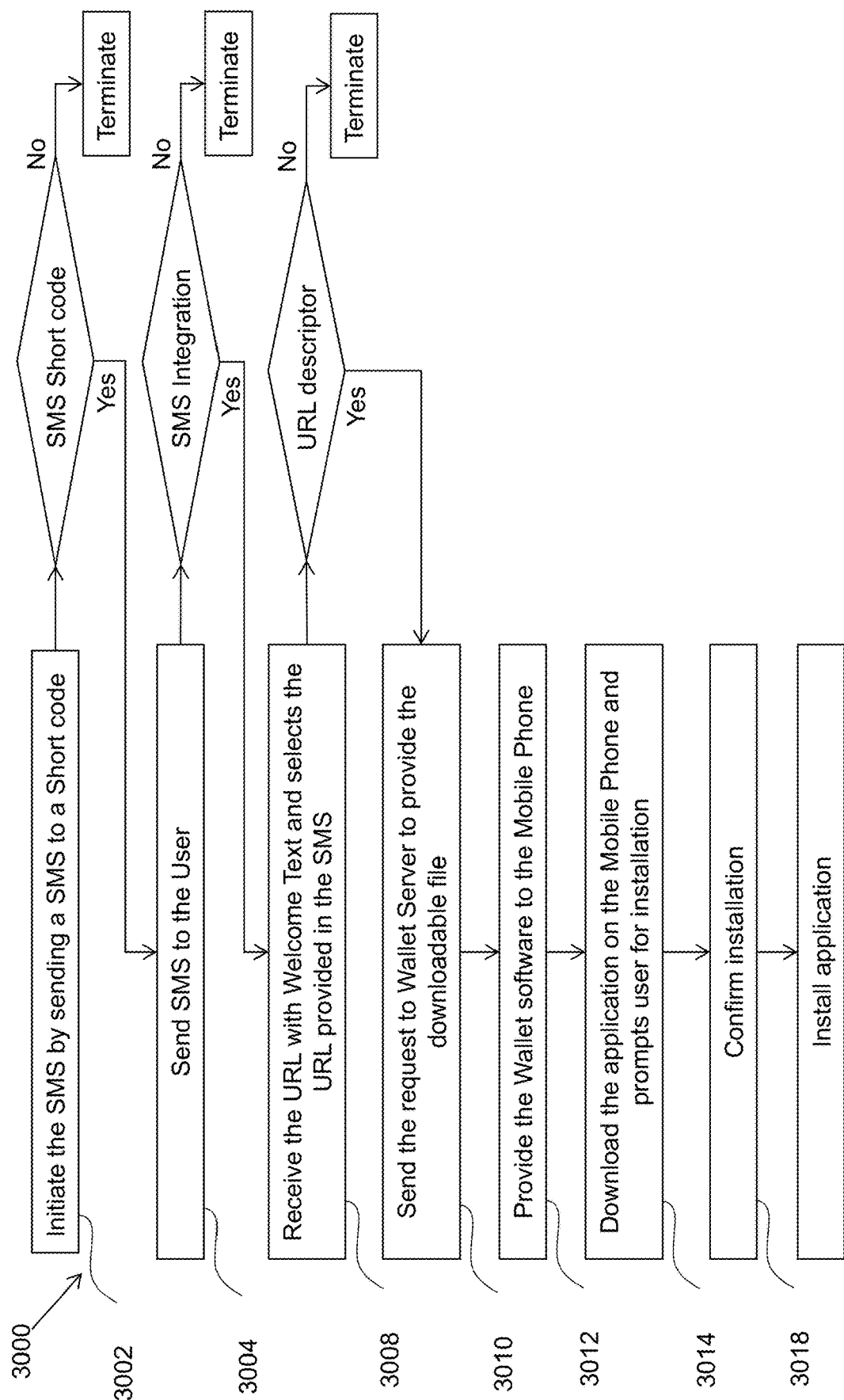
FIG. 30 illustrates a flow chart describing a method of installing the mobile wallet on the mobile phone of the user using SMS with a download URL.

FIG. 30 illustrates a flow chart describing a method 3000 of installing the mobile wallet on the mobile phone of the user using SMS with Download URL (Push or Pull). The method 3000 includes initiating the SMS by sending a SMS to a short code at step 3002. In an example, the SMS may be sent by the user to the Telco or wallet provider, also referred to as an SMS push. In an alternative embodiment, the user may receive an SMS from telco or wallet provider, also referred to as an SMS pull. In an alternative embodiment, the user may initiate SMS from a Website. The completion of step 3002 may be dependent on successful initiation of the SMS short code (SMSC). The method 3000 may further include sending the SMS to the user at step 3004. In an example, the Telco may send the SMS to the user. In an alternative embodiment, the user may use integration with the SMSC. The completion of step 3004 may be dependent on the method of SMS integration, which may be with the Telco or the SMSC.

The method 3000 further includes receiving the URL with a welcome text by the user at step 3008. The user may select the URL provided in the SMS. The completion of step 3008 may be dependent on URL descriptor and welcome message. The method 3000 further includes the mobile phone sending the request to wallet server to provide the downloadable file at step 3010. The wallet server may be further configured to for providing the wallet software to the mobile phone at step 3012 of the method 3000. The mobile phone may be configured for downloading the application on the mobile phone and prompting user for installation of the application at step 3014 of the method 3000. The user may confirm the installation at step 3018 of the method 3000 after the user has been prompted by the mobile phone for installation. The mobile phone may install the application after receiving user confirmation at step 3020 of the method 3000.

In an exemplary and non limiting embodiment, a wallet activation use case process may enable the user to activate the mobile wallet and establish secure linkages between user & ecosystem actors such as mobile wallet, mobile phone, mobile phone, secure element, wallet server, TSM, and wallet provider. In an example, the wallet activation use case actors like mobile handset, TSM, the user, the mobile wallet, the wallet provider, the wallet server. The wallet activation may take place only when the user may have successfully installed the mobile wallet on the mobile handset (either preloaded or downloaded by the user as described by way of FIG. 30). Further, for wallet activation to take place, the SE may be connected/associated with the mobile handset (for removable SEs like micro SD and UICC). Further, the user may have the data connectivity for wallet activation to take place. After successful activation of the wallet, the user may be able to use the wallet application.

FIG. 31 illustrates a method 3100 for wallet activation by the user. The method 3100 includes the mobile wallet showing a registration & activation screen to the user that includes an email address and a personal identification number (PIN) at step 3102. In an example, the PIN can be a 4 digit number. In an example, the PIN may be configured to be numeric and have business rules associated with it, e.g., 4-10 digits, no sequence, no repeating numbers and the like. In an example, the registration screen may be customized to capture additional parameters, as required to create a user profile, for example, username, a user photograph or any other user signature. The method 3100 further includes the user entering all required information on the registration and activation screen at step 3104. The method 3100 further includes the mobile wallet showing latest terms and conditions (T&C) to the user at step 3108. In an example, the T&C may be pulled at run time from server. In an example, the T&C may be different for each wallet provider. In an example, the acceptance of the T&C may be informed to the wallet provider along with a version number. The method 3100 may require the user to accept the T&C at step 3110. In an example, if the user may reject the T&C, then the user may be shown a message indicating that acceptance of T&C may be required to activate the wallet.

The method 3100 further includes the mobile wallet fetching a secure element ID (CIN), a device ID (IMEI), and a SIM ID (ICCID) from the mobile phone and sends the information (including E-mail ID, PIN and T&C version and a time stamp) to the wallet server at step 3112. In an example, not all information may be available to the mobile wallet in all cases and a separate work flow or interaction with Telco or service provider may be required to capture the required details. For example, if a mobile number may not be available from the SIM or device APIs, it may be captured from HTTP Header coming from the device if a Telco provides it. The method 3100 may require mobile number and SIM information from Telco before proceeding further in wallet activation. The method 3100 further includes the wallet server performing a first level verification to check if any of the information may be duplicate at step 3114. In an example, if the user record may already be available, then the wallet server may provide appropriate error message to the user.

The method 3100 further includes the wallet server sending the information to wallet provider for verification at step 3118. At step 3120 the wallet provider may verify the information and send the verification results to the wallet server. In an example, the verification process may include a KYC check by the Telco. The verification process may be required by the method 3100 before proceeding further in wallet activation. At step 3122, the wallet server may create a wallet record with a user status as 'INACTIVE' and send a confirmation to the mobile wallet. At step 3124, the mobile wallet may show a message to the user that wallet may be in process of being personalized for the user. At step 3128, the wallet server may send a request to TSM through ESB with user information (the mobile number, the SE ID, the device ID, the WALLET ID, and the PIN as discussed above).

The method 3100 further includes the ESB configured for sending the information to TSM at step 3130. At step 3132, the TSM may communicate with the TSM proxy client and initiates the SE personalization process. At step 3134, the TSM may personalize the secure element with wallet companion applet installation and may perform store data on it with the hardware and wallet related information. At step 3138, the TSM may send a notification to the wallet server once the personalization is complete. At step 3140, the wallet server may update the wallet status as "active" and notifies the wallet client. At step 3142 of the method, the mobile wallet may show a confirmation to the user indicating successful wallet activation.

In an exemplary and non limiting embodiment, the transaction and widget use cases may include a series of widget management use cases. In an example, the widget management use cases may include a series of widget installation uses cases. In an example, the widget installation uses cases may include an in-application use case alert. The in-application use case alert may allow the users to download widgets based on the alerts received by the wallet provider. The wallet provider may send the alerts using C-SAM's alert framework. The in-application use case alert may require the mobile wallet, the service provider, the user, the wallet provider, and the wallet server. The user may install widget as an in-application case after activation of the mobile wallet. Also, the user may be logged in to the mobile wallet. The service should have created a widget before in-application use case alert. The wallet provider may have reviewed the widget and published it before the in-application use case alert. The wallet provider may have created an alert before the in-application use case alert. After the in-application alert, the user may have successfully downloaded the widget. In the in-application use case alert, the mobile wallet may show an alert to the user. In an example, the alert may be shown to the user in the mobile wallet message inbox or during communication with wallet server. The user may then, selects alert, view the message and initiate a download. After initiation of download, the mobile wallet may install the widget and send confirmation to the wallet server. The wallet server may send confirmation to the mobile wallet. The mobile wallet may show the confirmation to the user.

In an example, the widget installation uses cases may include a search and download use case. The search and download use case may allow the user to search the widgets and download and install on the mobile wallet. The search and download use case may require the mobile wallet, the wallet server, the service provider, the user and the wallet provider. The search and download use case may require the user to have activated the mobile wallet, user to have logged in to the mobile wallet, service provider to have created a widget, and wallet provider to have reviewed the widget and published it. The user may successfully download the widget as a result of the search and download use case.

Figure 32:
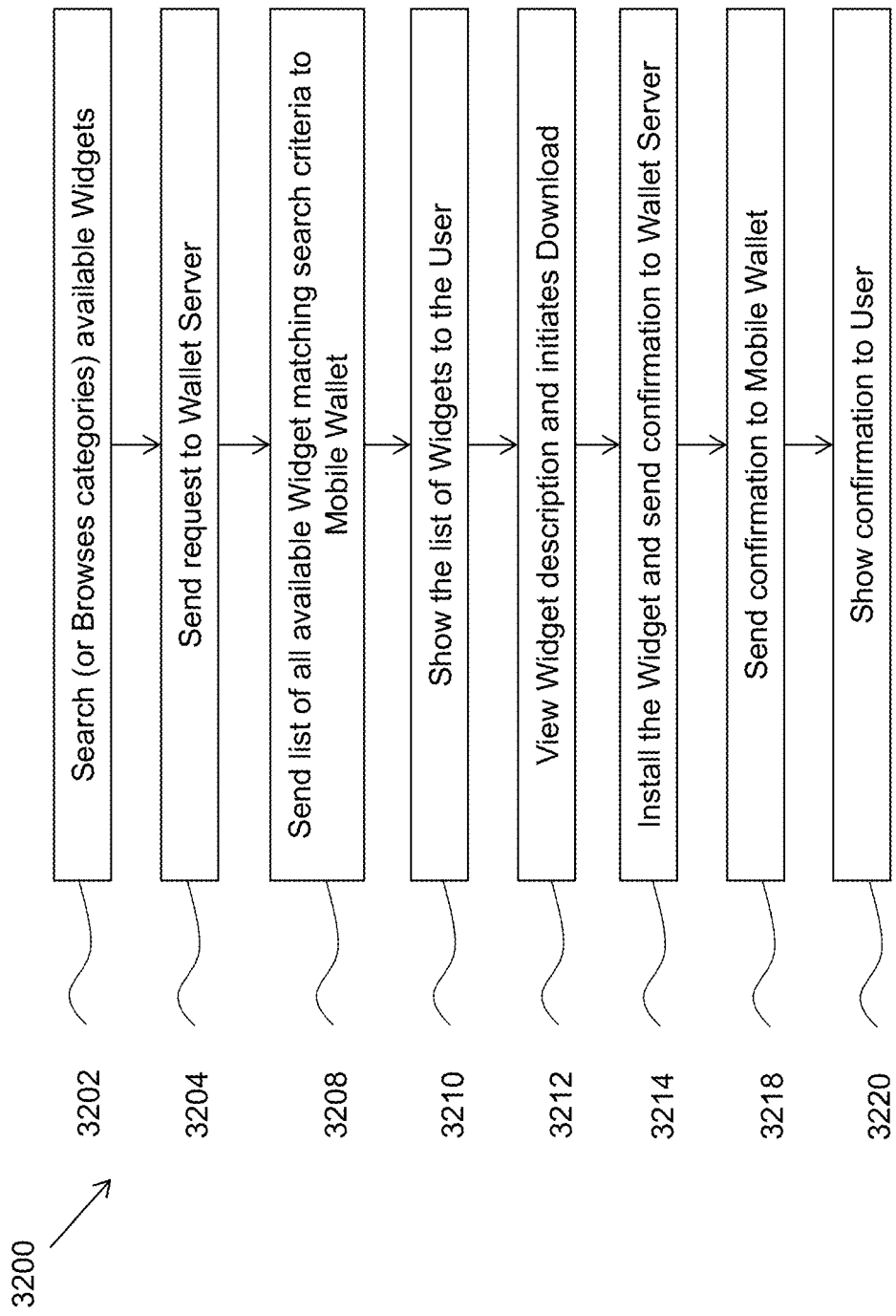
FIG. 32 illustrates a method as an example of the search and download use case.

FIG. 32 illustrates a method 3200 as an example of the search and download use case. The method 3200 may include the user to search or browse categories of available widgets at step 3202. In an example, the user may be able to search the widget by selecting widget from a service list or entering or selecting appropriate criteria in the wallet. At step 3204, the method 3200 may require the mobile wallet to send a request based on user criteria to the wallet server. The wallet server may send the mobile wallet a list of all available widget matching search criteria of the user at step 3208. The mobile wallet may show the list of the widgets to the user at step 3210. The user may view the widget description of any widget from the list sent by the wallet server and initiate a download of the desired widget at step 3212. The mobile wallet may install the widget and send a confirmation to the wallet server at step 3214 of the method 3200. The wallet server may send a confirmation to the mobile wallet at step 3218. The mobile wallet may show the confirmation to the user at step 3220.

Figure 33:
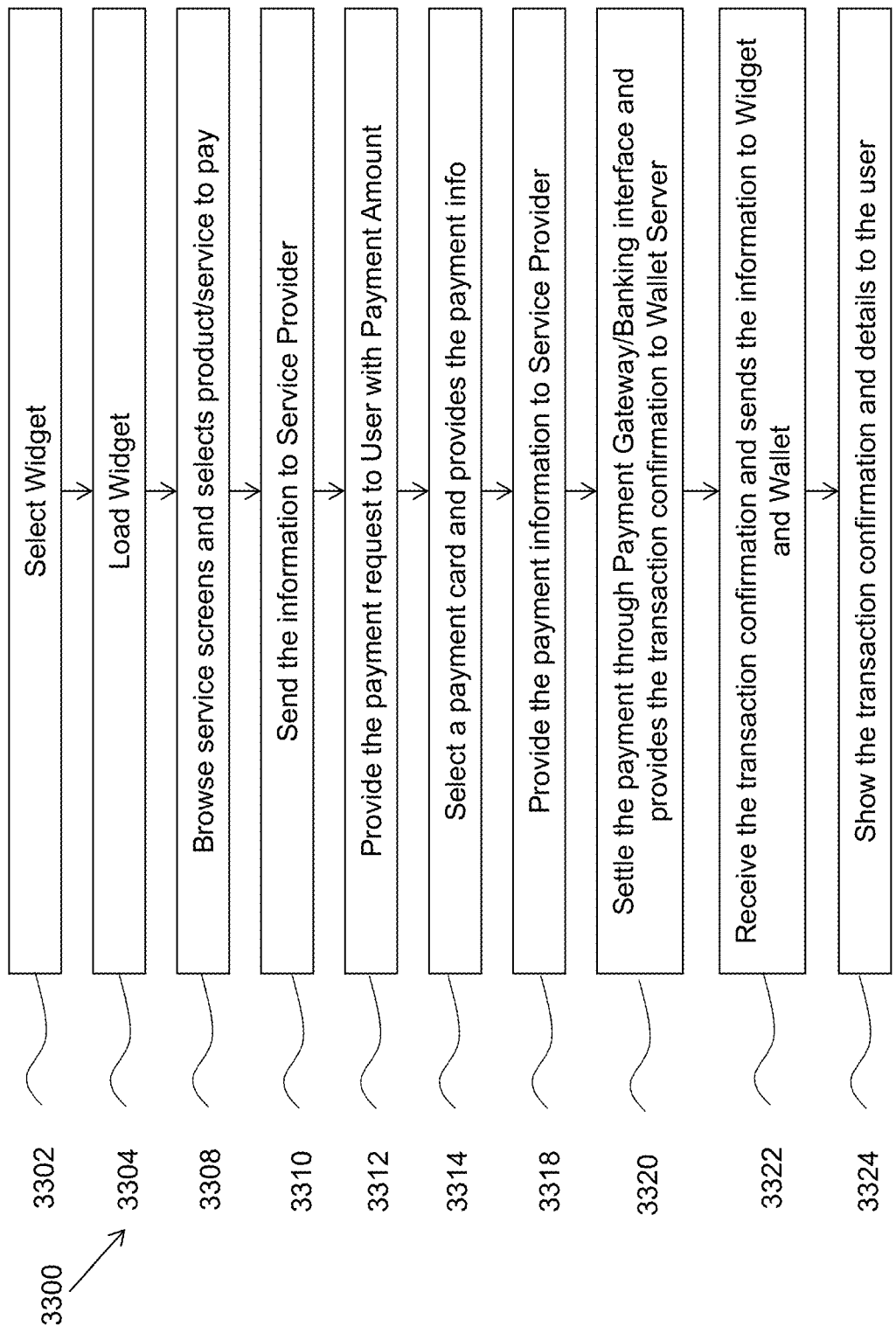
FIG. 33 illustrates an exemplary method for the OTA-transaction.

In some exemplary and non-limiting embodiments, the transaction use cases may include an over-the-air (OTA)-transaction use case. The over-the-air transaction use case may describe a process for the OTA-transaction based transaction. The OTA-transaction may include the user, the mobile wallet, the widget, and the service provider. For the OTA-transaction to take place, the user may have to be logged into the mobile wallet, the user may have to have data connectivity, and the user may have loaded the widget for OTA transaction on the mobile wallet. In an example, the OTA-transaction may facilitate in successfully completing a transaction by the user FIG. 33 illustrates an exemplary method 3300 for the OTA-transaction. The method 3300 may include the user to select a widget at step 3302. The widget selection may be done by various types of services that may be available to the user, for example, ticketing, bill payment and the like. At step 3304 the method 3300 may require the mobile wallet to load the widget at step 3304 onto the service screens (as also discussed above). The user may browse the service screens and selects product/service to pay at step 3308. The workflow and user experience may differ for different services. A service may require multiple interaction before the user may reach a payment screen. The wallet server may send the information from the user to the service provider at step 3310. The service provider may provide a payment request to the user with a payment amount at step 3312. The user may select a payment card and provides the payment info at step 3314. In an example, user may select a payment method available on wallet and that may allow the OTA transaction. In an example, the user may enter card information while air-travelling as well. The step 3318 of the method 3300 may require the wallet server to provide the payment information to the service provider. At step 3320 the service provider may settle the payment through a payment gateway/banking interface and may provide a transaction confirmation to the wallet server. At step 3322, the wallet server may receive the transaction confirmation and may send the information to the widget and the wallet. At step 3324 of the method 3300, the mobile wallet may show the transaction confirmation and details to the user.

In exemplary and non-limiting embodiments, the life cycle activities may include a card issuance use case. The card issuance use case may allow a card issuer to issue a card data on the wallet. The card issuance use case may include the issuer, the wallet server, the TSM, the user, and the mobile wallet. For the card issuance to take place, the user may have to activate the mobile wallet, the user may have to log in to the mobile wallet, the service provider may have to create an updated widget, and the wallet provider may have to review the widget and publish it. After, the card issuance is completed successfully; the user may be able to download the widget.

Figure 34:
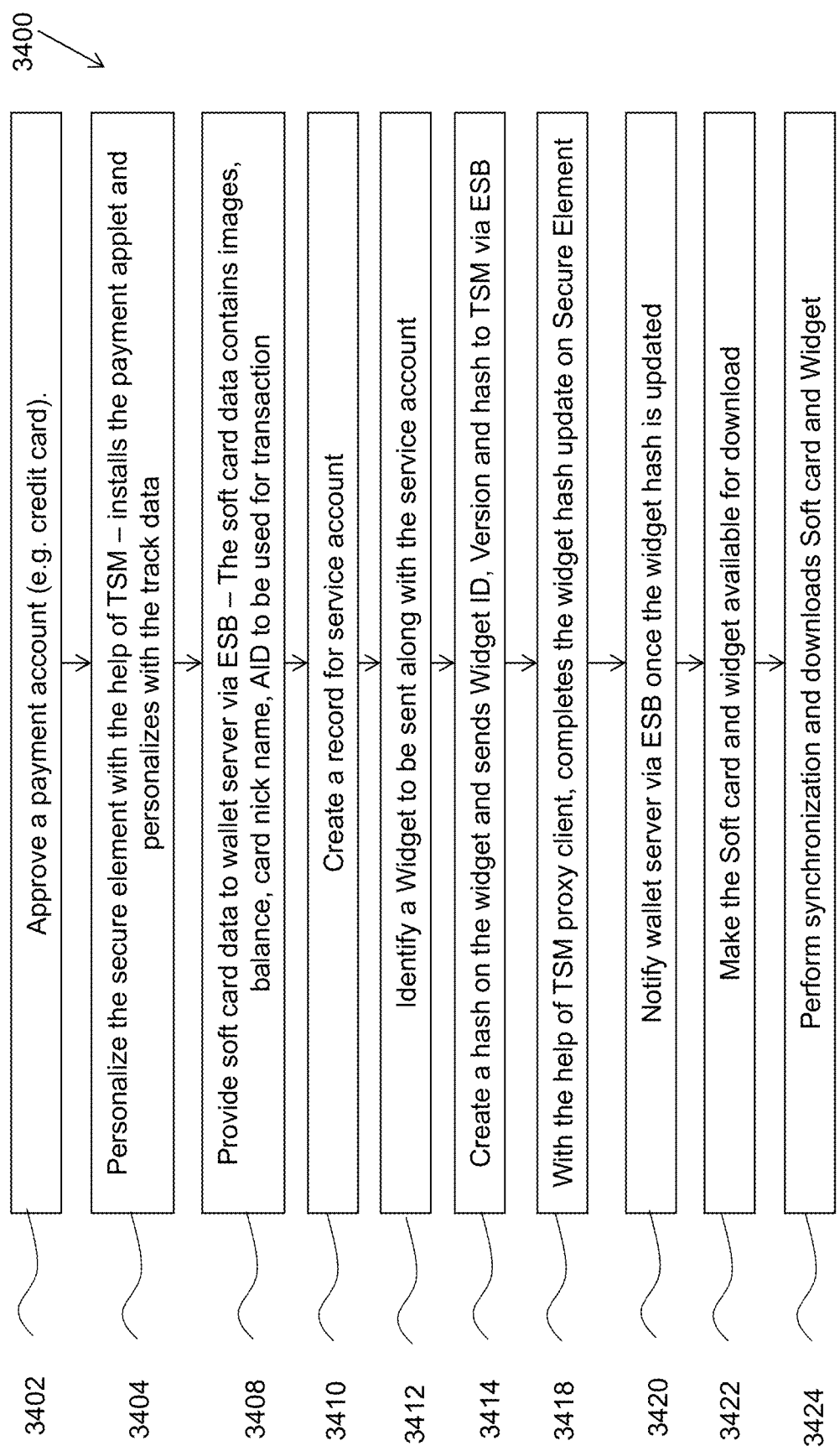
FIG. 34 illustrates a method as an example for the card issuance use case.

FIG. 34 illustrates a method 3400 as an example for the card issuance use case. The method 3400 may require the issuer to approve a payment account (for example, a credit card) at step 3402. The issuer may personalize the secure element with the help of the TSM at step 3404. In an example, the TSM may install the payment applet and may personalize with the track data. The card issuance use case may depend upon the payment card and the applet issuance on the SE & the type of applet. In an example, the applet may be a Pay-pass, a zip etc. At step 3408, the method 3400 may require the user to provide soft card data to the wallet server via ESB. The soft card data may contain images, balance, card nick name, and AID to be used for transaction. The method 3400 may further require the wallet server to create a record for a service account for the user at step US610. The wallet server may identify a widget to be sent along with the service account at step 3412. The wallet server may create a hash on the widget and send the Widget ID, the version and the hash to TSM via ESB at step 3414. The TSM may complete the widget hash update on the secure element with the help from the TSM proxy client at step 3418. The TSM may notify wallet server via ESB once the widget hash may be updated at step 3420. The wallet server may make the soft card and widget available for download at step 3422. The mobile wallet may perform synchronization and may download the soft card and the widget on the mobile phone of the user.

In exemplary and non-limiting embodiments, the support and administration may include a terminate wallet use case. The terminate wallet use case may allow a wallet administrator to terminate a wallet account. The terminate wallet use case may include a mobile wallet, a wallet server, a TSM, a TSM proxy client. For the wallet to terminate, the wallet administrator may have to be registered, the wallet administrator may have to have privileges to manage a user profile, and the wallet administrator may have to a wallet management console. The wallet administrator may successfully terminate a wallet account after completion of wallet termination use case.

Figure 35:
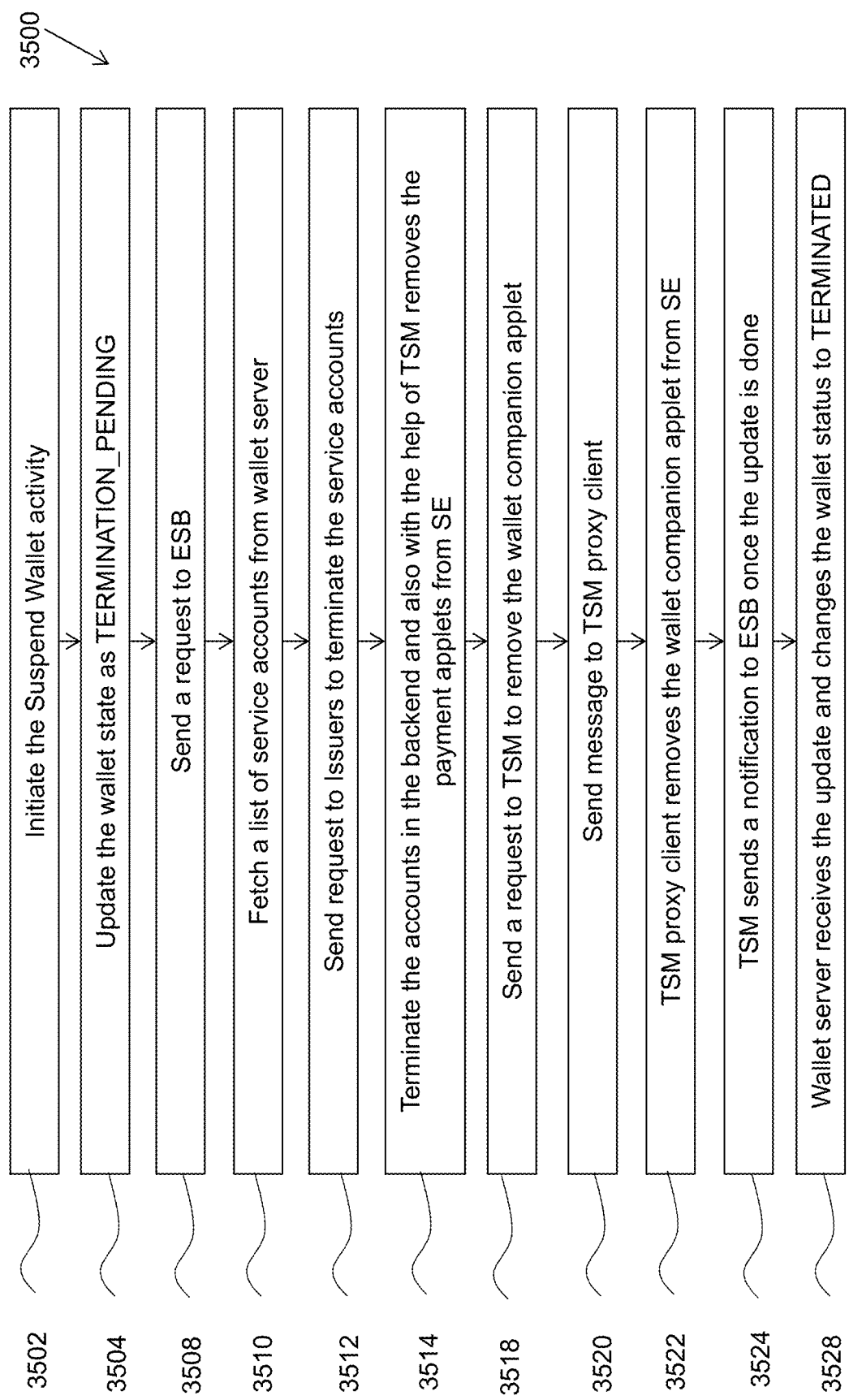
FIG. 35 illustrates a method as an example to terminate a wallet.

FIG. 35 illustrates a method 3500 as an example to terminate a wallet. The method 3500 may require the wallet administrator to initiates a suspend wallet activity at step 3502. The wallet server may update the wallet state as "termination_pending" at step 3504 after the suspension activity may be initiated. The wallet server may send a request to ESB at step 3508. The ESB may retrieve a list of service accounts from the wallet server at step 3510. The ESB may send request to the issuers to terminate the service accounts at step 3512. The ESB may check the list of service accounts before sending request to the issuers. The issuer may terminate the wallet account in the backend and also remove the payment applets from SE, with the help of TSM at step 3514. The ESB may send a request to TSM to remove the wallet companion applet at step 3518. The TSM may send a message to the TSM proxy client at step 3520. The TSM proxy client may remove the wallet companion applet from SE at step 3522. The TSM may send a notification to ESB once the update may be done at step 3524. The wallet server may receive the update and may change the wallet status to "terminated" at step 3528 of the method 3500. The wallet may be successfully terminated after step 3528.

In exemplary and non-limiting embodiments, the widget management includes a publish widget use case. The publish widget use case may allow the ecosystem provider to publish an approved widget. The publish widget use case may include the wallet administrator, the wallet server, and the service provider. Before publishing a widget, the wallet administrator may have to be registered, the service provider may have to be registered, the wallet administrator may have to be logged into the wallet management console, and the widget may have to be validated and approved.

Figure 36:
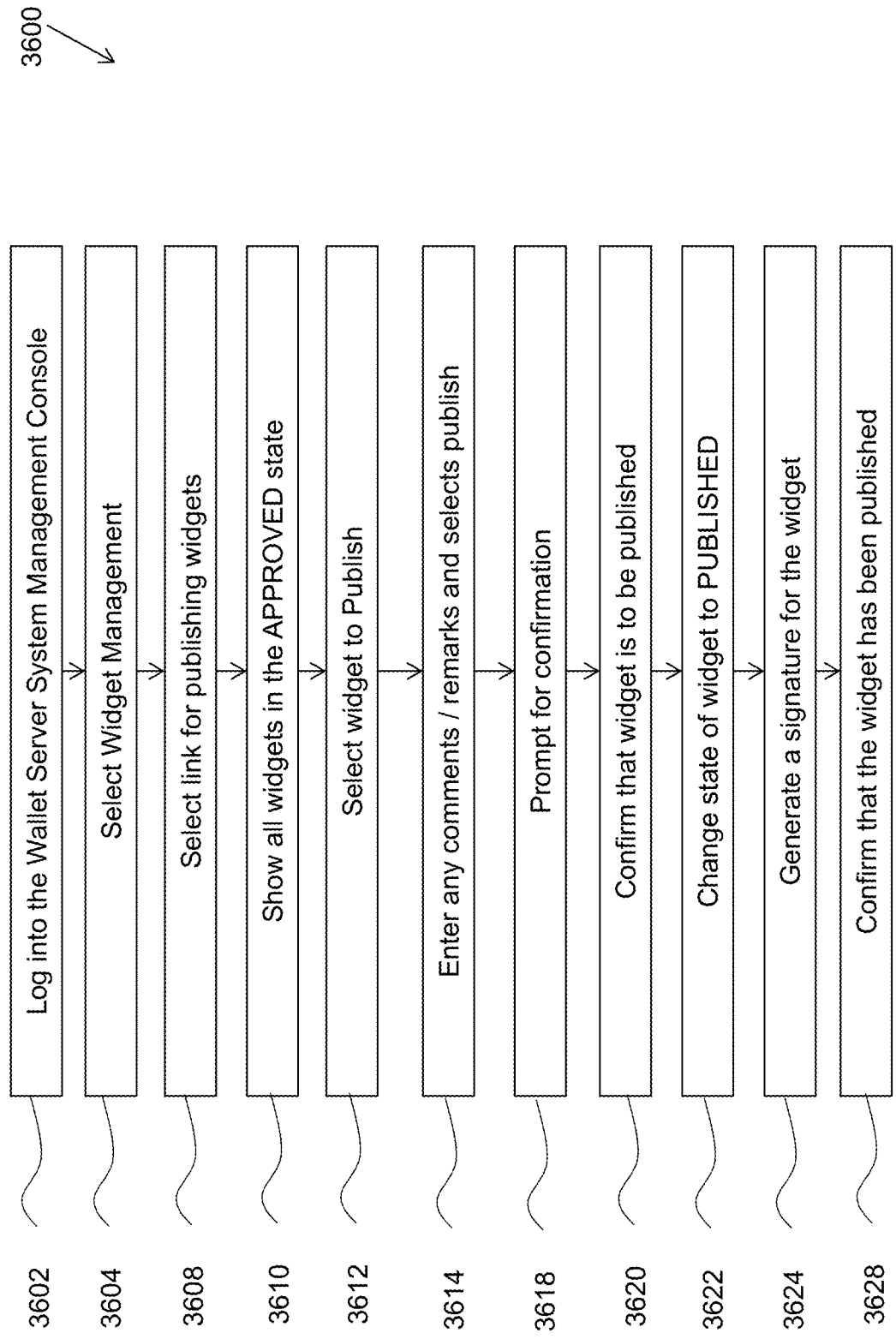
FIG. 36 illustrates a method as an example for publishing a widget.

FIG. 36 illustrates a method 3600 as an example for publishing a widget. The method 3600 may require the wallet administrator to log into the wallet server system management console at step 3602. The wallet administrator may select widget management from the wallet server system management console at step 3604. The wallet administrator may select a link for publishing widgets from the widget management at step 3608. The wallet server may display all widgets in the "approved" state at step 3610. The wallet administrator may select a widget to publish at step 3612. The wallet administrator may enters any comments or remarks and select publish one the publishing widgets of the wallet server system management console at step 3614. The wallet server may prompt the wallet administrator for a confirmation at step 3618. The wallet administrator may confirm that the widget may be published at step 3620. The wallet server may change the state of the widget to "published" at step 3622. The wallet server may generate a signature for the widget at step 3624. The wallet server may confirm that the widget may have been published at step 3628 of the method 3600.

Figure 37:
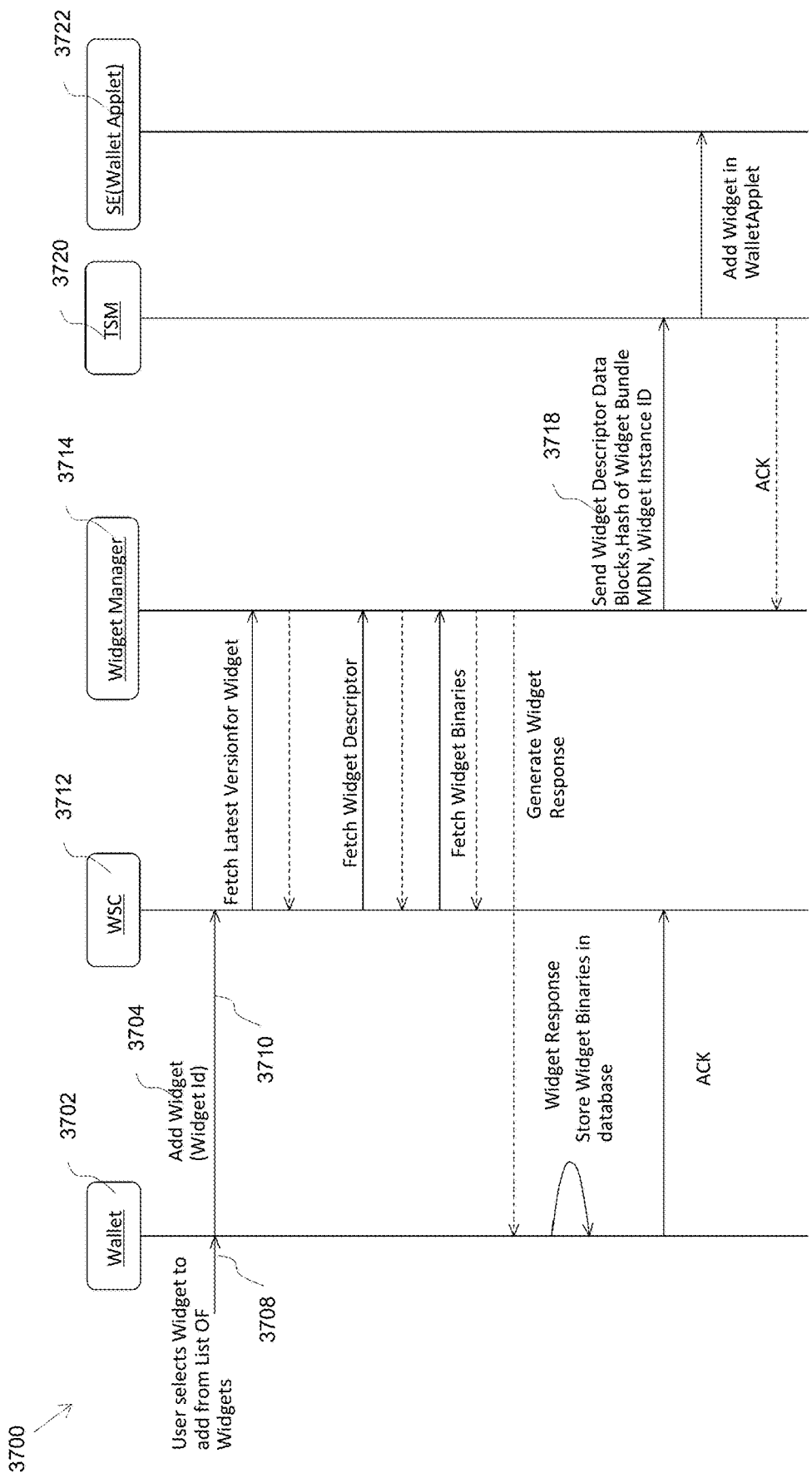
FIG. 37 is a method for adding a widget for the first time along with a TSM interaction.

Behavioral Model—Add Widget—FIG. 37 is a method 3700 for adding a widget for the first time along with a TSM interaction. The method 3700 may require a user to use a wallet 3702 for selecting a widget 3704 at step 3708. At step 3710, a widget script component 3712. The script component 3712 may communicate with a widget manager 3714 so as to retrieve a latest version of the widget 3704 at step 3718 of the method 3700. In an example, the script component 3712 may communicate with a widget manager 3714 so as to retrieve a widget descriptor. In an example, the script component 3712 may communicate with a widget manager 3714 so as to retrieve the widget binaries. The widget manager 3714 may send widget descriptor data blocks, hash of widget bundle, MDN, and widget instance ID to a trusted service manager (TSM) 3720 at step 3718 of the method 3700. The widget manager 3714 may generate widget response and communicate to the wallet 3702. The wallet 3702 may include a database for storing widget binaries and widget response from the widget manager 3714. The TSM 3720 may add the widget 3704 to a secure element 3722 at step 3728. In an example, the secure element 3722 may be a wallet applet.

Figure 38:
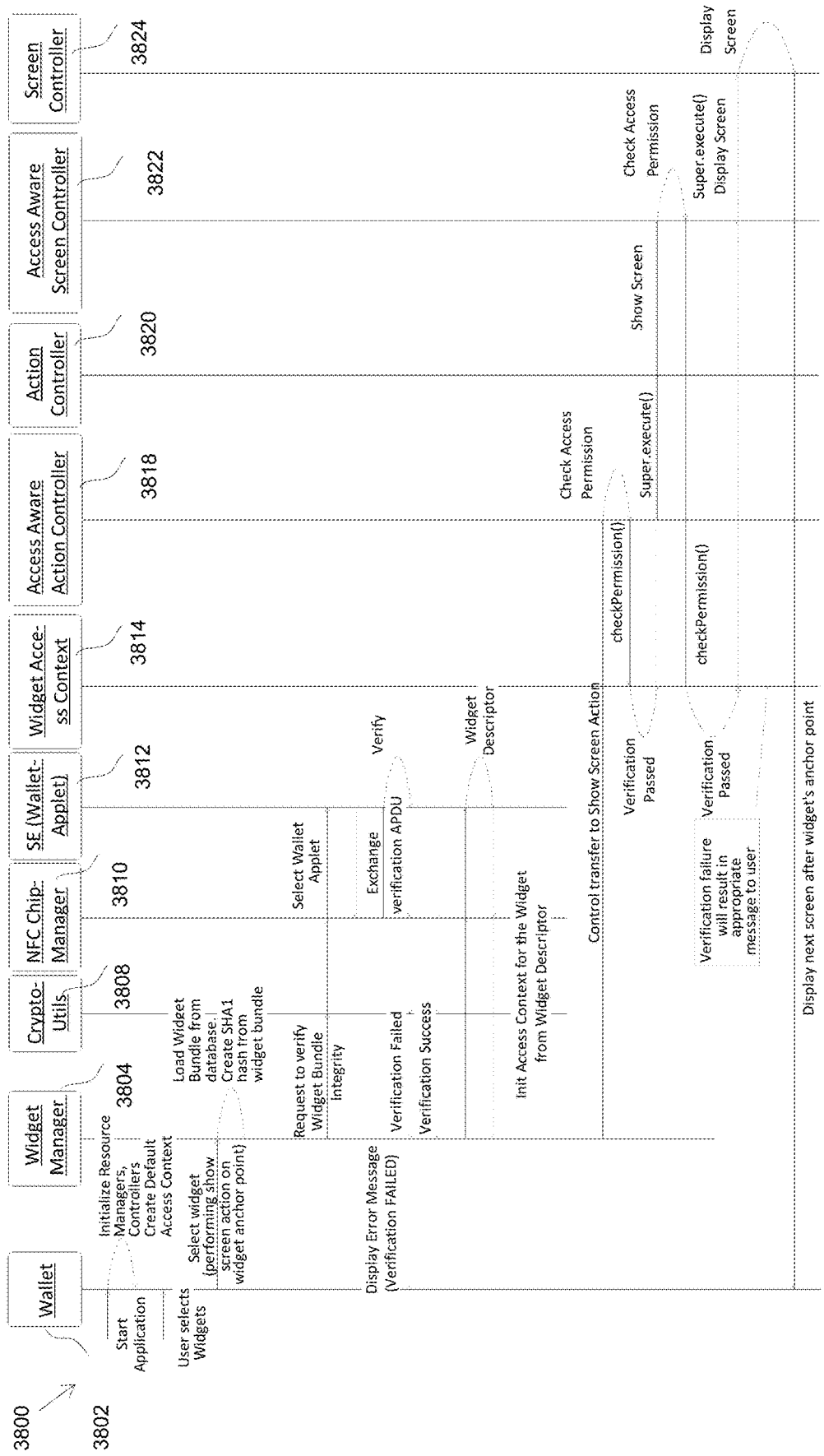
FIG. 38 is a behavioral model of a system for widget access verification with reference to the widget loading time signature, verification, and execution time access verification.

FIG. 38 is a behavioral model of a system 3800 for widget access verification with reference to the widget loading time signature, verification, and execution time access verification.

In an exemplary and non-limiting embodiment, a wallet 1002 may be configured so that a user may select a widget from a list of widgets. The wallet 1002 may be configured so that wallet 1002 may start the widget application selected by the user. The wallet 1002 may interact with a widget manager 3804. The widget manager 1004 may be configured to initialize resource managers, controllers, create default access context and the like. In an example, the widget manager 3804 may include the list of widgets and may facilitate showing of the widget lists to the user through the wallet 3802. The system 3800 may include a cryto-utility 3808 that may be configured to load the widget bundle from database. The cryto-utility 3808 may create a hash, for example a secure hash algorithm 1 (SHA1) hash from the widget bundle. The cryto-utility 3808 may communicate the hash and widget bundle to the widget manager 3804. The system 3800 may include a NFC chip utility 3810 and a secure element or wallet applet 3812. The cryto-utility 3808 may initiate a request to verify the widget bundle and send the request to the NFC chip utility 3810 and the wallet applet 3812. The NFC utility 3810 may facilitate selection of the 3812. The applet 3812 may send the verification request to a widget access context 3814. The widget access context 3814 may verify the widget bundles, the widget descriptor. In an example, the widget manager 3804 may initiate a communication with the widget access context 3814. The widget access context 3814 may be in communication with an access action controller 1018. The access action controller 1018 may check permission and access for permissions of the selected widget. In an example, an appropriate message may be sent to the user when the verification may be passed or failed. The system 3800 may include an action controller 3820 may execute the widget requests after permission verification. An access aware screen controller 3822 may be included in the system 3800, and configured to show a screen if the permission access may be received from the access action controller 1018. The system 3800 may include a screen controller 3824. The screen controller 3824 may be configured to display a screen on the wallet 3802 after checking display permission from the widget access context 3814.

The methods and systems of mobile transaction platforms in a multi-domain ecosystem for secure personalized transactions may provide for a method of protocol abstraction for a mobile transaction platform in a dynamic ecosystem for secure commerce and payment transactions. The mobile transaction platform may be a carrier-grade infrastructure platform that facilitates the development and delivery of secure transactional services, both Over-the-Air and through NFC Proximity, to a broad range of mobile phone environments. The method may include taking the information elements of the original method apart and mapping the information elements of the original method to new fields of information of a common format. These new fields of information may be empty, filled, or translated by tokenization or some other method of translation. The common format may work for different input protocols and deliver a single output protocol. The common format may be a meta-model that is consistent with the data structures of each protocol. The common model may be a services abstraction model that can handle the native sequence flows within an underlying protocol. The input protocols may be point-of-sale protocols, NFC protocols, credit card protocols, debit card protocols, ticketing protocols, EPSON Esc/POS protocol, UTC Standard protocol, AEDEX protocol, ICD 2002 protocol, Ultimate protocol, CD 5220 protocol, DSP-800 protocol, ADM 787/788 protocol, HP protocol, UnifiedPOS protocol, OLE for Point-of-Sale protocol, JavaPOS, cloud-based protocol, and the like.

The method of protocol abstraction may be performed between a mobile device and a point-of-sale device via a communication link. The mobile device may be a smartphone, tablet computer, laptop computer, or the like. The mobile device may be running an operating system such as iOS, Android, Windows, or the like. The mobile device may be running an application such as a container, widget, wallet, or the like. The application may store information related to soft cards. The soft cards may be credit cards, loyalty cards, gift cards, store value cards, ticket cards, and the like. The soft cards may be issued from multiple service providers from multiple ecosystems through multiple carrier or network providers. The soft cards may be provisioned, maintained, and enabled through and by a provisioning architecture. The provisioning architecture may include a mobile enabling tier, a service tier, and a software development kit. The point-of-sale device could be a real world point-of-sale device operating in a proximity environment or a virtual world point-of-sale device operating in a remote environment. The communication link may be an wired communication link, a wireless communication link, an NFC link, a Bluetooth link, a local area network link, a wide area network link or the like.

The method of protocol abstraction may include a tokenization capability for a mobile transaction platform in a dynamic ecosystem for secure commerce and payment transactions. The mobile transaction platform may be a carrier-grade infrastructure platform that facilitates the development and delivery of secure transactional services, both Over-the-Air and through NFC Proximity, to a broad range of mobile phone environments. The tokenization capability may take private information and replace it with a token. The private information may include a pin number, a credit card number, primary account number, other personally identifiable information, and the like. The token may consistent of numeric characters, alphabetic characters, a combination of alphabetical and numeric characters, a truncated primary account number with alphabetic and numeric characters replacing the middle digits of the primary account number, and the like. The token may be a one-time use token. The token may be issued by a trusted entity in the dynamic ecosystem for secure commerce and payment transactions. The trusted entity may be a server located at the payment gateway, acquirer, or issuer. The token may be generated as a mathematically reversible cryptographic function, a one-way non-reversible cryptographic function, or assigned through an index function, sequence number or a randomly generated number.

Figure 39:
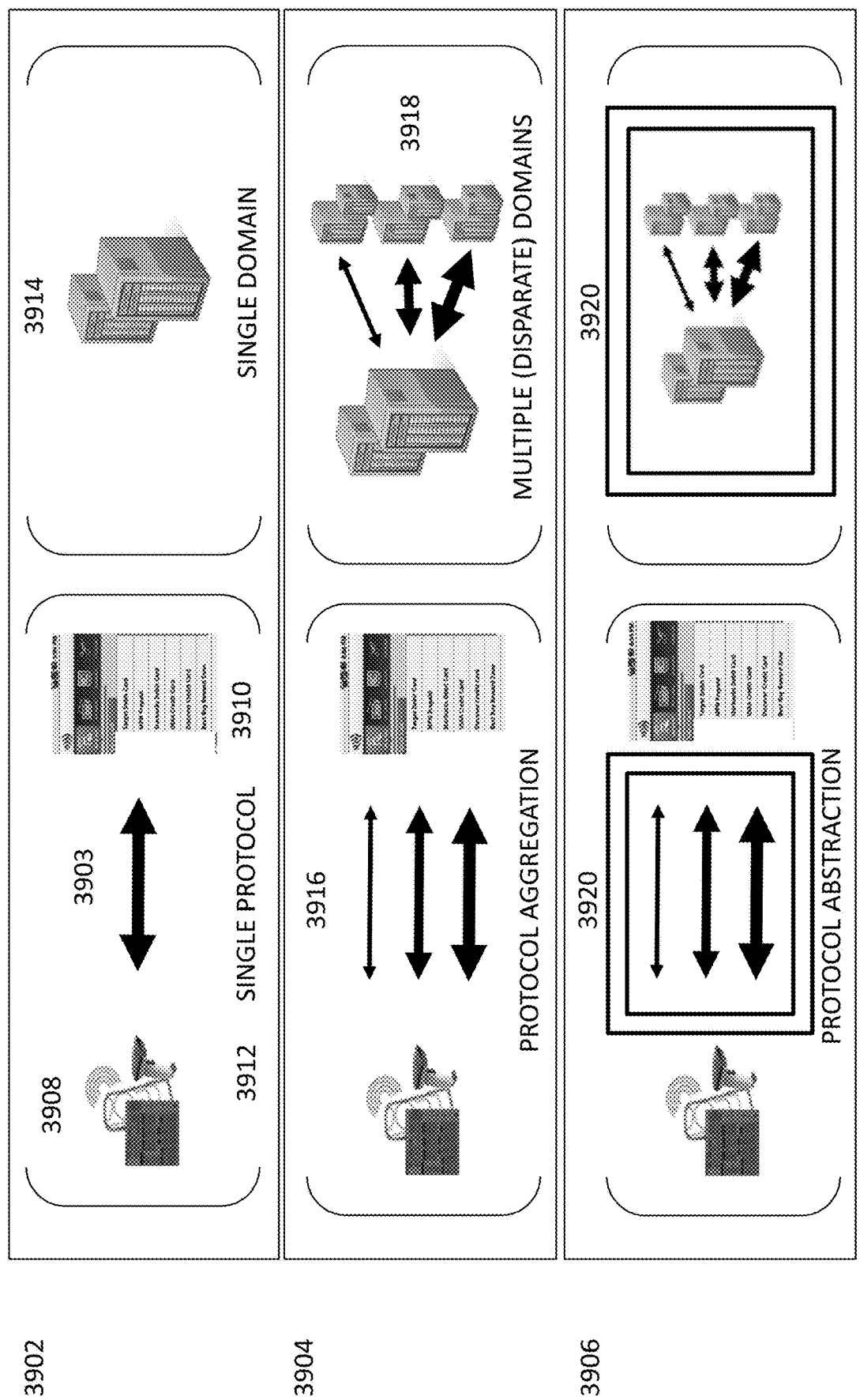
FIG. 39 illustrates a dynamic ecosystem for secure commerce and payment transactions.

With reference to FIG. 39, there is illustrated a dynamic ecosystem for secure commerce and payment transactions according to exemplary and non-limiting embodiments. A dynamic ecosystem for secure commerce and payment transactions 3902, include a point-of-sale terminal 3908, an application running on a mobile device 3910, a communication link between the point-of-sale device 3908 and the mobile application running on a mobile device 3910. A single protocol 3912 associated with a single domain 3914 may connect the point-of-sale device 3908 and the mobile application running on a mobile device 3910.

With continued reference to FIG. 39, a dynamic ecosystem for secure commerce and payment transactions 3904, a multiple protocols 3916 are associated with multiple domains 3918 may connect the point-of-sale device 3908 and the mobile application running on a mobile device 3910.

With continued reference to FIG. 39, a dynamic ecosystem for secure commerce and payment transactions 3906, a multiple protocols 3916 are associated with multiple domains 3918 may be abstracted using a wrapper 3920, as described previously in this specification, to connect the point-of-sale device 3908 and the mobile application running on a mobile device 3910.

The methods and systems described herein of multi-domain ecosystem secure personalized transactions includes a method of abstracting a protocol in a secure personalized transaction through a multi-domain ecosystem. The method includes receiving an electronic transaction message in a secure personalized transaction comprising a plurality of information fields at a networked device in the multi-domain ecosystem. The method may further include determining with the device a type and a content for each of the plurality of information fields. The method may further include mapping at least a portion of the plurality of information fields to common format message fields. The method may further include configuring a common format transaction message based on the mapping. The method may further include transmitting the common format transaction message from the networked device to a second networked device in the multi-domain ecosystem.

The methods and systems described herein of multi-domain ecosystem secure personalized transactions includes a method of abstracting a protocol in a secure personalized transaction through a multi-domain ecosystem. The method includes receiving an electronic transaction message in a secure personalized transaction comprising a plurality of information fields at a networked device in the multi-domain ecosystem. The method may further include determining with the device a type and a content for each of the plurality of information fields. The method may further include mapping at least a portion of the plurality of information fields with a meta-model that provides consistent mapping of the secure personalized transaction protocol to common format message fields. The method may further include configuring a common format transaction message based on the mapping. The method may further include transmitting the common format transaction message from the networked device to a second networked device in the multi-domain ecosystem.

The methods and systems described herein of multi-domain ecosystem secure personalized transactions includes a method of abstracting a protocol in a secure personalized transaction through a multi-domain ecosystem. The method includes receiving an electronic transaction message in a secure personalized transaction comprising a plurality of information fields at a networked device in the multi-domain ecosystem. The method may further include determining with the device a type and a content for each of the plurality of information fields. The method may further include mapping at least a portion of the plurality of information fields to common format message fields. The method may further include configuring a common format transaction message based on the mapping. The method may further include wrapping the common format transaction in a protocol abstraction content wrapper. The method may further include transmitting the wrapped common format transaction message from the networked device to a second networked device in the multi-domain ecosystem.

Figure 40:
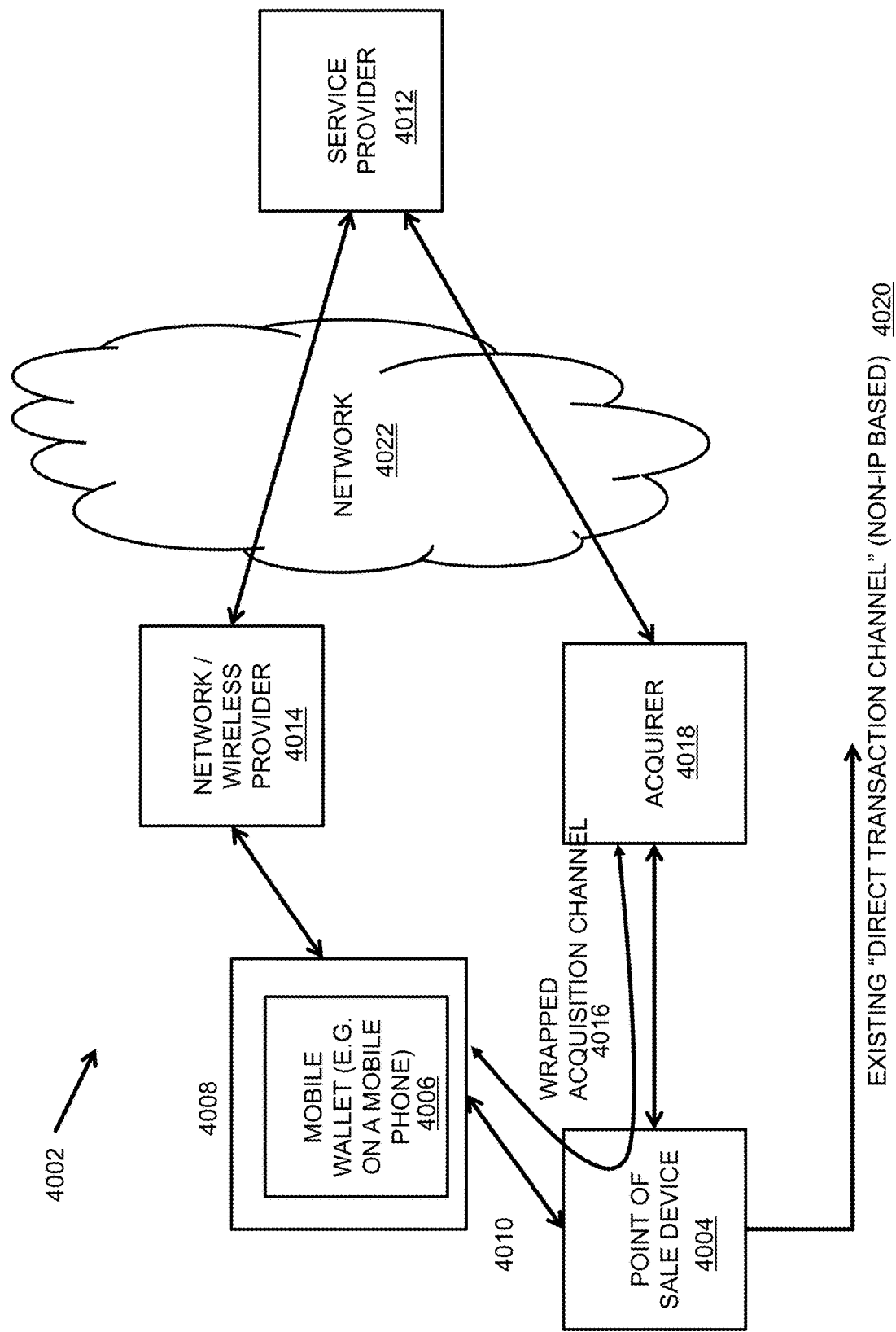
FIG. 40 illustrates a method of protocol abstraction in a dynamic ecosystem for secure commerce and payment transactions.

With reference to FIG. 40, there is illustrated a method of protocol abstraction in a dynamic ecosystem 4002 for secure commerce and payment transactions according to exemplary and non-limiting embodiments. A point-of-sale device 4004 may connect to a mobile wallet 4006 running on a mobile device 4008. Multiple mobile wallets may be running on the mobile device. The point-of-sale device 4004 may communicate with the mobile wallet 4006 running on the mobile device 4008 over a communication link 4010. The communication link 4010 may be a wired communication link, a wireless communication link, an NFC link, a Bluetooth link, a local area network link, a wide area network link or the like.

With continued reference to FIG. 40, the mobile wallet 4006 running on a mobile device 4008 may communicate with service provider 4012 via a protocol through a network or wireless provider 4014 and a network 4022. The network 4022 may be an Internet Protocol based network. A wrapped acquisition channel 4016 may be established to facilitate protocol abstracted communication among the point-of-sale device 4004, the mobile wallet 4006 running on a mobile device 4008, and an acquirer facility 4018. The wrapped acquisition channel 4016 that may wrap the protocol used for communication as described previously in this specification may facilitate exchanging electronic transaction information via a standardized communication protocol between the point-of-sale device 4004 and the mobile wallet 4006 running on a mobile device 4008 that is seamless to a user of the mobile device 4008. A user of the mobile device 4008 may operate the mobile device at a point-of-sale without necessarily being aware of the type of protocol being used during the POS transaction. In this way, legacy POS devices that only support a non-IP based transaction flow and POS devices that are capable of supporting an aggregated protocol transaction flow (e.g. through an IP network) may be seamlessly operated by the user. The mobile wallet 4006 running on a mobile device 4008 may communicate with service provider 4012 via a protocol through an acquirer 4018 and a network 4016. The network 4016 may be an Internet Protocol based network. The point-of-sale device 4004 may communicate via an existing direct transaction channel 4020. The existing direct transaction channel may be a non-Internet Protocol based channel 4020.

The methods and systems described herein of multi-domain ecosystem secure personalized transactions include a method of a secure personalized transaction through a multi-domain ecosystem. The method includes receiving an electronic transaction message in a secure personalized transaction comprising a plurality of non-confidential information fields at a networked device in the multi-domain ecosystem. The method may further include configuring a token comprising the non-confidential information and transaction identification information at the networked device. The method may further include electronically transmitting the token to a source of the electronic transaction message and to a service provider server disposed in the multi-domain ecosystem. The method may further include transmitting authentication of the token, along with token identification information from the source of the electronic transaction message to the service provider server for authenticating the transaction identified by the token. In an example, the service provider may be an instrument issuer. In an example, the service provider may access confidential information that is not accessible to the networked device to facilitate authenticating the transaction identified by the token. The confidential information may be associated with a digital wallet disposed on a device from which the authentication of the token is transmitted. In an example, transmitting authentication of the token may be facilitated by a provider-specific widget executing on a device from which the electronic transaction message is sourced.

Figure 41:
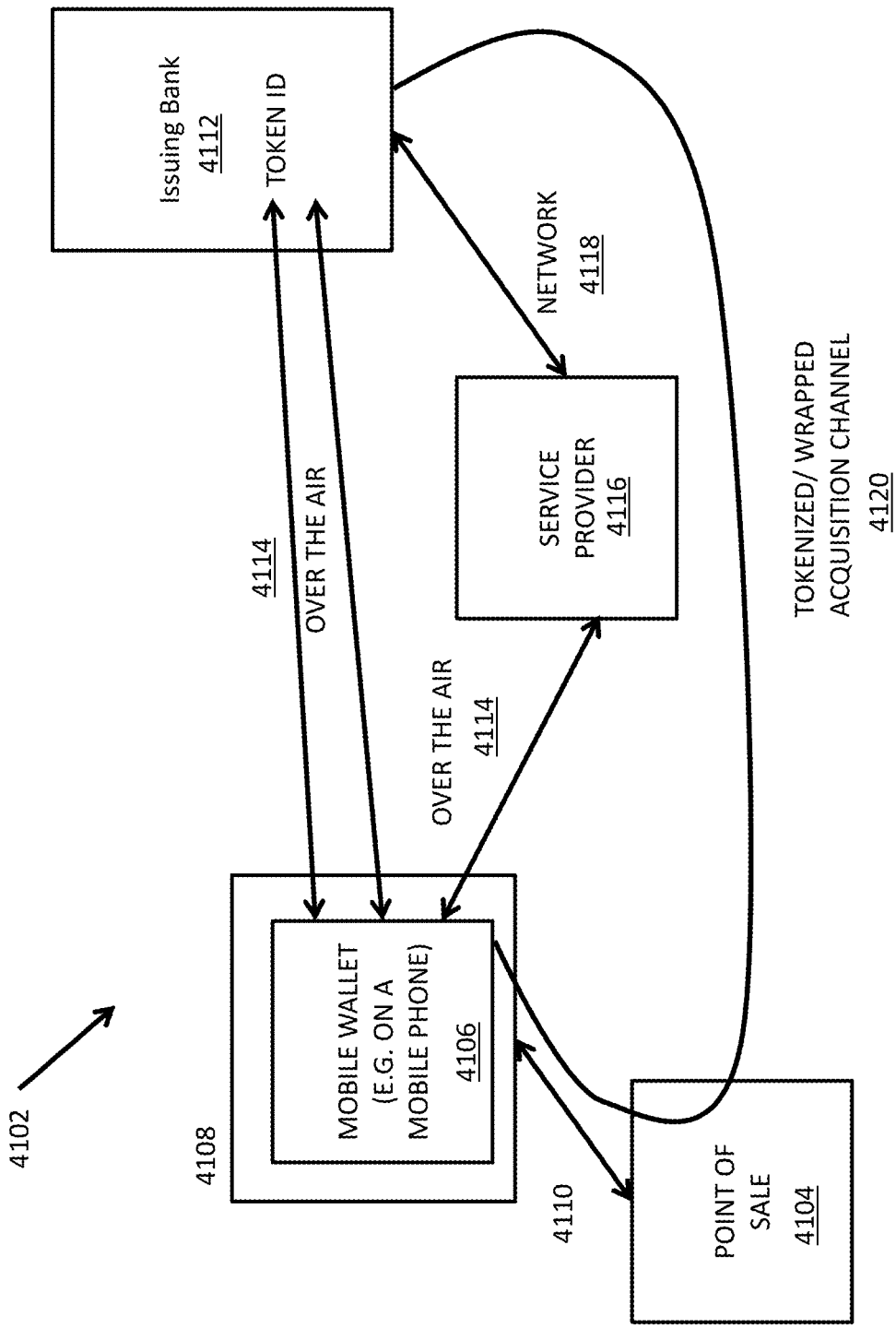
FIG. 41 illustrates a method of tokenization of transaction content in a dynamic ecosystem for secure commerce and payment transactions.

With reference to FIG. 41, there is illustrated a method of tokenization of transaction content in a dynamic ecosystem 4102 for secure commerce and payment transactions according to exemplary and non-limiting embodiments.

A point of sale device 4104 may be activated by near-by presence of a mobile phone that incorporates a mobile wallet 4106 requesting to perform an electronic transaction such as a purchase. The POS device 4104 and mobile wallet 4106 may exchange non-personal information that describes the requested transaction (item, cost, date/time, POS identity, POS service provider identity, and the like) along with a unique identifier generated by the mobile wallet 4106. The POS 4106 may issue a token that incorporates this information in a secure encoding to the mobile wallet 4106 and may also submit a version of the issued token to a payment authority, such as an issuing bank 4112 that may have been specified by the mobile wallet 4106.

The mobile wallet 4106 and the issuing bank 4112 may subsequently exchange information related to the transaction as described in the token to complete the transaction. In the example, the mobile wallet may submit a query to the issuing bank that includes a reference to the token (e.g. a token ID) that may signal to the issuing bank that the transaction identified in the token is authorized. Alternatively, the issuing bank may submit a request for authorization of the transaction referenced in the token to the mobile wallet. The transaction information of the token received from the POS terminal 4104 and from the issuing bank 4112 may be compared and presented to the user of the mobile device 4108 for authentication. In this way the transaction may be executed without requiring the POS 4104 or other entities in the POS communication path to have access to any user confidential, personal, or financial information because all confidential, personal, and financial information of the user/mobile wallet may be retained on the backend server (e.g. the issuing bank 4112) and may be accessed indirectly through the token that is exchanged among the mobile wallet 4106, the POS terminal 4104, the acquisition channel 4120, and the payment facilitator, such as the issuing bank 4112.

A point-of-sale device 4104 may connect to a mobile wallet 4106 running on a mobile device 4108. Multiple mobile wallets may be running on the mobile device. The point-of-sale device 4104 may communicate with the mobile wallet 4106 running on the mobile device 4108 over a communication link 4110 or based on visual information exchange (e.g. a QR code or bar code, and the like). The communication link 4110 may be a wired communication link, a wireless communication link, an NFC link, a Bluetooth link, a local area network link, a wide area network link or the like. The visual information exchange may include receiving an image with a camera and/or displaying an image on an electronic display.

With continued reference to FIG. 41, the point-of-sale device 4104 may receive private information from the mobile wallet 4106 running on the mobile device 4108, store the private information, then send the private information to an issuing bank 4112 for authorization. The issuing bank may receive the private information directly through an over the air interface 4114, or through a service provider 4116 and a network 4118. Upon authorization, the issuing bank 4112 may replace the private information with a token. The token may consistent of numeric characters, alphabetic characters, a combination of alphabetical and numeric characters, a truncated primary account number with alphabetic and numeric characters replacing the middle digits of the primary account number, and the like. The token may be a one-time use token. The token may be issued by a trusted entity in the dynamic ecosystem for secure commerce and payment transactions. The trusted entity may be a server located at the payment gateway, acquirer, or issuer. The token may be generated as a mathematically reversible cryptographic function, a one-way non-reversible cryptographic function, or assigned through an index function, sequence number or a randomly generated number. The issuing bank 4112 may then return the token to the point-of-sale device 4102. The point-of-sale device 4102 may then replace the private information with the token and store the token. The token may be contained in a wrapper, as described previously in this specification, and communicated among the mobile wallet 4106 running on a mobile device 4108, point-of-sale device 4104, and acquiring bank 4112, through a wrapped acquisition channel 4120.

With continued reference to FIG. 41, the mobile wallet 4106 running on the mobile device 4108, may establish a secure channel with the issuing bank 4112. Upon authorization, the issuing bank 4112 may generate a token and map it to the private information stored at the issuing bank 4112. The token will then be sent to the mobile wallet 4106 running on the mobile device 4108 and the mobile wallet 4106 running on the mobile device 4108 will use the token to complete the transaction at the point-of-sale device 4104. The mobile wallet 4106 running on the mobile device 4108, may generate and store a stack of tokens upon personalization of the mobile wallet 4106 and use these tokens to complete the transaction at the point-of-sale device 4104. The mobile wallet 4106 running on the mobile device 4108, may generate, at the time of the transaction, and use a token to complete the transaction at the point-of-sale device 4104.

Figure 42:
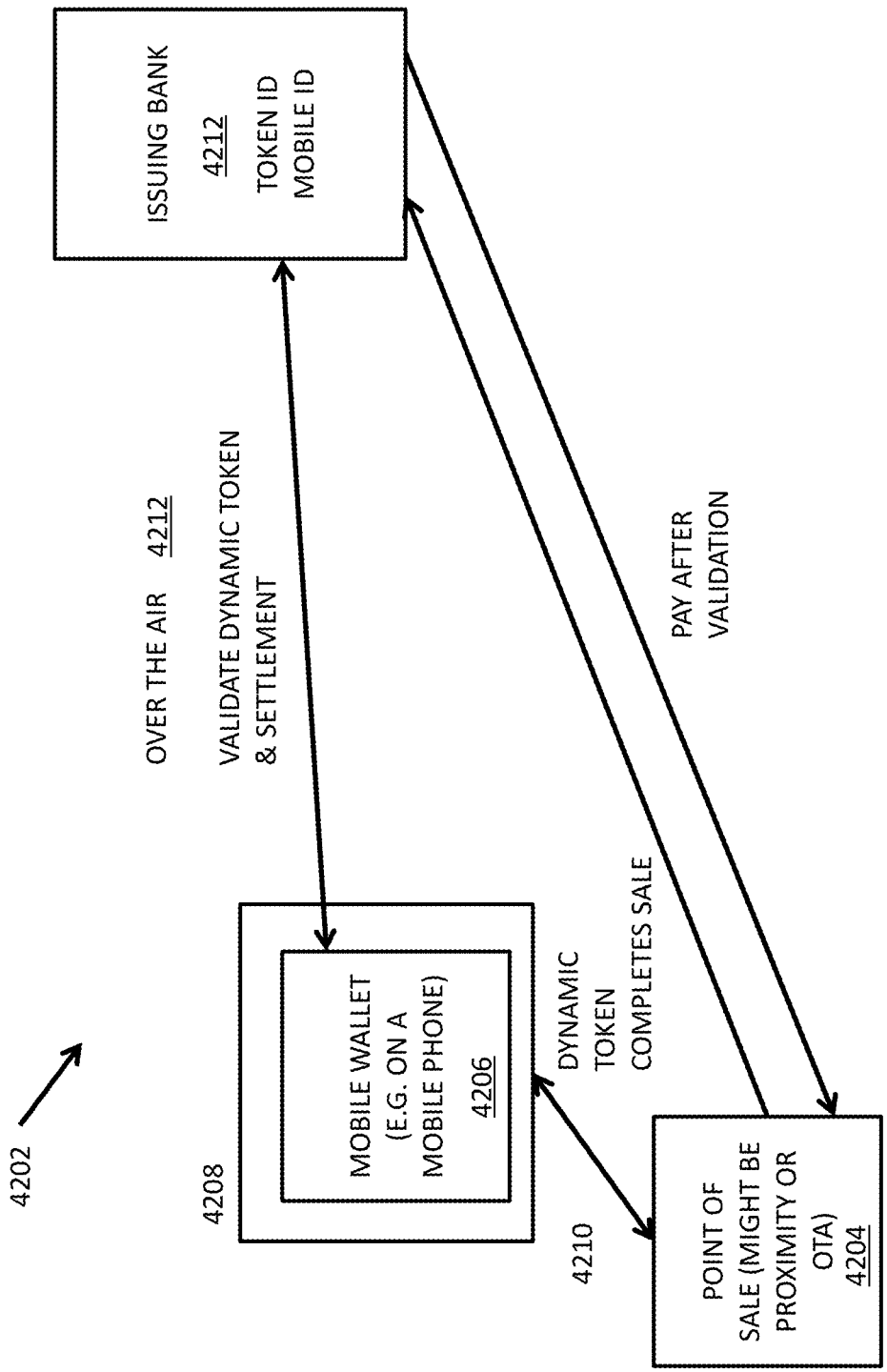
FIG. 42 illustrates a point-of-sale device to receive a dynamic token from a mobile wallet running on a mobile device.

With reference to FIG. 42, there is illustrated a method of dynamic tokenization of transaction content in a dynamic ecosystem 4202 for secure commerce and payment transactions according to exemplary and non-limiting embodiments. A point-of-sale device 4204 may connect to a mobile wallet 4206 running on a mobile device 4208. Multiple mobile wallets may be running on the mobile device. The point-of-sale device 4204 may communicate with the mobile wallet 4206 running on the mobile device C408 over a communication link 4210. The communication link 4210 may be a wired communication link, a wireless communication link, an NFC link, a Bluetooth link, a local area network link, a wide area network link or the like. Visual information exchange may include receiving an image with a camera and/or displaying an image on an electronic display.

With continued reference to FIG. 42, the point-of-sale device 4204 may receive a dynamic token from the mobile wallet 4206 running on the mobile device 4208. The dynamic token may be one of a dynamic token generated by the mobile wallet 4106 running on the mobile device 4108 upon personalization of the mobile wallet 4106, at the time of the transaction, or the like. The point-of-sale device 4204 may then send the dynamic token to the issuing bank 4212 for validation. The issuing bank 4212 may then validate the token via an over-the-air interface 4214 by validating the token and a mobile link ID known by the issuing bank 4212 to be associated with the mobile device 4208 on which the mobile wallet 4206 that generated the token resides. Upon validation of the token and mobile link ID, the issuing bank 4212 then authorized payment on the point-of-sale device 4204 and settlement on the mobile wallet 4206.

The methods and systems described herein of multi-domain ecosystem secure personalized transactions includes a method of token mobile caching that includes generating with a networked server a token for performing an electronic transaction over a public network with a client device. The method may further include providing the token to the client device over the public network. The method may further include storing the token along with information that uniquely identifies the client to which the token was provided in a memory accessible to the server. The method may further include comparing the stored information that uniquely identifies the client to which the token was provided with client identification information received with the token to determine if conducting the electronic transaction should be authenticated. The comparing may be performed in response to receiving an electronic message from a client device at the server to conduct an electronic transaction using the token over the public network. In an example, the electronic message may include information derived from a secure element associated with the client to which the token was provided.

To enhance mobile transaction security, tokenization as described herein may facilitate reducing confidential information exchange among devices. However, even a token may be captured by a third party and attempted to be used for an unauthorized transaction. Therefore, caching of mobile information related to tokenization may ensure that a token is received from a mobile device to which it was delivered. This may be accomplished by sharing token and mobile identification information over a secure acquisition channel between an issuer of the token (e.g. an issuing bank) and a POS/service provider so that when a mobile device provides the token, if the mobile device identification information does not match the token, the transaction can be denied. Likewise, caching of mobile-related information associated with a token may be retained at a payment facilitator such as an issuing bank. This information may be compared to a tokenized acquisition transaction from a POS device. In an example, a mobile device and a bank may exchange information over an IP network so that a token is provided to the mobile device for conducting one or more POS transactions. The mobile device may submit a token to a POS device along with mobile device identification information. This set of information may be optionally further tokenized and/or sent as a set to an issuing bank (e.g. over a secure acquisition channel). The issuing bank may compare the cached mobile related information associated with the token received from the POS device to the mobile device information received from the POS and only authorize the transaction if the information favorably compares.

The methods and systems described herein of multi-domain ecosystem secure personalized transactions include a method of tokenizing a wrapper in a secure personalized transaction through a multi-domain ecosystem. The method may include receiving an electronic transaction message in a secure personalized transaction comprising a plurality of information fields at a networked device in the multi-domain ecosystem. The method may further include determining with the device a type and a content for each of the plurality of information fields. The method may further include mapping at least a portion of the plurality of information fields to common format message fields. The method may further include configuring a common format transaction message based on the mapping. The method may further include wrapping the common format transaction in a protocol abstraction content wrapper. The method may further include configuring a token comprising the protocol abstraction content wrapper. The method may further include transmitting the wrapped common format transaction message from the networked device to a second networked device in the multi-domain ecosystem.

Figure 43:
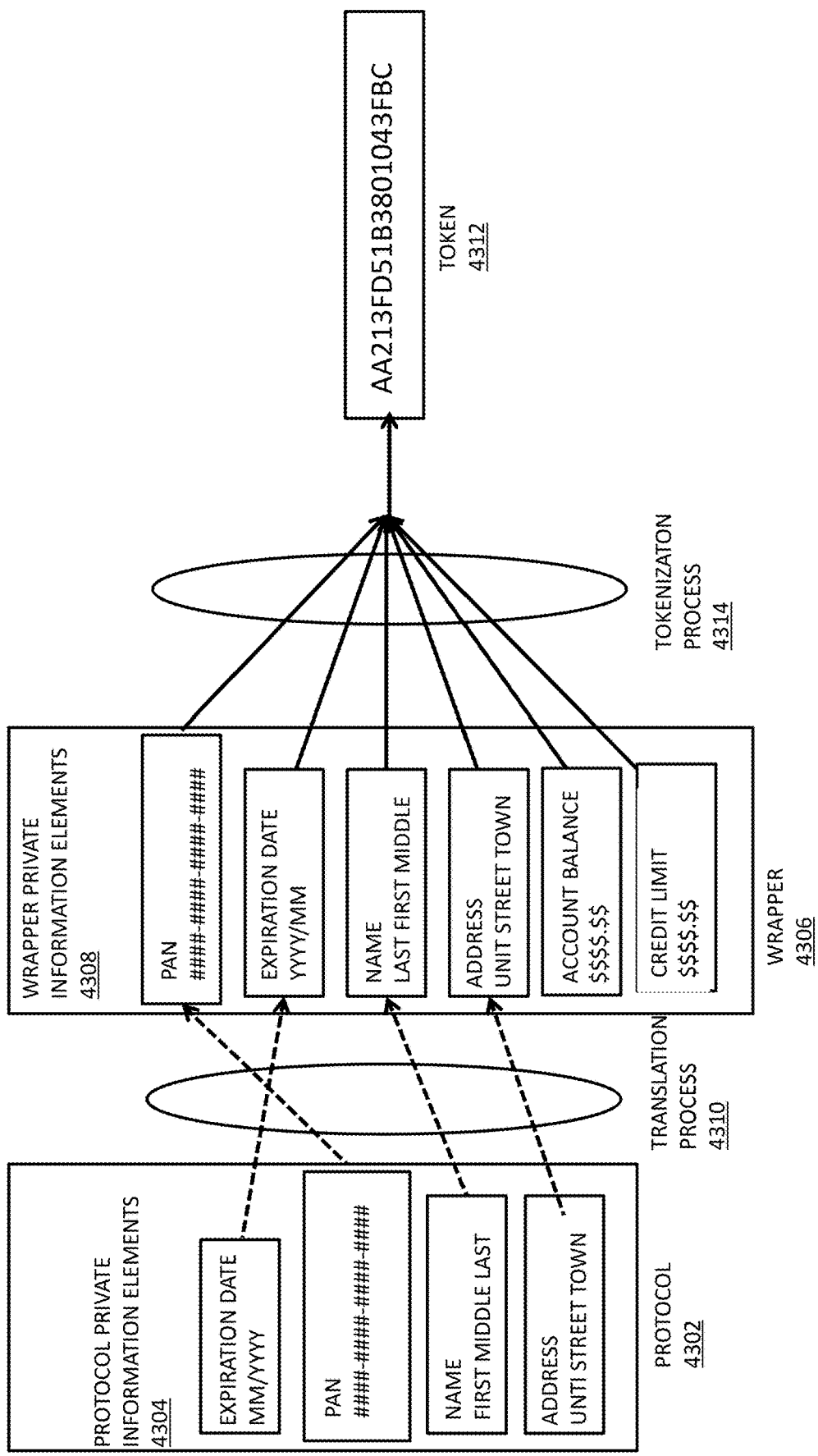
FIG. 43 illustrates a method of generating a token for an electronic transaction wrapper for secure content traversing a network in a dynamic ecosystem for secure commerce and payment transactions.

With reference to FIG. 43, there is illustrated a method of generating a token for an electronic transaction wrapper for secure content traversing a network in a dynamic ecosystem for secure commerce and payment transactions according to exemplary and non-limiting embodiments. A protocol 4302 for a particular ecosystem may be used to store and communicate protocol private information elements 4304 within a dynamic ecosystem for secure commerce and payment transactions. Protocol private information elements may include a credit card expiration date, primary account number (PAN), card holder's name, card holder's address, and the like. The protocol 4302 may organize the protocol private information elements 4304 in a specific order or configuration. For example the expiration date may be held in a first position, the primary account number in the second position, the card holder's name in a third position and the card holder's address in a fourth position. The protocol 4302 may store protocol private information elements 4304 in a particular configuration. For example, a protocol 4302 may store the credit card expiration date in a MM/YYYY format.

With continued reference to FIG. 43, a wrapper 4306 may be used to store and communicate wrapper private information elements 4308 for multiple ecosystems among dynamic ecosystems for secure commerce and payment transactions. Wrapper private information elements may include a credit card expiration date, primary account number (PAN), card holder's name, card holder's address, account balance, credit limit, and the like. The wrapper 4306 may organize the wrapper private information elements 4308 in a specific order or configuration. For example the primary account number may be held in a first position, the expiration date in the second position, the card holder's name in a third position, the card holder's address in a fourth position, the account balance in a fifth position, and the credit limit in a sixth position. The wrapper 4302 may store protocol private information elements 4306 in a particular configuration. For example, a wrapper 4306 may store the credit card expiration date in a YYYY/MM format.

With continued reference to FIG. 43, a translation process 4310 may be used to map protocol private information elements 4304 to wrapper private information elements 4308. For example the translation process 4314 may take the expiration date protocol private information element from the first position of the protocol 4302 and place it in the second position of the wrapper 4306 and translate the configuration of the private information element, MM/YYYY, to match the configuration of the wrapper information element YYYY/MM.

With continued reference to FIG. 43, a tokenization process 4314, may be used to replace the wrapper private information elements with a token 4312. The token 4312 may consistent of numeric characters, alphabetic characters, a combination of alphabetical and numeric characters, a truncated primary account number with alphabetic and numeric characters replacing the middle digits of the primary account number, and the like. The token 4312 may be a one-time use token 4312. The token 4312 may be issued by a trusted entity in the dynamic ecosystem for secure commerce and payment transactions. The trusted entity may be a server located at the payment gateway, acquirer, or issuer. The token 4312 may be generated as a mathematically reversible cryptographic function, a one-way non-reversible cryptographic function, or assigned through an index function, sequence number or a randomly generated number.

The methods and systems described herein of multi-domain ecosystem secure personalized transactions include a method of tokenizing a wrapper in a secure personalized transaction through a multi-domain ecosystem. The method may include receiving a wrapper for an electronic transaction message in a secure personalized transaction at a networked device in the multi-domain ecosystem. The method may further include configuring a token comprising the wrapper and transaction identification information at the networked device. The method may further include electronically transmitting the token to a source of the wrapper for an electronic transaction message and to a service provider server disposed in the multi-domain ecosystem. The method may further include transmitting authentication of the token, along with token identification information from the source of the wrapper for an electronic transaction message to the service provider server for authenticating the transaction identified by the token. In an example, the service provider may be an instrument issuer. In an example, the service provider may access confidential information that is not accessible to the networked device to facilitate authenticating the transaction identified by the token. In an example, the confidential information may be associated with a digital wallet disposed on a device from which the authentication of the token is transmitted. In an example, transmitting authentication of the token may be facilitated by a provider-specific widget executing on a device from which the wrapper for an electronic transaction message is sourced.

Figure 44:
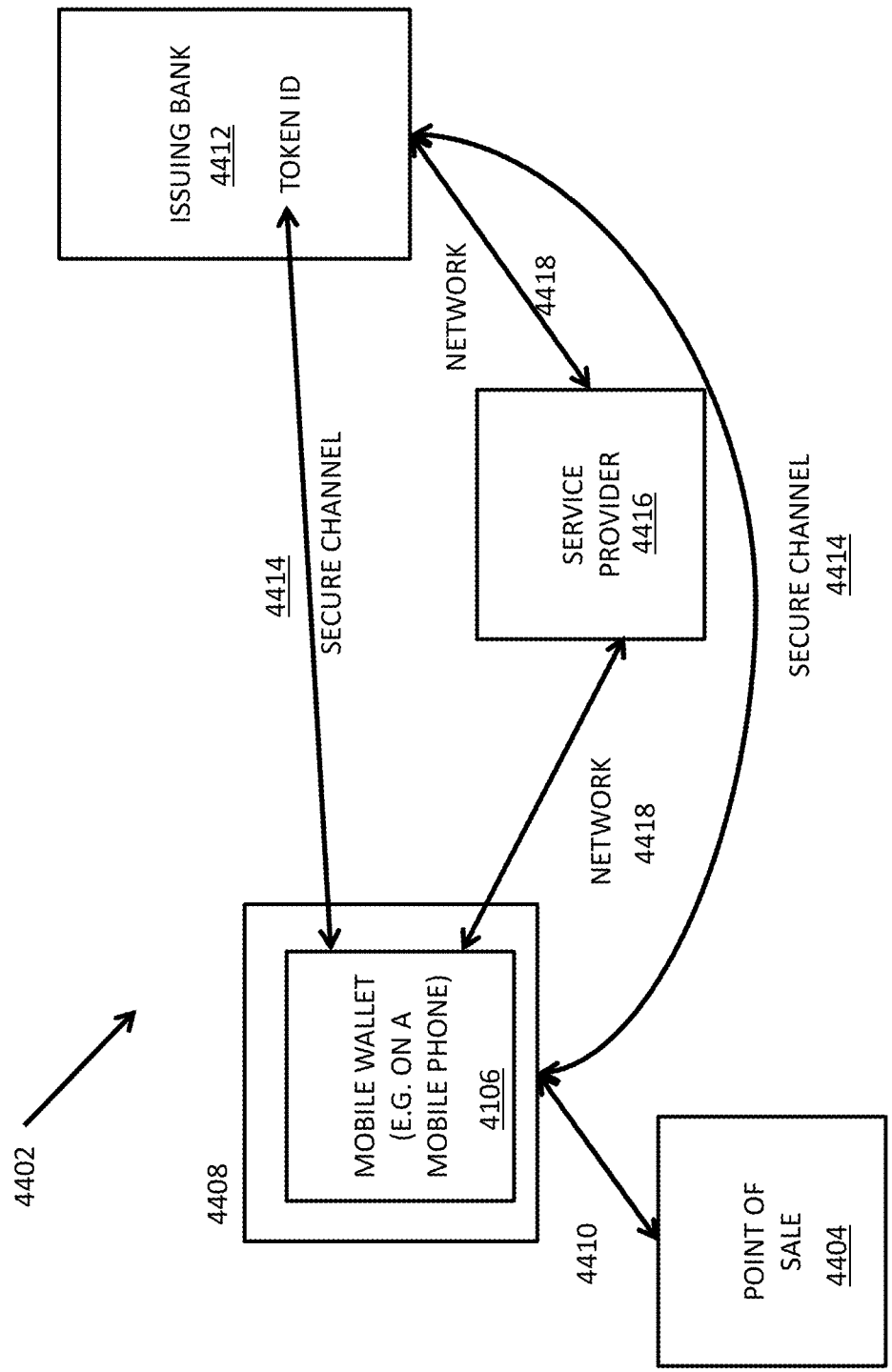
FIG. 44 illustrates a method of tokenization of a transaction wrapper in a dynamic ecosystem for secure commerce and payment transactions.

With reference to FIG. 44, there is illustrated a method of tokenization of transaction wrapper in a dynamic ecosystem 4402 for secure commerce and payment transactions according to exemplary and non-limiting embodiments. A point-of-sale device 4404 may connect to a mobile wallet 4406 running on a mobile device 4408. In exemplarily and non-limiting embodiments, multiple mobile wallets may be running on the mobile device. The point-of-sale device 4404 may communicate with the mobile wallet 4406 running on the mobile device 4408 over a communication link 4410. The communication link 4410 may be a wired communication link, a wireless communication link, an NFC link, a Bluetooth link, a local area network link, a wide area network link or the like.

With continued reference to FIG. 44, the mobile wallet 4406 running on the mobile device 4408, may establish a secure channel with the issuing bank 4412. The secure channel 4414 may be established directly between the mobile wallet 4406 running on the mobile device 4408 or through an over the air interface 4414, such as through a service provider 4416 and a network 4418. Upon authorization, the issuing bank 4412 may generate a token and map it to the wrapper information stored at the issuing bank 4412. The token will then be sent to the mobile wallet 4106 running on the mobile device 4108 and the mobile wallet 4106 running on the mobile device 4408 will use the token to complete the transaction at the point-of-sale device 4404. The mobile wallet 4406 running on the mobile device 4408, may generate and store a stack of tokens upon personalization of the mobile wallet 4406 and use these tokens to complete the transaction at the point-of-sale device 4404. The mobile wallet 4406 running on the mobile device 4408, may generate, at the time of the transaction, and use a token to complete the transaction at the point-of-sale device 4404.

The methods and systems described herein of multi-domain ecosystem secure personalized transactions includes a method for performing tokenized electronic transactions in a multi-domain ecosystem for secure personalized transactions. The method includes generating a token representing an electronic transaction message that identifies at least one transaction and at least one ecosystem participant in the transaction. The method may further include wrapping the token representing the electronic transaction message and providing a wrapper that may include a token representing an electronic transaction message. The method may further include generating a token representing the wrapper and providing a tokenized wrapper for a tokenized representation of an electronic message. The method may further include performing an electronic transaction between two participants in the ecosystem by transmitting the tokenized wrapper between two the two participants. In an example one of the two participants in the ecosystem may be the at least one ecosystem participant.

Figure 45:
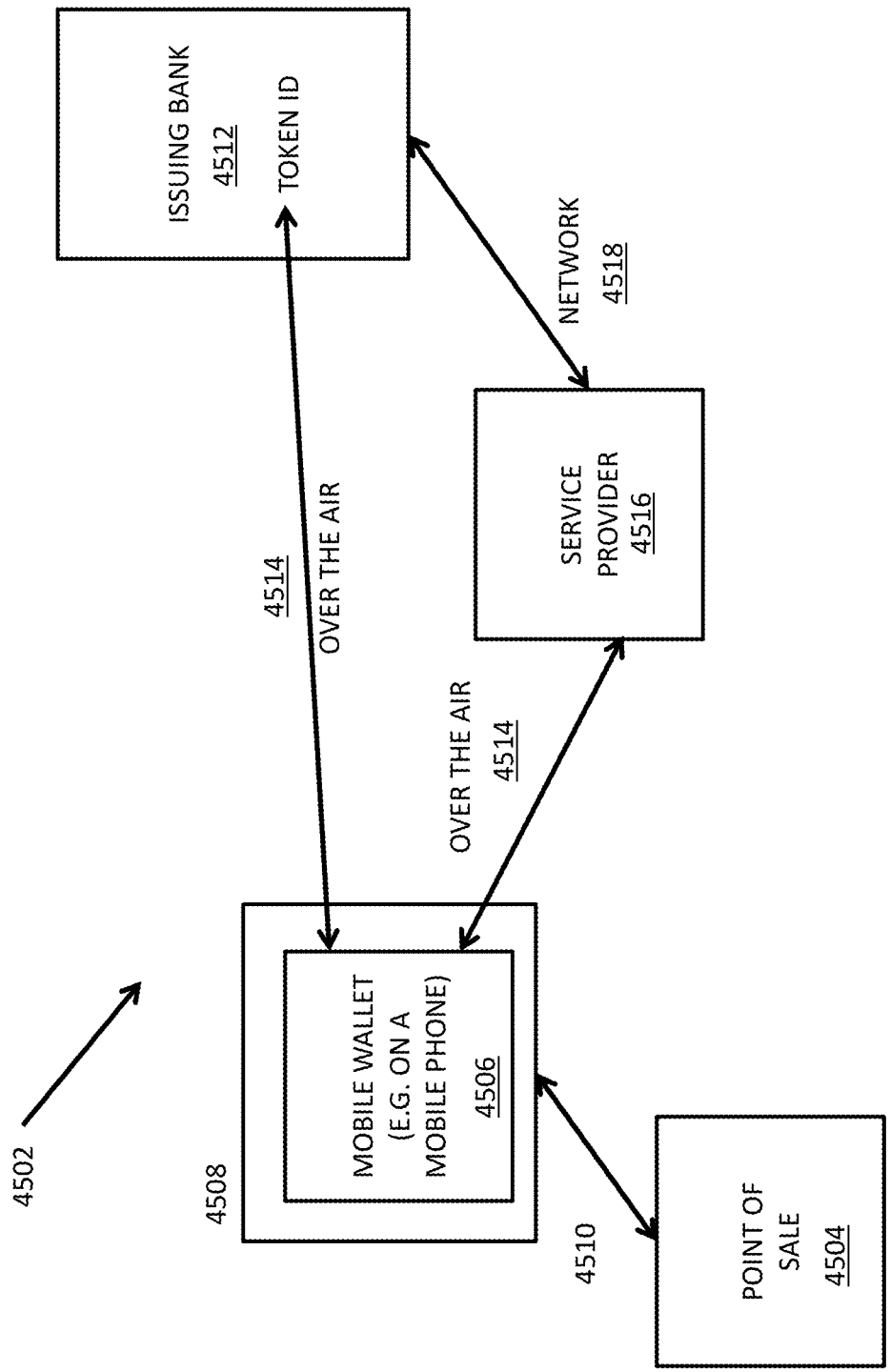
FIG. 45 illustrates a method of performing electronic transactions across an open network by transmitting a dynamically generated tokenized wrapper that includes a token representing transaction content in a dynamic ecosystem for secure commerce and payment transactions.

With reference to FIG. 45, there is illustrated a method of performing electronic transactions across an open network by transmitting a dynamically generated tokenized wrapper that includes a token representing transaction content in a dynamic ecosystem 4502 for secure commerce and payment transactions according to exemplary and non-limiting embodiments. A point-of-sale device 4504 may connect to a mobile wallet 4506 running on a mobile device 4508. Multiple mobile wallets may be running on the mobile device. The point-of-sale device 4504 may communicate with the mobile wallet 4506 running on the mobile device 4508 over a communication link 4510. The communication link 4510 may be a wired communication link, a wireless communication link, an NFC link, a Bluetooth link, a local area network link, a wide area network link or the like.

With continued reference to FIG. 45, the point-of-sale device 4504 may receive tokenized information from the mobile wallet 4506 running on the mobile device 4508, wrap the tokenized information in a tokenized wrapper and send the wrapper information to the mobile device which may communicate the tokenized wrapper that includes tokenized content to an issuing bank 4512 associated with the mobile wallet for authorization. The mobile device 4508 may transmit the tokenized wrapper with tokenized content to the issuing bank directly through an over the air interface 4514 or through a service provider 4516 and a network 4518. The tokenized information and/or the tokenized wrapper may consistent of a numeric characters, alphabetic characters, a combination of alphabetical and numeric characters, a truncated primary account number with alphabetic and numeric characters replacing the middle digits of the primary account number, and the like. The token may be a one-time use token. The token may be issued by a trusted entity in the dynamic ecosystem for secure commerce and payment transactions. The trusted entity may be a server located at the payment gateway, acquirer, or issuer. The token may be generated as a mathematically reversible cryptographic function, a one-way non-reversible cryptographic function, or assigned through an index function, sequence number or a randomly generated number.

In an example of protocol abstraction in transaction flow that includes multiple acquisition methods with multiple issuing banks a merchant may wish to utilize multiple payment information acquisition devices from multiple issuing banks, such as near-field communication (NFC), a barcode reader, and Bluetooth, in order to offer choices in payment methods to the merchant's customers. In this example, protocol abstraction would be used at the merchant's point-of-sale terminal, in order to allow the multiple payment acquisition devices to communicate to a single point-of-sale terminal, via a single communication protocol and link, such as Internet Protocol, by abstracting the individual acquisition protocols for each acquisition device, into a single protocol understood by the merchant's point-of-sale terminal, which can then be routed to multiple issuing banks, over one or more communication protocols and links.

Figure 46:
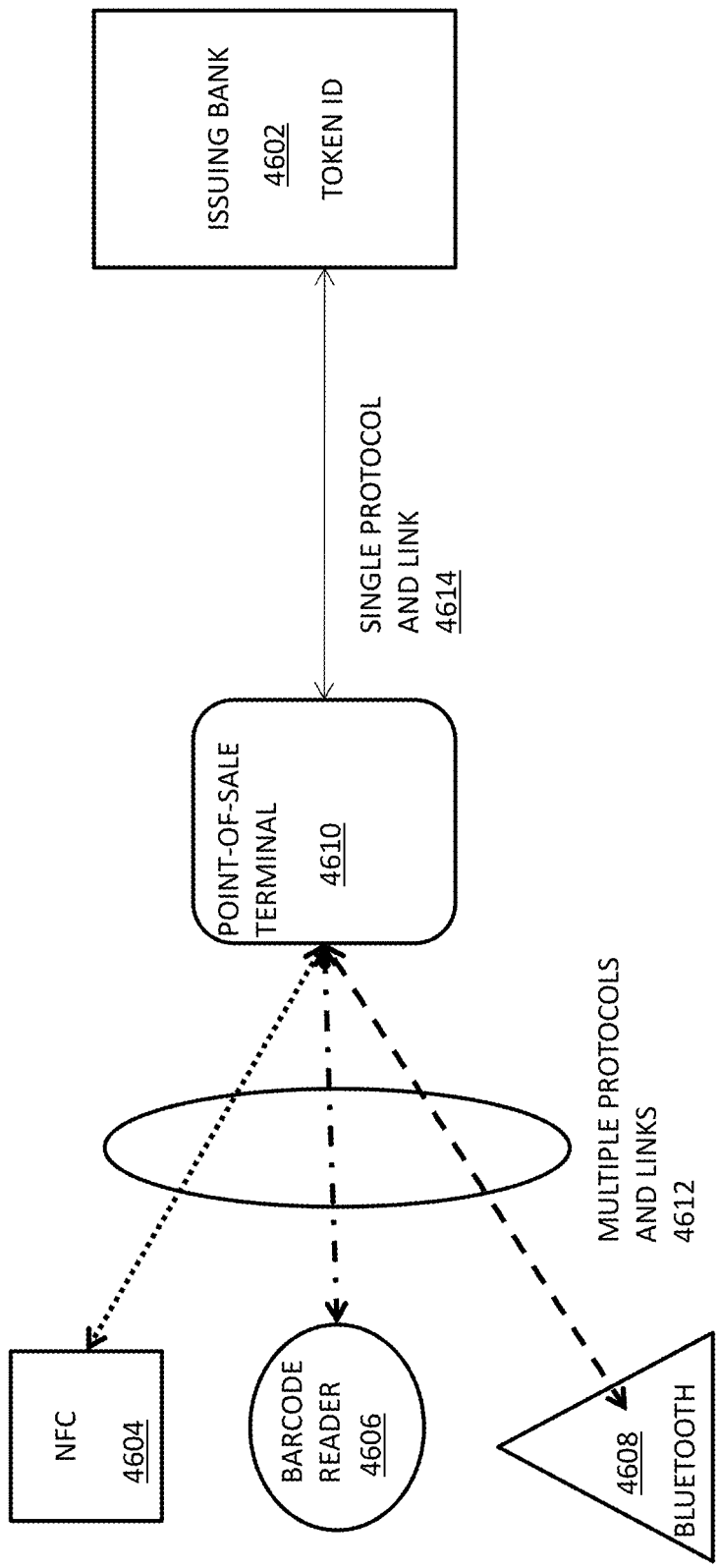
FIG. 46 illustrates a method of protocol abstraction in transaction flow that includes multiple acquisition methods with a single issuing bank.

In an example of protocol abstraction in transaction flow that includes multiple acquisition methods with a single issuing bank, referring to FIG. 46, a merchant may wish to utilize multiple payment information acquisition devices from a single issuing bank 4602, such as near-field communication (NFC) 4604, a barcode reader 4606, and Bluetooth 4608, in order to offer choices in payment methods to the merchant's customers. In this example, protocol abstraction would be used at the merchant's point-of-sale terminal 4610, in order to allow the multiple payment acquisition devices to communicate to a single point-of-sale terminal, via multiple protocols and links 4612, by abstracting the multiple acquisition protocols for each acquisition device, into a single protocol understood by the merchant's point-of-sale terminal, which can then be routed to the issuing bank, over a single communication protocol and link 4614.

In an example of protocol abstraction in transaction flow that includes a single acquisition method with multiple issuing banks, a merchant may wish to utilize a single payment information acquisition device to acquire payment information from multiple issuing banks, such as near-field communication (NFC), a barcode reader, and Bluetooth, in order to offer choices in payment methods to the merchant's customers. In this example, protocol abstraction would be used from the merchant's point-of-sale terminal, in order to allow the single payment acquisition device to communicate with a single point-of-sale terminal, via a single communication protocol and link, such as Internet Protocol, then abstracting the individual acquisition protocol for the single acquisition device into multiple communication protocols for the multiple issuing banks, allowing the appropriate transactions to be routed to the correct issuing banks, over multiple communication protocols and links.

In an example of protocol abstraction in over-the-air transaction flow that includes multiple acquisition methods and multiple issuing banks, multiple issuing banks may wish to send authorization information to a merchant that utilizes multiple payment information acquisition devices, such as near-field communication (NFC), a barcode reader, and Bluetooth, in order to offer choices in payment methods to the merchant's customers. In this example, protocol abstraction would be used at the merchant's point-of-sale terminal, in order to allow the multiple issuing banks to communicate to a single point-of-sale terminal, via a single communication protocol and link, such as Internet Protocol, by abstracting the individual communication protocols for each issuing bank, into a single protocol understood by the merchant's point-of-sale terminal, which can then be communicated each acquisition device, multiple communication protocols and links.

In an example of protocol abstraction in over-the-air transaction flow that includes multiple acquisition methods and a single issuing bank, a single issuing bank may wish to send authorization information to a merchant that utilizes multiple payment information acquisition devices, such as near-field communication (NFC), a barcode reader, and Bluetooth, in order to offer choices in payment methods to the merchant's customers. In this example, protocol abstraction would be used at the merchant's point-of-sale terminal, which connects to the single issuing bank, via a single communication protocol and link, such as Internet Protocol, and abstracting the individual communication protocol for the issuing bank, into multiple protocols understood by each acquisition device, which can then be communicated to one or more acquisition devices, over one or more communication protocols and links.

Figure 47:
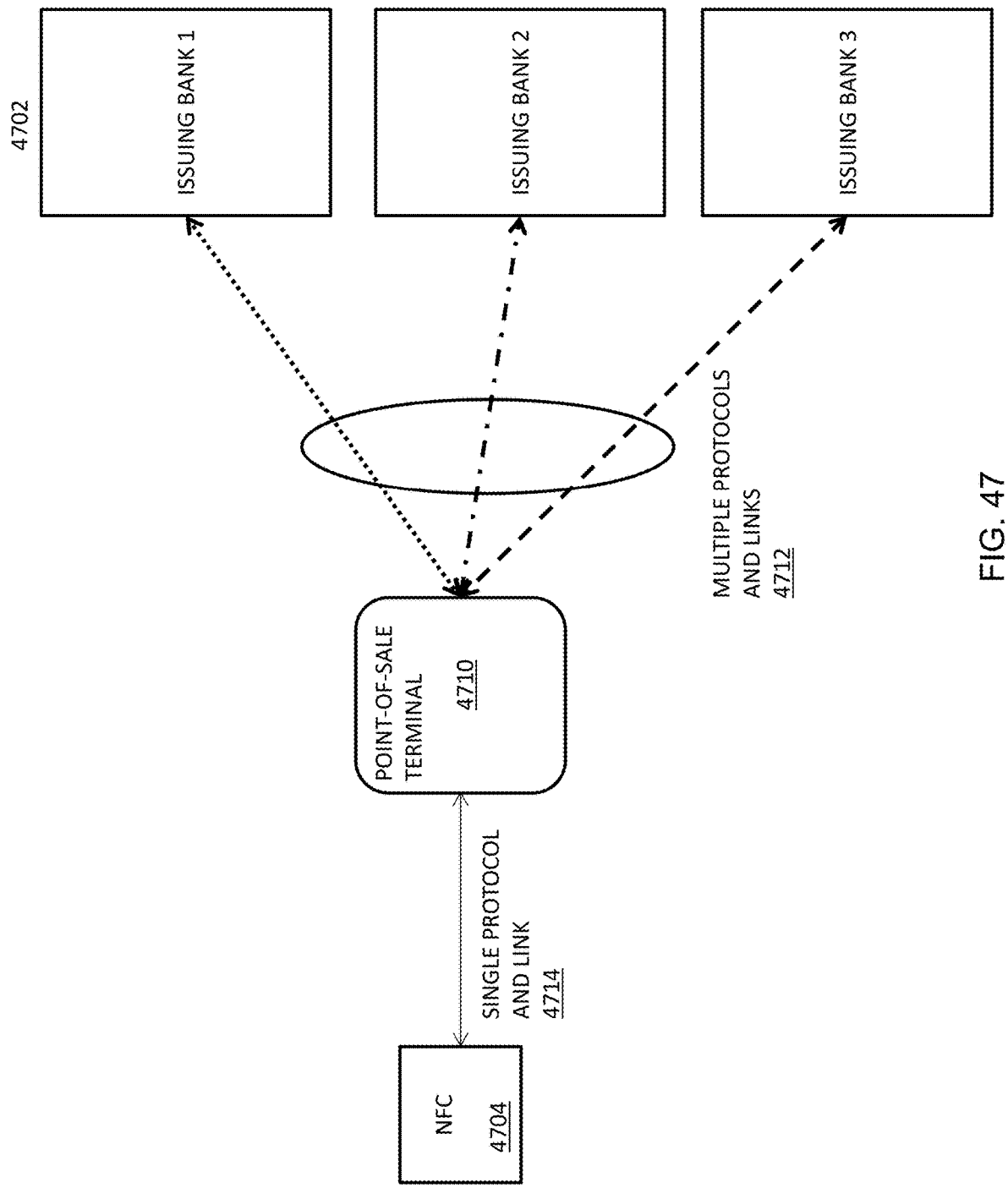
FIG. 47 illustrates a method of protocol abstraction in over-the-air transaction flow that includes single acquisition method and multiple issuing banks.

In an example of protocol abstraction in over-the-air transaction flow that includes single acquisition method and multiple issuing banks (as illustrated in FIG. 47), multiple issuing banks 4702 may wish to send authorization information to a merchant that utilizes a single payment information acquisition device, such as a near-field communication (NFC) device 4704. In this example, protocol abstraction would be used at the merchant's point-of-sale terminal 4710, in order to allow the multiple issuing banks to communicate to a single point-of-sale terminal, via a single communication protocol and link 4712, by abstracting the multiple communication protocols and communication links 4714 used by multiple issuing banks, into a single protocol understood by the merchant's point-of-sale terminal, which can then be communicated to the single acquisition device, via a single communication protocol and link 4712.

Figure 48:
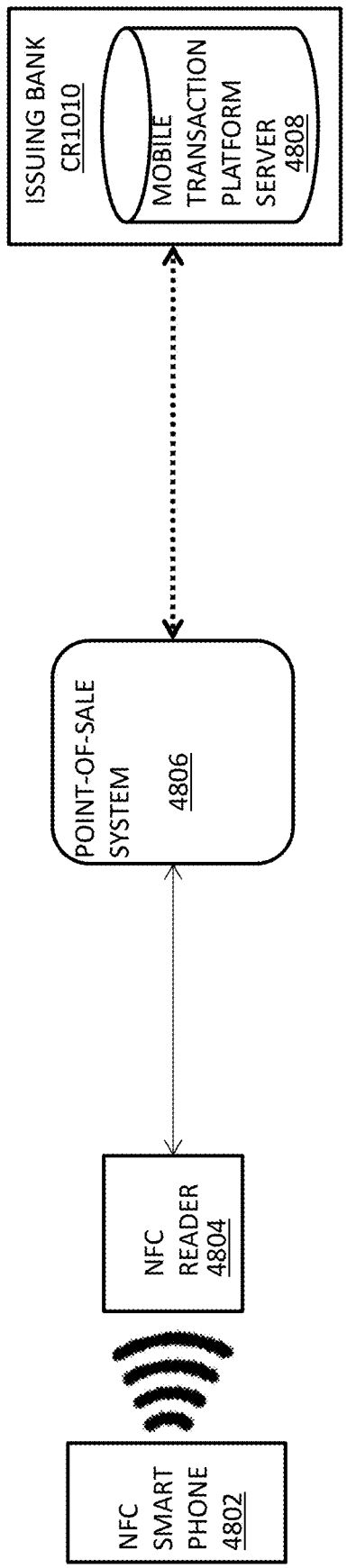
FIG. 48 illustrates a method of tokenized transactions, tokenized protocol abstraction, and tokenized wrapper.

In an example of tokenized transactions, tokenized protocol abstraction, and tokenized wrapper, referring to FIG. 48, a user may present an NFC-enabled smartphone 4802 to a merchant's NFC reader 4804 at a point-of-sale system 4806. The NFC-enabled smartphone 4802 dynamically generates a token that contains the credit card number and expiration date of the user and passes the token through the NFC reader 4804 to the point-of-sale system 4806. The point-of-sale system 4806 passes the token to the mobile transaction platform server 4808 at the issuing bank 4810. The mobile transaction platform server 4808 at the issuing bank 4810 decrypts the token using a key that resides only on the mobile transaction platform server, authenticates the transaction, and sends an authorization code back to the point-of-sale system 4806. The point-of-sale system 4806 then completes the transaction with the user through the NFC reader 4804.

Further in this example, multiple issuing banks may wish to send authorization information to a merchant that utilizes multiple payment information acquisition devices, such as near-field communication (NFC), a barcode reader, and Bluetooth, in order to offer choices in payment methods to the merchant's customers. In this example, protocol abstraction could be used at the merchant's point-of-sale terminal, in order to allow the multiple issuing banks to communicate to a single point-of-sale terminal, via a single communication protocol and link, such as Internet Protocol, by abstracting the individual communication protocols for each issuing bank, into a single protocol understood by the point-of-sale terminal, which can then be communicated each acquisition device, via multiple communication protocols and links.

Also, user A may present an NFC-enabled smartphone to a merchant's NFC reader that uses protocol X and user B may present a bar code displayed on a smartphone to the merchant's bar-code reader that uses protocol Y at the point-of-sale system. The smartphones of both users dynamically generate a tokens that contain the credit card number and expiration date of the respective user and passes the token through the NFC reader for user A and the bar-code reader for user B to the point-of-sale system. The point-of-sale system abstracts the different protocols used by the NFC and bar-code readers to communicate to the point-of-sale into a single protocol that cane used to communicate the information for both tokens to the mobile transaction platform server at the issuing bank via a single protocol and single communication link. The mobile transaction platform server at the issuing bank decrypts the tokens using keys that reside only on the mobile transaction server, authenticates the transactions, and sends authorization codes back to the point-of-sale system. The point-of-sale system then converts the abstracted protocol back into the individual protocols used by the NFC and bar code readers to complete the transactions with User A and User B.

In an alternate example, an issuing bank may wish to send authorization information to a merchant that utilizes multiple payment information acquisition devices, such as near-field communication (NFC), a barcode reader, and Bluetooth, in order to offer choices in payment methods to the merchant's customers. In this example, a tokenized wrapper could be used at the merchant's point-of-sale terminal, in order to allow the multiple issuing banks to communicate to a single point-of-sale terminal, via a single communication protocol and link, such as Internet Protocol, by abstracting the individual communication protocols for each issuing bank, into a single protocol understood by the point-of-sale terminal, which can then be communicated each acquisition device, via multiple communication protocols and links. In yet another example, user A may present an NFC-enabled smartphone to a merchant's NFC reader that uses protocol X and user B may present a bar code displayed on a smartphone to the merchant's bar-code reader that uses protocol Y at the point-of-sale system. The smartphones of both users send the credit card number and expiration date of the respective users and pass the credit card numbers and expiration dates through the NFC reader for user A and the bar-code reader for user B to the point-of-sale system. The point-of-sale system wraps the different protocols used by the NFC and bar-code readers to communicate to the point-of-sale system into a single protocol that can be used to communicate the information for both credit card numbers and expiration dates to the mobile transaction platform server at the issuing bank via a single protocol and single communication link. The mobile transaction platform server at the issuing bank replaces the credit card numbers and expiration dates with tokens and sends the tokens back to the point-of-sale system. The point-of-sale system then converts the wrapped tokens back into the individual protocols used by the NFC and bar code readers and passes the tokens back to the NFC and bar-code readers. The NFC and bar-code readers then replace the credit card numbers and expiration dates with the tokens.

The methods and systems described herein of multi-domain ecosystem secure personalized transactions includes a mobile transaction processing system that includes a plurality of servers and a plurality of client devices deployed in a network. Each server may be configured to facilitate secure personalized transactions among the plurality of client devices and a plurality of service provider servers in the network. Further, at least one of the plurality of client devices may be configured with a multi-tenant capable wallet operable in a container-based execution environment. The wallet may be accessible through a widget that may be disposed on the at least one of the plurality of client devices. Additionally, the plurality of servers may further be configured to facilitate transactions between the at least one of the plurality of client devices through the widget and at least one of the plurality of service provider servers through any of a plurality of trust models including a single trust domain, a single trust cluster, multiple trust clusters, and a direct trust relationship. In an example, the plurality of distinct trust models may include at least one of a single trust domain, a single trust cluster, multiple trust clusters, and direct trust relationship. In an example, the single trust domain may comprise a central wallet service center server that may interface with an electronic wallet on a user device. The central wallet service center server may facilitate establishing secure transaction channels with trusted service providers. In an example, the single trust cluster may comprise a trusted third party server for securely exchanging confidential wallet information with a personal electronic wallet and a wallet service center server for facilitating direct authentication of the user by a each of a plurality of service providers via the third party server. In an example, the wallet service center server may deliver user identification and security keys to at least one of the plurality of service providers. In an example, multiple trust clusters may comprise a plurality of distinct trusted third parties. Each third party may be configured with at least a server for exchanging confidential wallet information with a personal wallet and further for exchanging user and/or device identification provided by a wallet service center with a plurality of cluster-specific service providers.

In an example, a direct trust relationship may comprise a home wallet service center server for establishing transaction context with an electronic wallet. The home wallet service center server may facilitate establishing an authenticated transaction channel directly between the electronic wallet and the service provider. In an example, the widget may be configured for secure interaction with a specific provider. In an example, the widget may be configured for secure interaction through an intermediary with a specific provider. In an example, the widget may be configured on the mobile device over the air through an electronic interaction between the mobile device and a networked server associated with the specific provider.

The mobile transaction platform as described herein may facilitate conducting secure personalized transactions in an ecosystem via a plurality of distinct trust models. Each transaction between a client device in the ecosystem and a service provider server or the like in the ecosystem may be conducted via distinct trust models based on a variety of factors related to the transaction, the ecosystem configuration, and the like. Likewise, a service provider, or other participant in the ecosystem may determine a preferred or default trust model by which transactions are conducted with the service provider. By providing support for transaction-specific trust model determination, the platform may facilitate dynamic trust model determination and transactional use that can be influenced by a plurality of factors including transactional factors, ecosystem instantiation factors, service-provider preference factors, mobile network provider preferences, and the like.

Figure 49:
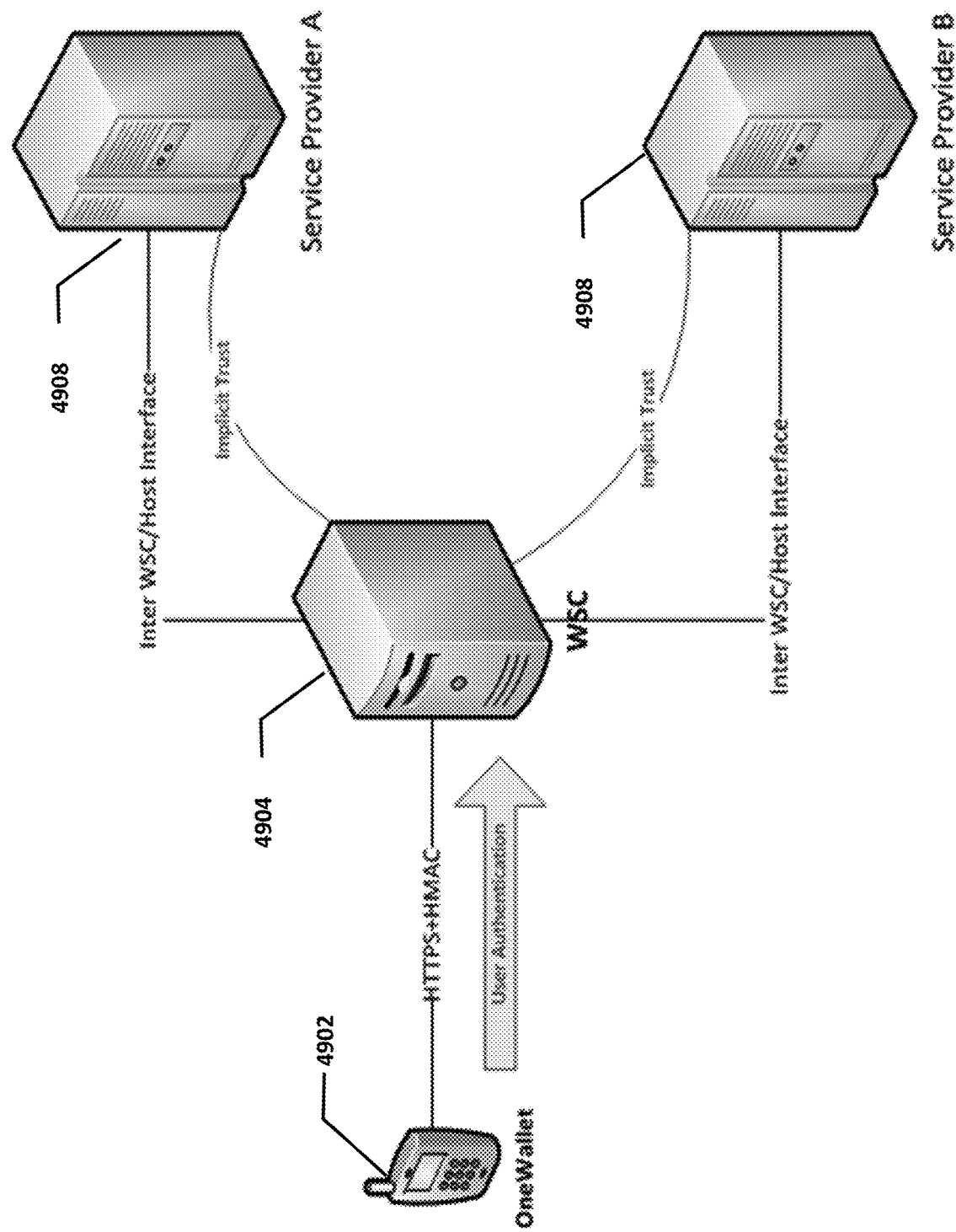
FIG. 49 illustrates an single trust domain model.

Trust models may include single trust domain models, single trust cluster models, multiple trust cluster models, direct trust relationship, and the like. A single trust domain model is characterized by a one-to-one relationship between a mobile device and a mobile transaction platform server (also referred herein as a Wallet Service Center (WSC) server. However, the WSC experiences a one-to-many relationship with implicitly trusted service providers. The device wallet and the WSC handle user authentication, payment authentication, and the like for the service providers who rely on the WSC to ensure transaction and end user integrity. FIG. 49 depicts an embodiment of a single trust domain model. A device wallet 4902 communicates directly with a WSC server 4904 in a one-to-one relationship as described above. Each of a plurality of trusted service provider servers 4908a and 4908b communicate over a network with the WSC server 4904. The WSC server 4904 may perform all wallet and user related authentication, validation, payment approval, and the like, while service providers 4908 implicitly trust the WSC server 4904 for this purpose. A user of the wallet 4902 may conduct transactions through the WSC server 4904 to any of a variety of service providers 4908 without needing to share confidential or personally identifiable information with the service provider.

Figure 50:
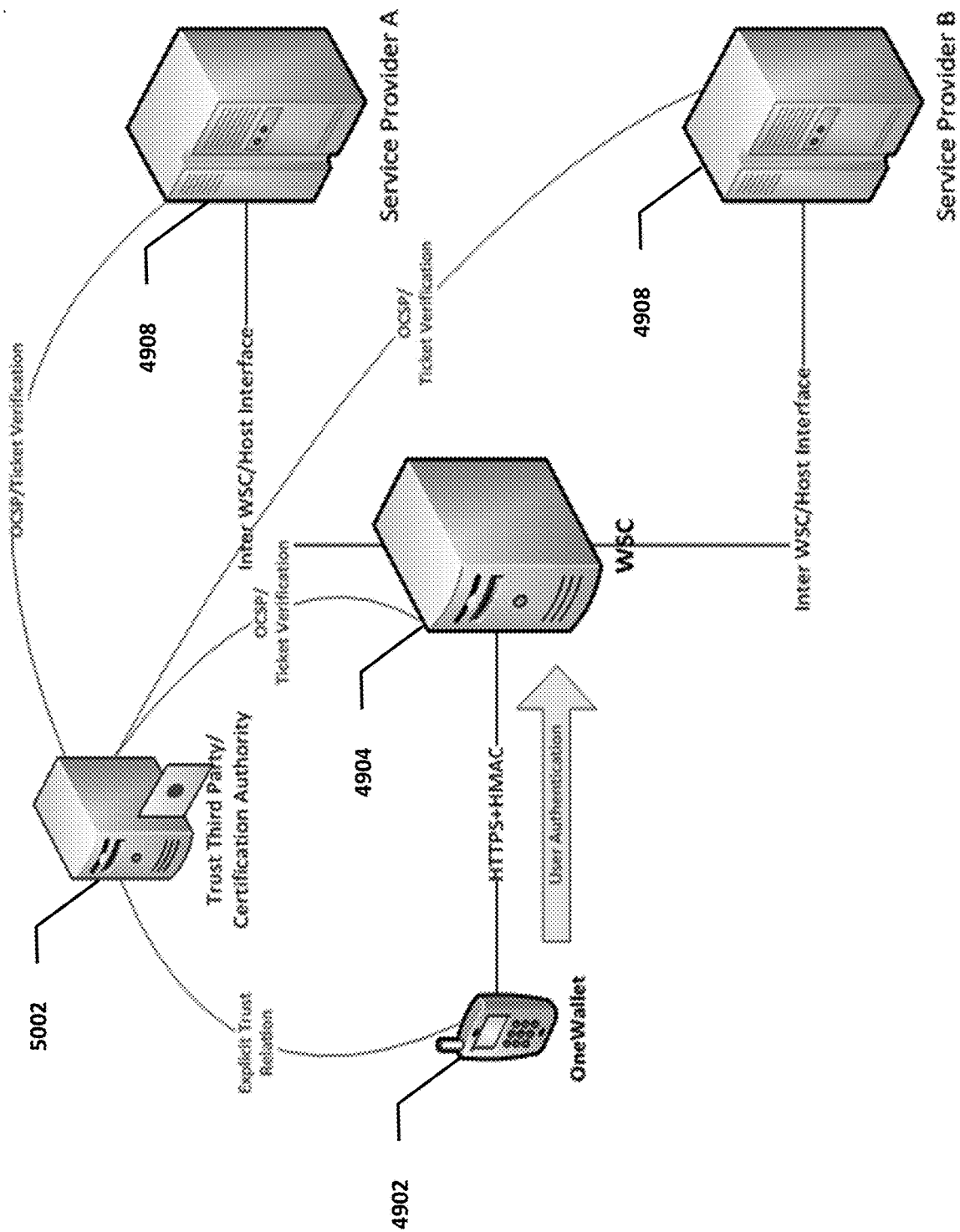
FIG. 50 illustrates the single trust cluster model as illustrated in FIG. 50, which may assume that a trusted third part is accessible in the ecosystem.

Trust models may also include a single trust cluster model as depicted in FIG. 50, which assumes that a trusted third party (TTP) 5002 is accessible in the ecosystem. The service providers 4908 do not maintain a direct trust relationship with the end-user via the device 4902, nor do they maintain an implicit trust relationship with a WSC 4904. Instead, the WSC 4904 performs authentication of the user/mobile device 4902 and may share such authentication via a ticket or token that the mobile device 4902 can explicitly provide to the TTP 5002 where transactions between an end user 4902 and a service provider 4908 may be consummated. An MTP Server 4904 maintains a strong relationship with the TTP 5002, and acts as a user registration entity. For example, in PKI authentication, the MTP Server 4904 acts as an RA (Registration Authority), while CA (Certification Authority) is considered to be a TTP 5002. As noted, service providers do not necessarily trust the MTP Server 4904 for authentication; however, the MTP Server 104 is trusted as an identification provider (IdP). Each service provider 4908 can authenticate the user identified by this ID, using the credentials forwarded by MTP Server 4904. A transaction is conducted via an explicit trust relationship between a wallet 4902 and a TTP 5002, wherein a wallet and a TTP can identify and authenticate each other securely. The Wallet's credentials need not be shared with the MTP Server.

Figure 51:
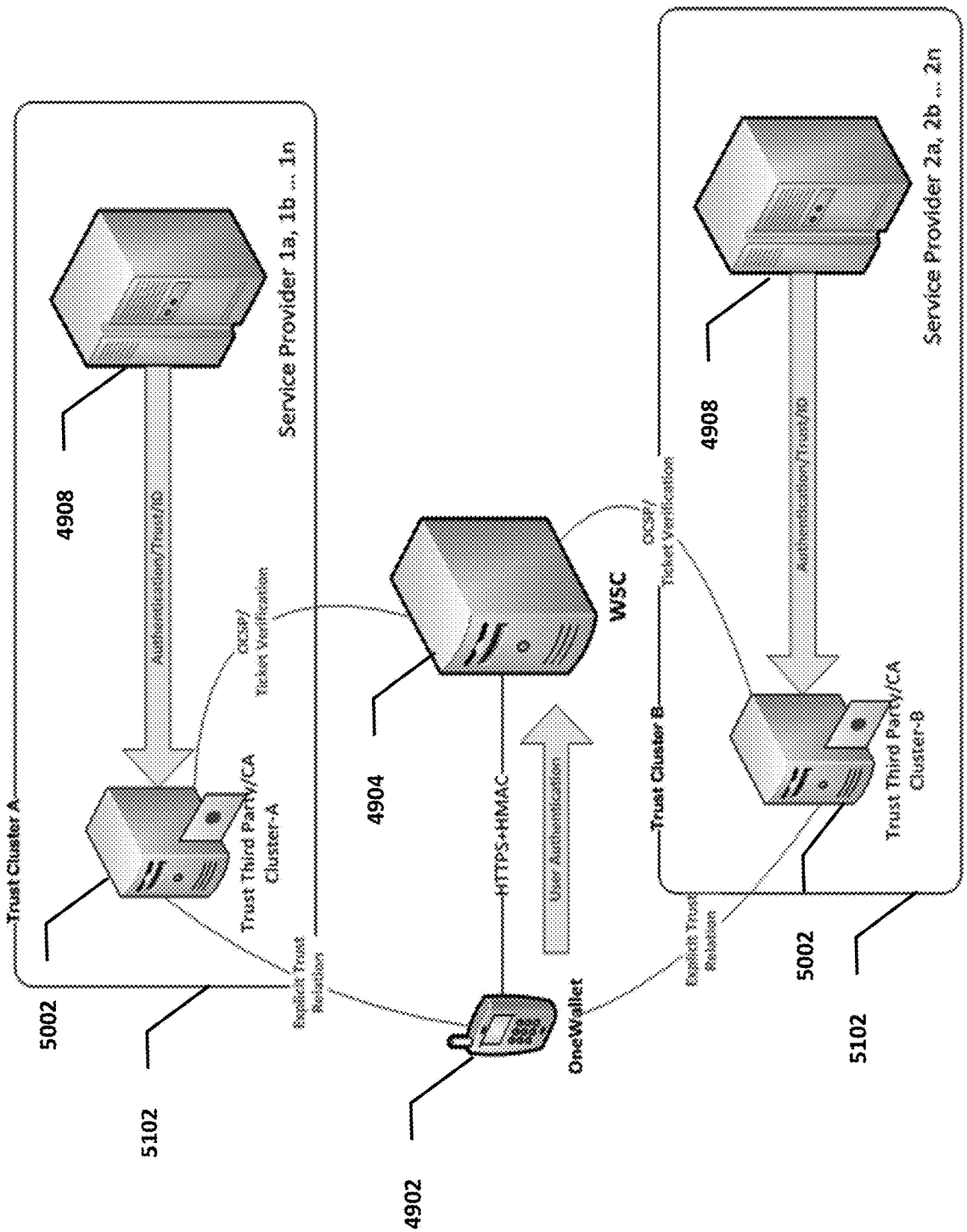
FIG. 51 illustrates a multiple trust cluster model.

Trust models may include a multiple trust cluster model as depicted in FIG. 51, which may include a distinct TTP 5002 for each of a plurality of service provider clusters 5102. Each cluster-specific TTP may establish direct trust with a wallet 4902. The MTP server 4904 performs user registration, identity providing, and the like as depicted and described with respect to FIG. 50.

Figure 52:
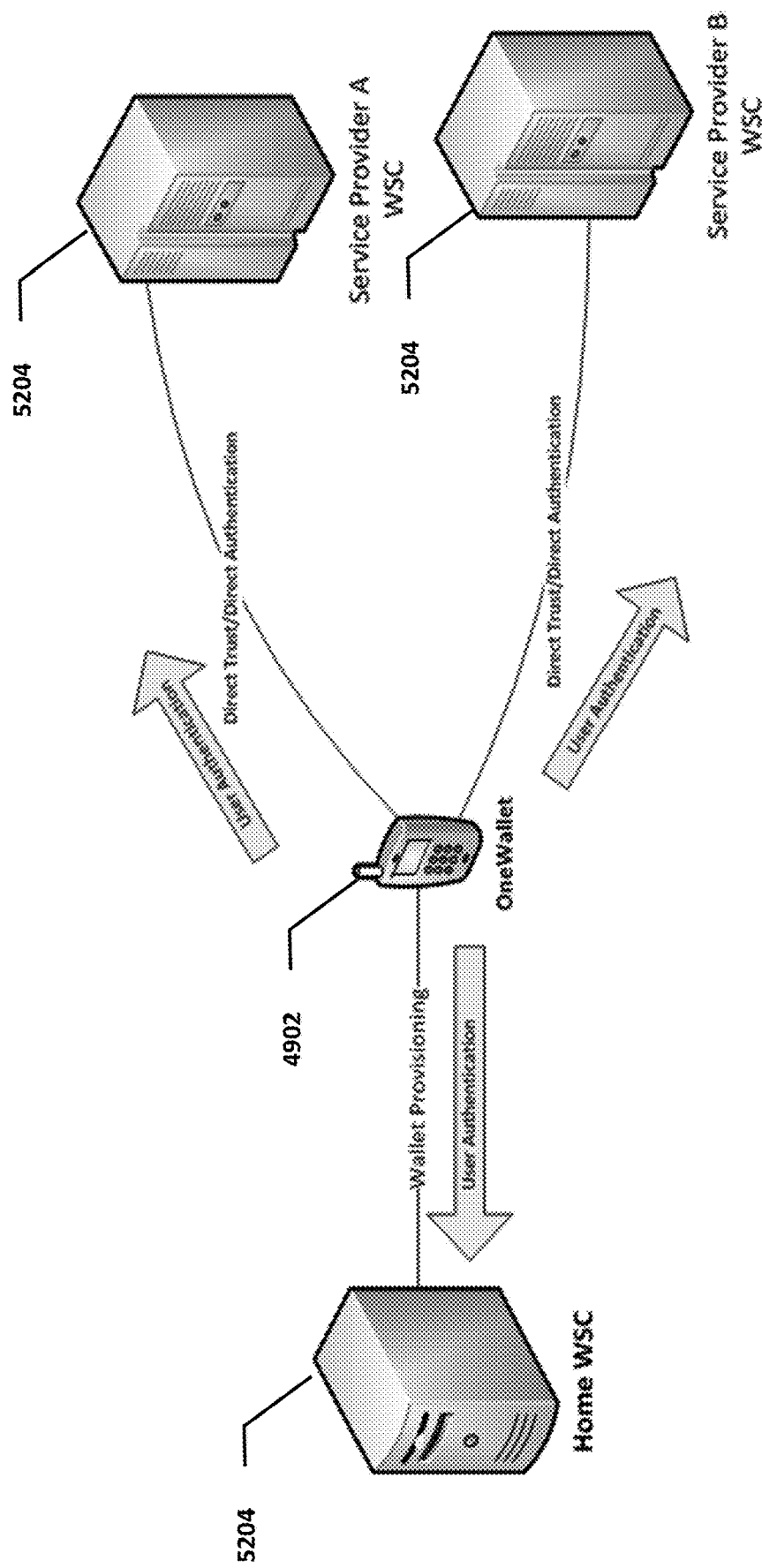
FIG. 52 illustrates a direct trust relationship where no two entities are compelled to trust each other.

Trust models may also include a direct trust relationship as depicted in FIG. 52, in which no two entities are compelled to trust each other. Each service provider 5204 maintains a direct credential with the user/client 4902 and authenticates directly.

The main characteristics of this model include: wallet/user 4902 maintains a credential for each service provider 5204 separately. For each transaction/service, the wallet has to be authenticated by each entity involved in the service fulfillment. A MTP Server does not control all aspects of a transaction; rather a transaction context is shared between each service provider. A wallet can use any type of authentication with the service provider, as far as it meets the security/risk requirements of the service provider. In an example, for a bill issuer authentication can be as simple as user's zipcode and mother's maiden name. For a payment service provider, this can be a credit card CVV or VbV/SecureCode password. Other authentication methods can be incorporated into direct trust relationship models including without limitation, three-dimensional authentication of the user, device, and domain.

The methods and systems of transaction processing with a plurality of trust models may include providing a multi-domain ecosystem platform for secure personalized transactions capable of operating with a plurality of distinct trust models. In such methods and systems a mobile transaction processing system may be configured with a plurality of servers and a plurality of client devices deployed in a network. Each server may be configured to facilitate secure personalized transactions among the plurality of client devices and a plurality of service provider servers in the network. The system may include at least one of the plurality of client devices configured with a multi-tenant capable wallet operable in a container-based execution environment, wherein the wallet is accessible through a widget disposed on the at least one of the plurality of client devices. The plurality of servers in the system may be further configured to facilitate transactions between the at least one of the plurality of client devices via the widget and at least one of the plurality of service provider servers via any of a plurality of trust models including a single trust domain, a single trust cluster, multiple trust clusters, and a direct trust relationship. A single trust domain may comprise a central wallet service center server that interfaces with an electronic wallet on a user device and facilitates establishing secure transaction channels with trusted service providers. A single trust cluster may comprise a trusted third party server for securely exchanging confidential wallet information with a personal electronic wallet and a wallet service center server for facilitating direct authentication of the user by a each of a plurality of service providers via the third party server, wherein the wallet service center server delivers user identification and security keys to at least one of the plurality of service providers. Multiple trust clusters may comprise a plurality of distinct trusted third parties each configured with at least a server for exchanging confidential wallet information with a personal wallet and further for exchanging user and/or device identification provided by a wallet service center with a plurality of cluster-specific service providers. Also, a direct trust relationship comprises a home wallet service center server for establishing transaction context with an electronic wallet that facilitates establishing an authenticated transaction channel directly between the electronic wallet and the service provider. The widget disposed on the client device(s) may be configured for secure interaction with a specific service provider or through an intermediary with a specific provider. The widget may further be configured on the mobile device over the air through an electronic interaction between the mobile device and a networked server associated with the specific provider.

The methods and systems described herein of multi-domain ecosystem secure personalized transactions include a secure mobile wallet operative on a mobile device. The secure mobile wallet may include a plurality of distinct user accounts. In an example, access to a distinct user account may be facilitated by a provider-specific trust model through a widget disposed on the mobile device. In an example, the widget may be configured for secure interaction with a specific provider. In an example, the widget may be configured for secure interaction through an intermediary with a specific provider. In an example, the widget may be configured on the mobile device over the air through an electronic interaction between the mobile device and a networked server associated with the specific provider.

The methods and systems described herein of multi-domain ecosystem secure personalized transactions include a method of trust model determination for a mobile transaction in an ecosystem for secure personalized transactions. The method may include configuring a plurality of servers deployed in a network to facilitate transactions between a client device and a provider-specific server through any of a plurality of trust models. The plurality of trust models may include such as a single trust domain, a single trust cluster, multiple trust clusters, and a direct trust relationship. The method may further include analyzing a default trust model for a transaction between the mobile device and the provider-specific server to determine a measure of risk associated with the transaction. The method may further include conducting the transaction through one of the default trust model and another trust model from the plurality of trust models, based on the resulting measure of risk. In an example, conducting the transaction may include accessing a wallet function on the mobile device via a provider-specific widget executing on the mobile device. The provider-specific widget may be selected based on the resulting measure of risk. In an example, the measure of risk may be based on a location of the mobile device. In an example, the measure of risk may be based on a location of the provider-specific server relative to a location of the mobile device. In an example, the measure of risk may be based on aspects of a network over which the mobile device is conducting the transaction.

The methods and systems of secure personalized transactions in an ecosystem may include a mobile wallet that is capable of operating with a plurality of distinct trust models. Such a secure mobile wallet may be operative on a mobile or other client device and may comprise a plurality of distinct user account. Access to a distinct user account may be facilitated by a provider-specific trust model via a widget disposed on the mobile device. As noted above the widget disposed on the client device(s) may be configured for secure interaction with a specific service provider or through an intermediary with a specific provider. Also as noted above, the widget may further be configured on the mobile device over the air through an electronic interaction between the mobile device and a networked server associated with the specific provider.

The mobile transaction processing system as described herein for providing an ecosystem for secure personalized transactions may facilitate trust model determination for a mobile transaction. Model determination may include configuring a plurality of servers deployed in a network to facilitate transactions between a client device and a provider-specific server via any of a plurality of trust models including a single trust domain, a single trust cluster, multiple trust clusters, and a direct trust relationship. Model determination may further include analyzing a default trust model for a transaction between the mobile device and the provider-specific server to determine a measure of risk associated with the transaction. Based on the resulting measure of risk, the transaction may be conducted via the default trust model or another trust model selected from the plurality of trust models that include a single trust domain, a single trust cluster, multiple trust clusters, and a direct trust relationship.

Conducting the transaction may include accessing a wallet function on the mobile device via a provider-specific widget executing on the mobile device. The provider-specific widget may be selected based on the resulting measure of risk, which may be based on a location of the mobile device or a location of the provider-specific server relative to a location of the mobile device. Also, the measure of risk may be based on aspects of a network over which the mobile device is conducting the transaction.

The methods and systems described herein of multi-domain ecosystem secure personalized transactions include a domain-specific program language for use in an ecosystem. The ecosystem may include an instrument issuer, a service provider, an acquirer, and a client. The domain-specific program language may include a syntax that may be compliant with such as WL, CSS, and Javascript. The language may further include an object that may enable a wallet-related function on a client device. In an example, the enabled wallet-related function may be at least one of a wallet container, a wallet, a widget, and a wallet companion applet.

The mobile transaction platform methods and systems that facilitate secure personalized transactions in a multi-domain ecosystem may include an multi-domain ecosystem domain-specific language that supports XML, CSS, Javascript and the like for creating wallets and widgets that may be configured to operate as a runtime component of a container. Such a language may include one or more objects, tags, metadata elements and the like that may enable a container, wallet, widget, companion applet and the like. The multi-domain ecosystem domain-specific language may provide domain specific Javascript or XML functions to access a variety of modules, functions, and services of the mobile transaction platform. In addition, functions for enabling NFC operations, accessing barcode information, and the like may also be included.

By creating a domain-specific set of functions within a standardized software pattern (e.g. an official language), the domain-specific language reveals functions through standardized patterns so that users and software-related architects may readily determine that a domain-specific language is being patterned. This domain-specific language is applied to software programming and module configuration of an ecosystem that is described herein to, among other things, simplify generating code to take action for that domain. Each domain-specific function may represent a uniquely novel aspect of the domain-specific language. The software development environment of the MTP may allow use of the domain-specific set of functions as a variant of the domain-specific language. In an example, adapting the domain specific-language with a wallet enabling function may provide a modified language that is particularly suited for development of functions that enable creation of services that support secure, personalized, mobile transaction services. A developer can use the MTP domain-specific language to create services based on the set of functions that may be specific for creating secure mobile transactions. As a domain-specific language, there may be provided native tools to check the language; validate the use of it; and ensure that encryption is properly used.

The methods and systems described herein of multi-domain ecosystem secure personalized transactions include a platform for serving secure personalized transactions in a multiple domain ecosystem. The platform may include an interpreter for interpreting domain-specific program language objects for enabling wallet-related functions that are relevant to at least one of the multiple domains. In an example, the interpreter may be a runtime interpreter. In an example, the interpreter may be a runtime container executing on a client device. In an example, the enabled wallet-related function may be at least one of a wallet container, a wallet, a widget, and a wallet companion applet.

In addition to an XML, CSS, and Javascript compliant language, the MTP may include a domain-specific language interpreter that may operate on the client device (e.g. as part of the runtime client). The runtime itself may be a language interpreter, which interprets the code based on the domain-specific language and executes that functionality on the client (e.g. a mobile phone). A client operable runtime (e.g. container) may facilitate interpreting domain specific language elements that are relevant to a domain, such as the multi-domain ecosystems for secure personalized transactions described herein. Although the description of the domain-specific language is based on a standard language that is Javascript, XML, and CSS compliant, the domain-specific language could be based on nearly any interpreted language (e.g. VB script, visual basic, and the like).

Such a domain-specific programming language for use in an ecosystem involving an instrument issuer, a service provider, an acquirer, and a client, may include a syntax that is compliant with XML, CSS, and Javascript, and a domain-specific object/element/tag that enables a wallet-related function on a client device. In particular, the enabled wallet-related function may be a wallet container, a wallet, a widget, a wallet companion applet, or a combination thereof.

A platform for serving secure personalized transactions in a multiple domain ecosystem, such as an MTP may include an interpreter for interpreting domain-specific program language objects for enabling wallet-related functions that are relevant to at least one of the multiple domains. The interpreter may be a runtime interpreter, a runtime container executing on a client device, and the like. Also, the enabled wallet-related function may be at least one of a wallet container, a wallet, a widget, and a wallet companion applet.

The methods and systems described herein of multi-domain ecosystem secure personalized transactions include a set of tools for securing content in a multi-domain ecosystem. The set of tools may include a software development kit for constructing a mobile transaction ecosystem. The set of tools may further include a set of domain-specific functions for enabling client-side functionality of at least one of a widget, a wallet, a container, and a companion applet. The set of tools may further include device agnostic application programming interfaces. The set of tools may further include device-specific application programming interfaces. The set of tools may further include enabling tier functions for facilitating interoperation with client device software and hardware. The set of tools may further include widget publishing modules to facilitate availability of provider-specific widgets for delivery and downloading to a client device.

As described herein, a software development kit (SDK) for a mobile transaction processing platform (MTP) may facilitate securing content in a multi-domain ecosystem for secure personalized transactions. The MTP SDK may provide service provider programmers and the like with tools for implementing and configuring transaction workflows, service provider-specific widgets for use on client devices, wallets that include device specific and device agnostic capabilities that may be accessed through APIs, and the like to secure content. The SDK leverages an on-device runtime container that further facilitates isolating widgets, wallets, and the like to facilitate seamless content security. The runtime container, also referred herein and elsewhere as mClient may also include a user interface framework, and a workflow engine that provide service execution, actions, application (e.g. widget) execution control, scripting, and communication support for a variety of communication channels. The MTP tools for securing content in a multi-domain ecosystem for secure personalized transactions may facilitate a development process that includes defining business requirements, creating user interface flows, developing widgets, applets, and server-based applications, building and testing the developed elements.

The methods and systems described herein of multi-domain ecosystem secure personalized transactions include a network-enabled server for configuring a set of service provider tools for a multi-domain ecosystem for secure personalized transactions. The network-enabled server may include a mobile transaction platform server. The network-enabled server may further include a wallet service center development environment operable on the platform server. The network-enabled server may further include a wallet service center runtime module operable on the platform server. The network-enabled server may further include a software development kit for constructing and maintaining server-based and client-based elements of the ecosystem. In an example, the elements of the ecosystem may include wallets, widgets, companion applets, and containers.

The MTP may comprise a platform for configuring a set of service provider tools for a multi-domain ecosystem for secure personalized transactions. The MTP may comprise a network-enabled server for configuring a set of service provider tools including a wallet service center development environment operable on the network-enabled server, a wallet service center runtime module operable on the server, and a software development kit for constructing and maintaining server-based and client-based elements of the ecosystem. The client-based elements that may be maintained may include wallets, widgets, companion applets, containers, and the like.

A widget configuration capability of a mobile transaction platform may include one or more applications operable on a client device in an ecosystem. The widget configuration application(s) may include a user interface that initially appears as a gray widget. The configuration application may include a user interface by which widget user interface icons and the like may be positioned in the gray widget, customized in look and feel (e.g. layouts, color, etc) and saved on the client device for use as a validated widget. Such a widget configuration application may enable user-specific customization of widget interfaces.

The methods and systems described herein of multi-domain ecosystem secure personalized transactions include a mobile application for in-situ customizing of a portion of a widget. The mobile application may include a user interface template for receiving widget functional code and descriptors from a widget development process performed on a networked server. The mobile application may further include a user interface for facilitating access to widget features and functions through icons defined by a widget descriptor. The mobile application may further include an algorithm for configuring a widget downloaded to the device on which the user interface may be displayed based on user actions detected in the user interface. In an example, the user interface template may be automatically configurable based on the widget descriptor. In an example, the application for in-situ customizing of a portion of a widget may operate on a mobile device. In an example, the application may execute within an mClient container runtime environment.

The MTP may include a mobile application for in-situ customizing of a portion of a widget that may include a user interface template for receiving widget functional code and descriptors from a widget development process performed on a networked server, a user interface for facilitating access to widget features and functions via icons defined by a widget descriptor, and an algorithm for configuring a widget downloaded to the device on which the user interface is displayed based on user actions detected in the user interface. The application may automatically configure the user interface template based on the widget descriptor. The application for in-situ customizing of a portion of a widget may be adapted to operate on a mobile device. The application may execute within an mClient container runtime environment.

The methods and systems described herein of multi-domain ecosystem secure personalized transactions include a server-based application that includes a set of reference mobile transaction platform services. The application may further include an automated wizard application for accessing the set of reference services and configuring at least one service from the set of reference services based on user input. In an example, the automated wizard application may facilitate in configuring at least one of client element distribution, issuer environments, settlement environments, aggregation services, transaction medium support, support for handset types, user experience, business model, and regulatory considerations based on the user input.

The methods and systems described herein of multi-domain ecosystem secure personalized transactions include an ecosystem configuration guidance system that includes a set of reference mobile transaction platform services. The ecosystem configuration guidance system may further include an automated wizard application for receiving user input associated with a desired ecosystem configuration. The automated wizard application may also be operable for recommending a configuration of at least one service from the set of reference services based on the user input. In an example, the set of reference services may include such as distribution services, continuum use services, issuer services, settlement services, aggregation services, transaction medium requirements, handset and operating system considerations, user experience factors, business modeling, and regulatory considerations. In an example, the user input associated with a desired ecosystem configuration may be a hyperlink. In an example, the wizard may search for information based on the hyperlink and may populate at least one reference service template. In an example, the hyperlink may be a link to a website of a service provider operating the wizard.

The mobile transaction platform may further include a wizard to facilitate configuring a plurality of aspects of a multi-domain ecosystem for secure personalized transactions. The wizard may be an automated application or the like that accesses a set of reference mobile transaction platform services and configures at least one service from the set of reference services based on user input. In an example, the automated wizard application facilitates configuring at least one of client element distribution, issuer environments, settlement environments, aggregation services, transaction medium support, support for handset types, user experience, business model, and regulatory considerations based on the user input.

The mobile transaction platform may alternatively include an ecosystem configuration guidance system that may include a set of reference mobile transaction platform services, and an automated wizard application for receiving user input associated with a desired ecosystem configuration and recommending a configuration of at least one service from the set of reference services based on the user input. In an example, the set of reference services may include distribution services, continuum use services, issuer services, settlement services, aggregation services, transaction medium requirements, handset and operating system considerations, user experience factors, business modeling, and regulatory considerations.

The ecosystem configuration guidance system may receive a hyperlink as user input associated with a desired ecosystem configuration. The wizard may search for information based on the hyperlink and may populate at least one reference service template.

In another example, the hyperlink may be a link to a website of a service provider operating the wizard.

A method of type-length variable data communication among participants in an multi-domain ecosystem for secure personalized transactions may include receiving a plain old java object at a producer server that is a participant in the multi-domain ecosystem; converting the received plain old java object to a type length variable stream that complies with a type length variable protocol; and transmitting the converted object via a one-way message bus from producer to a mobile device participant in the multi-domain ecosystem. The plain old java object may conform to type length variable protocol guidelines. The type length variable protocol may support streaming, float support, and prepended runtime class type information.

The present method may provide for a message bus for a mobile transaction platform in a dynamic ecosystem for secure commerce and payment transactions. The message bus may enable the one-way exchange of ancillary data between components within a mobile transaction platform (MTP). The message bus may be channel agnostic to allow the exchange of data through multiple channels. The multiple channels may be proprietary protocol channels, a short-messaging-service (SMS) channel, the push notification framework of a mobile network operator, and the like. The proprietary protocol channel may be a type length variable (TyLV) protocol channel. The TyLV protocol channel may enable mobile device software to communicate with a transaction platform. The TyLV protocol channel may facilitate the conversion of a plain old java object (POJO) to be converted into a TyLV protocol stream and a TyLV protocol stream to be converted into a POJO. The conversion process may be an automated conversion process. The conversion process may require that the POJO conform to guidelines. The guidelines could require that the POJO: be a publicly defined class, implement the marker interface com.csam.wsc.daf.tylv.TyLVBindObject, have data member values that are all non-final, non-static, non-transient, and public, be a non-negative number, pass null instead of the actual value to indicate an optional value, not be an anonymous class, must provide a default constructor, provide class type information for the decode operation, and the like. The TyLV protocol may also require that member value types be declared. Member value types may be: short and its wrapper Short class, int and its wrapper Integer class, long and its wrapper Long class, Boolean and its wrapper Boolean class, java.math.BigInteger, byte array, java.util.Map and its sub types, java.util.List and its sub types, Composed user defined types implementing TyLVBindObject, java.lang.String, representing java modified UTF encoding, java.util.Date, C-SAM defined com.csam.wsc.core.util.BitSequence class type, and the like. The TyLV protocol may also support other functions. Other functions may include inheritance support for streaming, float support, runtime class type information prepended to the actual data of that class type, and the like. The one-way exchange may enable the sending of data objects without explicitly requiring network round-trips. The ancillary data may not be the primary payload of a service request. The ancillary data may be received and consumed by a consumer, which may reside within a mobile application. The mobile application may be a wallet application or the like. The ancillary data may be produced and sent by a producer. The producer may be a component within the mobile transaction platform.

The message bus for a mobile transaction platform in a dynamic ecosystem for secure commerce and payment transactions may provide for a message. The message may be an atomic packet of data that can be transmitted over a communication link. The message may be any business object that could be exchanged in the form of data through the message bus. The message may be comprised of a message ID and payload. The message ID could be the unique identifier of the message determined by a developer of the system. The payload may be the actual data exchanged between the producer and the consumer. The format of the payload data may be a string. The message may be sent by a component on a channel. The message may be received and processed by a receiver component.

The message bus for a mobile transaction platform in a dynamic ecosystem for secure commerce and payment transactions may provide for a message channel. The message channel may be a virtual pipe that connects a sender component to a receiver component. The sender component may write information to the message channel and the receiver component may read information from the message channel.

The message bus for a mobile transaction platform in a dynamic ecosystem for secure commerce and payment transactions may provide for a message class. The message class may be a platform message or a wallet message. The platform message may not be meant for service consumption and may be consumed and acknowledged by the runtime. A developer may receive a notification for the message in JavaScript and the message may be flagged as consumed. The message may not be able to be acknowledged from JavaScript. An attempt to acknowledge a platform message from JavaScript may be ignored. The wallet message may be made for service consumption and acknowledgement from JavaScript. The wallet message may be produced by the server and may be transformed into an equivalent JSON format and passed to a device.

The message bus for a mobile transaction platform In a dynamic ecosystem for secure commerce and payment transactions may provide for consumers and producers. Consumers may be entities or components responsible for consuming messages. Producers may be entities or components responsible for producing messages. Consumers may be applications running on mobile devices. Producers may be server components. The producer may register against a message ID. The message ID may uniquely identify the message. The consumer of a message may be the runtime if the data is owned by the runtime. The message may be passed to the central message handling function of the container application. The producer may consume an acknowledgement for a message produced by the producer when the message is returned by the consumer to the producer via the message bus.

Figure 53:
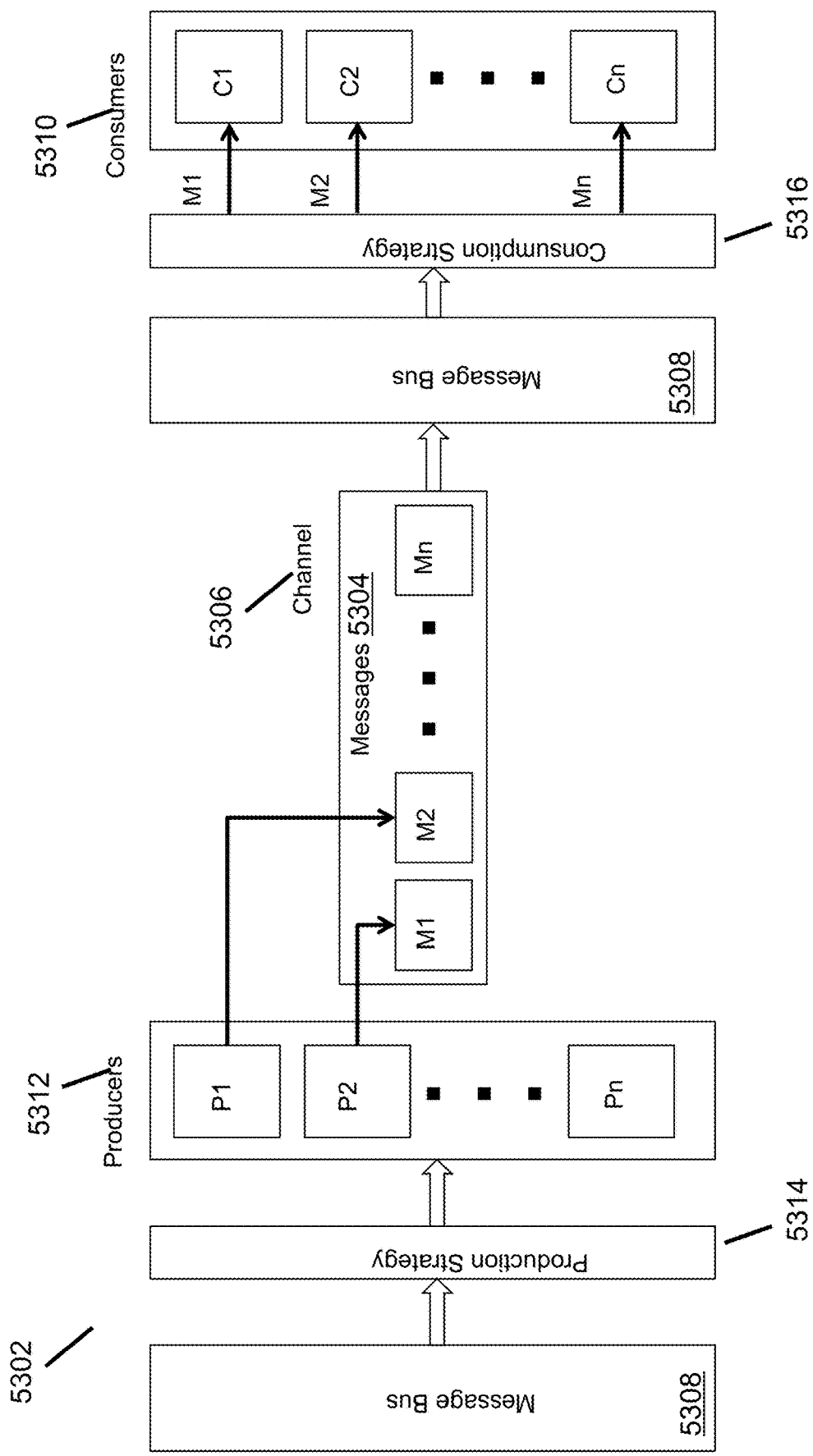
FIG. 53 illustrates message bus communication architecture.

With reference to FIG. 53, there is illustrated a message bus communication architecture 5302 for a mobile transaction platform in a dynamic ecosystem for secure commerce and payment transactions according to exemplary and non-limiting embodiments. A message may be consumed when the messages 5304 arrive through a channel 5306 to a message bus 5308. A channel may be a set of messages. A message 5304 in the channel 5306 may be an item, which will be dispatched to a consumer who has registered for it with the message bus 5308. The messages may be dispatched in the sequence of their occurrence on the channel. Multiple messages 5304 may be dispatched in a batch piggybacked to the same response packet.

With continued reference to FIG. 53, a consumption strategy 5316 may determine the process of dispatch for items. The process may be to dispatch the messages 5304 in the sequence of the messages' occurrence on the channel 5306. Multiple messages may be disputed in a batch piggybacked to the same response packet. A consumer 5310 may send an acknowledgement when it consumes a message 5304 to indicate the successful consumption of the message 5304. The acknowledgement may hold the value indicating the successful or unsuccessful consumption of the message 5304. The acknowledgment may be sent back to the server when a mobile application sends its next request to the server. The acknowledgement may be sent during the next request in the next new application session. The acknowledgement may be sent instantaneously and in real-time by the consumer 5310 initiating a special response sequence to acknowledge processing of the message (804).

With continued reference to FIG. 53, a producer 5312 may begin message production when a response is to be sent via the message bus 5308. The registered producers may produce messages and dispatch them on the output channel. The messages 5304 may then be encoded and the entire list may then be sent via the message bus 5308. A server-based producer may produce a java object which may then be converted to an equivalent JSON object by the mobile transaction platform infrastructure. The production strategy 5314 may dispatch the message on the output channel in the order of the producers registered. The mobile transaction platform server may provide a producer registry where developers register their respective producers. The registration order for the producers may be the order in which the producers are invoked when there is an opportunity to deliver a message.

In accordance with exemplary and non-limiting embodiments, the present disclosure provides a type-mapping scheme and type definition rules for converting any Plain Old Java Object (POJO) to a Type Length Variable (TyLV) stream and vice-versa. The scheme may enable developers to write device based use cases to define POJOs, which may be converted on the fly to the corresponding TyLV stream. In an example, the TyLV stream may be used in accordance with the TyLV protocol which may enable any device based software to communicate with a transaction provider to accomplish a task.

In an embodiment, on the fly streaming may help the developers in abstracting away non-essential streaming details. This in turn may result in freeing the developers from understanding a myriad of TyLV protocol related details. The type mapping scheme and the type definition rules of the present invention may be used in defining device based use cases and other interactions based on the TyLV protocol.

In an example, the mapping and type definition rules may be defined and used as guidelines such as to cause POJOs to be streamed to the TyLV protocol. A POJO which follows these defined set of guidelines may be referred to as a TyLV compliant POJO. In an example, the guidelines may include such as a rule to define a POJO as a publicly defined class. Further, the POJO may implement a marker interface such as com.xyz.wsc.daf.tylv.TyLVBindObject. In an event of failure of such an implementation, runtime errors of the nature of ClassCastException may be generated. in various embodiments, data members of a POJO may be non-final, non-static, non-transient and public (while all other type of objects may be ignored for the purpose of streaming). In an embodiment, POJO members of integral nature may not supply negative values as the failure to do this may result in runtime exceptions being thrown with a message such as "Decoder does not support length computation of negative numbers". The guidelines may include a rule to allow the POJO to declare member variables such as short and its wrapper Short class, integer and its wrapper Integer class, long and its wrapper Long class, boolean and its wrapper boolean class, java.math.BigInteger, bytearray, java.util.Map and its sub types, java.util.List and its sub types, composed user defined types implementing TyLVBindObject, java.lang.String (representing Java modified UTF encoding), java.util.Date, com.csam.wsc.core.util.BitSequence class type, and the like. In an example, specification of a variable of a type such as other than those defined such as other than those mentioned above may result in runtime exceptions. In cases such as where an object is an aggregate object, the object may be declared as a public inner static or non-static class.

In an example, as per the rules specified for a Java class format, a compiler may generate synthetic fields for non-static inner classes.

In an example, the key value pairs such as contained within java.util.Map instance maybe of the type java-.lang.String, and overriding Object.toString may not be very helpful for such key value pairs.

In an alternate example, TyLV protocol implementation may allow Boolean or Boolean data type but internally, it may encode or decode this data types as an 8-bit byte. Thus, a Boolean value true may be treated as 1, and a Boolean value false may be treated as 0. Also, the class type com.xyz-.wsc.core.util.BitSequence supported by TyLV protocol may be internally treated an integer-32 value. Further, the data types may be stringized in a specific format. Additionally, a map containing zero entries may not be allowed and a null may be used to represent map as an optional value.

In an example, systems using TyLV protocol may support the Universal Character Set or UCS Transformation Format (UTF) encoding definition modified by the Java platform, as the java.lang.String types may be Universal Character Set or UCS Transformation Format (UTF) encoded. Further, primitive type members may not be optional.

In an example, byte may be non-empty and composed types may be declared on the basis of their concrete types rather than on the basis of the interface they implement.

In an example, TyLV protocol may support a Homogeneous, variable length, List with objects of same type. The type of objects may be any Java class type or any user defined class type, and may include Wrapper types to support primitive type data.

In an alternate example, additional guidelines related to POJOs may include defining a rule for any POJO or any of its member variables such that passing a null value instead of an actual value may indicate an optional value. Further, a rule may be defined such that a TyLV compliant POJO may not support type inheritance. Also, declaring a POJO or any of its members as an Anonymous Class may result in runtime exceptions. Additionally, a default constructor may need to be provided as the TyLV engine may not be able to use a defined constructor.

In an example, additional guidelines related to POJOs may include a rule such that a TyLV codec may require a class type information for decode operation, so that the TyLV engine may correctly identify the BindObject interface implementation type or List content object type which may be populated with decoded data appropriately. In an example, the class type information may be provided as comma separated list of fully qualified class name string values. In an example, the class type information is included herein below.

```
Public class Parent implements BindObject {
    Public BindObject child1;
    Public int child2;
    Public List child3;
}
```

Additionally, an example of a class type declaration as Action Configuration Parameter may be provided in the following manner:

```
com.xyz.wsc.comms.Parent, com.xyz.wsc.comms.
CertificateResponse, com.xyz.wsc.comms.Certificate
```

In the above examples, the parent class may resemble the parent class type which may be composed of BindObject type child1, int type child2, and List type child3. Also, in the class type declaration example, the second class type declaration CertificateResponse may be used to identify the run time type information for child1. Similarly, third class type declaration, the Certificate, may identify the child3 content that may be of the type of object collected in list. The list data content may be provided as any of the wrapper types like Integer, Map or may be any other valid Java type. It may result in a runtime exception if class type information is not provided.

In an example, additional rules may be defined regarding streaming of object graphs using the TyLV protocol. The streaming of object graphs in the TyLV protocol may be similar to Java object serialization protocol. However, in the TyLV protocol, all the objects composing the graph may be TyLV compliant. Further, a root object of the graph may almost always be an object implementing the TyLVBindObject interface.

In an example, the TyLV compliant POJOs may be defined as plain value aggregation objects that may not contain any functionality. These POJOs which may be defined for the purpose of TyLV streaming may be used only in scenarios where streaming is the prime objective. Further, putting computation in the POJOs may be avoided.

In an example, probable range of values for an integral data type may be identified before defining it. As an example, defining a long variable for carrying values that may be accommodated in a short type may be avoided if the probable range of values for the variable is known. In order to achieve this objective, a type may be assigned by such as anticipating the max value that may need to be transferred. However, in other embodiments such as in cases where anticipation of the maximum value is not possible, the most accommodating type may be selected accordingly. Further, it may be advisable to take care of underflows and overflows in code which may involve numeric computation. This may be helpful in avoiding assignment of negative values to bind object members, which may not be supported by the engine.

In an example, the TyLV protocol may include inheritance support for streaming. Further, as a protocol change, negative values and float support may be enabled. Also, the TyLV protocol may support prepending of runtime class type information to the actual data of that class type. This may be similar to serialization of an object in Java, and may enable the decoding engine to identify a correct actual bind object type or the list content object type.

An example of a valid POJO may be defined as:

```
Class ValidBindObject implements TyLVBindObject{
    public String member1 ;
    public int member2 ;
    public AggregateObject member3 ;
    public AnotherAggregateObject member4 ;
    public AnotherAnotherAggregateObject member5 ;
```

-continued

```
    public static class AggregateObject implements TyLVBindObject{
        public int member1 ;
        public String member2 ;
    }
    public class AnotherAnotherAggregateObject implements
    TyLVBindObject{
        public int member1 ;
        public String member2 ;
    }
}
```

An example of an invalid POJO may be defined as:

```
        class InvalidBindObject implements TyLVBindObject{ @1
public final String member1 ; &&1
        public static int member2 ; &&2
        private int member3 ; &&3
public TyLVBindObject invalidAggregateMember4 = new
TyLVBindObject( ) {@2
};
public InvalidBindObject (String value){ @3
    //whatever
}
public TyLVBindObject invalidAggregateMember5; @4
```

In the above examples, error points may be indicated such as by @XX and ignored points may be indicated such as by &&. In an example, these errors may be runtime errors.

In accordance with exemplary and non-limiting embodiments, this document discloses an MTP 5.x wallet and widget infrastructure model for mPayment and mCommerce ecosystems. The MTP 5.X model may address and incorporate customer feedback on various features associated with an MTP 4.x abstraction model which may be related to committing to an abstraction model and reliance on middleware to build phone application. Some of the exemplary features of MTP 4.x that the model 5.x may address may be such as but are not limited to customer desire to such as incorporate new phone features instantly without waiting for support from middleware providers; expensive training on a new, proprietary tool that may include Human Resource (HR) related concerns; considerable rework and cost required in migrating away from the middleware.

In an example, the MTP 5.x model may support development simplicity, lower on-going maintenance effort, and an ability to support third party widgets.

In an example, an MTP 5.x client may provide flexibility to developers to such as use one or more of the capabilities of the model. The architecture may comprise stand-alone libraries that may contain infrastructure components such as Comms, NFC, Crypto and the like. In accordance with the MTP 5.x model, these components may be extracted into stand-alone libraries. Further, parts or the entire mobile application may be built entirely on a native phone operating system. These parts may include user interface components, business logic, or any other components of the mobile application. Further, the widgets provided in the model may be supported through such as a phone independent application programming interface (API) layer. In an example, the widgets may also use application programming interfaces (APIs) that may be offered by the mobile application, which may be in addition to the application programming interfaces (APIs) available from the runtime. In an example, the model architecture may allow client runtime, to be bundled within the mobile application. In an alternate example, the mobile application may be built on the runtime.

In an example, the modularity of the MTP 5.x architecture may allow three types of deployment for a mobile application. These three deployment models may include such as an independent native application model, a hybrid ecosystem application model, and a cross platform ecosystem application model. These models may be discussed in greater detail in succeeding description of the invention as follows.

The independent native application model OM1.1 (hereafter referred to as model 1 for simplicity) may be targeted to customers that may not need widgets. This may provide a unique and custom user experience for such customers. The model 1 may include a phone operating system environment including such as a plurality of mobile libraries. The libraries may be used by such as a mobile application such as an mWallet client application. The mobile libraries may facilitate the customers to leverage the existing mobile libraries to build mobile application components, such as a Crypto component or a Comms component, instead of having to build the components from scratch. The libraries may be designed to facilitate mobile transactions and wallet related capabilities. In an example, the mobile libraries may be coupled to the MTP server and may provide a complete out of the box infrastructure solution for the customers of the mobile application.

As an example of the independent infrastructure support capabilities of the model 1, a crypto component may be built using this model such that it may provide more than just wrappers over the native crypto operations. The component may perform as a security component that may handle functions such as key generation, key management, personal identification number (PIN) management and the like.

In an example, each of the libraries may be incorporated by itself, without any external dependency. The developers of the mobile application OM214 may integrate best of the breed libraries from third party sources to provide the complete mobile application solution OM214.

The hybrid ecosystem application deployment model (also referred to as a model 2 hereafter for simplicity of the description) may be targeted to customers that may require a unique, native experience along with a capability of service extensibility through the widgets. The model 2 may include a mobile application and application programming interface which may be built such as over a phone operating system. In accordance with the model 2, the entire client runtime software may be bundled with the mobile application. The phone operating system may include a plurality of libraries which may be used by the mobile application such as the mWallet client application. The model 2 may also include the widgets that may be supported by such as a phone independent API. In an example, the model 2 may be capable to not compromise on user experience, performance or application functionality. The model may have higher development costs as a variable portion of the mobile application such as the mWallet may be custom built for each phone platform.

In an example, the client runtime software of the model 2 may switch between native screens and screens built using extensible markup language (XML) through a toolkit. The runtime may also allow integration of actions developed such as in JavaScript, that may be through the toolkit, and actions developed through native implementations. In this manner, in an exemplary embodiment a large part (such as 80 percent) of the mobile application may leverage the runtime and toolkit related development efficiencies while the rest may be built native for a differentiable experience. The widgets may be built using a toolkit such as using XML, cascading style sheets (CSS), and JavaScript. This may allow developers a greater flexibility while staying updated with all phone platforms as the developers may bypass the runtime to create functionality that may not be available through the runtime. In an example, the widgets may be able to use development support through the runtime. However, the widgets may also use the mobile application's exposed application programming interfaces (APIs) for development. The widget toolkit may make it easier and smoother for ecosystem service providers to develop the widgets. The application tools may be enhanced to support hybrid assembly and packaging.

FIG. OM1.3 illustrates a cross platform ecosystem application deployment model in accordance with the MTP 5.x architecture. The cross platform ecosystem application deployment model (also referred to as model 3 hereafter for simplicity) may be a cost effective model that may be targeted to customers such as whose requirements may be fulfilled by the capabilities of the client application runtime. The model may include a mobile application and API built over such as a phone operating system that may include multiple libraries. Further, in accordance with the cross platform ecosystem application deployment model, multiple widgets may be supported by such as a phone independent API. Further, in accordance with this model, both the client application and widgets may be built using toolkits that may support cross-platform development.

In an example, the model 3 may be similar to a deployment model in accordance with an MTP 4.x version of the MTP architecture with the exception that MTP 5.x may facilitate or support platform extensions as opposed to the MTP 4.x version.

Figure 54:
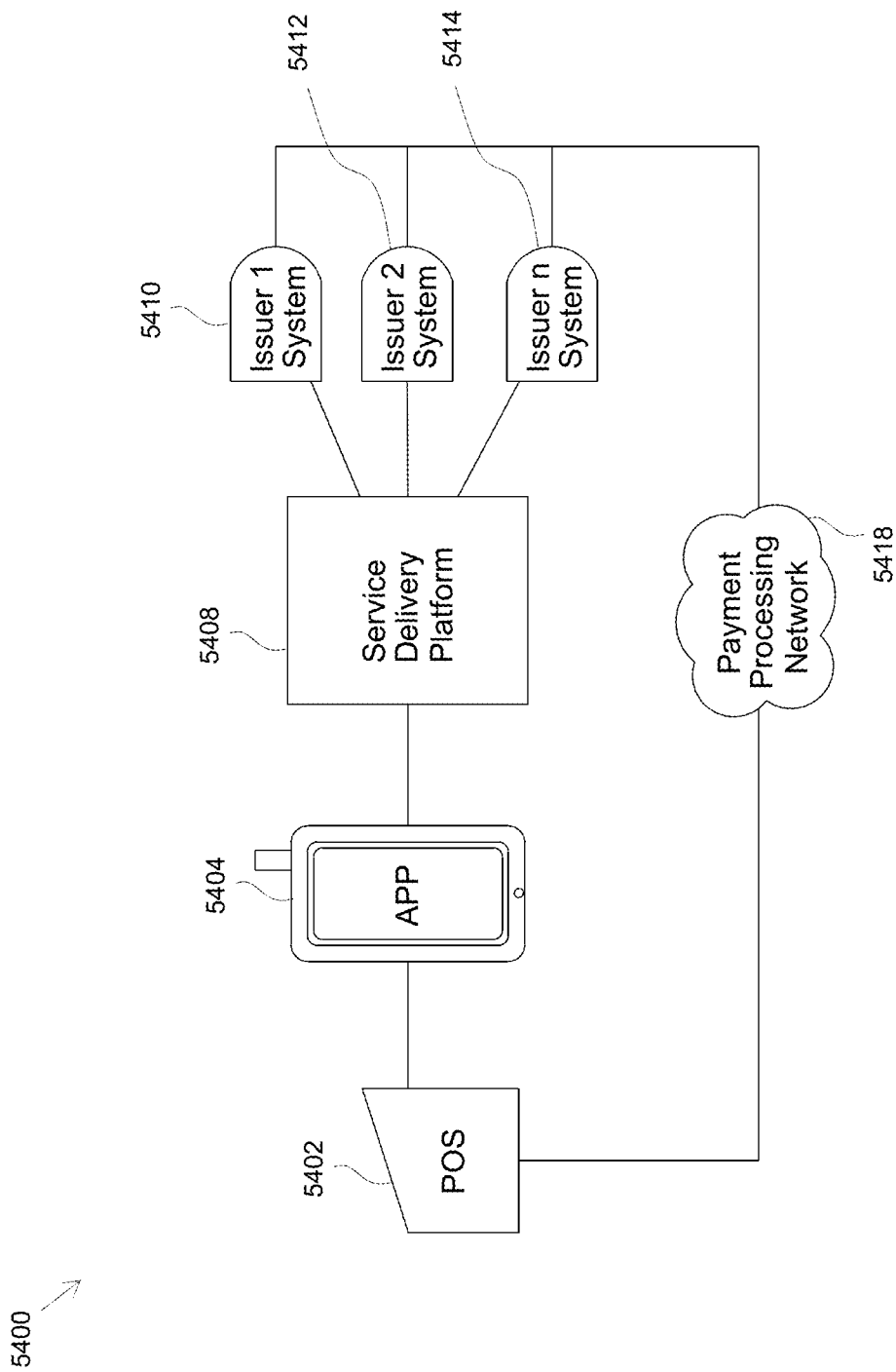
FIG. 54 illustrates a high level block diagram of various subsystems of a payment facilitator system.

FIG. 54 illustrates a high level block diagram of various subsystems of a payment facilitator system 5400 as used in the deployment of a service delivery platform ecosystem (hereafter referred to as SDP 5408 for the purpose of simplicity of description and discussed later), in accordance with an exemplary embodiment of the present invention.

In accordance with an exemplary embodiment, various subsystems within the payment facilitator 5400 may include a point of sale (POS) 5402 terminal, application (APP) 5404 such as a mobile application 5404, SDP 5408, several issuer systems such as including the depicted issuer system 1 5410, issuer system 2 5412, and issuer system 3 5414, without limitations. The various subsystems may be connected over a network such as a payment processing network 5418. The APP 5404 can further include one or more widgets.

The payment facilitator 5400 of FIG. 54 may facilitate in leveraging mobile phones at a physical merchant POS 5402 such as the POS 5402 to such as enact payment of goods and services. The mobiles phones may thus be utilized to facilitate payment as an alternative to plastic-based physical transaction cards such that a payment transaction can be processed, routed, and settled through the payment facilitator. As such, a merchant may be facilitated with the use of the payment facilitator 5400 as it may reduce the overall costs associated with a transaction. Also, the payment facilitator 5400 may be advantageous for a customer or a consumer as it provides a rewarding shopping or transaction experience that can save money such as through offers, loyalty, or the like promotional schemes or overall reduced prices offered by the merchants due to savings obtained by the merchants from the payment process with the use of the payment facilitator 5400.

The payment facilitator 5400 may provide consumers a choice with multiple payment products across several issuers like issuers. The payment facilitator 5400 may provide an improved payment experience to the consumers as compared to other transaction modes and may be as simple as pulling out such as a physical leather wallet, selecting a card, and swiping it over a machine. Also, the payment facilitator 5400 may provide a secured platform with better risk management as compared to conventional plastic cards and payment options. The merchants may also be facilitated with the use of the payment facilitator 5400 such as making several available for the merchants with respect to their individual POS equipments. In addition, several promotional schemes or value added services such as coupons, offers, loyalty, and receipts can be integrated into the payment facilitator 5400 to provide a holistic retail experience for the merchants as well as the consumers.

In accordance with an exemplary embodiment, FIG. 54 depicts the payment facilitator 5400 from a payment perspective. However, as the payment facilitator 5400 scales similar models of the payment facilitator 5400 may be applied for other non-payment instruments such as coupons, loyalty cards, and the like.

In an embodiment of the present invention, the APP 5404 as shown in FIG. 54 may be a mobile application 5404. The mobile application 5404 can include such as a wallet (also referred to as virtual wallet) as one of its components. A consumer can be associated with one or more such wallets. The wallets may facilitate consumers such as during payment processes for the sake of convenience, compactness, and interoperability provided by the wallets. Each of the wallets may be configured to hold a subset of a consumer's transacting instruments. In accordance with various embodiments, the wallet may securely store and protect consumer payment account information, organizing and managing lifecycle of consumer payment accounts, implement strong authentication as required to access the accounts, provide options for selection of a specific account for a transaction, execute the transaction with the POS 5402 or payment gateway with the selected account, implement and enforce business rules governing access to the accounts and transactions using these accounts. In accordance with several embodiments, several forms and implementations of the virtual wallets may be possible depending upon various parameters such as including without limitations an entity hosting the wallet, a channel through which a consumer transacts and location where payment credentials are stored, and the like.

In an exemplary scenario, a consumer or a user can create a wallet such as on a shopping store or website for example "merchant.com" and add payment cards using such as a web portal. In an example, such a wallet may be referred to as an on-line wallet that may provide convenience during such as purchase of products only from "merchant.com". It must be appreciated that the payment facilitator 5400 may facilitate the consumers to add their pre-existing payment accounts to the virtual wallets by themselves. However, in some other cases such as merchant issued cards (e.g. gift cards), the payment accounts may be added automatically.

In some examples, an entity such as a bank or any other financial institution (FI) may establish their own versions of the virtual wallet. In such cases, the entity may take on a significant level of risk and indemnify the merchants from fraud since they may provide wallet functionality such as holding an account, authenticating a user, card selection, and the like, and are issues merely for payment account. In such cases, the wallets may thus be limited to self-issued instruments.

The wallets and each payment type of the wallets may be configured to comply with such as defined business rules, interchange fees, PCI compliance, and the like such as by mapping various standards and payment pricing models across from plastic to the virtual wallets. In an embodiment, the wallets may be implemented in such as smart phones such as implemented within or using capabilities of mobile handsets or other such handheld devices. This may facilitate extension of the virtual wallets from an on-line deployment to the physical POS 5402.

In accordance with the embodiments of the present invention, the wallet may be a component or a subsystem of the mobile application 5404 or the container as described above. The mobile application 5404 (as shown in FIG. 54) may include several services and functions such as the wallet without limitations. For example, a mobile application 5404 with the wallet as one of the several mobile services, one or more additional services or functions may be provided such as to create a motivation within a consumer to purchase. Therefore, while the additional services may promote motivation to purchase, the wallet may provide the functionality required for the purchase to be completed or executed such that the focus of the wallet may be on purchases executed at the POS 5402 such as a physical POS 5402.

Figure 55:
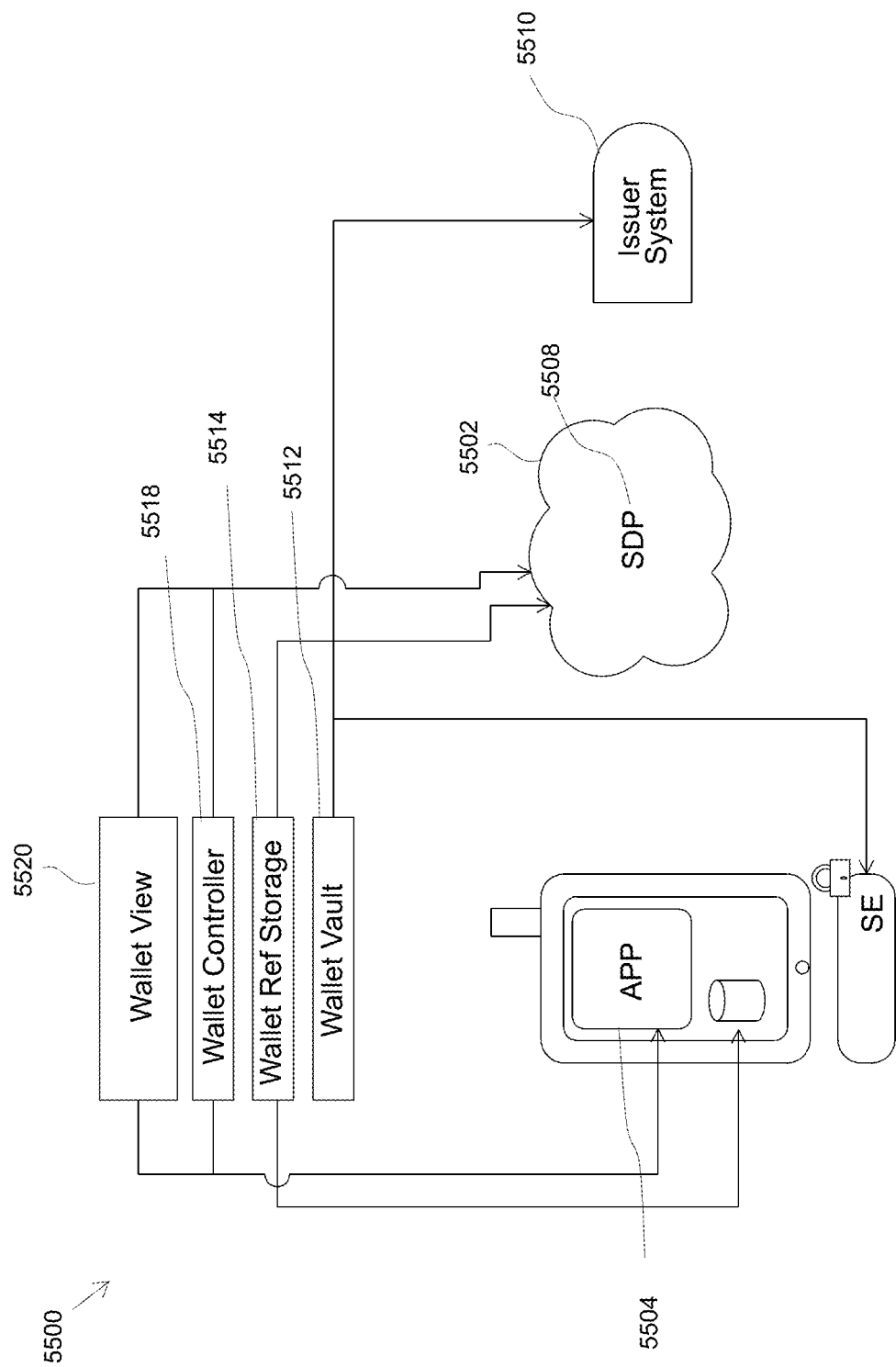
FIG. 55 shows various components of the wallet.

FIG. 55 shows various components of the wallet, in an exemplary embodiment of the present invention. The wallet of FIG. 55 can be termed as a software wallet 5500. In accordance with various embodiments and depending on the design of the payment facilitator and the service delivery platform ecosystem 5502, the various components of the wallet may be variously located in any suitable combination of the mobile phone or any other handheld device 5504, SDP 5508, or the issuer system 5510. Therefore, the wallet 5500 can be construed and viewed as a distributed component or a combination of distributed components that can run across multiple systems or subsystems such as shown in FIG. 55. As shown in FIG. 55, the wallet may include a vault 5512, a reference store 5514, a wallet controller 5518, and a wallet view 5520.

The vault 5512 may be a secured storage associated with each individual payment credential. In an embodiment, the vault 5512 may be consolidated on a secure element. In another embodiment, the vault 5512 may be distributed across several systems or subsystems such that each subsystem or system such as an issuer may retain control of the payment credential and release of such as single use tokens upon request. In an embodiment, the service delivery platform ecosystem may employ the distributed model, however it must be appreciated that the use the consolidated model may be possible and within the purview of the invention.

The reference store 5514 may serve as a repository of reference data relating to such as the contents of the wallet. The reference data may include such as but is not limited to artwork and branding, issuer information, routing information (and reference identifiers), masked account data, metadata, and the like. In an embodiment, a subset of these data elements may be stored on such as the mobile phone such as within a memory of the mobile phone while the complete set or data may be stored on a server associated with the SDP 5508 referred to as SDP server (as discussed later in detail).

The wallet controller 5518 may be configured to implement such as a wallet specific business logic and lifecycle. The wallet controller 5518 may be configured to control and manage the wallet and provide interfaces such APIs to external systems that may access the wallet. Additionally, the wallet controller 5518 may be configured to implement protocols such as to communicate with the POS. For example, the wallet controller 5518 may reside on the SDP server in a typical deployment of the service delivery platform ecosystem of the present invention.

The wallet view 5520 may be a user interface associated with the wallet such as to facilitate access, interaction, population, and management of the wallets by respective users through means provided by the wallet view 5520. The user interface provided by the wallet view 5520 may be created separately and preferably consistently for each channel such as including but is not limited a mobile phone, web, IPTV, and the like that may be used to access the wallet. In an embodiment of the present invention, the wallet view 5520 may be included in a container application designed for and associated with the service delivery platform ecosystem. In an embodiment, the wallet view 5520 may be included in a web interface for the consumers linked through the service delivery platform ecosystem.

In an exemplary embodiment, the payment facilitator may be deployed in a mobile wallet. The wallet may be deployed such as in mobile payment-based systems such as the service delivery platform ecosystem 5502 or the payment facilitator. The wallet 5500 may be configured so as to facilitate the consumers to choose a certified application to access the wallet such as the wallet associated with the payment facilitator from the cloud to perform payments. In an embodiment, these payments may be made at the POS. In another embodiment, these payments may be made at a remote locate location.

The wallet architecture may include such as the wallet view 5520, wallet controller 5518, wallet vault 5512, application, reference storage 5514, service delivery platform 5508, a plurality of the issuer systems such as the issuer system 5510-5514. The service delivery platform 5508 may further include a master wallet, and several application wallets such as a first application wallet, a second application wallet, and the like. The application may include such as a first application 1, a second application, and an application for the payment facilitator.

In an embodiment, the SDP 5508 architecture may include several SDPs 5508 and SDP wallets with such as a hierarchical parent child relationship among them. The SDPs 5508 may be configured to maintain a parent-child hierarchy with multiple wallets. Each of the applications such as mobile applications may be linked to an independent wallet instance. The SDPs 5508 may be configured to maintain a parent-child relationship between such as a parent payment facilitator wallet and child application wallets corresponding to the respective parent wallets. In such a scenario, the architecture may be designed so as to define a single SDP 5508 and single wallet view 5520 to a consumer such that the consumer perceives as if interacting with a single wallet and SDP 5508 that is used from within different applications or different wallet views 5520.

In a hierarchical architecture as discussed above, all instruments may be provisioned to the parent payment facilitator wallet i.e. to the reference store 5514 of the parent wallet of the payment facilitator. The actual wallet vault 5512 may be configured to remain with and under control of the issuer systems 5510. However, in an embodiment, non-sensitive information may be provisioned to the SDP 5508. The child wallets may be configured to have their own reference stores 5514 such as to enable a filtered view on the reference store 5514 of the parent wallet of the payment facilitator.

In embodiments, various wallet lifecycle rules such as PIN length, allowed PIN retried, and the like may be configurable independently for each wallet within guidelines such as set by the payment facilitator. The mobile application may request a token from the SDP 5508 at the time of payment. The SDP 5508 may be configured to use an enterprise service bus (ESB) to retrieve a token for the payment account. The token may be a one-time token such as generated by the issuer system. The request for token retrieval and generation may be associated with a strong authentication process by the SDP 5508 and an optional additional authentication available to the issuer system. The token may then be used at the POS through one of the available channels. In an embodiment, the individual mobile applications may communicate consumer services from the SDP 5508 through standard web services in order to access the corresponding wallet.

In accordance with some exemplary and non-limiting embodiments of the wallet architecture, the issuers may be involved in safeguarding payment credentials and issuing the tokens. The issuer may be allowed to control format of the token and may include additional security measures as appropriate and relevant. Further, the issuers may have minimal impact on chargeback and other exception scenarios as the issuer may be directly involved in provisioning and payment flows. The wallet architecture may also provide wallet accessibility from multiple mobile applications such as from the multiple wallet views 5520. Also, during authentication, each wallet may be authenticated independently with such as independent passcodes and may be managed or activated or locked or suspended and the like independently while still providing a user with a consistent user experience. The wallet architecture may also enable a configurable rule-based filtering for filtering the reference stores 5514 for each child wallet thereby allowing a merchant to have an allowed subset of all the user's payment cards. Also, the architecture may facilitate default accounts to be easily set as per the respective wallets separately. The wallet architecture may also enable automatic population of the consumer's branded container of the payment facilitator with payment credentials in the consumer's master wallet. This may facilitate management of all accounts from a single location. Further, through this single location-based management, the users can also identify their other applications that are used to access their wallet of the payment facilitator.

The SDP 5508 as discussed and referred above, and shown in FIG. 54 may be configured as a system that may be configured to package and deliver services to the consumers through several channels. The SDP 5508 may facilitate an organized, easy to consume manner packaging and delivery of the services through the multiple channels. The SDP 5508 may be enabled such as in a mobile payment domain. The SDP 5508 may be configured to perform such as enrolment, know-your-customer (KYC), and creation of a user wallet instance. The SDP 5508 may be configured to manage the lifecycle of the wallet along with linkages to various end point devices. The SDP 5508 may be configured to such as provide standardized interface to consumers for service discovery and selection. The SDP 5508 may be configured to such as offer issuer governed enrollment and provisioning of services in a uniform manner. The SDP 5508 may be configured to such as implement strong authentication, security and trust models around service provisioning and consumption. The SDP 5508 may be configured to maintain detailed audit trails, logs, and transaction records for such as the services and wallet events, and the like. The SDP 5508 may be configured to onboard individual service providers, aggregate disparate service hosts, enforce service implementation standards, and manage overall growth of the ecosystem, and perform several other functions. The functions and configurations of the SDP 5508 discussed here are merely exemplary without limitations. In still some embodiments, the SDP 5508 may be configured to perform several other functions and tasks based on such as the nature of the services delivered by the SDP 5508. For example, the services related to the financial transactions may have extra mandatory requirements for security and reliability such that the SDP 5508 may be configured to enhance the security related tasks while delivering the financial services. Furthermore, the SDP 5508 may be configured to further enhance system scalability and redundancy while delivering services to public in large.

The SDP 5508 may be designed to include various components specifically for the payment facilitator in an exemplary embodiment of the SDP 5508 ecosystem deployment based on the MTP methods and systems described herein including wallets, containers, MTP servers, service providers and the like. In an example, there may be several components working together to fulfill the SDP server functions. The components may all be deployed in a highly secure, highly scalable, high availability enterprise server configuration. In an example, the ESB may standardize and interconnect multiple partners and systems from which services may be consumed and delivered to the mobile container. Each partner service provider may be on-boarded through a series of steps that are modeled in the SDP 5508. These steps may be defined by the payment facilitator and be governed by the nature of the service offering (e.g. payment, offers, loyalty, etc.).

Various exemplary components of the payment facilitator SDP 5508 may be described herein. In an example, the payment facilitator SDP 5508 may include a communication component. The communication component may deal with the communication protocols, codec, serialization, enveloping, and complexities of packet switched communication with the mobile application over multiple data channels. In an example, the payment facilitator SDP 5508 may include a message bus & notification component. The message bus & notification component may support produce/consumer based model for object exchange, along with message structures, with the mobile client. In an example, the message bus & notification component may also facilitate push notifications, alerts, etc. allowing the SDP 5508 to proactively reach the container application to perform some activity. In an example, the payment facilitator SDP 5508 may include a security/authentication component. The security component may facilitate implementation of the security related designs for strong authentication, data privacy, confidentiality/privacy, data integrity, and the like as they relate to the overall trust models and risk management of the services being delivered. In an example, the payment facilitator SDP 5508 may include an over-the-air (OTA) provisioning component. The OTA provisioning may be configured for dealing with the over-the-air provisioning and delivery of the application, widgets, instruments (payment, offers, loyalty, tickets, and the like) and proxy services for tokenization of the instruments. In an example, the payment facilitator SDP 5508 may include an OTA TSM proxy component. The OTA trusted service manager (TSM) proxy component may be required only in a secure element (such as illustrated in FIG. 55) based ecosystems for over the air provisioning of applets and managing the secure element security domains. In an example, the OTA TSM proxy may typically interface with an external third party TSM. In an example, the payment facilitator SDP 5508 may include a wallet and widget management component. The wallet and widget management may create and manage the lifecycle of a consumer's wallet, association of the wallet with one or more devices, and personalizing the application with one or more widgets and the lifecycle of those widgets. In an example, the payment facilitator SDP 5508 may include a transaction engine. The transaction engine may be configured for dealing with transactional reliability across the wireless channel and maintaining a complete audit trail of the services being delivered. The transaction engine may facilitate receipt and other associated transactional services. In an example, the payment facilitator SDP 5508 may include an instrument management component. The instrument management component may be configured for managing the lifecycle of individual instruments that a consumer populates in their wallet. In an example, the payment facilitator SDP 5508 may include a location and geo-fencing component. The location and geo-fencing component may assist the service providers in setting up geo-fences and opt in location-based services. In an example, the location and geo-fencing component may generate triggers for the service providers when consumers enter the geo fences based on which targeted services can be delivered. In an example, the payment facilitator SDP 5508 may include an augmented reality component. The augmented reality component may provide unique and advanced user experience infrastructure that may be incorporated within the wallet and widgets.

In an exemplary embodiment of the SDP 5502 ecosystem deployment based on the MTP methods and systems described herein the message definitions may be created for the ESB that may enforce standards and protocols that may be created for the payment facilitator. The service providers may then implement the ESB connectors such as to expose their services to the platform in a way that the various stakeholders of the payment facilitator infrastructure may consume the services.

In an exemplary embodiment of the SDP 5502 ecosystem deployment based on the MTP methods and systems described herein, the service provisioning from the SDP 5508 may a set of basic steps. In some embodiments, some steps may be optional depending upon the nature of the service and the preference of the service provider. In an example, a first step may include registration and KYC. At this step, the consumer may request a service (wallet, payment account, etc.) and provide the required personal information in order to perform relevant KYC steps. Further to registration and KYC, a service approval may be required for further processing. The service approval may require a service partner to approve the service request after following relevant internal business processes. The service approval may create relevant credentials for the consumer and any service payloads. In some embodiments, the service approval may be optional. A next step may be service provisioning. At this step a service may be provisioned to the user. The service provisioning may include delivering components of the service to a consumer phone or creating necessary updates on a consumer server. The service provisioning may be followed by service activation. The service activation may be required to confirm that the service is provisioned correctly, to the correct user, and all states are set to "READY" for the service to be consumed. In some embodiments, the service activation may be optional. A next step may be service execution. At this step, the consumer may start using the service from within their application. A next step may be service management, which may include all updates and lifecycle components of the service.

In an exemplary embodiment of the SDP 5502 ecosystem deployment, the SDP 5508 architecture for payment facilitator may allow the service partners to configure and control their service products in a way that they comply with the payment facilitator specifications (through the ESB interfaces), but control their own process, service data, and business rules. Such a control and management may be essential for an open ecosystem that may attract a critical mass of service providers.

In an exemplary embodiment of the SDP 5502 ecosystem deployment based on the MTP methods and systems described herein including wallets, containers, MTP servers, service providers and the like, there may be a mobile phone stand-in may conduct a transaction at a POS. A high-level mobile payment scenario flows is described herein. However, it should be noted that these steps are high level and may be re-arranged to suite a specific user experience, and other steps may be inserted in order to provide additional functionality. The purpose of this disclosure document is to demonstrate various deployment options for the payment facilitator and not specific use cases for payment.

In exemplary and non-limiting embodiments, for affecting the mobile payment a consumer may have to first arrive at checkout terminal and items to be purchased may be scanned. The consumer may then launch a mobile application on the mobile phone and may be required to enter login credential (for example, PIN, password, or passphrase and the like). The mobile application may connect to the SDP 5508 to validate login and authenticate consumer and device. The mobile application may present a list of payment options that may be stored in the consumer's mobile wallet upon successful authentication of the service and device. The consumer may be required to choose a payment option (for example, a gift card) from the list provided to the consumer.

After the payment option may be chosen the mobile application may initiate a checkout process with the POS. The payment option may be initiated via multiple implementation options depending upon the channels that may be supported by the POS and the mobile phone. In an example, a tokenized NFC may be used for initiating the checkout process. The POS may be near field communication (NFC) enabled for this option. The mobile application may request the SDP 5508 for a token for the selected payment card. The SDP 5508 may authenticate the mobile application and may route the request to corresponding token generator for a concerned issuer. The consumer may be required to tap the phone at the NFC enabled POS to transmit token. In an example, the NFC may be international organization for standardization (ISO) and the international electrotechnical commission (IEC) standard 18092. In an example, a secure element NFC (SE NFC) may be used for initiating the checkout process. In this case, the consumer may be required to tap the phone at NFC enabled POS with the payment credential stored in the SE on the phone. In an example, the NFC may be international organization for standardization (ISO) and the international electrotechnical commission (IEC) standard 14443. In an example, a QR code scan may be used for initiating the checkout process. The mobile application may request the SDP 5508 for a token for the selected payment card. The SDP 5508 may authenticate the mobile application and may route the request to corresponding token generator for a concerned issuer. The mobile application may convert token into a 2D bar code that is scanned by the POS. In an example, a virtual reader may be used for initiating the checkout process. The mobile application may capture the merchant, POS, and transaction information by scanning a QR code or tapping an NFC tag. The mobile application may send the data along with selected card OTA to SDP 5508. The SDP 5508 may request token, and send the token along with other information to POS through a back-end process.

A next step after initiating the checkout process may require the POS to processes the transaction and route the process to the payment facilitator. The payment facilitator may route the transaction to the issuer of the payment card at a next step. The issuer may authorize the transaction and approval may be delivered to the POS at a next step. The POS may confirm the transaction and delivers a receipt. In an example, the receipt may be printed, electronically delivered to the mobile application or e-mailed at a verified email address. The delivery of the receipt may complete the Mpayment process and the consumer may leave the checkout terminal with the items purchased.

In an exemplary embodiment of the SDP 5502 ecosystem deployment based on the MTP methods and systems described herein including wallets, containers, MTP servers, service providers and the like, various deployment models may be employed by the merchants. The merchants may be at various stages in their individual mobile strategies; and therefore, it may be required to support multiple deployment models for merchants so as to adopt a common payment facilitator. The payment facilitator along with each issuer may approve and certify the entire transaction path from a security and risk management perspective such as to keep the transaction costs low. Therefore, it may be important to have a common platform that may be shared amongst all participating merchants.

In exemplary and non-limiting embodiments, there can be three models that may be used for deployment. The three models ay co-exist and a merchant may adopt one or more of these models depending upon their individual strategies. In exemplary and non-limiting embodiments, more or less than the three models described herein may be deployed. In exemplary and non-limiting embodiments, the models may be configured for implementing payments, offers, loyalty offers and the like.

In an exemplary embodiment of the SDP 5502 ecosystem deployment based on the MTP methods and systems described herein, the deployment model maybe a merchant application with a child payment facilitator wallet. The consumers may be required to pay at a POS using their existing, in-market merchant mobile applications linked to their primary payment facilitator wallet through direct child wallets that are provisioned and managed by the SDP 5508 wallet platform. The child wallets may be independently configured but linked to the master wallet. In an example, the existing merchant mobile applications interface directly with the SDP 5508, through the OTA web service interfaces. The SDP 5508 may provide authenticated, controlled, and filtered access to the consumer's payment facilitator wallet and the merchant application may be used for transaction at the POS. In an example, the SDP 5508 may aggregate multiple payment issuers supporting multiple payment channels and manages both the consumer's parent payment facilitator wallet and child merchant wallet.

In an exemplary embodiment of the SDP 5502 ecosystem deployment based on the MTP methods and systems described herein, the deployment model maybe a merchant application with a merchant wallet. The merchant may use their independent third party wallet within their mobile application and may access the payment credentials from the master payment facilitator wallet.

In an exemplary embodiment of the SDP 5502 ecosystem deployment based on the MTP methods and systems described herein, the deployment model maybe based in a payment facilitator container. The consumers may pay using a payment facilitator branded mobile application that may automatically get populated from the SDP 5502 and provide consumers with a uniform view into their parent payment facilitator wallet. The SDP 5502 may aggregate multiple payment issuers supporting multiple payment channels and manage the consumer's payment facilitator wallet. In an example, the payment facilitator mobile application may interact with merchant POS to perform transactions without any additional development by merchants. In an example, the merchants and issuers may optionally create their own widgets to run within the payment facilitator application to create custom experiences.

Figure 56:
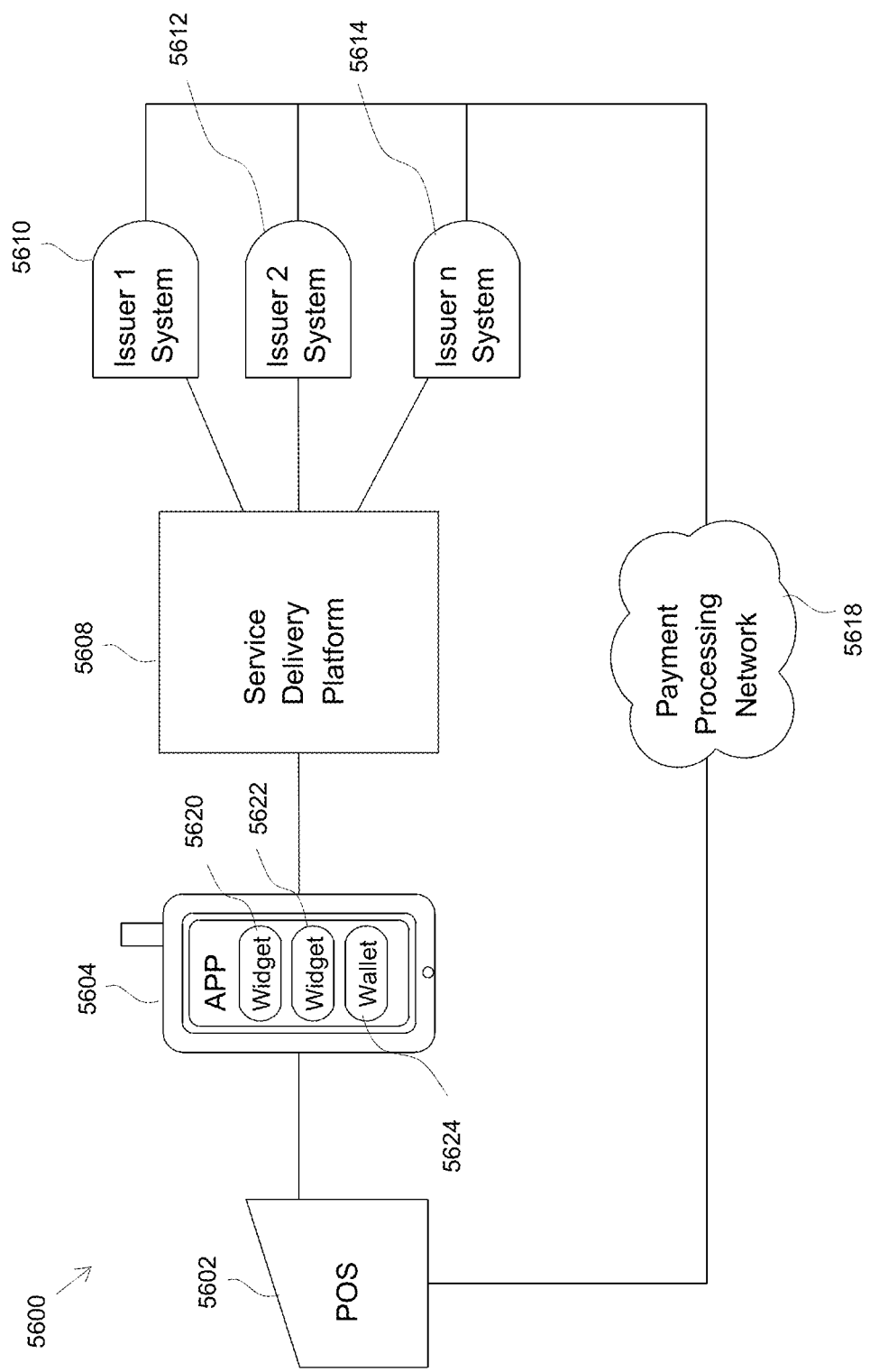
FIG. 56 illustrates a high level block diagram of the deployment model 5600 maybe based in a payment facilitator container.

FIG. 56 illustrates a high level block diagram of the deployment model 5600 maybe based in a payment facilitator container.

In accordance with the illustrated embodiment, various subsystems within the payment facilitator may include a point of sale (POS) 5602, application (APP) 5604 such as a mobile application 5604, SDP 5608, several issuer systems such as including the depicted issuer 1 system 5610, issuer 2 system 5612, and issuer 3 system 5614, without limitations. The various subsystems may be connected over a network such as a payment processing network 5618. The APP 5604 may further include a first widget 5620, a second widget 5622, and a wallet 5624.

The illustrated embodiment may be one example of a payment facilitator payment guideline that may have to be managed across multiple issuer systems such as the issuer systems 5610-5614 and multiple merchants. The consumer may not be aware of complex back end operations of mobile transactions in order to create a simple experience of "Select card and Pay". The payment facilitator brand may be created and marketed through a payment facilitator wallet container application 5604. In an embodiment, the merchants may promote the payment facilitator standard as a payment acceptance brand. In an example, multiple issuers 5610-5614 may be supported with diverse payment products and multiple POS 5602 channels giving consumers a choice of payment options that may fit their needs across multiple merchants. The payment facilitator container may require a minimal effort on the part of merchants to accept the payment facilitator payment options. The POS 5602 sidework may be required as widgets may be optional. The payment facilitator container may ensure payment processing in compliance to payment facilitator guidelines and standards for POS 5602 based transaction.

The payment facilitator container model may leverage the full power of the SDP the back and front-end aggregation of multiple service providers. As illustrated in FIG. 56 a payment facilitator branded mobile application 5604 (container) may be built using the MTP wallet toolkit.

The container may include a wallet implementation that may incorporate the payment facilitator specifications. The wallet may get automatically populated from the SDP as consumers create their payment facilitator wallet. In an embodiment, the payment facilitator container may be used to make payments at a payment facilitator compliant POS 5602 without any further development by the merchants. In an embodiment, the merchants may have an ability to create widgets using the MTP toolkit that may be specifically designed to provide a merchant centric user experience at the POS 5602. The widget creation may be at the merchant's discretion and may be implemented or added at any time. The SDP may aggregate and allow for the on boarding of multiple issuers 5610-5614, and may allow the merchants to define their payment facilitator compatible payment products and other value added services (VAS). During such on boarding, the issuers 5610-5614 may select the POS 5602 interaction protocols that may be supported for each payment product. The POS 5602 interaction protocols may determine which merchants may accept which payment products as at least one of the issuer-selected protocols may have to be supported by the merchant's POS 5602 channels, for example, NFC, Bar Code, OTA, and the like.

In some exemplary embodiments, the SDP may be configured to manage a 3-dimensional matrix. The matrix may be configured for merchant's POS 5602 supported proximity channels, for example, NFC, 2D Bar Code, OTA, and the like. The matrix may be configured for merchant POS 5602 capability. The matrix may be configured for issuer approved channels.

In an exemplary embodiment of the SDP ecosystem deployment based on the MTP methods and systems described herein, the payment facilitator may be used for mobile payment with a merchant widget. In exemplary and non-limiting embodiments, for affecting the mobile mpayment a consumer may have to first arrive at checkout terminal and items to be purchased may be scanned. The consumer may then launch a payment facilitator mobile application 5604 on the mobile phone and may be required to enter a payment facilitator managed login credential (for example, PIN, password, or passphrase and the like). The consumer may then be required to select a merchant from the dashboard of pay-enabled merchants. The merchant widget may be launched in a "Pay" mode and present a list of payment options accepted at the merchant POS 5602. The list of payment options may be a filtered view on the locally stored options in the consumer's wallet as a part of the payment facilitator container. The consumer may be required to choose a payment option (for example, a gift card) from the list provided to the consumer.

The merchant widget may request a transaction payload from the SDP that may be sent to the merchant POS 5602 for the corresponding channel supported by the merchant POS 5602. The SDP may transfer a transaction payload formatted for the merchant POS 5602. In exemplary embodiments, the transaction payload may be in form of coupons, loyalty, and the like. The transaction payload may be attached based on the merchant POS 5602 ability. The merchant widget may initiate a checkout process with POS 5602 upon receipt of the transaction payload. The initiation of the checkout process may be done similar to as described above with reference to example with no merchant widget generation.

A next step after initiating the checkout process may require the POS 5602 to processes the transaction and route the process to the payment facilitator. The payment facilitator may route the transaction to the issuer of the payment card at a next step. The issuer may authorize the transaction and approval may be delivered to the POS 5602 at a next step. The POS 5602 may confirm the transaction and delivers a receipt. In an example, the receipt may be printed, electronically delivered to the mobile application 5604 or e-mailed at a verified email address. The delivery of the receipt may complete the mpayment process and the consumer may leave the checkout terminal with the items purchased.

In an exemplary embodiment of the SDP ecosystem deployment based on the MTP methods and systems described herein, a user interface (UI) in the payment facilitator container. The UI concept described herein may be used as reference for an exemplary embodiment only. The UI concept may be subject to changes depending upon user requirement. In an exemplary embodiment, the UI concept may include a wallet controlled mode and a widget controlled mode. The wallet control mode may be configured so that the payment facilitator wallet may control the merchant POS 5602 interaction and payment experience. The wallet control mode may circumvent the need for merchants to create widgets. The widget control mode may be configured so that a merchant may create a widget and the widget may will control the interaction and payment experience at the merchant POS 5602.

The methods and systems described herein may be deployed in part or in whole through a machine that executes computer software, program codes, and/or instructions on a processor. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it may be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It may further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the methods and systems described herein have been disclosed in connection with certain preferred embodiments shown and described in detail, various modifications and improvements thereon may become readily apparent to those skilled in the art. Accordingly, the spirit and scope of the methods and systems described herein is not to be limited by the foregoing examples, but is to be understood in the broadest sense allowable by law.

All documents referenced herein are hereby incorporated by reference.

What is claimed is:

1. A method, comprising:
   executing a digital wallet on at least one of a mobile device and a server of a network-based multi-domain ecosystem for secure personalized transactions to configure and install a digital wallet applet associated with the digital wallet in a security domain region of a secure element subset of a non-transient digital memory that is accessible to the mobile device;
   managing data in the security domain region of the secure element subset as a group by authenticating security keys for the security domain region, and wherein each of a plurality of security domain regions of the secure element require distinct security domain-specific security keys; and
   executing the digital wallet applet, thereby providing a sharable interface through which the digital wallet applet manages access to the digital wallet, the sharable interface providing digital wallet applet-managed access by the digital wallet applet to the digital wallet, providing managed access by another applet executing on the mobile device to the digital wallet, and providing managed access by a multi-domain computing ecosystem server to the digital wallet, wherein the digital wallet applet, the another applet and the multi-domain computing ecosystem server each communicate with the sharable interface electronically.

2. The method of claim 1, wherein managing access to the digital wallet comprises coordinating access to digital wallet resources by the digital wallet applet and at least one of a couponing applet, an over-the-air transaction applet, a service-provider personalized applet, and a payment applet.

3. The method of claim 2, wherein coordinating access to digital wallet resources facilitates a payment transaction that includes use of a coupon and at least one other form of payment that is accessible via the wallet.

4. The method of claim 1, wherein the multi-domain ecosystem server has access to account information corresponding to a resource of the digital wallet and wherein an identifier of the account information is retrieved from the digital wallet by the digital wallet applet for forwarding to a participant.

5. The method of claim 1, wherein managing access to the digital wallet comprises facilitating secure interaction with at least one participant in a multi-domain computing ecosystem for secure personalized transactions.

6. The method of claim 1, wherein managing access to the digital wallet further comprises communicating with other applets via an application protocol data unit interface.

7. The method of claim 1, wherein the digital wallet applet further provides at least two wallet management features selected from a group of features consisting of secure storage, authentication, ID management, activation control, cryptography, key generation, key storage, and PIN control.

8. The method of claim 1, wherein providing a sharable interface under control of the digital wallet applet comprises facilitating access to one or more additional wallet applets via the sharable interface.

9. The method of claim 1, wherein managing access to the digital wallet comprises managing access to secure element content via the sharable interface.

10. The method of claim 1, wherein the sharable interface facilitates managed access by at least one other wallet applet to wallet-related information stored in the secure element sub set.

11. A method, comprising:
configuring and installing a digital wallet applet associated with a digital wallet in a security domain region of a non-transient digital memory that is accessible to a mobile device;
managing data in the security domain region by authenticating security keys for the security domain-specific region, and wherein each of a plurality of security domain regions require distinct security domain-specific security keys; and
executing the digital wallet applet, thereby providing a sharable interface through which the digital wallet applet manages access to the digital wallet, the sharable interface providing digital wallet applet-managed access by the digital wallet applet to the digital wallet, providing managed access by at least one of another applet executing on the mobile device to the digital wallet and a multi-domain computing ecosystem server to the digital wallet, wherein the digital wallet applet, the another applet and the multi-domain computing ecosystem server each communicate with the sharable interface electronically.

12. The method of claim 11, wherein managing access to the digital wallet comprises coordinating access to digital wallet resources by the digital wallet applet and at least one of a couponing applet, an over-the-air transaction applet, a service-provider personalized applet, and a payment applet.

13. The method of claim 12, wherein coordinating access to digital wallet resources facilitates a payment transaction that includes use of a coupon and at least one other form of payment that is accessible via the wallet.

14. The method of claim 11, wherein the multi-domain ecosystem server has access to account information corresponding to a resource of the digital wallet and wherein an identifier of the stored account information is retrieved from the digital wallet by the digital wallet applet for forwarding to a participant.

15. A non-transitory machine readable storage medium having stored thereon a computer program the computer program comprising a routine of set instructions for causing at least one of a mobile device and a network-based multi-domain ecosystem to perform the steps of:
executing a digital wallet on at least one of a mobile device and a server of a network-based multi-domain ecosystem for secure personalized transactions to configure and install a digital wallet applet associated with the digital wallet in a security domain region of a secure element subset of a non-transient digital memory that is accessible to the mobile device;
managing data in the security domain region of the secure element subset as a group by authenticating security keys for the security domain-specific region, and wherein each of a plurality of security domain regions of the secure element require distinct security domain-specific security keys; and
executing the digital wallet applet, thereby providing a sharable interface through which the digital wallet applet manages access to the digital wallet, the sharable interface providing digital wallet applet-managed access by the digital wallet applet to the digital wallet, providing managed access by another applet executing on the mobile device to the digital wallet, and providing managed access by a multi-domain computing ecosystem server to the digital wallet, wherein the digital wallet applet, the another applet and the multi-domain computing ecosystem server each communicate with the sharable interface electronically.

* * * * *